US012598000B2

(12) United States Patent
Yoshino

(10) Patent No.: US 12,598,000 B2
(45) Date of Patent: Apr. 7, 2026

(54) SUBSCRIBER APPARATUS, OPTICAL COMMUNICATION SYSTEM AND OPTICAL SIGNAL MONITORING METHOD

(71) Applicant: NTT, Inc., Tokyo (JP)

(72) Inventor: Manabu Yoshino, Musashino (JP)

(73) Assignee: NTT, Inc., Tokyo (JP)

( * ) Notice: Subject to any disclaimer, the term of this patent is extended or adjusted under 35 U.S.C. 154(b) by 407 days.

(21) Appl. No.: 18/034,012

(22) PCT Filed: Oct. 30, 2020

(86) PCT No.: PCT/JP2020/040980
§ 371 (c)(1),
(2) Date: Apr. 26, 2023

(87) PCT Pub. No.: WO2022/091385
PCT Pub. Date: May 5, 2022

(65) Prior Publication Data
US 2023/0396335 A1      Dec. 7, 2023

(51) Int. Cl.
*H04B 10/27* (2013.01)
*H04B 10/50* (2013.01)

(52) U.S. Cl.
CPC ......... *H04B 10/27* (2013.01); *H04B 10/5059* (2013.01)

(58) Field of Classification Search
CPC ......... H04Q 11/0005; H04Q 2011/0037; H04J 14/0307; H04B 10/27
See application file for complete search history.

(56) References Cited

U.S. PATENT DOCUMENTS 10,727,936 B2 * 7/2020 Yilmaz ................. H04L 41/122
2002/0122617 A1 * 9/2002 Nakajima .......... H04Q 11/0005
385/16

(Continued)

FOREIGN PATENT DOCUMENTS

JP      2009200956 A  *  9/2009
JP      2011234244 A  *  11/2011

OTHER PUBLICATIONS

Telecommunication Standardization Sector of ITU, Digital sections and digital line system—Optical line systems for local and access networks, a broadband optical access system with increased service capability by wavelength allocation, ITU-T G.983.3, Series G: Transmission Systems and Media, Digital Systems and Networks, Mar. 2001.

(Continued)

*Primary Examiner* — Pranesh K Barua
(74) *Attorney, Agent, or Firm* — Harness, Dickey & Pierce, P.L.C.

(57) ABSTRACT
A subscriber device in an optical communication system including a subscriber device, a user device connected to the subscriber device, an optical switch that relays an optical signal transmitted from the subscriber device to a destination device, a wavelength control unit that allocates a wavelength to the subscriber device, and an optical switch control unit that controls the optical switch such that the optical signal transmitted from the subscriber device is output to another port connected to a transmission line corresponding to a transfer destination on a path to the destination device. The subscriber device includes a wavelength monitoring unit that monitors a wavelength of the optical signal transmitted from the user device and a transceiver that transmits and receives the optical signal to and from another device. The wavelength monitoring unit instructs the user device to use an appropriate wavelength when the wavelength of the optical
(Continued)

signal transmitted from the user device is different from the wavelength allocated by the wavelength control unit. When the wavelength of the optical signal transmitted from the user device is identical to the wavelength allocated by the wavelength control unit, the subscriber device transmits the optical signal through the optical switch.

5 Claims, 84 Drawing Sheets

(56)                References Cited

U.S. PATENT DOCUMENTS

| | | | | |
|---|---|---|---|---|
| 2007/0189663 A1* | 8/2007 | Hirai | .................. | H04Q 11/0062 |
| | | | | 385/24 |
| 2009/0016726 A1* | 1/2009 | Suzuki | ............. | H04B 10/07957 |
| | | | | 398/79 |
| 2009/0080889 A1* | 3/2009 | Nozue | ................ | H04J 14/0232 |
| | | | | 398/72 |
| 2009/0263133 A1* | 10/2009 | Nakagawa | .......... | H04J 14/0246 |
| | | | | 398/67 |
| 2010/0150558 A1* | 6/2010 | Wisseman | .......... | H04J 14/0212 |
| | | | | 398/79 |
| 2014/0133502 A1* | 5/2014 | Lee | ....................... | H01S 5/0612 |
| | | | | 372/20 |
| 2018/0198522 A1* | 7/2018 | Mochizuki | ....... | H04B 10/07957 |
| 2019/0165865 A1* | 5/2019 | Nakagawa | .......... | H04J 14/0276 |
| 2019/0222309 A1* | 7/2019 | Gross | ..................... | H04B 10/85 |

OTHER PUBLICATIONS

Telecommunication Standardization Sector of ITU, Digital sections and digital line system—Optical line systems for local and access networks, 40-Gigabit-capable passive optical networks(NG-PON2): General requirements, ITU-T G.989.1, Series G: Transmission Systems and Media, Digital Systems and Networks, Mar. 2013.

Optoelectronics Industry and Technology Development Association (Japan), Fiber optic active components and devices—Performance standards—GPON transceivers, OITDA standard OITDA/TP 20/AD: 2015 1st edition, Feb. 2015, http://www.oitda.or.jp/main/st/TP20-1.pdf.

* cited by examiner

| PORT NUMBER | CONNECTED DEVICE |
|---|---|
| 1 | TRANSCEIVER 1x |
| 2 | AWG#1 port #3 |
| 3 | EMPTY |
| : | : |
| XXX | YYY |

Fig. 40

|  | $\lambda 1$ | $\lambda 2$ | $\lambda 3$ |
|---|---|---|---|
| USER 1 | TRANSMISSION | RECEPTION | FAILURE |
| USER 2 | EMPTY | EMPTY | RECEPTION |
| USER 3 | EMPTY | TRANSMISSION | EMPTY |

Fig. 41

|  | $\lambda 1$ | $\lambda 2$ | $\lambda 3$ |
|---|---|---|---|
| GROUND A | USED | USED | FAILURE |
| GROUND B | EMPTY | EMPTY | USED |
| GROUND C | EMPTY | USED | EMPTY |

MONITORING UNIT 62-1 RECEIVER 61

Figure 76:
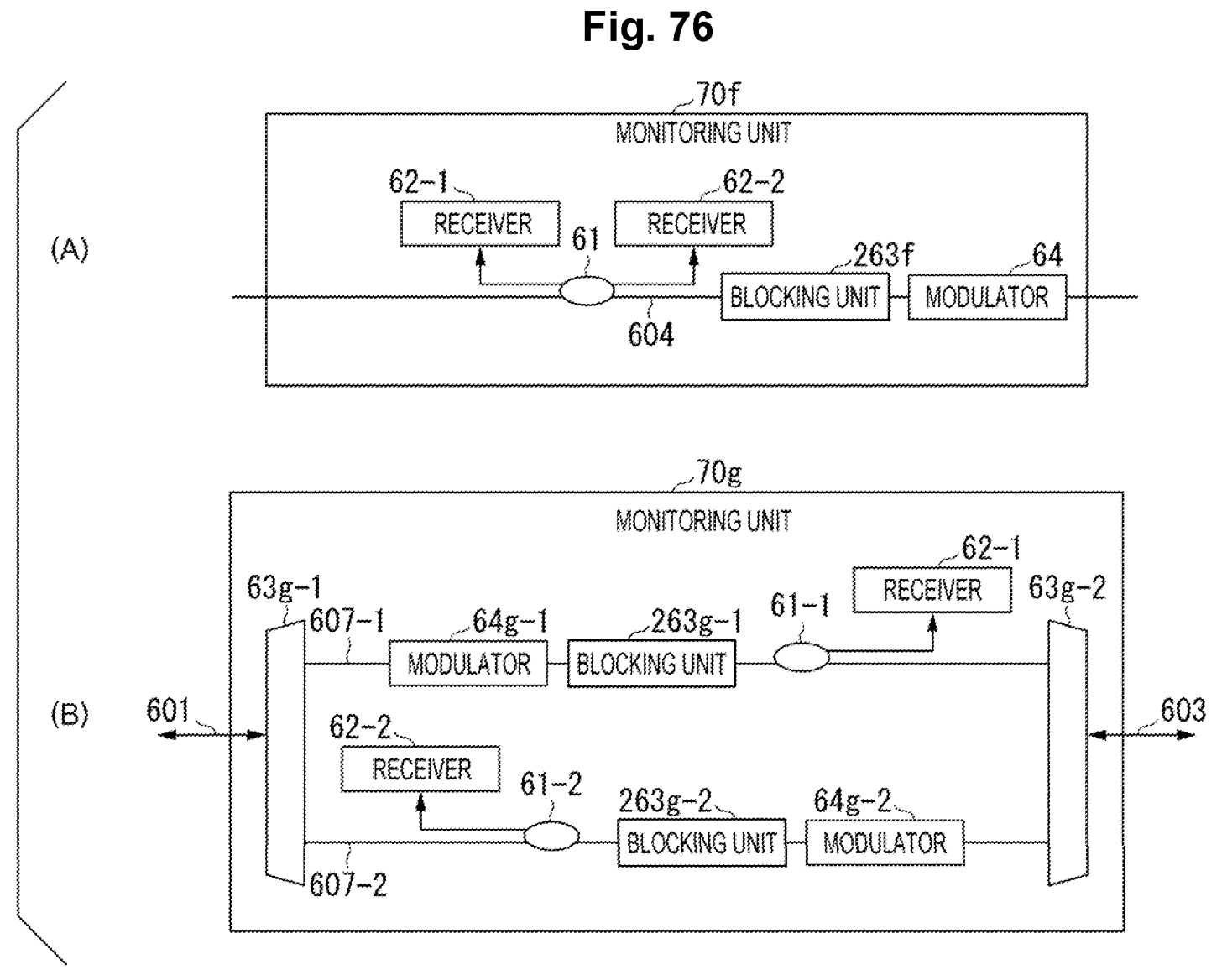

62-2 RECEIVER

263f BLOCKING UNIT

64 MODULATOR

604

(B)

70g

MONITORING UNIT

603

63g-2

62-1 RECEIVER 61-1

263g-1 BLOCKING UNIT 64g-1 MODULATOR 607-1

63g-1

62-2 RECEIVER 61-2

607-2

263g-2 BLOCKING UNIT 64g-2 MODULATOR

Figure 80:
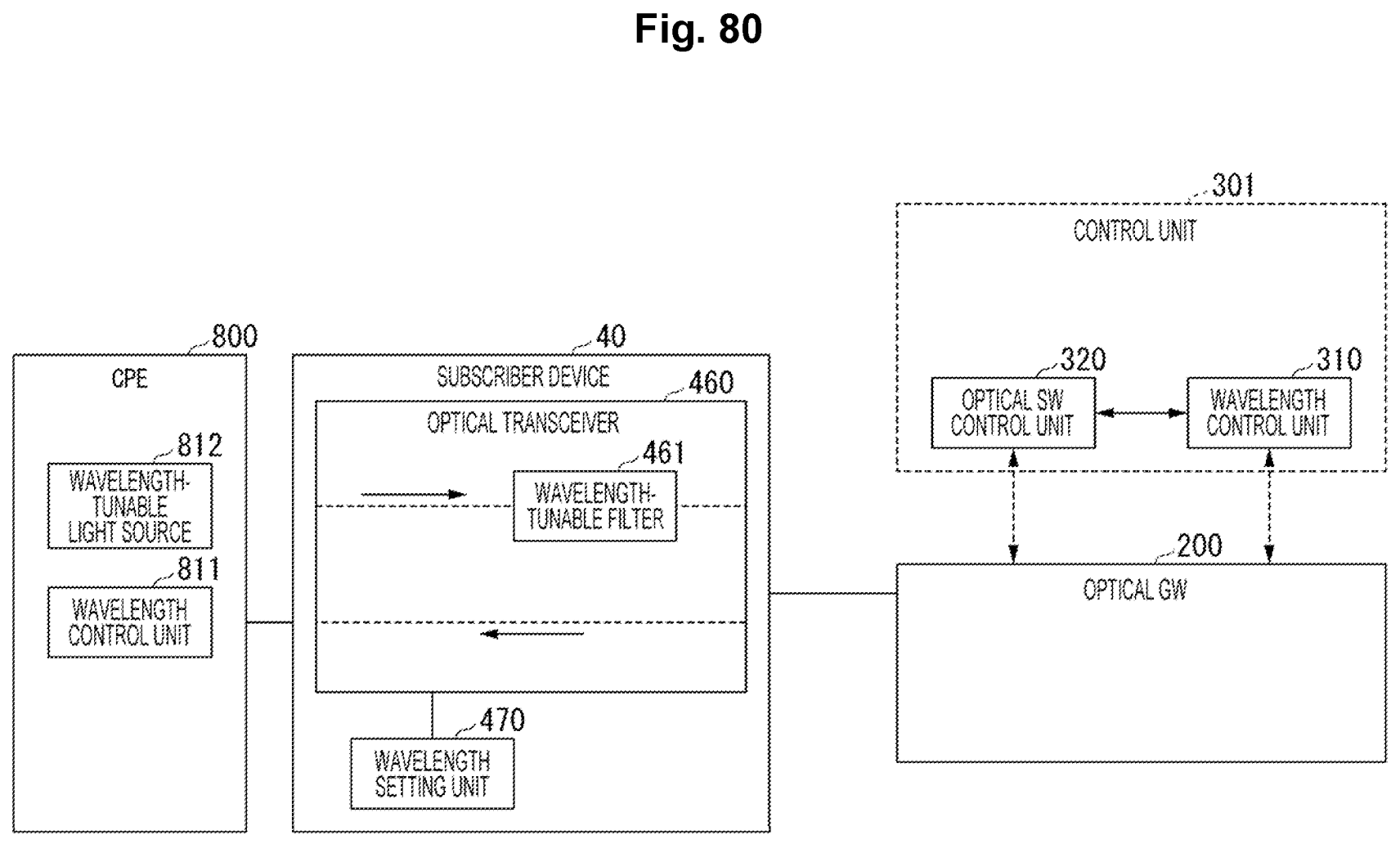

301 — CONTROL UNIT

310 — WAVELENGTH CONTROL UNIT

320 — OPTICAL SW CONTROL UNIT

200 — OPTICAL GW

40 — SUBSCRIBER DEVICE

460 — OPTICAL TRANSCEIVER

461 — WAVELENGTH-TUNABLE FILTER

470 — WAVELENGTH SETTING UNIT

800 — CPE

812 — WAVELENGTH-TUNABLE LIGHT SOURCE

811 — WAVELENGTH CONTROL UNIT

Fig. 81

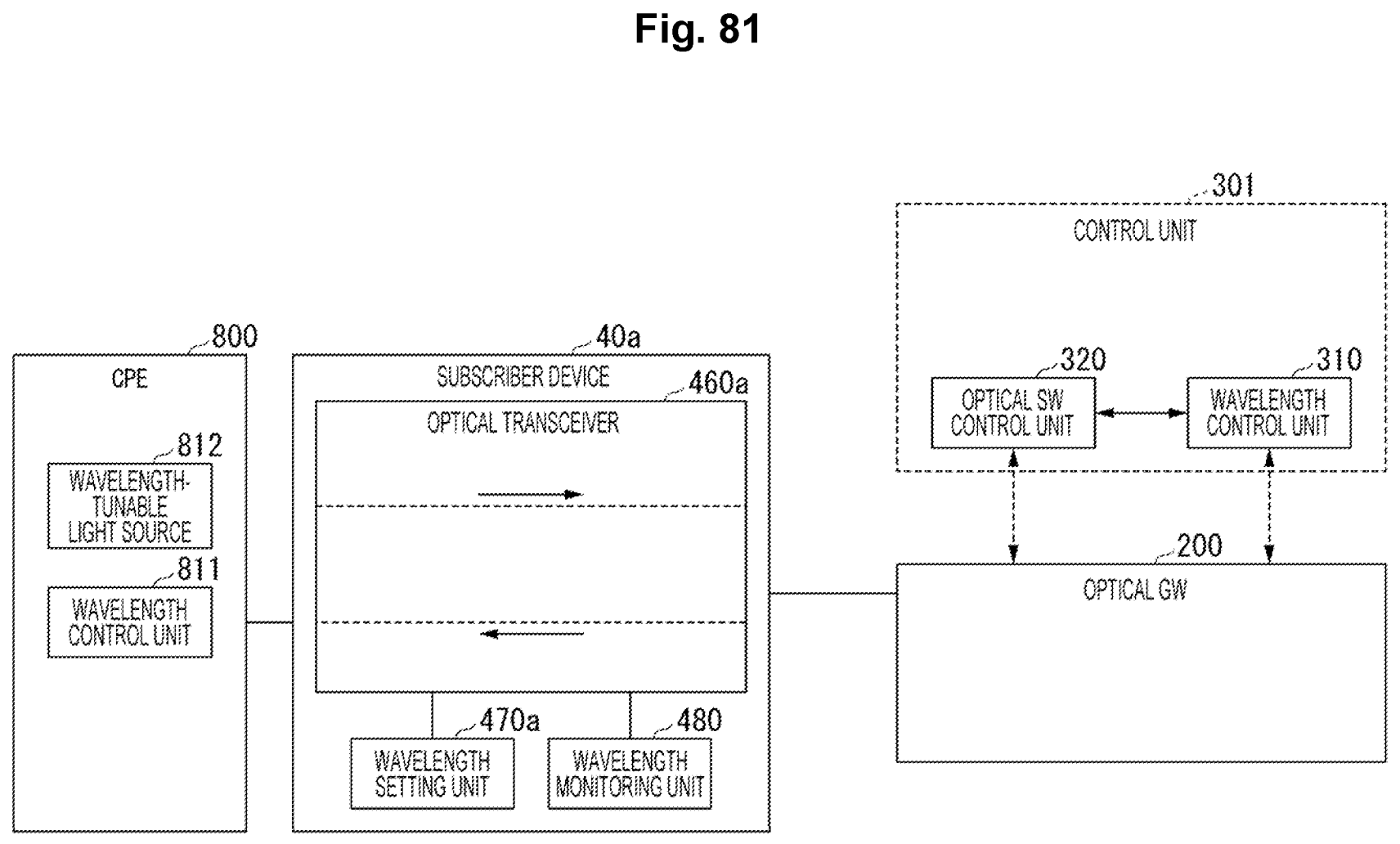

CONTROL UNIT 301

WAVELENGTH CONTROL UNIT 310

OPTICAL SW CONTROL UNIT 320

OPTICAL GW 200

SUBSCRIBER DEVICE 40a

OPTICAL TRANSCEIVER 460a

WAVELENGTH MONITORING UNIT 480

WAVELENGTH SETTING UNIT 470a

CPE 800

WAVELENGTH-TUNABLE LIGHT SOURCE 812

WAVELENGTH CONTROL UNIT 811

SUBSCRIBER APPARATUS, OPTICAL COMMUNICATION SYSTEM AND OPTICAL SIGNAL MONITORING METHOD

CROSS-REFERENCE TO RELATED APPLICATIONS

This application is a 371 U.S. National Phase of International Application No. PCT/JP2020/040980, filed on Oct. 30, 2020. The entire disclosure of the above application is incorporated herein by reference.

TECHNICAL FIELD

The present invention relates to a subscriber device, an optical communication system, and an optical signal monitoring method.

BACKGROUND ART

A network that provides a high-speed Internet by fiber to the home (FTTH) or a mobile service is inefficient in terms of administration because the network is independently constructed for each service. Accordingly, an optical access system that accommodates a plurality of services in one device has been proposed (see, for example, Non-Patent Literature 1). Further, in order to realize an optical access system capable of accommodating multiple services, a passive optical network (PON) and wavelength division multiplexing PON (WDM-PON) in which a plurality of wavelengths are used are standardized by International Telecommunication Union-Telecommunication Standardization Sector (ITU-T) (see, for example, Non Patent Literature 2.).

On the other hand, in an existing optical access system, communication between a subscriber side device and a station is connected to a higher core network. The subscriber-side device is, for example, an optical network unit (ONU). Connection to the core network is made via a terminal device in the station-side device. The terminal device is, for example, an optical line terminal (OLT). In this OLT, an optical signal is once converted into an electric signal, and a process of giving or deleting user information and destination information to or from the electric signal, a routing process, and the like are performed. Therefore, a delay occurs in communication to some extent. Further, when the amount of data increases, the OLT may accumulate signals in a buffer and perform priority control or the like. Accordingly, the delay further increases. When the delay increases, quality of an optical service greatly deteriorates. Thus, it is important to reduce the delay as much as possible.

To improve quality of an optical service and provide various services in an optical access network, a reduction in a delay occurring in an OLT is necessary. By using an optical switch or the like capable of performing a process such as routing without converting an optical signal into an electrical signal, it is possible to considerably reduce delay.

CITATION LIST

Non Patent Literature

Non Patent Literature 1: "ITU-T G.983.3", International Telecommunication Union, 2001
Non Patent Literature 2: "ITU-T G.989.1", International Telecommunication Union, 2013

2

SUMMARY OF INVENTION

Technical Problem

Incidentally, when a customer premises equipment (CPE) is provided in a subscriber's home in addition to an ONU, a signal output from the CPE is terminated once by the ONU. Thereafter, the ONU performs communication of a signal output from the CPE with an optical signal with a wavelength of a light source provided in the ONU. Therefore, in the related art, the optical signal transmitted from the CPE cannot be used as it is.

In view of the foregoing circumstances, an objective of the present invention is to provide a technology capable of relaying an optical signal transmitted from a user device to a destination.

Solution to Problem

An aspect of the present invention is a subscriber device in an optical communication system including the subscriber device, a user device connected to the subscriber device, an optical switch that relays an optical signal transmitted from the subscriber device to a destination device, a control unit that allocates information regarding at least a wavelength, a time, a polarized wave, a mode, a code, a frequency, a core, a core wire, or a combination thereof to the user device; and an optical switch control unit that controls the optical switch such that the optical signal transmitted through the subscriber device from the user device is output to another port connected to a transmission line corresponding to a transfer destination on a path to the destination device. The subscriber device includes a filter configured to transmit, in an optical signal transmitted from the user device, an optical signal satisfying a condition set in accordance with the information allocated by the control unit. The filter filters and blocks an optical signal transmitted from the user device when the optical signal is different from information allocated from the control unit.

An aspect of the present invention is a subscriber device in an optical communication system including the subscriber device, a user device connected to the subscriber device, an optical switch that relays an optical signal transmitted from the subscriber device to a destination device, a control unit that allocates information regarding at least a wavelength, a time, a polarized wave, a mode, a code, a frequency, a core, a core wire, or a combination thereof to the user device; and an optical switch control unit that controls the optical switch such that the optical signal transmitted through the subscriber device from the user device is output to another port connected to a transmission line corresponding to a transfer destination on a path to the destination device. The subscriber device includes a monitoring unit configured to monitor an optical signal transmitted from the user device. The monitoring unit gives an instruction to the user device when the optical signal transmitted from the user device is different from the information allocated by the control unit, and transmits the optical signal through the optical switch when the optical signal transmitted from the user device is identical to the information allocated from the control unit.

An aspect of the present invention is an optical communication system including the foregoing subscriber device, the user device, the optical switch, the control unit, and the optical switch control unit.

An aspect of the present invention is an optical signal monitoring method performed by a subscriber device in an optical communication system including the subscriber device, a user device connected to the subscriber device, an optical switch that relays an optical signal transmitted from the subscriber device to a destination device, a control unit that allocates information regarding at least a wavelength, a time, a polarized wave, a mode, a code, a frequency, a core, a core wire, or a combination thereof to the user device; and an optical switch control unit that controls the optical switch such that the optical signal transmitted through the subscriber device from the user device is output to another port connected to a transmission line corresponding to a transfer destination on a path to the destination device. The method includes a transmitting step of transmitting, in an optical signal transmitted from the user device, an optical signal satisfying a condition set in accordance with the information allocated by the control unit. In the transmitting step, an optical signal transmitted from the user device is filtered and blocked when the optical signal is different from information allocated from the control unit.

An aspect of the present invention is an optical signal monitoring method performed by a subscriber device in an optical communication system including the subscriber device, a user device connected to the subscriber device, an optical switch that relays an optical signal transmitted from the subscriber device to a destination device, a control unit that allocates information regarding at least a wavelength, a time, a polarized wave, a mode, a code, a frequency, a core, a core wire, or a combination thereof to the user device; and an optical switch control unit that controls the optical switch such that the optical signal transmitted through the subscriber device from the user device is output to another port connected to a transmission line corresponding to a transfer destination on a path to the destination device. The method includes a monitoring step of monitoring an optical signal transmitted from the user device. In the monitoring step, an instruction is given to the user device when the optical signal transmitted from the user device is different from the information allocated by the control unit, and the optical signal is transmitted through the optical switch when the optical signal transmitted from the user device is identical to the information allocated from the control unit.

Advantageous Effects of Invention

According to the present invention, it is possible to relay an optical signal transmitted from a user device to be relayed to a destination.

BRIEF DESCRIPTION OF DRAWINGS

FIG. 9 is a diagram illustrating an example of an optical SW in a basic configuration.

FIG. 13 is a diagram illustrating an example of an optical SW in a basic configuration.

FIG. 14 is a diagram illustrating an example of an optical SW in a basic configuration.

FIG. 15 is a diagram illustrating an example of an optical SW in a basic configuration.

FIG. 23 is a diagram illustrating an example of an access topology in a basic configuration.

FIG. 37 is a diagram illustrating a configuration example of a monitoring unit in a basic configuration.

FIG. 39 is a diagram illustrating an example of an SW connection table according to the same configuration example.

FIG. 40 is a diagram illustrating an example of a user wavelength table according to the same configuration example.

FIG. 41 is a diagram illustrating an example of an inter-station wavelength table according to the same configuration example.

FIG. 61 is a diagram illustrating a configuration example of an optical GW in the optical access system according to a first embodiment.

FIG. 72 is a diagram illustrating a configuration example in a second modification of the subscriber device and the control unit.

FIG. 76 is a diagram illustrating another aspect of the monitoring unit.

FIG. 80 is a diagram illustrating a first configuration example of an optical access system including a CPE.

FIG. 81 is a diagram illustrating a second configuration example of the optical access system including the CPE.

FIG. 82 is a diagram illustrating a third configuration example of the optical access system including the CPE.

FIG. 83 is a diagram illustrating a fourth configuration example of the optical access system including the CPE.

DESCRIPTION OF EMBODIMENTS

Figure 1:
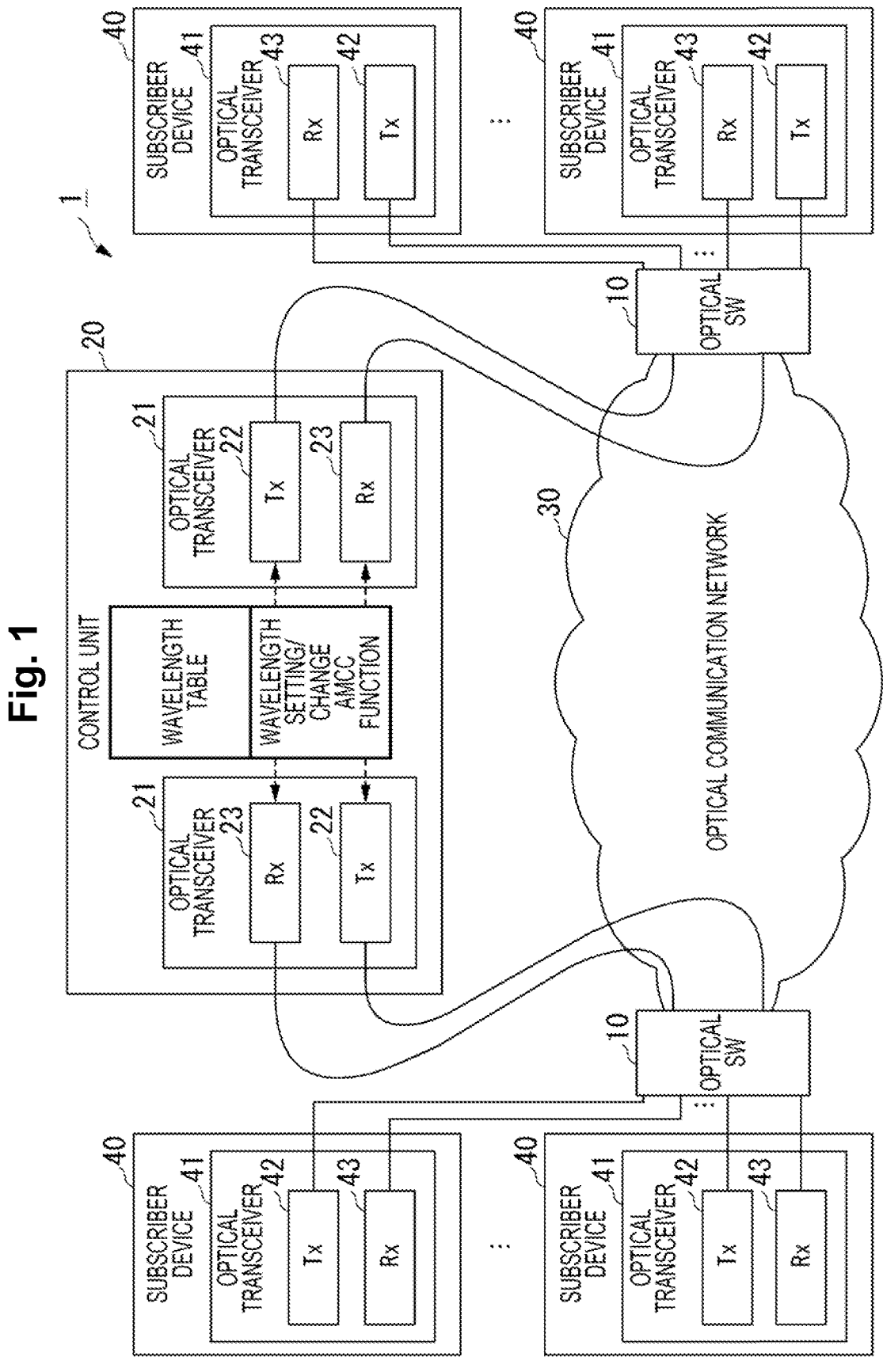
FIG. 1 is a diagram illustrating a basic configuration example of an optical communication system according to an embodiment.

Hereinafter, embodiments of the present invention will be described in detail with reference to the drawings. In the drawings, the same units are denoted by the same reference numerals, and the description thereof will be omitted. In the following description, a basic configuration in the present invention will first be described, and then specific embodiments will be described.

(Basic Configuration)

First, a basic configuration of the present invention will be described with reference to FIGS. 1 to 41.

FIG. 1 is a diagram illustrating a basic configuration example of an optical communication system 1 according to the present embodiment. The optical communication system 1 includes one or a plurality of optical SWs (switches) 10. Although two optical SWs 10 are illustrated in the drawing, the number of optical SWs 10 is any number. The optical SW 10 is connected to the control unit 20.

When the optical SW 10 is controlled with an optical signal, the optical SW 10 includes an optical receiver that receives at least an optical signal, but description thereof is omitted in the following description.

The optical SW 10 communicates with another optical SW 10 via the optical communication network 30. For example, in the optical communication network 30, a WDM network including various topologies can be used. One or more subscriber devices 40 are connected to the optical SW 10. The subscriber device 40 is connected to the optical SW 10 by, for example, an optical access network such as PON. The subscriber device 40 includes an optical transceiver 41. The optical transceiver 41 is an example of an optical transmission unit and an optical reception unit in the configuration of the subscriber device. The optical transceiver 41 includes an optical transmitter (Tx) 42 and an optical receiver (Rx) 43. The optical transceiver 41 is a wavelength-tunable optical transceiver. As the optical transceiver 41, for example, a conventional optical transceiver of the related art that has an auxiliary management and control channel (AMCC) function can be used.

The control unit 20 may include an operation system (OpS) and the OpS may include the control unit 20. Hereinafter, the control unit 20 may be similarly connected to any port of the optical SW 10, for example, a port 2. The control unit 20 may be installed in a building different from the optical SW 10 and may be connected to the optical SW 10 or an optical SW control unit (not illustrated in FIG. 1) via a network. The control unit 20 may be connected to a port that is not connected to the subscriber device 40, another optical SW 10, a higher network, a transmission line to another ground, or the like among the ports of the optical SW 10. The control unit 20 may be installed for each of the optical SW 10 or may be installed for each plurality of optical SWs 10.

When the control unit 20 controls the optical SW 10 by an optical signal, the control unit 20 includes one or a plurality of optical transceivers 21. The optical transceiver 21 is an example of a configuration of an optical transmission unit and an optical reception unit in the control unit 20. The optical transceiver 21 includes an optical transmitter (Tx) 22 and an optical receiver (Rx) 23. The optical transceiver 21 is a tunable wavelength optical transceiver. The case where the plurality of optical transceivers 21 is provided is appropriate for a case where the connectable port is different for each port of the optical SW 10, a case where the port controlling the optical SW 10 is different from that of the subscriber device 40, a case where a control target is at least one of the plurality of optical SWs 10 and the subscriber device connected to the plurality of optical SWs 10 and the connectable ports are different, and the like. In the case where the number of optical SWs 10 is plural, the optical SWs may be connected by a transmission line. In the case where the ports are different, the optical SWs may be connected by a folded connection using a folded transmission line or the like to be described below. When the control unit includes a transmitter and the subscriber device includes a receiver, the transmission side of the control unit 20 is connected to the reception side of the subscriber device 40. When the control unit 20 includes a receiver and the subscriber device 40 includes a transmitter, the reception side of the control unit 20 is connected to the transmission side of the subscriber device 40.

When only the optical transceiver or a modulation unit of the monitoring unit to be described below is used, the optical transceiver may not be provided. When the control unit 20 controls the subscriber device 40 with an optical signal, when the control unit 20 performs a wavelength allocation process or the like on the subscriber device 40 with an optical signal via the optical SW 10, the optical SW 10 is controlled to transmit and receive an optical signal between the subscriber device 40 and the control unit 20. After the wavelength allocation process, the optical SW 10 is controlled to output the optical signal input from the transmission line to a port corresponding to a transmission destination specified by a subscriber, the subscriber device 40, the port of the optical SW 10, the wavelength of the optical signal, a combination of the wavelength of the subscriber device 40 and the wavelength of the optical signal, a combination of the port and the wavelength of the optical signal, or the like.

When the wavelength allocation process or the like is performed via the monitoring unit in the preceding stage of the optical SW 10, the optical SW 10 is controlled to transmit and receive an optical signal between the monitoring unit and the subscriber device 40 and output the optical signal to a port corresponding to a specified transmission destination after the allocation process.

When the wavelength allocation process or the like is performed via the monitoring unit at the subsequent stage of the optical SW 10, the optical SW 10 is controlled to output an optical signal to a port corresponding to a specified transmission destination, the optical signal is transmitted and received between the monitoring unit and the subscriber device 40 in a state where the output from the port is blocked by a blocking unit. After the allocation process, the blocking is released.

When the wavelength allocation process or the like is performed before connection to the optical SW 10, after the wavelength allocation process, the optical SW 10 is controlled to output an optical signal to a port corresponding to the specified transmission destination.

The control unit 20 has or is connected to a management database (DB) such as an SW connection table and a wavelength table.

When the control unit 20 is connected to the management DB, information regarding a user and a wavelength to be used is exchanged with the management DB. The management DB stores a use wavelength, destination information, and transmission destination information of each user. The destination and the transmission destination are represented by, for example the ground A and the ground B, in the case of the ground A or the like. In the case of the subscriber device 40 or the like, the destination and the transmission destination are represented by an identifier of the subscriber device 40, or an identifier of a transmission line or a port to which a device is connected, an identifier of a device, a component, or a function passed through on the way, or an identifier of a port to which the device or the component or the function is connected. The management DB manages information regarding a user connected to the optical access system.

The SW connection table indicates a connection destination of each port of the optical SW 10. That is, a port to which an optical signal is input and output can be used as information for identifying a subscriber device, a control unit, a monitoring unit, a ground, or the like of a transmission source or a transmission destination of the optical signal.

The wavelength table is data indicating a wavelength allocated to each subscriber device 40 or the like. The wavelength table may be divided into a user wavelength table and an inter-station wavelength table.

The user wavelength table indicates, for example, a wavelength which is used for user transmission, a wavelength which is used for reception, an available wavelength which is not being used for transmission and reception, and a wavelength which cannot be used due to a failure.

The inter-station wavelength table indicates, for example, a wavelength which a certain ground uses for communication with each of the other grounds, an available wavelength which is not used for communication with each of the other grounds, and a wavelength which cannot be used due to a failure in communication with each of the other grounds.

In order to allocate a wavelength corresponding to a transmission destination on a path to a communication destination to the subscriber device 40, an optical transceiver of the subscriber device 40 or the like and an optical transceiver of the control unit 20 first communicate with each other. With reference to the wavelength table, the control unit 20 selects a wavelength to be allocated to the subscriber device 40 or the like according to the transmission destination on the path to the communication destination.

For example, a wavelength control unit of the control unit 20 allocates the wavelength used by the user with reference to information indicating the wavelength used by the user or a service. The wavelength control unit manages and controls information on which user is connected to which port of the optical SW 10 and which wavelength is used by which user by sharing each of pieces of connection information.

When a wavelength is selected, in a case where the wavelength is multiplexed in a section included in the middle of a path and is identified by the wavelength, a free wavelength in the section included in the path is an available wavelength and is selected from available wavelengths.

On the other hand, it is not necessary to consider a free wavelength in a section in which wavelength is not multiplexed in a section included in the middle of a path. In a case where identification and branching are not performed only with the wavelength (for example, time division multiplexing, code division multiplexing, mode division multiplexing, core division multiplexing, core wire multiplexing, space division multiplexing, frequency division multiplexing, polarization division multiplexing, or a combination thereof, or a combination thereof and wavelength division multiplexing), even a wavelength that is not a free wavelength in the section may be selected as an available wavelength when identification and branching are possible in the section. When wavelength conversion is performed in the middle of a path, a free wavelength in a section included in a path until wavelength conversion or a wavelength is not multiplexed in a section included in the middle of the path until wavelength conversion, or identification is performed only with the wavelength. When the wavelength is not branched, a free wavelength may not be selected.

In this way, since the wavelength to be selected does not depend only on a use status of the wavelength in the section included in the middle of the path, it is preferable that the wavelength table indicate available wavelengths in consideration of not only a free wavelength but also a combination with another multiplexing. Since the available wavelength depends on the use status and multiplexing status of the sections included in the middle of the path, the control unit can use an AND (OR of wavelengths that cannot be identified or separated by factors other than the wavelength) as the available wavelength of the section included in the path.

When a destination port of the optical SW 10 is set with the wavelength and the subscriber device 40 for transmission and the ports included in the optical SW 10 are divided into two groups, for example, ports 1 and 2, are connected between the groups and are not connected within the group, available wavelengths may be separate in a direction from the port 1 which is one group to the port 2 which is the other group and a direction from the port 2 which is the other group to the port 1 which is one group.

When the same control unit controls or manages all the sections included in the path, the wavelength allocation process is closed meanwhile. However, when a plurality of control units or an external device controls or manages all the sections, the wavelength allocation process may be controlled by operating in cooperation or may be controlled by receiving a use authority of the wavelength table itself which shows the available wavelengths or values thereof.

The control unit 20 sets the selected wavelength in the subscriber device 40 by the control signal. Thereafter, the control unit 20 sets the optical SW 10 to output the optical signal transmitted from the subscriber device 40 according to a destination or a transmission destination of the optical signal.

When the subscriber devices 40 face each other via the optical SW 10, the facing subscriber devices 40 are accordingly connected. When the connection is made via a device, a component, or a functional unit in the middle of the path connected between the subscriber devices 40, the connection is made after the device, the component, or the functional unit is routed. The optical SW 10 may connect the subscriber device 40, the device, component, or functional unit to be routed, or the facing subscriber device 40 with the same wavelength of light or after performing photoelectric conversion or other processing, or may connect them with different wavelengths in at least a part of the path as light or after performing photoelectric conversion or other processes. For example, when a device, a component, or a functional unit to be routed in the middle of the path and both subscriber devices are connected to the same optical SW, routing is formed from the subscriber device to the next device, component, or function to be routed, from the device, component, or function to be routed to the next device, component, or function to be routed, or from the last device, component, or function to the facing subscriber device. The routing from the subscriber device which is a communication source to the facing subscriber device which is a communication partner is a setting in a case where the device, component, or function to be routed is not routed. In the routing, identification of multiplexing processes of wavelengths or the like may be added to parameters, in addition to a transmission source, a destination including a transit, or a transmission destination. This is appropriate when a plurality of optical signals with different wavelengths and optical frequencies are aggregated and transmitted to the same stations or the optical SWs or the like on other grounds which are routing destinations or when a plurality of optical signals with different wavelengths and optical frequencies are demultiplexed and distributed to different devices, components, functions, or subscriber devices.

The control unit 20 allocates a wavelength used for communication by the subscriber device 40 using, for example, an AMCC function of using a control signal that is slower than a main signal which is an optical signal between the subscriber devices 40 and can be superimposed on the main signal. Hereinafter, communication between the subscriber device 40 and the control unit 20 will be exemplified by the AMCC function, but the present invention is not limited thereto. In particular, when an initial setting or a setting change of the wavelength or the like is performed in a state where the main signal is not conducted to the facing device, the control signal may not use another AMCC or the like different from the main signal, and may be exchanged as the main signal. The main signal may be transmitted and received in accordance with any modulation scheme as long as the scheme can be realized with functions of the subscriber device 40 and the control unit 20.

For example, in order to allocate a wavelength corresponding to a transmission destination on a path to the communication destination to the subscriber device 40, the optical transceiver 41 of the subscriber device 40 and the optical transceiver 21 of the control unit 20 first perform communication using the AMCC. With reference to the wavelength table, the control unit 20 selects a wavelength to be allocated to the subscriber device 40 according to the transmission destination on the path to the communication destination. As an example, the control unit 20 selects a wavelength from among free wavelengths that are not used for other paths in a link for wavelength multiplexing on the path. The control unit 20 may allocate individual wavelengths to each subscriber device 40. The control unit 20 sets the selected wavelength in the subscriber device 40 by the control signal in which the AMCC is used. Thereafter, the control unit 20 switches the optical SW 10 to output the optical signal transmitted from the subscriber device 40 to the transmission line corresponding to the transmission destination on the path to the communication destination.

The control unit 20 may control the optical switch to perform routing in accordance with the destination information. As the destination information, a subscriber device, a wavelength, an input port, an output port, or a set such as a set of a subscriber device, an input port, or an output port and a wavelength may be used In the following embodiment, a case where a set of a subscriber device and a wavelength is used as destination information will be mainly described.

Accordingly, the facing subscriber devices 40 are connected.

The control unit 20 may perform a wavelength changing process of instructing the subscriber device 40 to allocate the wavelength to which the wavelength has been allocated. For example, a target subscriber device 40 is specified based on monitoring information output from a monitoring unit to be described below, and the wavelength changing process is performed on the specified subscriber device 40.

An instruction from the control unit 20 to the subscriber device 40 may be given in a path at the time of initial setting or may be performed from a monitoring unit or the like.

The control unit 20 controls the optical SW 10 or the blocking unit, if any, such that the optical signal of the target subscriber device 40 is not transmitted during the wavelength change. When the control unit 20 directly controls the subscriber device 40 by an optical signal, the optical SW 10 is controlled such that the optical signal is transmitted and received between the subscriber device 40 and the wavelength control unit.

For example, when there is no other influence on the output side before the change in the wavelength, the output port is switched after the change in the wavelength. When there is no other influence on the output side after the change in the wavelength, the output port is switched before the change in the wavelength. The transmission may be stopped by a device other than the optical SW 10.

For example, the transmission line from the optical SW 10 to the subscriber device 40 or the subscriber device 40 is removed, and the connection is reestablished after the setting. Alternatively, the transmission line, the optical SW 10, a branch combiner/splitter, or a multiplexer/demultiplexer and a blocking unit at a connection point thereof are provided. The blocking unit performs blocking before the change in the wavelength and performs setting before or after switching an output port as necessary to release the blocking.

For example, after the wavelength changing process, the optical SW control unit controls the optical SW 10 such that an optical signal with the changed wavelength from the subscriber device 40 is output from the port 2 in accordance with the communication destination or the transmission destination.

At the time of wavelength switching, for example, when the wavelength switching has an influence on another subscriber device 40, the optical output in the path is blocked. Specifically, the transmission of the optical signal itself is stopped, the connection to the optical SW 10 is released, the connection from the input side to the output side of the optical SW 10 is released, and the optical signal is blocked by, for example, the blocking unit included in the monitoring unit or the like such as a shutter.

In a wavelength allocation process, the optical SW control unit controls the path in the optical SW 10 such that that the optical SW 10 does not transmit the optical signal of the subscriber device 40 which is a wavelength allocation target. That is, the optical SW control unit controls the path in the optical SW 10 such that that the optical signal transmitted from the subscriber device 40 is not output to a port (another port) other than the port connected to the monitoring unit of the subscriber device 40 which is a wavelength allocation target.

When there is no particular influence despite switching of the output destination of the optical SW 10 before setting of the wavelength (before allocation of the wavelength), the optical SW control unit may switch the output destination of the optical SW 10 before the change in the wavelength. In the wavelength allocation process, a functional unit other than the optical SW 10 may stop the transmission of the optical signal transmitted from the subscriber device 40.

When the wavelength is switched in a state of the connection to the path before or after the switching in association with the switching of the wavelength and the switching of the optical SW 10, there is no influence.

The wavelength allocation process (wavelength setting) and a path setting process are performed in this order. The optical SW control unit switches the output destination (path) of the optical SW 10 after the change in the wavelength so that there is no particular influence despite of the switching of the output destination of the optical SW 10.

For example, cases where the first port and a first wavelength "λ1" are used before the switching and the second port and a second wavelength "λ2" are used after the switching may be the following cases.

(1) A case where there is no subscriber device 40 using the first port and the second wavelength "λ2."

There is no influence despite switching from the first wavelength "λ1" to the second wavelength "λ2" in the first port. In this case, it is possible to perform wavelength switching before port switching.

(2) A case where there is the subscriber device 40 using the first port and the second wavelength "λ2."

There is an influence when the wavelength is switched from the first wavelength "λ1" to the second wavelength "λ2" in the first port. In this case, it is not possible to perform wavelength switching before port switching.

(3) A case where there is no subscriber device 40 using the second port and the first wavelength "λ1."

There is no influence despite switching from the first wavelength "λ1" to the second wavelength "λ2" in the second port. In this case, it is possible to perform wavelength switching before port switching.

(4) A case where there is the subscriber device 40 using the second port and the first wavelength "λ1":

There is an influence when the wavelength is switched from the first wavelength "λ1" to the second wavelength "λ2" in the second port. In this case, it is not possible to perform wavelength switching before port switching.

In the foregoing "(1)" and "(3) or (4)," the wavelength can be switched before the port switching.

In the above "(1) or (2)" and "(3)," the wavelength can be switched before the port switching.

In the above "(2)" and "(4)", it is not possible to switch the wavelength before port switching, and it is necessary to stop or block the optical signal.

In the wavelength allocation process, the wavelength control unit performs the wavelength allocation process on the subscriber device 40 which is a wavelength allocation target via the monitoring unit. For example, the wavelength control unit performs the allocation process of a new wavelength that is the same as or different from the wavelength used in detection of the abnormality on the subscriber device 40 which is a wavelength allocation target.

In the path setting process, an optical switch control unit controls the path in the optical SW 10 such that the subscriber device 40 which is a wavelength allocation target is connected to a port (another port) other than the port connected to the monitoring unit of the subscriber device 40 which is the wavelength allocation target. For example, the optical switch control unit controls the optical SW 10 such that the optical signal input from the transmission line of the subscriber device 40 which is a wavelength allocation target is output to the port (another port) specified in accordance with the transmission destination. Here, the transmission destination is specified in accordance with the subscriber, the subscriber device 40, the port of the optical SW 10, the wavelength of the optical signal, a combination of the subscriber device 40 and the wavelength of the optical signal, a combination of the optical signal of the port 1 and the wavelength of the optical signal, or the like.

The optical SW 10 is included in, for example, an optical gateway (GW). An example of the optical SW 10 included in the optical GW will be described with reference to FIGS. 2 to 15.

Figure 2:
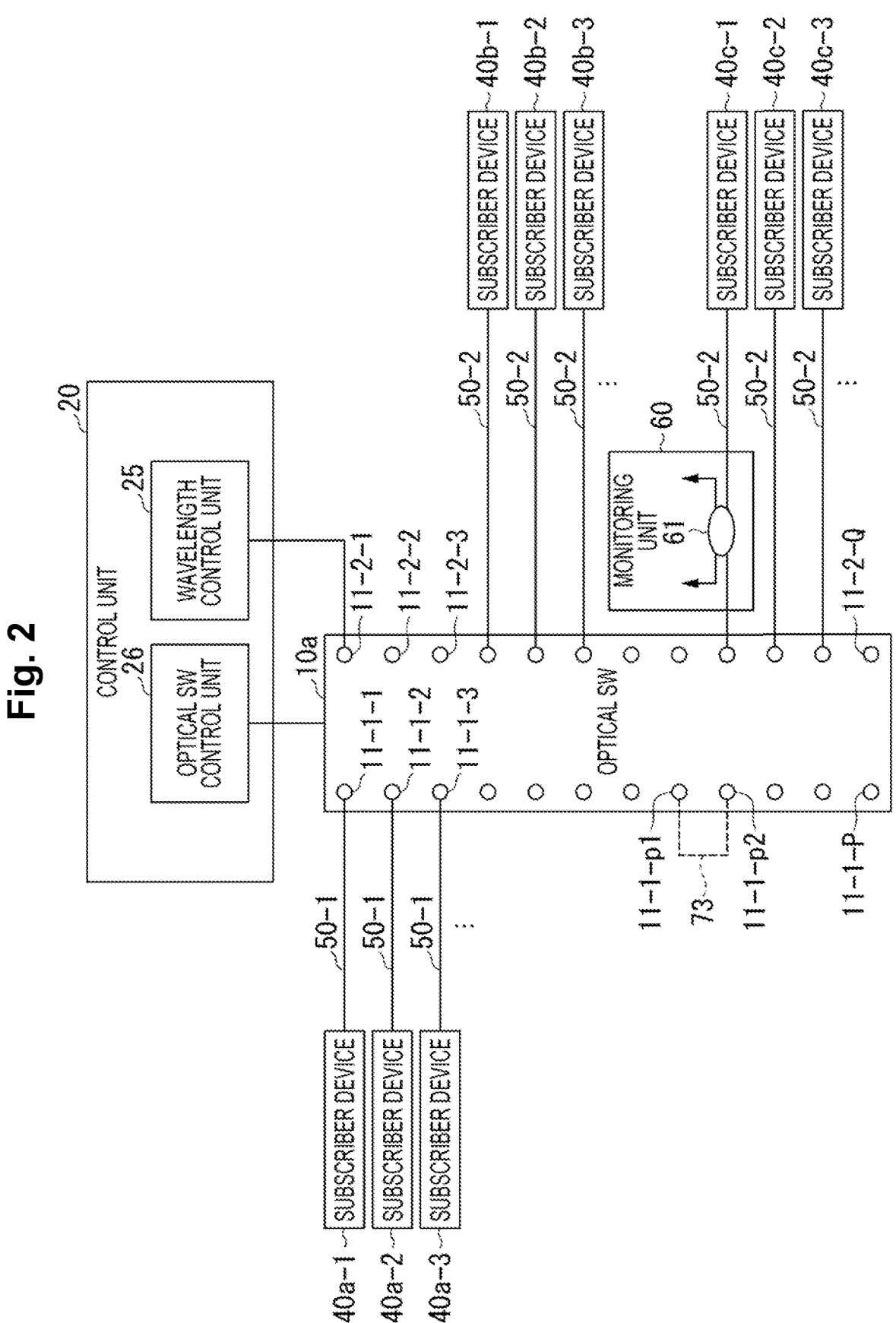
FIG. 2 is a diagram illustrating an example of an optical SW in a basic configuration.

FIG. 2 is a diagram illustrating a configuration example of the optical SW 10a. The optical SW 10a is connected to the plurality of transmission lines 50, and outputs an optical signal input from any of the transmission lines 50 to the other transmission line 50. The transmission line 50 is, for example, an optical fiber. The optical SW 10a includes ports 11-1-1 to 11-1-P (where P is an integer equal to or greater than 1) and ports 11-2-1 to 11-2-Q (where Q is an integer equal to or greater than 1 and at least one of P and Q is equal to or greater than 2). When any of the ports 11-1-1 to 11-1-P is not specified, the ports 11-1-1 to 11-1-P are collectively referred to as the port 11-1. When any of the ports 11-2-1 to 11-2-Q is not specified, the ports 11-2-1 to 11-2-Q are collectively referred to as the port 11-2. The transmission line 50 connected to the port 11-1 is referred to as a transmission line 50-1. The transmission line 50 connected to the port 11-2 is referred to as a transmission line 50-2.

Each port 11-1 is connected to the subscriber device 40 via the transmission line 50-1. Each port 11-2 is connected to the subscriber device 40 via the transmission line 50-2. The subscriber device 40 is, for example, an ONU. The transmission line 50-2 may be connected to optical communication network 30 that is an upper network. In this case, a direction of the subscriber device 40 connected via the transmission line 50-1 is the downlink direction, and a direction of the upper network connected via the transmission line 50-2 is the uplink direction. The transmission line 50-2 may include an optical communication device such as another optical SW 10.

The ports 11-1-1, 11-1-2, 11-1-3, ... are connected to the subscriber devices 40a-1, 40a-2, 40a-3, ... which are the subscriber devices 40 on the ground A, respectively, via transmission lines 50-1. Any one of the ports 11-2 (in the drawing, a port 11-2-1) is connected to a wavelength control unit 25 to be described below. Some of the ports 11-2-i, 11-2-(i+1), 11-2-(i+2), ... are connected to 40b-1, 40b-2, 40b-3, ... that are the subscriber devices 40 on the ground B, respectively, via a transmission line 50-2 (where i is an integer equal to or greater than 2). Some of the ports 11-2-j, 11-2-(j+1), 11-2-(j+2), ... different from the port 11-2 connected to the subscriber device 40 on the ground B are connected to the subscriber devices 40c-1, 40c-2, 40c-3, ..., which are the subscriber devices 40 on the ground C, respectively, via a transmission line 50-2 (where j is an integer equal to or greater than 2). The optical SW 10a outputs an optical signal input from the port 11-1 to the port 11-2 and outputs an optical signal input from the port 11-2 to the port 11-1. Here, an optical communication device such as another optical SW or the optical communication network 30 may be interposed between the subscriber device 40 on the ground A, the subscriber device 40 on the ground B, and the subscriber device 40 on the ground C.

The optical SW 10a is connected to the control unit 20. The control unit 20 includes a wavelength control unit 25 and an optical SW control unit 26. The wavelength control unit 25 performs a wavelength allocation process of receiving a wavelength allocation request from the subscriber device 40 by an optical signal, allocating a wavelength corresponding to a transmission destination on a path to a communication destination to the subscriber device 40 that has transmitted the request, and notifying the subscriber device 40 of the allocated wavelength by an optical signal. For example, the wavelength control unit 25 may dynamically allocate a wavelength corresponding to a transmission destination on a path to a communication destination to the subscriber device 40 that has transmitted the request. As the optical signal transmitted and received between the wavelength control unit 25 and the subscriber device 40, it is preferable to use a control signal superposition scheme that does not depend on a communication protocol of the optical signal (a main signal) between the subscriber devices 40. As an optical signal transmitted and received between the wavelength control unit 25 and the subscriber device 40, for example, protocol-free AMCC is used. The main signal may be transmitted and received and may be set without using the control signal superimposed by the AMCC or the like.

While the wavelength allocation process is being executed, the optical SW control unit 26 controls the optical SW 10a such that optical signals are transmitted and received between the subscriber device 40 and the wavelength control unit 25. After the wavelength allocation process, the optical SW control unit 26 controls the optical SW 10a such that the optical signal input from the transmission line 50 is output to the transmission line 50-2 corresponding to the transmission destination on the path to the communication destination specified by a combination of the subscriber device 40 that has transmitted the input optical signal and the wavelength of the input optical signal.

Each transmission line 50-2 includes a monitoring unit 60. In the drawing, only one monitoring unit 60 is illustrated. The monitoring unit 60 includes a power splitter 61. The power splitter 61 branches an optical signal transmitted through the transmission line 50-2. The monitoring unit 60 monitors the optical signal branched by the power splitter 61. The monitoring unit 60 generates monitoring information based on a monitoring result and outputs the generated monitoring information. The monitoring information is information indicating the monitoring result or information obtained from the monitoring result. For example, when an abnormality or the like of the communication status between the subscriber devices 40 is detected by a change request from the subscriber device 40 using a control signal or by monitoring the optical signal, the monitoring information in which the fact that the abnormality of the communication status has occurred and information for specifying the subscriber device 40 in which the abnormality of the communication status has occurred are set is output. Examples of the abnormality in the communication status include a wavelength shift, an increase or decrease in an output, and a communication abnormality (error). An example of an output destination of the monitoring information is the control unit 20. When the abnormality is detected, the control unit 20 controls the optical SW the monitoring unit, or the blocking unit such that transmit the optical signal of the target subscriber device is not output, for example. Further, when the control unit 20 directly controls the subscriber device 40 by an optical signal, the optical SW 10 is controlled such that the subscriber device 40 is connected to the control unit again. Then, the control unit 20 performs an allocation process of a new wavelength that is the same as or different from the wavelength at the time of detection of the abnormality, similarly to a time at which the subscriber device 40 is newly connected. Accordingly, the optical SW 10 connects the optical signal with the wavelength before or after the change from the subscriber device 40 to the port before the change by the subscriber device 40. From a case of non-recovery from the abnormal state despite a predetermined process such as reactivation or reallocation performed a predetermined number of times due to a failure, a Rogue ONU, or the like, or an identification number or a behavior of a subscriber device registered in a blacklist or performing a similar operation in the past, the connection in the optical SW may be released, the connection may be blocked by a blocking unit, or setting, connection, or transmission may be stopped. During communication with another subscriber device 40, the power splitter 61 can branch a control signal transmitted by the subscriber device 40 or superimpose and output the control signal to the subscriber device 40 or the like.

When the subscriber device 40 is connected to the transmission line 50-2, the control unit 20 may be connected to the port 11-1. Alternatively, when the subscriber device 40 is connected to the transmission line the subscriber device 40 connected to the transmission line 50-2 may be connected to the control unit via a folded transmission line 73. The folded transmission line 73 is an optical fiber, an optical switch, an optical branch combiner/splitter, or an optical multiplexer/demultiplexer that inputs an optical signal output from the port 11-1-p1 to another port 11-1-p2 (where p1 and p2 are integers equal to or greater than 1 and equal to or less than P). In this case, the optical signal transmitted from the subscriber device 40b or 40c is input to the optical SW 10a via the transmission line 50-2. The optical SW 10a outputs the optical signal input from the transmission line 50-2 to the port 11-1-p1, and inputs the optical signal transmitted through the folded transmission line 73 from the port 11-1-p2. The optical SW 10a outputs the optical signal input from the port 11-1-p2 from the port 11-2-1 to the control unit 20. Accordingly, the subscriber device 40b or 40c and the control unit 20 are connected.

The wavelength control unit 25 may perform a wavelength changing process of instructing the subscriber device 40 that has performed the wavelength allocation process to change the wavelength or the like. Here, the wavelength changing process is illustrated as an example in which the subscriber device 40 communicates with the control unit using the monitoring information as a trigger. For example, the wavelength control unit 25 specifies the subscriber device 40 which is a wavelength change target based on the monitoring information output from the monitoring unit 60 and performs the wavelength changing process on the specified subscriber device 40. The optical SW control unit 26 controls the optical SW 10a such that an optical signal is transmitted and received between the subscriber device 40 and the wavelength control unit 25 during the wavelength changing process. After the wavelength changing process, the optical SW control unit 26 controls the optical SW 10a such that the optical signal transmitted from the subscriber device 40 at the changed wavelength is output to the transmission line 50-2 corresponding to the transmission destination on the path to the communication destination. For example, after the wavelength changing process, the optical SW control unit 26 controls the optical SW 10a such that the optical signal with the changed wavelength from the subscriber device 40 is output to the transmission line 50-2 corresponding to the transmission destination on the path to the communication destination used in a combination of the subscriber device 40 which is a transmission source and the wavelength before the change. Alternatively, the optical SW 10a may be controlled to output the optical signal having the changed wavelength to the transmission line 50-2 different from that before the wavelength change. In this case, before and after the wavelength changing process, the subscriber device 40 of the transmission destination on the path to the communication destination is different. The wavelength control unit 25 may receive a wavelength changing request from the subscriber device 40 during communication or after the end of communication and perform the wavelength changing process on the subscriber device 40 which is a request source. Both the wavelength used for transmission and the wavelength used for reception by the subscriber device 40 may be changed through the wavelength changing process, or one thereof may be changed.

The monitoring information used for the wavelength changing process may be, for example, a change request from the subscriber device 40 using a control signal, an abnormality of a communication status such as a wavelength shift, an increase or decrease in an output, or a communication abnormality (error), a deviation from specification, setting, or an allowable range of a wavelength, a modulation scheme, a protocol, or the like to be used, use of an unallocated wavelength, or abnormality detection such as signal interruption. The monitoring information may be a trigger other than the monitoring signal, for example, a change request for a transmission destination or the like via a main signal or via a signal not routed through an optical SW, or may be a request for abnormality detection, stop, or change from a device inside or outside of a network of a transmission line, a management system, or the like. When abnormality detection, stop, or change is requested and the wavelength or the like is not changed to a designated, set, or allowable range, a shutter or the like may interrupt an instruction or a signal for restart or the like in a state the control unit is connected to the subscriber device 40 or a signal may be blocked in a state in which the signal is not output to the transmission line. Exchange between the control unit 20 and the subscriber device 40 may be performed by AMCC or may be performed by a main signal. When the subscriber device 40 is not compatible with AMCC, the exchange may be appropriately performed with the main signal. When the wavelength or the like before the switching does not have an adverse influence on the facing device before the switching, the path with the facing subscriber device 40 may be set by the monitoring unit or the like while being connected without switching to the control unit 20. When the wavelength or the like after the switching does not have an adverse influence on the facing device after the switching, the path with the facing subscriber device 40 may be set by the monitoring unit or the like after the switching without the connection switching to the control unit 20.

Figure 3:
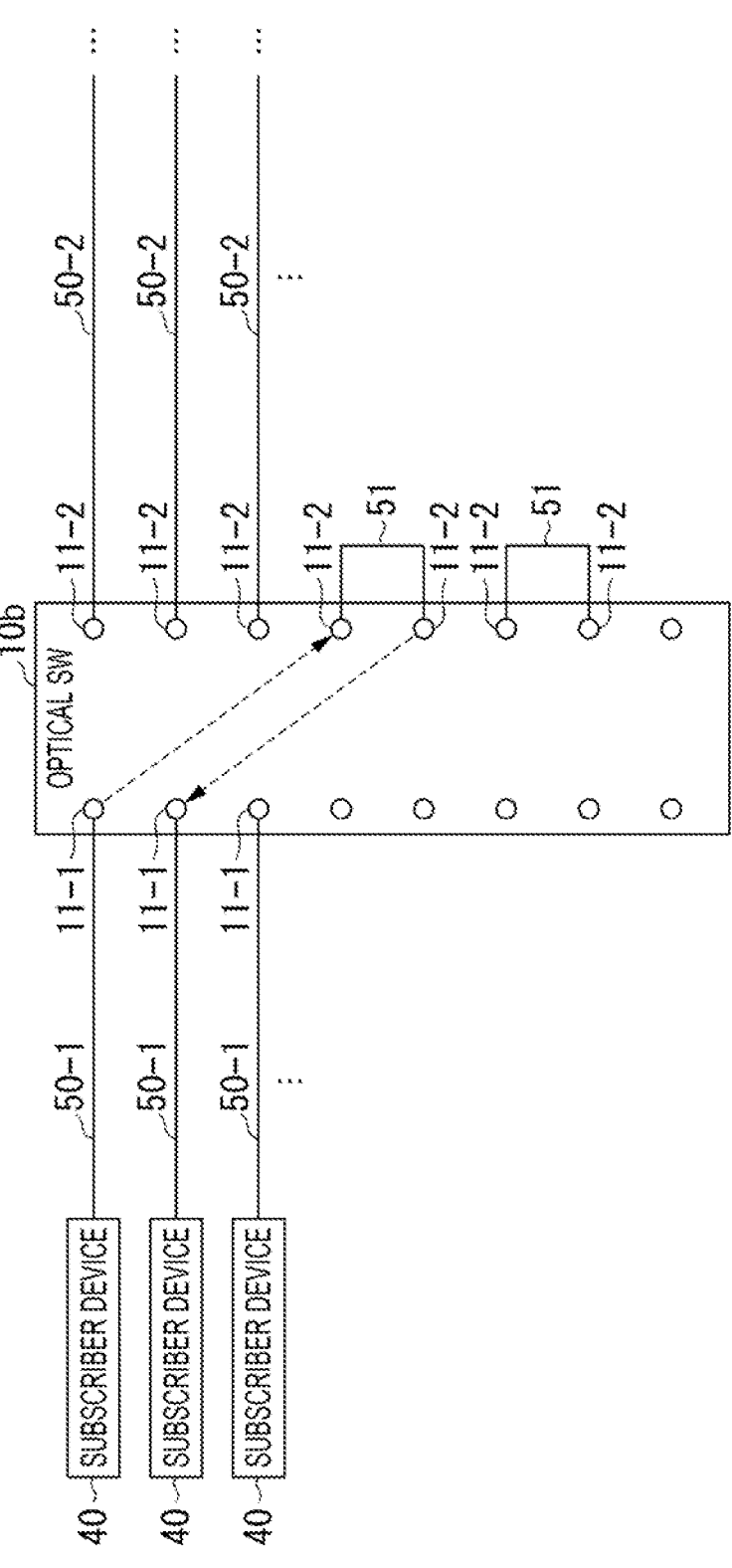
FIG. 3 is a diagram illustrating an example of an optical SW in a basic configuration.

FIG. 3 is a diagram illustrating a configuration example of an optical SW 10b having a folding circuit for folding communication. In the drawing, the same portions as those of the optical SW 10a illustrated in FIG. 2 are denoted by the same reference numerals, and the description thereof will be omitted. In FIG. 3, description of the control unit 20 is omitted. In the following description, description of the control unit 20 is omitted in the drawings when the description is not particularly necessary. The optical SW 10b is connected to a folded transmission line 51. The folded transmission line 51 is an optical fiber, an optical switch, an optical branch combiner/splitter, or an optical multiplexer/demultiplexer that inputs an optical signal output from the port 11-2 to the other port 11-2. Accordingly, the optical SW 10b enables folded communication.

When a port which is an output destination of the optical signal is set in a combination of the transmission source subscriber device 40 which is a transmission source and the wavelength, the destination may be different between a direction from the port 11-1 to the port 11-2 to which the folded transmission line 51 is connected and a direction from the port 11-2 to which the folded transmission line 51 is connected to the port 11-1.

Figure 4:
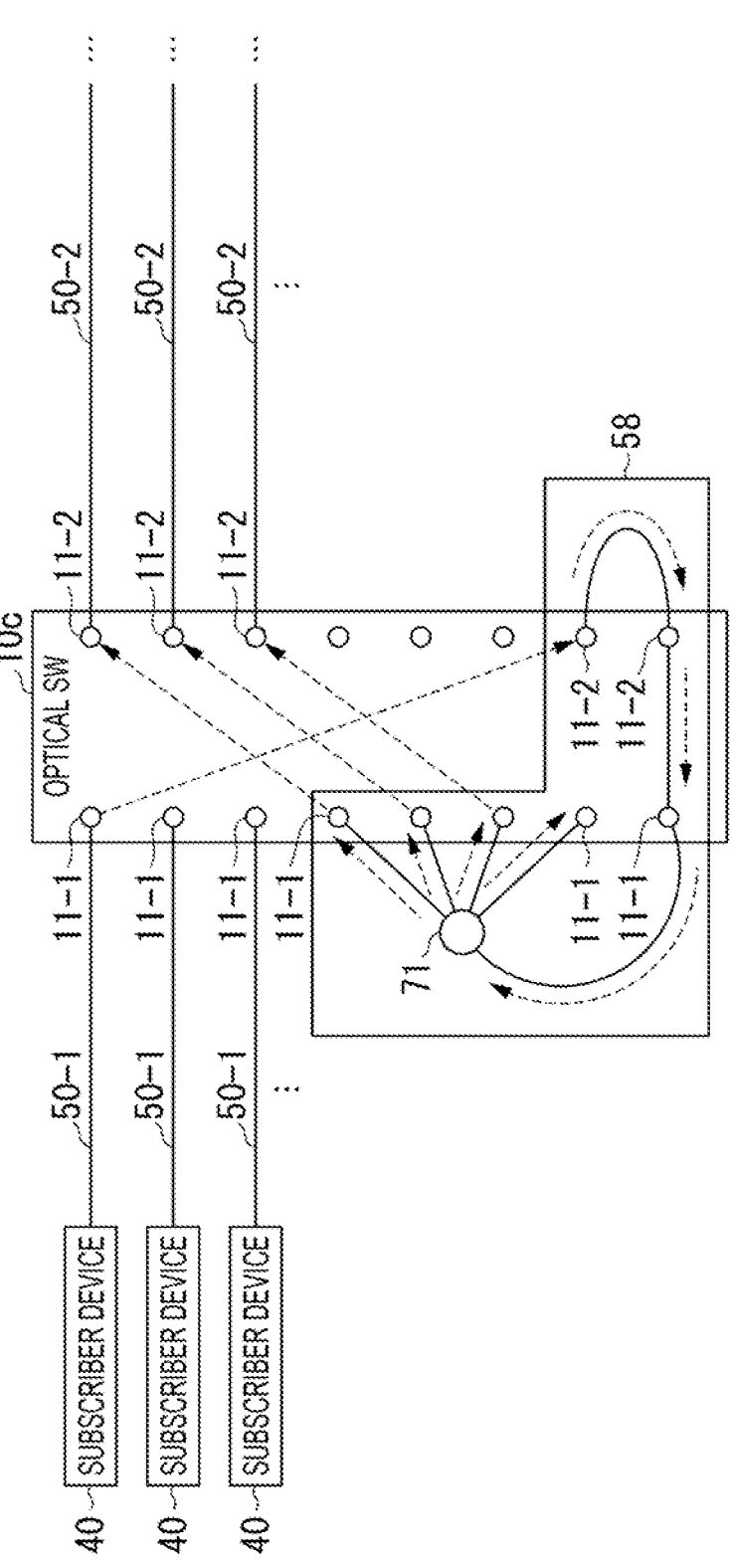
FIG. 4 is a diagram illustrating an example of an optical SW in a basic configuration.

FIG. 4 is a diagram illustrating a configuration example of an optical SW 10c that performs uplink multicasting using a one-to-one folded transmission line and one-to-other folded transmission lines facing each other. In the drawing, the same portions as those of the optical SW 10a illustrated in FIG. 2 are denoted by the same reference numerals, and the description thereof will be omitted. The optical SW 10c includes a distribution unit 58 that distributes an optical signal output from the port 11-2 into a plurality of signals and inputs the plurality of distributed optical signals to different ports 11-1. In FIG. 4, the optical SW 10c inputs the optical signal output from the port 11-2 to the other port 11-2 via the folded transmission line. The optical SW 10c outputs the input optical signal to the port 11-1 to which the 1×N power splitter 71 is connected. The optical signal output from the port 11-1 is distributed by the power splitter 71 to be input to the plurality of other ports 11-1. The optical SW 10c outputs the optical signals input from the plurality of ports 11-1 to different ports 11-2. Bidirectional communication is also possible. The optical signal in the downlink direction is routed in a direction reverse to the uplink direction.

The optical SW 10c may receive optical signals with a plurality of wavelengths from the port 11-1. In this case, the optical SW 10c distributes the optical signals with the plurality of wavelengths input from the port 11-1 by the distribution unit 58 and outputs the distributed optical signals to each subscriber device 40 connected to the port 11-2 or a transmission line connected to another ground. The subscriber device 40 connected to the port 11-2 selects and receives an optical signal with a predetermined wavelength among the optical signals with the plurality of wavelengths. The transmission line connected to the other ground may transmit the optical signals with the plurality of wavelengths as it is or may transmit the optical signals with a wavelength selected by a WDM device illustrated in FIG. 6 to be described below.

Figure 5:
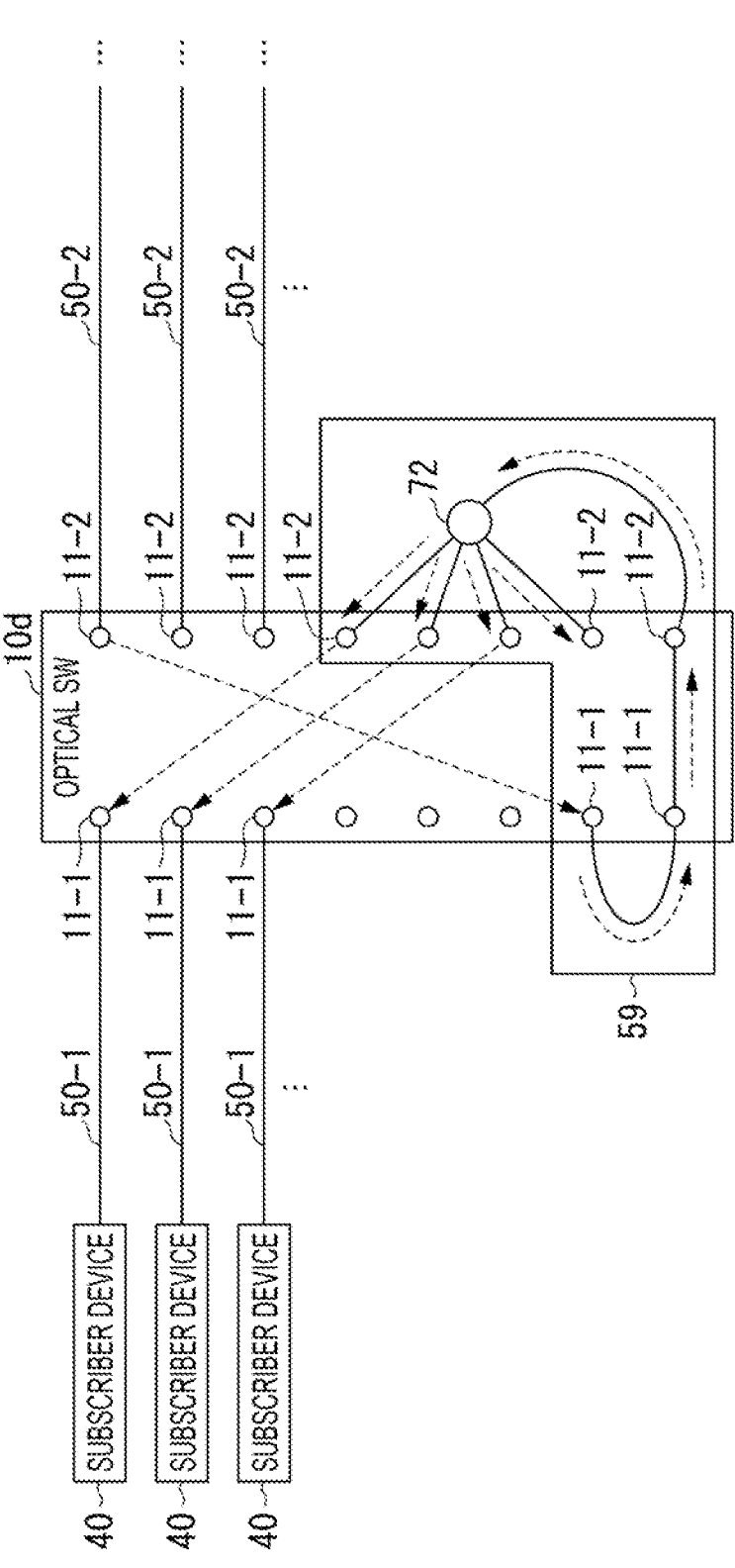
FIG. 5 is a diagram illustrating an example of an optical SW in a basic configuration.

FIG. 5 is a diagram illustrating a configuration example of an optical SW 10d that performs downlink multicasting. In the drawing, the same portions as those of the optical SW 10a illustrated in FIG. 2 are denoted by the same reference numerals, and the description thereof will be omitted. The optical SW 10d includes a distribution unit 59 that distributes an optical signal output from the port 11-1 into a plurality of signals and inputs the plurality of distributed optical signals to different ports 11-2. In FIG. 5, the optical SW 10d inputs the optical signal output from the port 11-1 to the other port 11-1 via the folded transmission line. The optical SW outputs the input optical signal to the port 11-2 to which the 1×N power splitter 72 is connected. The optical signal output from the port 11-2 is distributed by the power splitter 72 to be input to the plurality of other ports 11-2. The optical SW 10d outputs the optical signals input from the plurality of ports 11-2 to different ports 11-1.

The optical signals with the plurality of wavelengths may be input to the optical SW 10d from the port 11-2. In this case, in the optical SW 10d, the optical signals with the plurality of wavelengths input from the port 11-2 are distributed by the distribution unit 59, and the distributed optical signals are output to the subscriber devices 40 connected to the port 11-1. Each of the subscriber devices 40 connected to the port 11-1 selects and receives an optical signal with a predetermined wavelength from among the received optical signals with the plurality of wavelengths.

Figure 6:
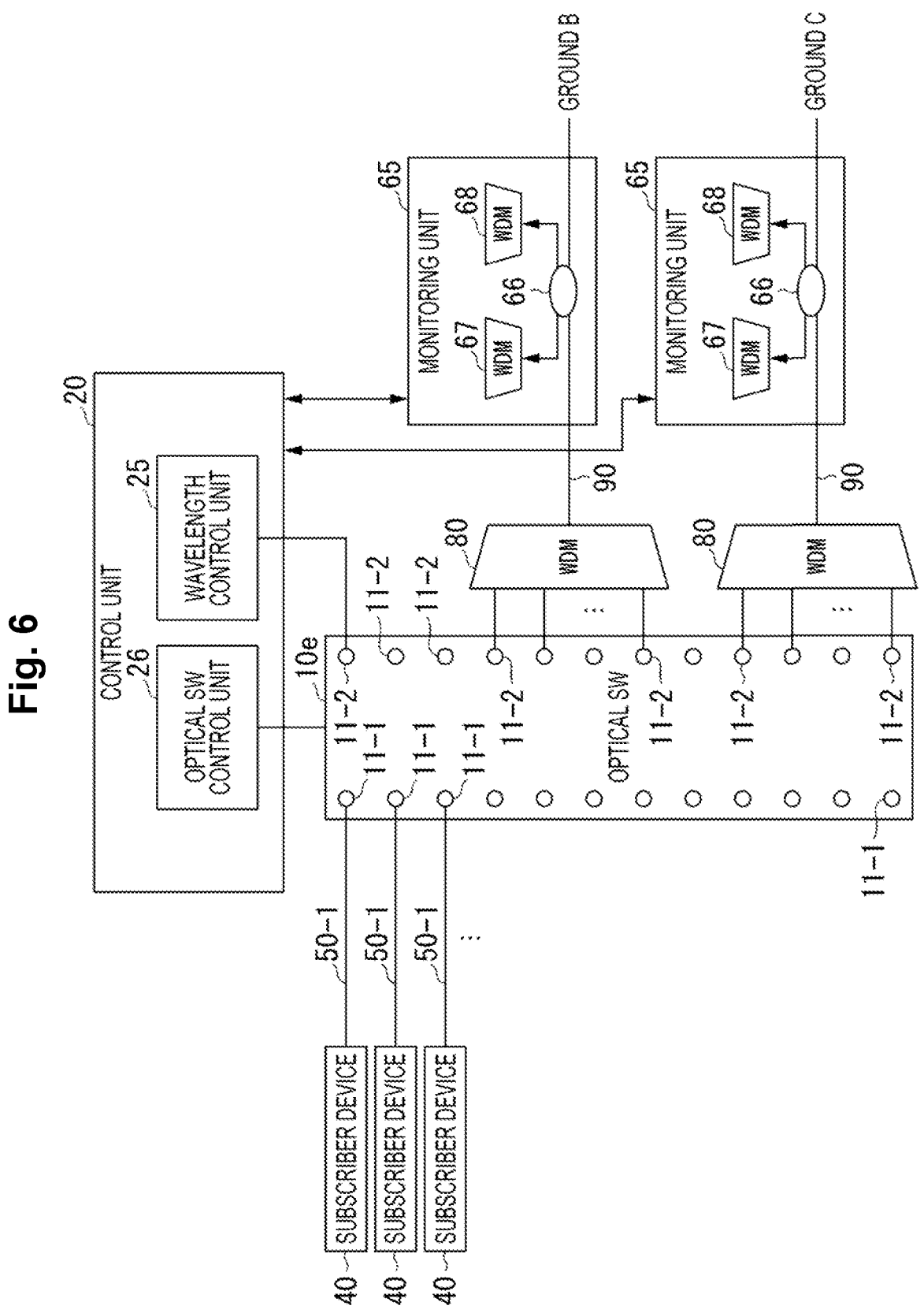
FIG. 6 is a diagram illustrating an example of an optical SW in a basic configuration.

FIG. 6 is a diagram illustrating a configuration example of an optical SW 10e that performs WDM transmission. In the drawing, the same portions as those of the optical SW 10a illustrated in FIG. 2 are denoted by the same reference numerals, and the description thereof will be omitted. The optical SW 10e is connected to one or more WDM devices 80. The WDM device 80 is an example of a multiplexing/demultiplexing device. The WDM device 80 multiplexes optical signals with different wavelengths output from the plurality of ports 11-2 and outputs the multiplexed optical signals to a multiplexing communication transmission line 90. The WDM device 80 demultiplexes the optical signal received via the multiplexing communication transmission line 90 by the wavelength and inputs the demultiplexed optical signals to the plurality of ports 11-2. As described above, the WDM device 80 has functions of a multiplexing device and a demultiplexing device. As a function of the multiplexing device, optical signals with different wavelengths output from the plurality of ports 11-2 of the optical SW 10e are multiplexed and output to the multiplexing communication transmission line 90. As a function of the demultiplexing device, an optical signal received via the multiplexing communication transmission line 90 is demultiplexed by the wavelength, and the demultiplexed optical signals is input to the plurality of different ports 11-2 of the optical SW 10e. The optical SW that performs WDM transmission may connect the folded transmission line 51 illustrated in FIG. 3 to the port 11-2 that is not connected to the WDM device 80.

The multiplexing communication transmission line 90 includes a monitoring unit 65. The monitoring unit 65 includes a power splitter 66 and WDM devices 67 and 68. The power splitter 66 branches an optical signal transmitted through the multiplexing communication transmission line 90. The WDM device 67 demultiplexes the uplink optical signal branched by the power splitter 66. The WDM device 68 demultiplexes the downlink optical signal branched by the power splitter 66. The monitoring unit 65 monitors the optical signals demultiplexed by the WDM devices 67 and 68. The monitoring unit 65 generates monitoring information based on a monitoring result and outputs the generated monitoring information.

The monitoring unit 65 may include a power splitter 69 in each of the transmission lines between the port 11-2 and the WDM device 80. The power splitter 69 branches an optical signal transmitted through a transmission line between the port 11-2 and the WDM device 80 and outputs the branched optical signal to the control unit 20.

The wavelength control unit 25 may perform the wavelength changing process of instructing the subscriber device 40 that has performed the wavelength allocation process to change the wavelength. For example, the wavelength control unit 25 specifies the subscriber device which is wavelength change target based on the monitoring information output from the monitoring unit 65 and performs the wavelength changing process on the specified subscriber device 40. The optical SW control unit 26 controls, for example, reconnects the optical SW via the monitoring unit such that the optical signal is transmitted and received between the subscriber device 40 and the wavelength control unit 25 during the wavelength changing process. When the optical signal with the changed wavelength is input from the subscriber device 40 after the wavelength changing process, the optical SW control unit 26 controls the optical SW 10e such that the input optical signal from the port 11-2 corresponding to the transmission destination on the path is output to the communication destination. The wavelength control unit 25 may receive a wavelength changing request from the subscriber device 40 during communication or after the end of communication and perform the wavelength changing process on the subscriber device 40 which is a request source.

Figure 7:
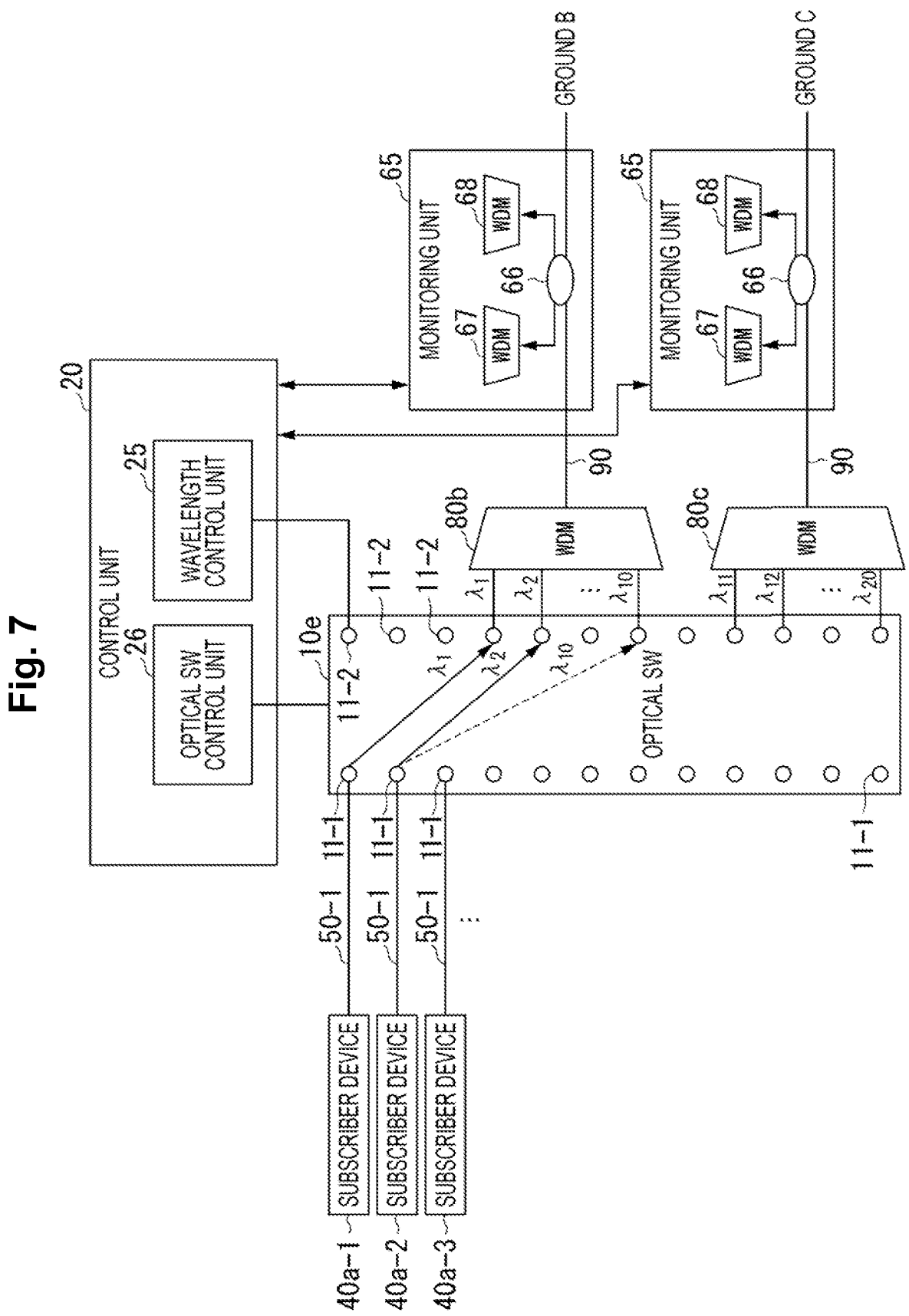
FIG. 7 is a diagram illustrating an example of routing before a change in a wavelength in the optical SW in the basic configuration.
Figure 8:
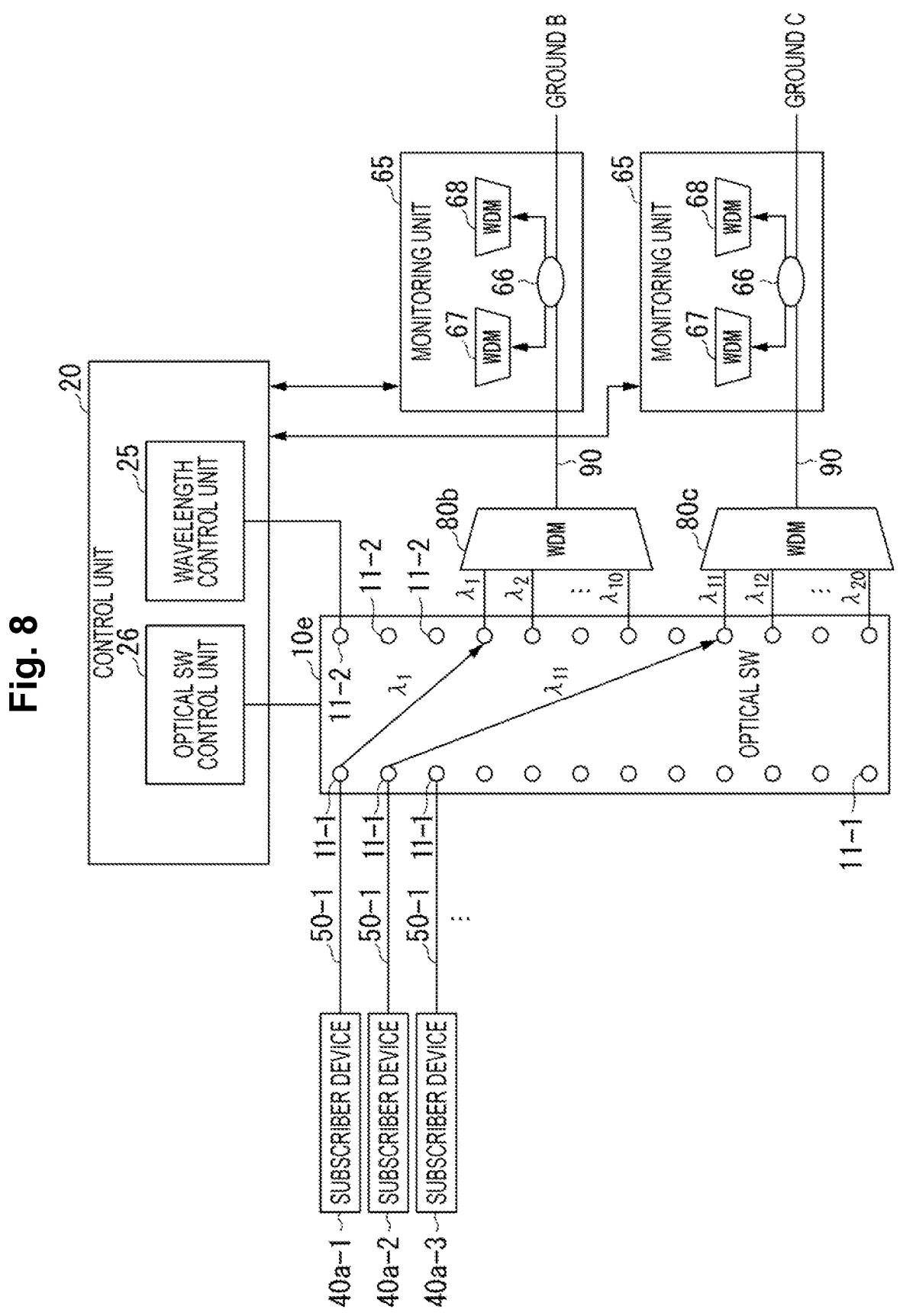
FIG. 8 is a diagram illustrating an example of routing after the change in the wavelength in the optical SW in the basic configuration.

An example of a change in a wavelength in the optical SW 10e will be described with reference to FIGS. 7 and 8. FIG. 7 is a diagram illustrating an example of routing before the change in the wavelength in the optical SW 10e. The optical SW 10e is connected to the subscriber devices 40a-1, 40a-2, 40a-3, . . . which are the subscriber device 40 on the ground A. The WDM device 80 connected to the ground B is referred to as a WDM device 80b, and the WDM device 80 connected to the ground C is referred to as a WDM device 80c. The WDM device 80b transmits and receives optical signals with wavelengths $\lambda_1$ to $\lambda_{10}$ to and from the optical SW 10e, and the WDM device 80c transmits and receives optical signals with wavelengths $\lambda_{11}$ to $\lambda_{20}$ to and from the optical SW 10e.

In FIG. 7, before the change in the wavelength, the optical SW 10e outputs an optical signal with the wavelength $\lambda_1$ input from the subscriber device 40a-1 and an optical signal with the wavelength $\lambda_2$ input from the subscriber device 40a-2 from different ports 11-2 to the WDM device 80b. The subscriber device 40a-2 transmits a wavelength changing request to the wavelength control unit by a control signal during communication or after end of the communication. When the wavelength changing request is received from the subscriber device 40a-2, the wavelength control unit 25 performs the wavelength changing process of instructing the subscriber device 40a-2 to change the wavelength to the wavelength $\lambda_{10}$. The optical SW control unit 26, the monitoring unit, or the blocking unit does not output an optical signal with the wavelength $\lambda_{10}$ received from the subscriber device 40a-2 until the change in the wavelength is completed as necessary. The optical SW control unit 26 controls the optical SW 10e such that the optical signal from the port 11-2 corresponding to the wavelength $\lambda_{10}$ is output to the WDM device 80b after the switching is completed. The wavelength control unit 25 may further change the wavelength used for reception by the subscriber device 40a-2.

After the wavelength changing process, the optical SW control unit 26 may control the optical SW 10e such that the optical signal transmitted from the subscriber device which is a transmission source using the changed wavelength is output to the WDM device 80 different from that before the change in the wavelength. FIG. 8 is a diagram illustrating an example of routing after the change in the wavelength in the optical SW 10e when the WDM device which is an output destination is changed. Before the change in the wavelength, as illustrated in FIG. 7, the subscriber device 40a-1 communicates using the wavelength $\lambda_1$, and the subscriber device 40a-2 communicates using the wavelength $\lambda_2$ or $\lambda_{10}$. The subscriber device 40a-2 transmits a wavelength changing request to the wavelength control unit 25 by a control signal during communication or after end of the communication. When the wavelength changing request is received from the subscriber device 40a-2, the wavelength control unit 25 performs the wavelength changing process of instructing the subscriber device 40a-2 to change the wavelength to the wavelength $\lambda_{11}$ in order to communicate with the subscriber device 40 on the ground C. The optical SW control unit 26, the monitoring unit, or the blocking unit does not output the optical signal with the wavelength $\lambda_{10}$ input from the subscriber device 40a-2 until the change in the wavelength is completed as necessary. After the switching is completed, the optical SW control unit 26 controls the optical SW 10e such that the optical signal with the wavelength $\lambda_{11}$ received from the subscriber device 40a-2 is output from the port 11-2 corresponding to the wavelength $\lambda_{11}$ to the WDM device 80c. The wavelength control unit 25 may further change the wavelength used for reception by the subscriber device 40a-2.

When the subscriber device 40a-2 does not change the wavelength used for reception, the wavelength control unit may operate as follows. When the wavelength is not used as at least a part of the destination information, the following may not be applied.

(1) The wavelength control unit 25 releases a transmission wavelength used by the subscriber device 40 on the ground B which is a communication destination before the wavelength switching. By releasing the transmission wavelength, the path from the subscriber device 40*a*-2 to the subscriber device 40 on the ground B is reset. Thereafter, the wavelength control unit 25 reallocates a wavelength that has become a free wavelength by the releasing for reception of a signal addressed to the subscriber device 40*a*-2 from the subscriber device 40 on the ground C that is a new communication destination. This is performed when a wavelength used for each subscriber device 40 is unique, and a wavelength other than the free wavelength is not allocated.

(2) When the subscriber device 40 connected via the different multiplexing communication transmission line 90 before and after the change in the wavelength of the subscriber device 40*a*-2 is a communication destination, the wavelength used before the change in the wavelength can be reused as it is. However, although the wavelength is used as the destination information, for example, when different transmission lines are routed or an input port or an output port of the optical switch is different, the same wavelength is treated as a different path. In order to enable reuse as described above, in this case, for example, an "input transmission line," an "output transmission line," or a "combination of all transmission lines included in a path" is added to an argument serving as a condition for determining an output destination of an optical signal. For example, the output destination is determined in a combination of a transmission line or a port that has received the optical signal and a wavelength of the optical signal, or a combination of a transmission line or a port that has received the optical signal, the subscriber device that has transmitted the optical signal, and a wavelength of the optical signal.

Although the wavelength changing process performed by the subscriber device 40 requesting the change in the wavelength has been described above, the same applies to the wavelength changing process performed based on the monitoring information.

Figure 9:
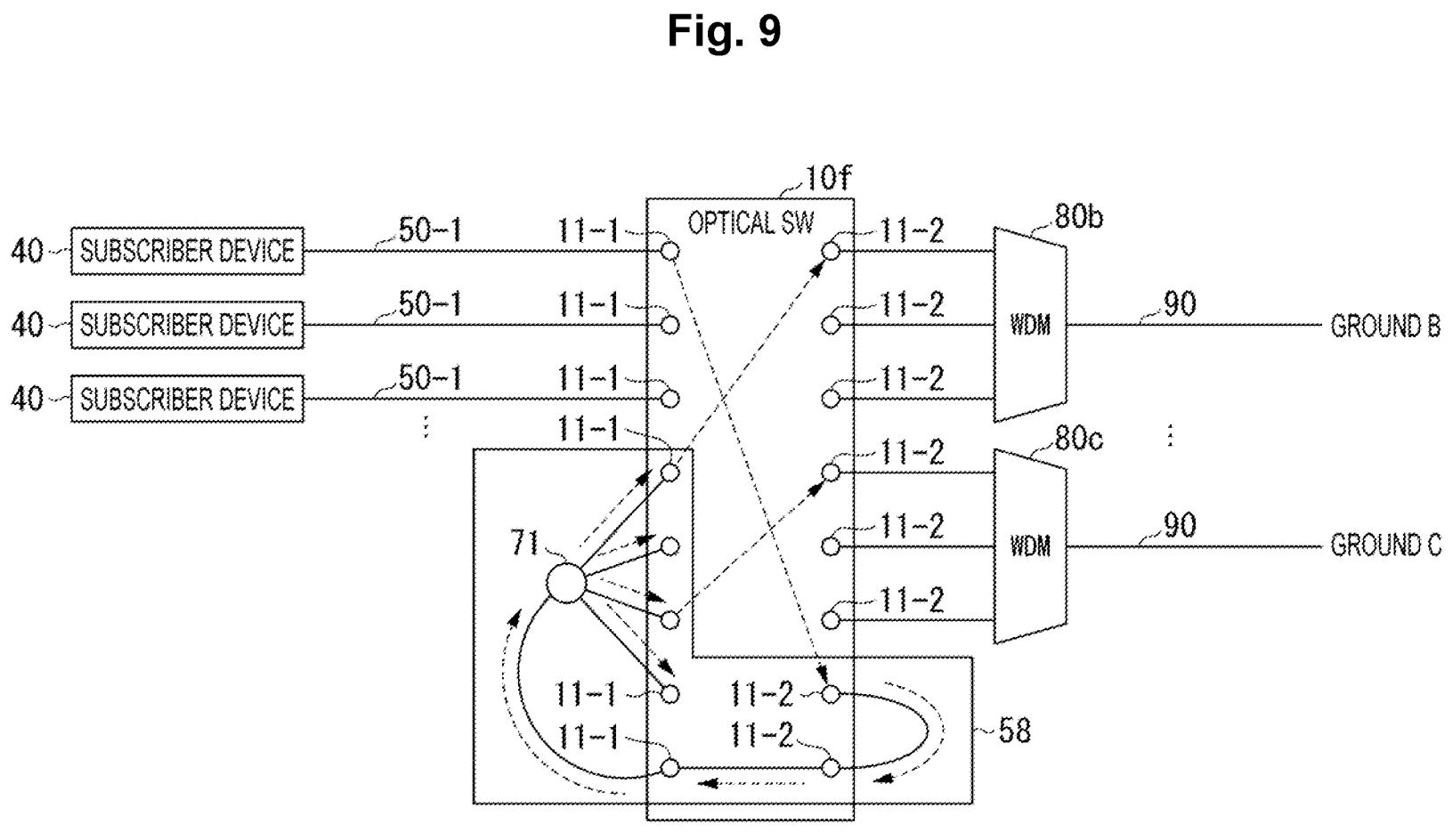

An optical SW that performs WDM transmission and multicasting will be described with reference to FIGS. 9 to 11. FIG. 9 is a diagram illustrating a configuration example of an optical SW 10*f* that performs WDM transmission and multicasting in an uplink direction. In FIG. 9, the optical SW 10*f* performs multicasting in an uplink direction with a single wavelength. As illustrated in FIG. 9, the optical SW 10*f* includes a distribution unit 58 similar to that in FIG. 4. In FIG. 9, multicasting is performed on the grounds B and C. The optical SW 10*f* outputs the optical signal input from the port 11-1 connected to the subscriber device 40 from the port 11-2 connected to the folded transmission line and inputs the optical signal transmitted through the folded transmission line from the other port 11-2. The optical SW 10*f* outputs the input optical signal from the port 11-1 to which the 1×N power splitter 71 is connected. The optical SW 10*f* inputs the optical signal distributed by the 1×N power splitter 71 from the plurality of ports 11-1, outputs one of the input optical signals to the port 11-2 connected to the ground B, and outputs the other optical signal to the port 11-2 connected to the ground C.

The subscriber device 40 may output the WDM signal. For example, the subscriber device 40 outputs a WDM signal in which the optical signal with the wavelength $\lambda_1$ and the optical signal with the wavelength $\lambda_2$ are multiplexed. A plurality of transmission lines between the WDM device 80*b* and the optical SW 10*f* transmit and receive optical signals with the wavelengths $\lambda_1, \lambda_2, \ldots$ in order from the upper side. Similarly, in a plurality of transmission lines between the WDM device 80*c* and the optical SW 10*f*, optical signals with the wavelengths $\lambda_1, \lambda_2, \ldots$ are transmitted and received in order from the supper side.

In the optical SW 10*f*, the WDM signals with the wavelengths $\lambda_1$ and $\lambda_2$ input from the port 11-1 connected to the subscriber device 40 are distributed by the distribution unit 58. The optical SW 10*f* outputs the distributed WDM signals to the port 11-2 corresponding to the wavelength $\lambda_1$ among the ports 11-2 connected to the WDM device 80*b*. Further, the optical SW 10*f* outputs the other distributed WDM signals to the port 11-2 corresponding to the wavelength $\lambda_2$ among the ports 11-2 connected to the WDM device 80*c*. The WDM device 80*b* filters the WDM signal input from the port corresponding to the wavelength to block the wavelength $\lambda_2$, passes the optical signal with the wavelength $\lambda_1$, and outputs the optical signal to the multiplexing communication transmission line 90. The WDM device 80*c* filters the WDM signal input from the port corresponding to the wavelength $\lambda_2$ to block the wavelength $\lambda_1$, passes the optical signal with the wavelength $\lambda_2$, and outputs the optical signal to the multiplexing communication transmission line 90.

Figure 10:
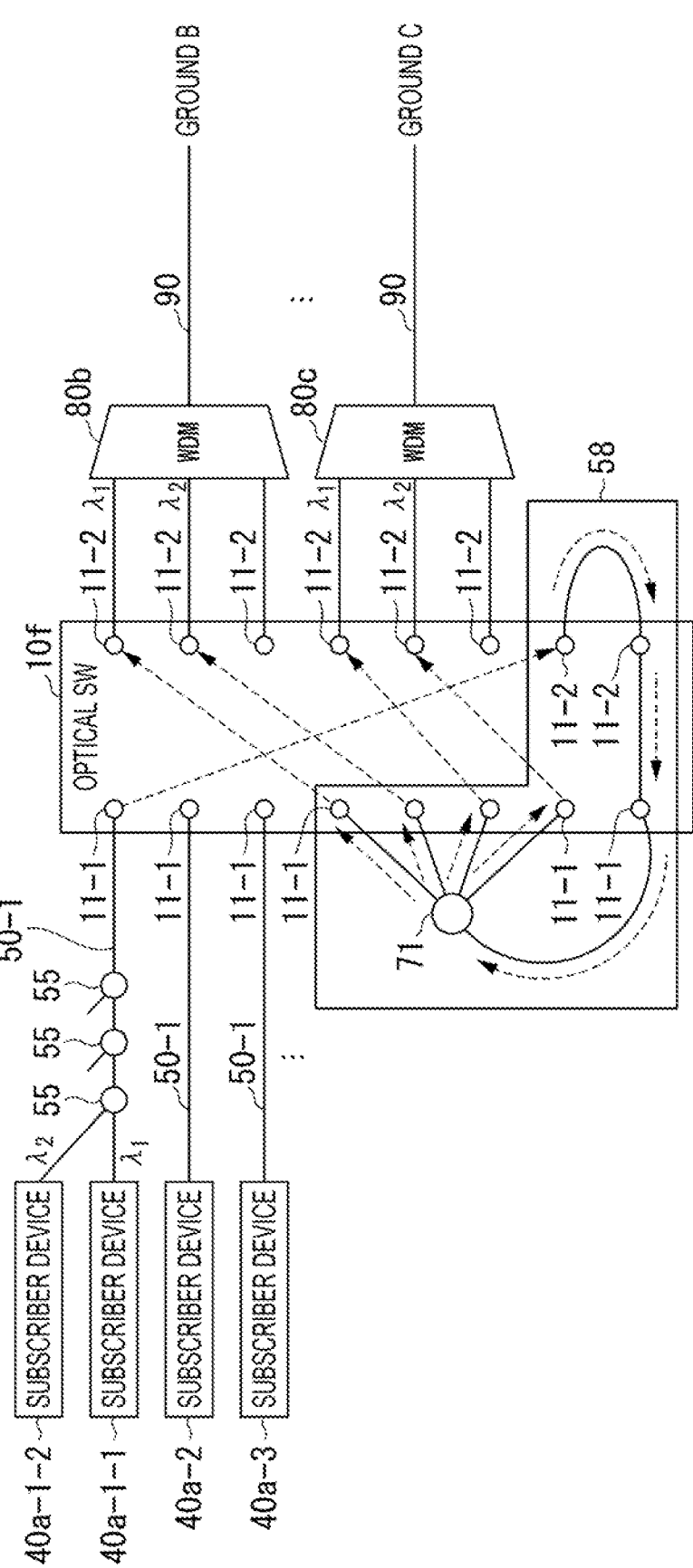
FIG. 10 is a diagram illustrating an example of an optical SW in a basic configuration.

FIG. 10 is a diagram illustrating a case where the optical SW 10*f* performs multicasting in an uplink direction on a plurality of grounds using a plurality of wavelengths. By including one or more 1×M power splitters 55 in the transmission line 50-1, the plurality of subscriber devices 40 can be connected to the transmission line 50-1 connected to one port 11-1. In FIG. 10, as a plurality of subscriber devices 40*a*-1, subscriber devices 40*a*-1-1, 40*a*-1-2, . . . are connected to one transmission line 50-1. The subscriber devices 40*a*-1-1, 40*a*-1-2, . . . use different wavelengths. Here, the subscriber device 40*a*-1-1 transmits an optical signal with the wavelength $\lambda_1$, and the subscriber device transmits an optical signal with the wavelength $\lambda_2$. The optical SW 10*f* receives, from the port 11-1, an optical signal obtained by multiplexing the optical signal with the wavelength $\lambda_1$ transmitted by the subscriber device 40*a*-1-1 and the optical signal with the wavelength $\lambda_2$ transmitted by the subscriber device 40*a*-1-2. The optical SW 10*f* outputs the input optical signal from the port 11-2 to which the folded transmission line is connected and inputs the optical signal transmitted through the folded transmission line from the other port 11-2. The optical SW outputs the input optical signal from the port 11-1 to which the 1×N power splitter 71 is connected. The optical signal distributed by the 1×N power splitter 71 is input to the optical SW 10*f* from the plurality of ports 11-1.

The optical SW 10*f* outputs the optical signal distributed by the power splitter 71 to the port 11-2 corresponding to the wavelength $\lambda_1$ and the port 11-2 corresponding to the wavelength $\lambda_2$ among the ports 11-2 connected to the WDM device 80*b*. Further, the optical SW outputs the optical signal distributed by the power splitter 71 to the port 11-2 corresponding to the wavelength $\lambda_1$ and the port 11-2 corresponding to the wavelength $\lambda_2$ among the ports 11-2 connected to the WDM device 80*c*. The WDM device 80*b* filters the optical signal input from the port corresponding to the wavelength $\lambda_1$, passes the optical signal with the wavelength $\lambda_1$, and outputs the optical signal to the multiplexing communication transmission line 90. The WDM device 80*b* filters the optical signal input from the port corresponding to the wavelength $\lambda_2$, passes the optical signal with the wavelength $\lambda_2$, and outputs the optical signal to the multiplexing communication transmission line 90. Similarly, the WDM device 80*c* filters the optical signal input from the port corresponding to the wavelength $\lambda_1$, passes the optical signal with the wavelength $\lambda_1$, and outputs the optical signal to the multiplexing communication transmission line 90, and filters the optical signal input from the port corresponding to the wavelength $\lambda_2$, passes the optical signal with the wavelength $\lambda_2$, and outputs the optical signal to the multiplexing communication transmission line 90.

Figure 11:
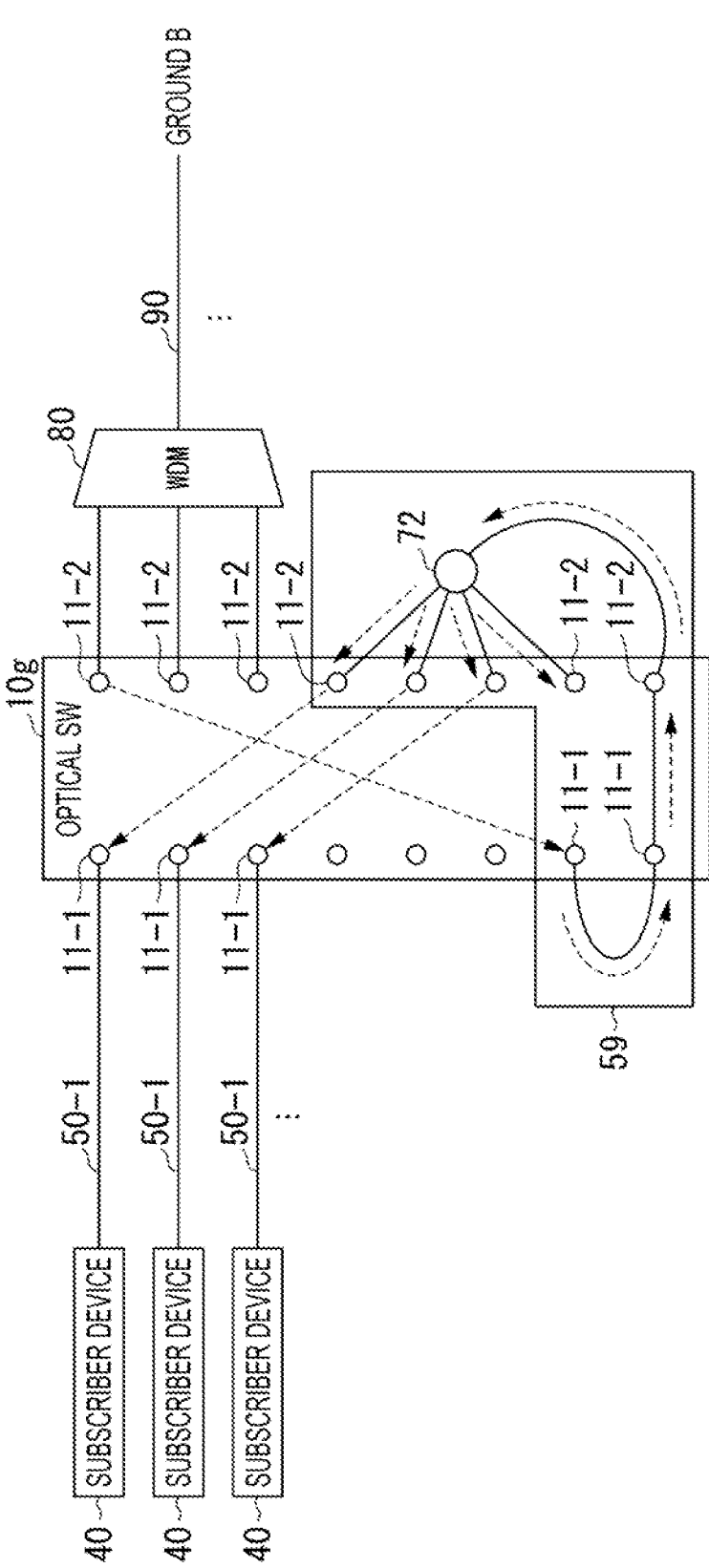
FIG. 11 is a diagram illustrating an example of an optical SW in a basic configuration.

FIG. 11 is a diagram illustrating a configuration example of an optical SW 10g that performs WDM transmission and downlink multicasting. The optical SW 10g includes a distribution unit 59 similar to that in FIG. 5. The optical SW 10f illustrated in FIGS. 9 and 10 and the optical SW 10g illustrated in FIG. 11 may include a monitoring unit 65 similar to that in FIG. 6. The wavelength control unit 25 can perform the wavelength changing process in the same way as described above on the subscriber device 40 in which the monitoring unit 65 has detected the abnormality of the communication status.

Figure 12:
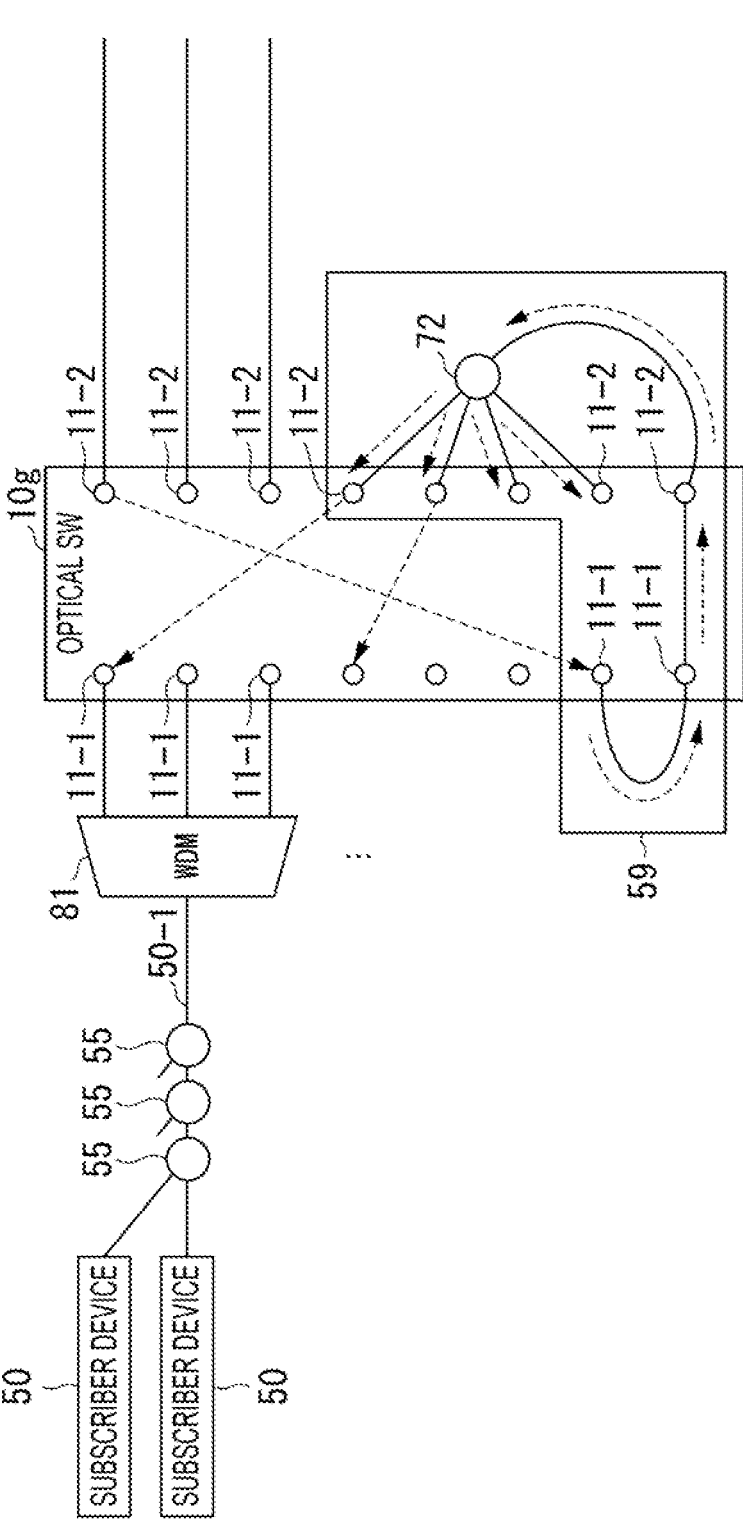
FIG. 12 is a diagram illustrating an example of an optical SW in a basic configuration.

FIG. 12 is a diagram illustrating a case where the optical SW 10g performs WDM transmission and downlink multicasting. The connection configuration illustrated in FIG. 12 is different from the connection configuration illustrated in FIG. 11 in that the WDM device 80 connected to the plurality of ports 11-2 of the optical SW 10g is replaced with a WDM device 81 connected to the plurality of ports 11-1. One or more subscriber devices 40 are connected to the WDM device 81 on the side opposite to the port 11-1. The optical SW 10g inputs optical signals with a plurality of wavelengths from another ground from the port 11-2 and outputs the optical signals to the port 11-1 to which the folded transmission line of the distribution unit 59 is connected. The optical signals with the plurality of wavelengths are directly branched by the power splitter 72. The optical SW 10d inputs the branched optical signals with the plurality of wavelengths from the plurality of ports 11-2 and outputs the input optical signals to any one of the ports 11-1 connected to the WDM device 81. The WDM device 81 filters and passes an optical signal with the wavelength corresponding to the port 11-1 that has received the optical signal from the input optical signals with the plurality of wavelengths, and outputs the optical signal which has passed to a transmission line connected to the subscriber device 40.

Figure 13:
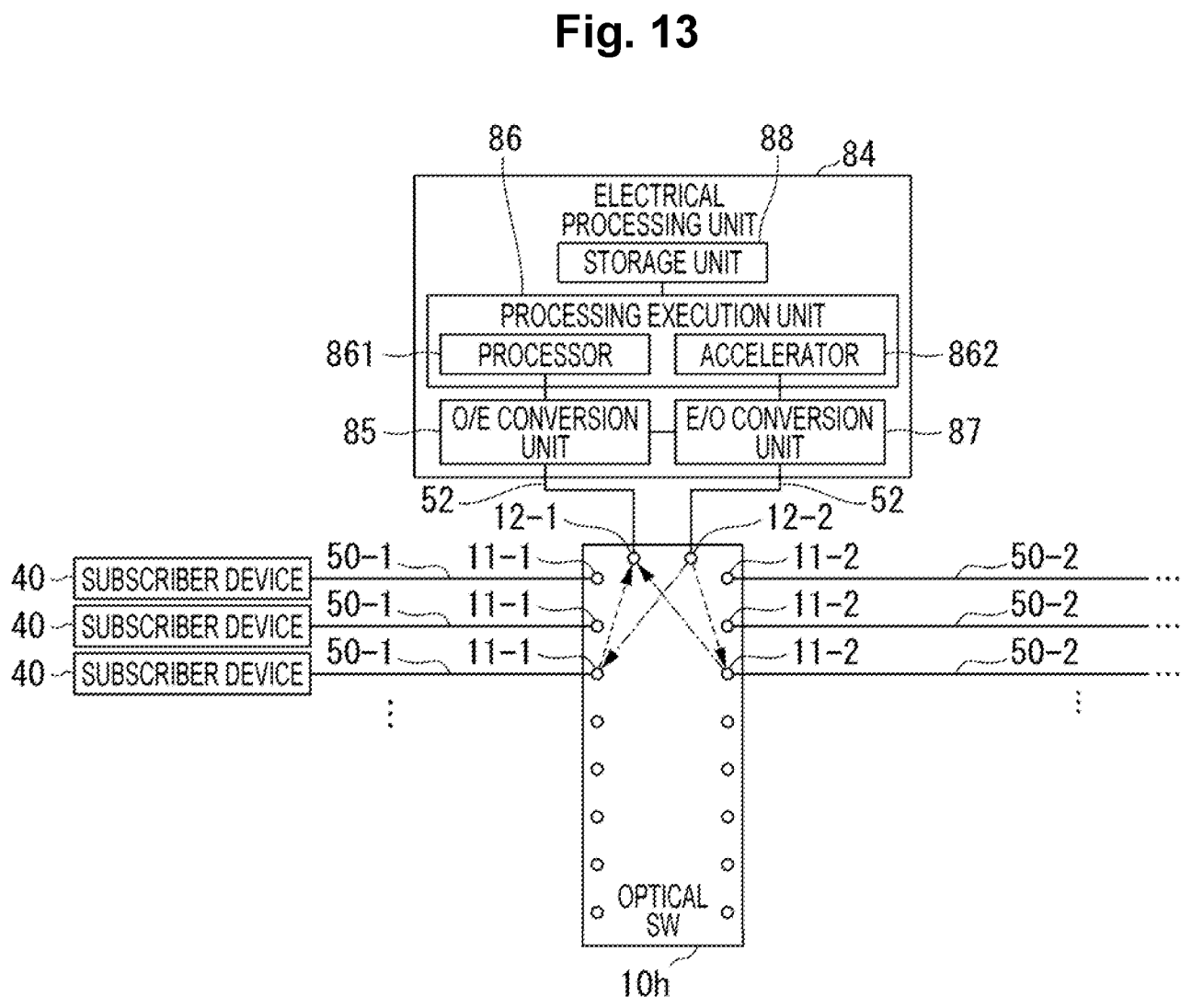

FIG. 13 is a diagram illustrating a configuration example of an optical SW 10h that performs electrical processing on an optical signal. In FIG. 13, the same portions as those of the optical SW 10b illustrated in FIG. 3 are denoted by the same reference numerals, and the description thereof will be omitted. The optical SW 10h is different from the optical SWs 10a to 10g described above in that ports 12-1 and 12-2 are further included. The ports 12-1 and 12-2 are connected to an electrical processing unit 84 via a transmission line 52. The ports 11-1 and 11-2 may be used as ports connected to the electrical processing unit 84 via the transmission line 52.

Under the control of the optical SW control unit 26, the optical SW 10h outputs the optical signal input from the subscriber device 40 from the port 11-2 or 12-1 according to a combination of the wavelength and the subscriber device 40 that is the transmission source of the optical signal or the port 11-1 that has input the optical signal. Under the control of the optical SW control unit 26, the optical SW 10h outputs an output destination of the optical signal input from the port 11-2 from the port 11-1 or 12-1 according to the combination of the wavelength and the port 11-2 to which the optical signal is input.

The optical SW 10h drops the optical signal on the electrical processing unit 84 by outputting an optical signal from the port 12-1. The electrical processing unit 84 electrically terminates the dropped optical signal, performs various types of electrical processing such as error correction and line concentration, converts the signal into an optical signal, and inputs the optical signal to the port 12-2 of the optical SW 10h. The optical SW 10h outputs the optical signal input from the electrical processing unit 84 from the port 11-1 or 11-2 in accordance with the transmission destination on the path to the communication destination specified in the combination of the port 12-2 and the wavelength. In this way, the electrical processing unit 84 performs electrical processing addition (O-E)-O conversion (where O represents light, and E represents electricity.). The electrical processing unit 84 may simply perform O-E-O conversion without performing electrical processing for adding a function. The electrical processing unit 84 can also reduce optical waveform deterioration associated with transmission by performing 3R reproduction (Re-amplification: amplification, Re-timing: timing reproduction, Re-shaping: waveform shaping) or performing 0/1 inversion to use a threshold effect in O-E-O conversion or the like.

The wavelength of the optical signal before the conversion into the electrical signal and the wavelength of the optical signal after the conversion from the electrical signal may be the same or different. The electrical processing unit 84 may multiplex optical signals transmitted from the plurality of subscriber devices 40 at an electrical stage, convert the multiplexed signal into a plurality of optical signals, and branch the plurality of optical signals to separate ports, multiplexers/demultiplexers, or power splitters. The branched optical signal may be further demultiplexed and output to the multiplexer/demultiplexer at a plurality of wavelengths or may be further branched by a power splitter to be multicast. The electrical processing unit 84 may perform only multiplexing or only multicasting in the electrical stage. The process at the electrical stage is appropriate for a case where signals of the transceivers of the subscriber device 40 having a band smaller than that of the transmission line are bundled and treated, for example.

Specifically, the optical SW 10h is connected to an electrical processing unit 84 that converts optical signals transmitted from the plurality of subscriber devices 40 into electrical signals, multiplexes the electrical signals, processes the multiplexed electrical signals, converts the electrical signals into optical signals with a plurality of wavelengths, and inputs the optical signals to the optical switch 10h. The optical switch control unit 26 controls the optical switch 10h such that the plurality of optical signals input from the transmission line 50-1 are output to the electrical processing unit 84 in accordance with a combination of the plurality of subscriber devices 40 that have transmitted the plurality of input optical signals and the wavelength of the input optical signal, and the signal input from the electrical processing unit 84 is output to the transmission line 50-2 corresponding to the transmission destination on the path to the communication destination specified by the wavelength.

When a port to be an output destination of the optical SW is defined by a combination of a subscriber device that transmits an optical signal and a wavelength, the destination may be different between a direction from the port 11-1 to the port 11-2 and a direction from the port 11-2 to the port 11-1 in order to cause the optical signal to pass through the electrical processing unit 84.

The electrical processing unit 84 includes an optical/electrical (O/E) conversion unit 85, a processing execution unit 86, an E/O (electrical/optical) conversion unit 87, and a storage unit 88. The O/E conversion unit 85 converts the optical signal input from the optical SW 10h into an electrical signal. The processing execution unit 86 includes a processor 861 and an accelerator 862. The processor 861 is, for example, a general-purpose processor such as a central processing unit (CPU). The accelerator 862 is, for example, a processor such as a graphics processing unit (GPU). The processor 861 and the accelerator 862 perform electrical signal processing on the electrical signal converted by the O/E conversion unit 85 by reading and executing a program from the storage unit 88. The processing execution unit 86 may perform electrical signal processing of a plurality of functions. Examples of the electrical signal processing are digital signal processing (DSP) for long distance/high speed access, mobile fronthaul processing, error correction, or the like. The E/O conversion unit 87 converts the electrical signal into an optical signal with a wavelength instructed from the optical SW control unit 26 and outputs the optical signal to the optical SW 10*h*. The storage unit 88 stores a program used for the processor 861 and the accelerator 862 to perform a function of electrical signal processing.

Since the processing execution unit 86 has a device architecture based on a general-purpose processor, it is possible to add and change electrical signal processing and to replace with various functions other than the transmission function. Since the processing execution unit 86 performs DSP for long distance/high speed access, a dedicated large scale integration (Large-Scale Integration, Large-Scale Integrated Circuit) for long distance/high speed access is not required, and flexible function deployment according to needs can be realized.

The optical SW 10*h* may be connected to a plurality of electrical processing units 84. In this case, the optical SW 10*h* includes ports 12-1 and 12-2 connected to the electrical processing units 84. Each of the electrical processing units 84 may perform different electrical signal processing, or some or all of the electrical processing units may perform the same electrical processing.

The processing execution unit 86 and the storage unit 88 may be realized by using hardware such as an application specific integrated circuit (ASIC), a programmable logic device (PLD), or a field programmable gate array (FPGA).

Figure 14:
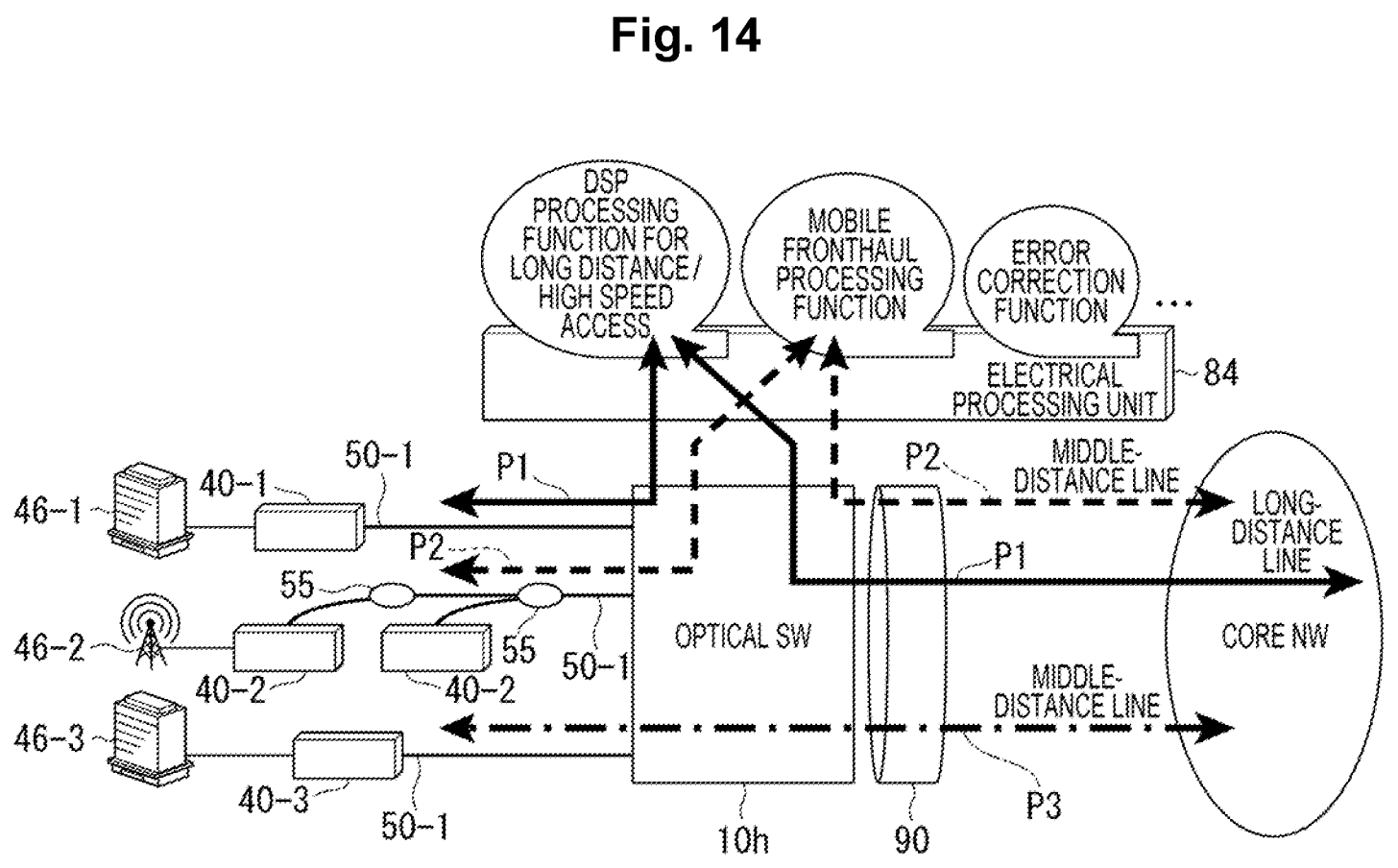

FIG. 14 is a diagram illustrating an example of connection using the optical SW 10*h*. Subscriber devices 40-2, and 40-3 connected to the optical SW 10*h* are, for example, ONUs. A user 46-1 who uses the subscriber device 40-1 is a user who performs long-distance or high-speed communication. One or more communication devices of the user 46-1 are connected to the subscriber device 40-1. The subscriber device 40-1 communicates with a communication destination device along a long distance line P1. The mobile base station 46-2 is connected to the subscriber device 40-2. In FIG. 14, the plurality of subscriber devices 40-2 are connected to one transmission line 50-1 by a power splitter 55. The subscriber device communicates with the communication destination device along a middle distance line P2. A user 46-3 who uses the subscriber device 40-3 is a user who performs medium-distance or medium-speed communication. One or more communication devices of the user 46-3 communicate with a communication destination device along the middle distance line P3 via the subscriber device 40-3. The optical signals of the long distance line P1, the middle distance line P2, and the middle distance line P3 are wavelength-multiplexed and transmitted along the multiplexing communication transmission line 90 connected to the core NW (network). The electrical processing unit 84 has a DSP function for long-distance/high-speed access, a mobile fronthaul processing function, an error correction function, and the like.

An operation of the optical SW 10*h* will be described with reference to FIGS. 13 and 14. The optical SW 10*h* outputs an uplink optical signal transmitted by the subscriber device 40-1 to the electrical processing unit 84. The O/E conversion unit 85 of the electrical processing unit 84 converts the input optical signal into an electrical signal. The processing execution unit 86 performs DSP processing for long-distance/high-speed access on the converted electrical signal. The E/O conversion unit 87 converts the electrical signal subjected to the DSP processing into an optical signal and outputs the optical signal to the optical SW 10*h*. The converted wavelength may be the same as or different from the wavelength when input to the electrical processing unit 84. The optical SW 10*h* outputs the optical signal input from the electrical processing unit 84 from the port 11-2 to the multiplexing communication transmission line 90.

The optical SW 10*h* receives a downlink optical signal transmitted along the multiplexing communication transmission line 90 and addressed to the subscriber device 40-1. The optical SW 10*h* outputs the input downlink optical signal from the port 12-1 to the electrical processing unit 84 according to a combination of the input port 51-2 and the wavelength. The O/E conversion unit 85 of the electrical processing unit 84 converts the input optical signal into an electrical signal, and the processing execution unit 86 performs DSP processing for long-distance/high-speed access on the converted electrical signal. The E/O conversion unit 87 converts the electrical signal subjected to the DSP processing into an optical signal and outputs the optical signal to the optical SW The converted wavelength of the optical signal may be the same as or different from the wavelength at the time of inputting to the electrical processing unit 84. The optical SW 10*h* outputs the optical signal input from the electrical processing unit 84 to the port 11-1 connected to the subscriber device 40-1.

In the foregoing example, the configuration in which the electrical processing unit 84 modulates the multiplexed electrical signal with the same signal and converts the modulated electrical signal into optical signals with a plurality of wavelengths has been described. The electrical processing unit 84 may be configured to convert the multiplexed or demultiplexed electrical signals into one or more optical signals (optical signals modulated with the same signal or different signals) with one or more wavelengths.

The optical signal transmitted and received by the subscriber device 40-2 is also processed in the same way as the optical signal transmitted and received by the subscriber device 40-1, as described above. Here, the processing execution unit 86 performs mobile fronthaul processing on the optical signal transmitted and received by the subscriber device 40-2. The processing execution unit 86 determines signal processing to be performed on the electrical signal based on any information included in the electrical signal.

On the other hand, the optical SW 10*h* outputs an uplink optical signal input from the subscriber device 40-3 from the port 11-2 to the multiplexing communication transmission line 90. The optical SW 10*h* inputs a downlink optical signal addressed to the subscriber device 40-3 transmitted along the multiplexing communication transmission line 90 and outputs a downlink optical signal to the port 11-1 connected to the subscriber device 40-3 according to a combination of the wavelength and the port 11-2 to which the optical signal is input.

Figure 15:
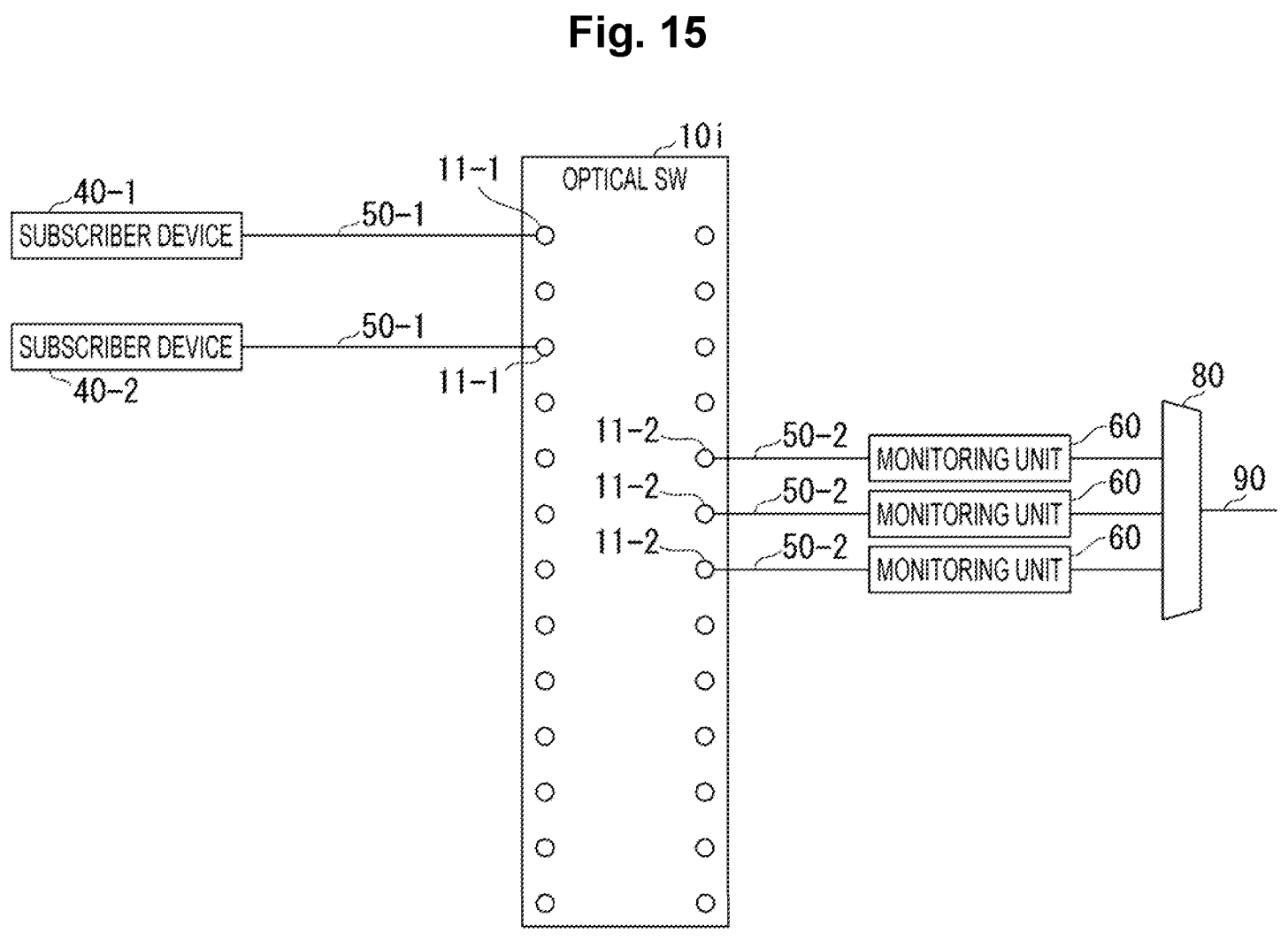

FIG. 15 is a diagram illustrating a configuration example of an optical SW 10*i* that monitors an optical signal before WDM transmission is performed. In the drawing, the same portions as those of the optical SW 10*e* illustrated in FIG. 6 are denoted by the same reference numerals, and the description thereof will be omitted. The difference from FIG. 6 is that the monitoring unit 60 is provided between the port 11-2 and the WDM device 80. The transmission line 50-2 connected to the port 11-2 includes the monitoring unit 60. In the drawing, only three monitoring units 60 are illustrated. A specific configuration of the monitoring unit 60 is as illustrated in FIG. 2. An optical signal output from the port 11-2 is multiplexed and output by the WDM device 80 via the monitoring unit 60. The WDM device 80 demultiplexes the optical signal received along the multiplexing communication transmission line 90 by the wavelength, and inputs the demultiplexed optical signals to the monitoring unit 60. The monitoring unit 60 generates monitoring information based on a monitoring result and outputs the generated monitoring information. An example of an output destination of the monitoring information is the control unit 20.

Next, an access topology to the optical SW will be described with reference to FIGS. 16 to 25.

Figure 16:
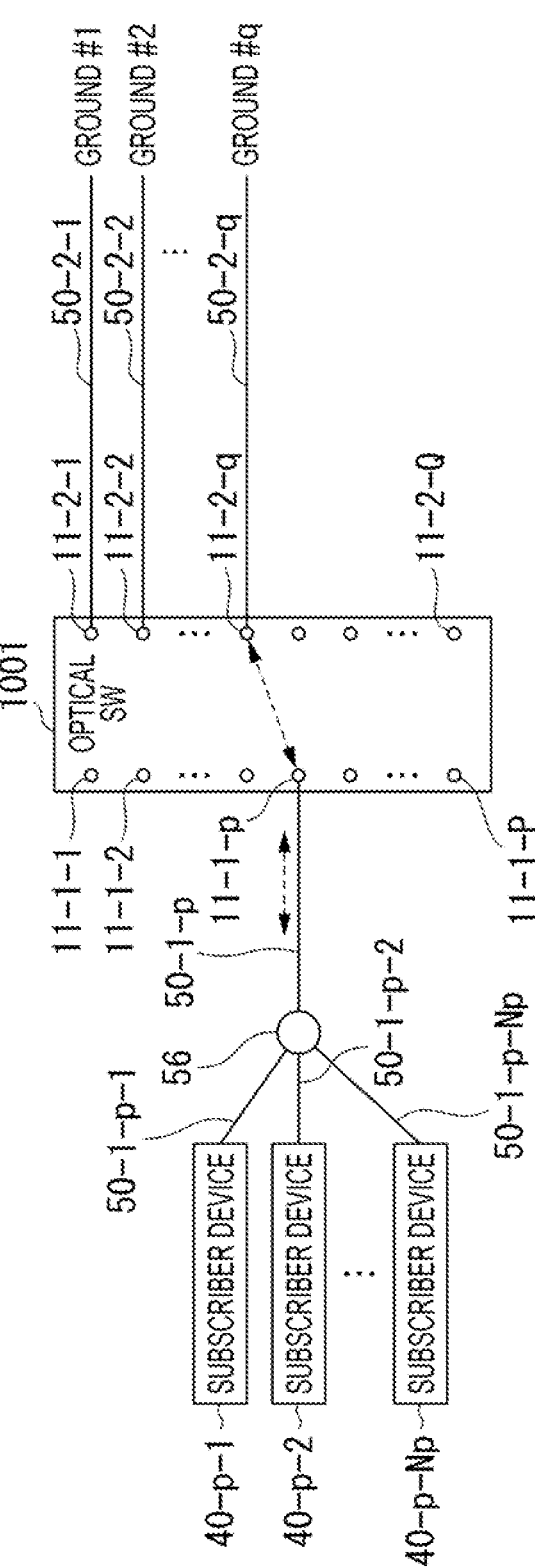
FIG. 16 is a diagram illustrating an example of an access topology in a basic configuration.

FIG. 16 is a diagram illustrating a passive double star (PDS) type access topology using time division multiplexing. As the optical SW 1001, any of the above-described optical SWs 10a to 10i can be used. The optical SW 1001 includes ports 11-1-1 to 11-1-P and ports 11-2-1 to 11-2-Q. The transmission line 50-1 connected to the port 11-1-$p$ (where p is an integer equal to or greater than 1 and equal to or less than P) is also referred to as a transmission line 50-1-$p$, and the transmission line 50-2 connected to the port 11-2-$q$ (where q is an integer equal to or greater than 1 and equal to or less than Q) is also referred to as a transmission line 50-2-$q$. In FIG. 16, the port 11-2-$q$ is connected to the ground #q by a transmission line 50-2-$q$.

A power splitter 56 is provided in the transmission line 50-1-$p$. To the power splitter 56, Np (where Np is an integer equal to or greater than 2) subscriber devices 40-$p$ are connected in a star form. The Np subscriber devices are referred to as subscriber devices 40-$p$-1 to 40-$p$-Np, and a transmission line 50-1-$p$ between the subscriber device 40-$p$-$np$ (where np is an integer equal to or greater than 1 and equal to or less than Np) and the power splitter 56 is referred to as 50-1-$p$-$np$. The subscriber devices 40-$p$-1 to 40-$p$-Np use the same wavelength by time division multiplexing. The wavelength used for an uplink optical signal is different from a wavelength used for a downlink optical signal.

The optical SW 1001 receives downlink optical signals with the wavelength $\lambda_1$ addressed to the subscriber devices 40-$p$-1 to 40-$p$-Np time-division-multiplexed from the port 11-2-$q$. The optical SW 1001 outputs an input downlink optical signal from the port 11-1-$p$ which is the output destination according to a combination of the port 11-2-$q$ and the wavelength $\lambda_1$. The power splitter 56 receives the time-division-multiplexed downlink optical signal from the transmission line 50-1-$p$, branches the input optical signal, and outputs the optical signal to transmission lines 50-1-$p$-1 to 50-1-$p$-Np. The subscriber devices 40-$p$-1 to 40-$p$-Np receive time-division-multiplexed optical signals and select downlink optical signals addressed to the own devices from the received optical signals.

The subscriber devices 40-$p$-1 to 40-$p$-Np transmit uplink optical signals time-division-multiplexed with the same wavelength $\lambda_2$ by time division multiple access (TDMA). The power splitter 56 receives an uplink optical signal with a wavelength $\lambda_2$ from each of the transmission lines to 50-1-$p$-Np, time-division-multiplexes the input optical signal, and outputs the optical signal to the transmission line 50-1-$p$. The optical SW 1001 outputs the time-division-multiplexed uplink optical signal from the port 11-2-$q$ according to the combination of the port 11-1-$p$ and the wavelength $\lambda_2$.

Note that the PDS type access topology can be applied to any one or more of the transmission lines 50-1-1 to 50-1-P.

Figure 17:
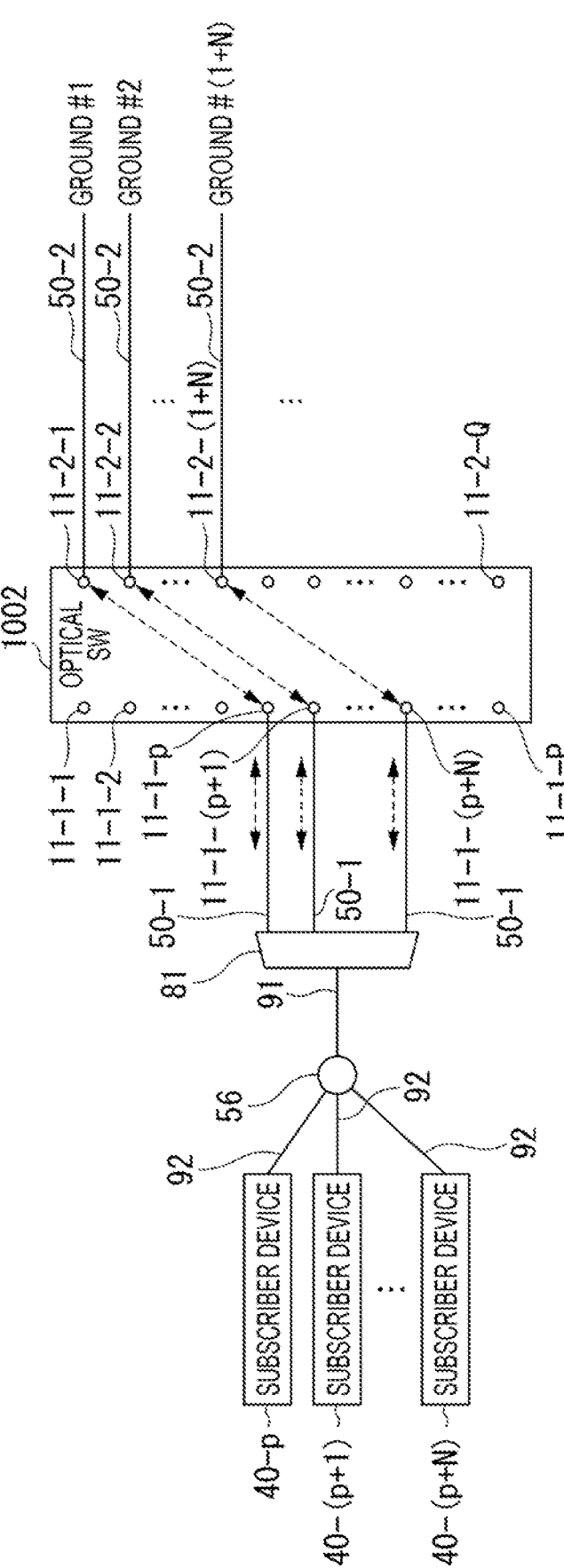
FIG. 17 is a diagram illustrating an example of an access topology in a basic configuration.

FIG. 17 is a diagram illustrating a PDS type access topology using wavelength multiplexing. As an optical SW 1002, any of the above-described optical SWs 10a to 10i can be used. The optical SW 1002 is connected to one or more WDM devices 81. The WDM device 81 multiplexes downlink optical signals with different wavelengths output from the plurality of ports 11-1 and outputs the multiplexed optical signal to the multiplexing communication transmission line 91. The WDM device 81 demultiplexes the uplink wavelength-multiplexed optical signal received along the multiplexing communication transmission line 91 and inputs the demultiplexed optical signals to different ports 11-1. A power splitter 56 is provided in the multiplexing communication transmission line 91. N (where N is an integer equal to or greater than 2) subscriber devices 40 are connected to the power splitter 56 in a star form. The subscriber device 40 and the power splitter 56 are connected by a transmission line 92. The plurality of subscriber devices 40 connected to the power splitter 56 transmit and receive optical signals of different wavelengths.

In FIG. 17, the ports 11-1-$p$ to 11-1-($p$+N) of the optical SW 1002 are connected to the WDM device 81 via the transmission line 50-1 (where p and N are integers equal to or greater than 1, and p+N is an integer equal to or less than P). Subscriber devices 40-$p$ to 40-($p$+N) are connected to the power splitter 56.

The optical SW 1002 inputs a downlink optical signal addressed to the subscriber device 40-($p$+$n$) with the wavelength $\lambda_{1(q+n)}$ from the port 11-2-($q$+n) (where q is an integer equal to or greater than 1 and n is an integer of 0 or more and equal to or less than N). FIG. 17 illustrates an example in a case where q=1. The optical SW 1002 routes the downlink optical signal with the wavelength $\lambda_{1(1+n)}$ input from the port 11-2-($q$+n) to the port 11-1-($q$+n) which is the output destination corresponding to a combination of the port 11-2-($p$+$n$) and the wavelength $\lambda_{1(1+n)}$. Accordingly, the optical SW 1002 routes the downlink optical signal having the wavelength $\lambda_{11}$ input from the port 11-2-1 to the port 11-1-$p$, and routes the downlink optical signal with the wavelength $\lambda_{12}$ input from the port 11-2-2 to the port 11-1-($p$+1).

The WDM device 81 multiplexes the downlink optical signals with the wavelengths $\lambda_{11}$ to $\lambda_{1N}$ output from the ports 11-1-$p$ to 11-1-($p$+N) and outputs the multiplexed optical signal to the multiplexing communication transmission line 91. The power splitter 56 receives the wavelength-multiplexed downlink optical signal from the multiplexing communication transmission line 91, branches the received downlink optical signal as it is, and outputs the optical signal to the transmission lines 92 to the subscriber devices 40-$p$ to 40-($p$+N). The subscriber devices 40-$p$ to 40-($p$+N) receive the wavelength-multiplexed downlink optical signal, and select the downlink optical signal with the wavelength used by the own device from the received optical signal.

Figure 18:
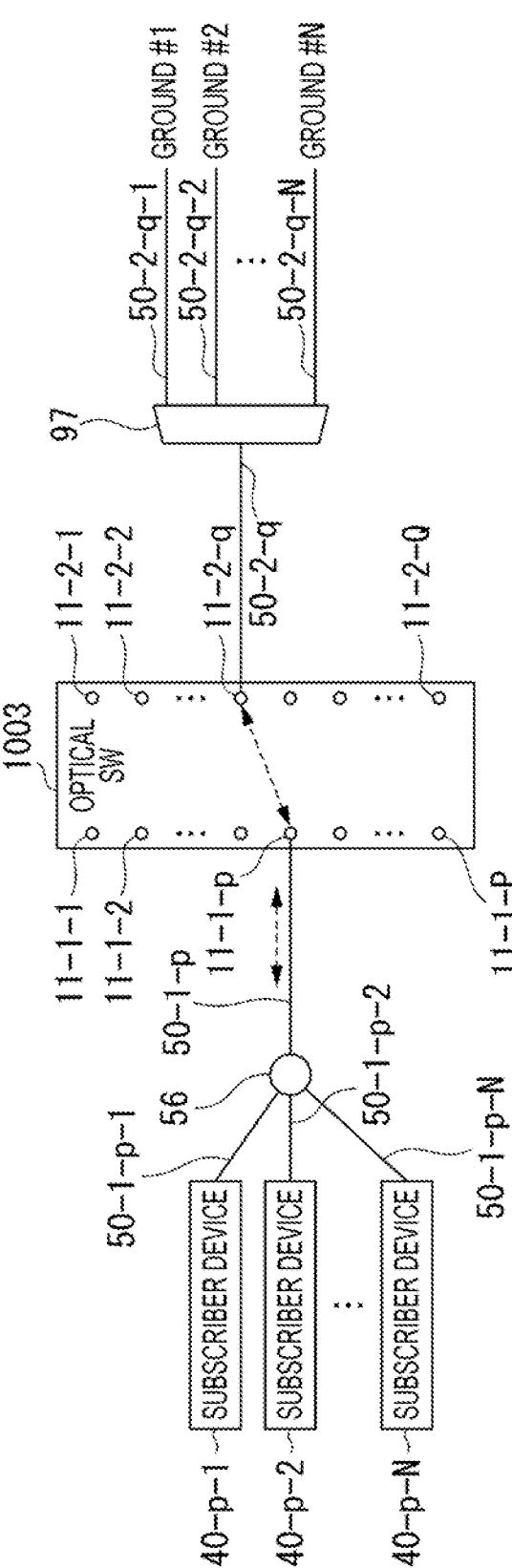
FIG. 18 is a diagram illustrating an example of an access topology in a basic configuration.

The subscriber device 40-($p$+$n$) transmits an uplink optical signal with a wavelength $\lambda_{2(1+n)}$. The power splitter 56 receives an uplink optical signal from each of the subscriber devices 40-$p$ to 40-($p$+N) via the transmission line 92, performs wavelength multiplexing on the input uplink optical signal of each of the wavelengths $\lambda_{21}$ to $\lambda_{2(1+N)}$, and outputs the multiplexed optical signal to the multiplexing communication transmission line 91. The WDM device 81 receives the wavelength-multiplexed uplink optical signal from the multiplexing communication transmission line 91 and performs wavelength separation. The WDM device 81 inputs uplink optical signals with the wavelength $\lambda_{2(1+n)}$ to the port 11-1-($p$+$n$). The optical SW 1002 outputs the uplink optical signal with the wavelength $\lambda_{2(1+n)}$ from the port 11-2-($q$+n) which is the output destination corresponding to a combination of the input port 11-1-($p$+n) and the wavelength-$_{2(1+n)}$. Accordingly, the uplink optical signal with the wavelength $\lambda_{21}$ transmitted by the subscriber device 40-$p$ is input from the port 11-1-$p$ and output from the port 11-2-1. The uplink optical signal with the wavelength $\lambda_{22}$ transmitted by the subscriber device 40-($p$+1) is input from the port 11-1-($p$+1) and is output from the port 11-2-2. As illustrated in FIG. 18, a WDM device may be disposed at a subsequent stage of the optical SW.

FIG. 18 is a diagram illustrating a PDS type access topology in which wavelength multiplexing is used and a WDM device is disposed at a subsequent stage of an optical SW. As the optical SW 1003, any of the above-described optical SWs 10$a$ to 10$i$ can be used. A port 11-2-$q$ (where q is an integer between 1 and Q) of the optical SW 1003 is connected to a WDM device 97 via a transmission line 50-2-$q$. The WDM device 97 is connected to a ground #n (n is an integer equal to or greater than 1 and equal to or less than N) via a transmission line 50-2-$q$-$n$. A power splitter 56 is provided in the transmission line 50-1-$p$ connected to the port 11-1-$p$ of the optical SW 1003. N subscriber devices 40-$p$-1 to 40-$p$-N are connected to the power splitter 56 in a star configuration.

The WDM device 97 inputs a downlink optical signal addressed to the subscriber device 40-$p$-$n$ with the wavelength $\lambda_{1n}$ transmitted from the ground #n from the transmission line 50-2-$q$-$n$. The WDM device 97 inputs, to the optical SW 1003, the wavelength-multiplexed signal obtained by multiplexing the downlink optical signals of $\lambda_{11}$ to $\lambda_{1N}$ input from the ground #1 to the ground #N. The optical SW 1003 outputs the downlink wavelength-multiplexed signal input from the port 11-2-$q$ from the port 11-1-$p$ which is the output destination. The power splitter 56 branches the wavelength-multiplexed signal input from the transmission line 50-1-$p$ and outputs the branched signals to the transmission lines 50-1-$p$-1 to 50-1-$p$-N. The subscriber devices 40-$p$-1 to 40-$p$-N receive the wavelength-multiplexed signals and select a downlink optical signal addressed to the own devices from the received optical signals. Accordingly, the subscriber device 40-$p$-$n$ receives the optical signal with the wavelength $\lambda_{1n}$ from the ground #n.

The subscriber device 40-$p$-$n$ transmits an uplink optical signal with a wavelength $\lambda_{2n}$. The power splitter 56 inputs uplink optical signals with wavelengths $\lambda_{21}$ to $\lambda_{2N}$ from the respective subscriber devices 40-$p$-1 to 40-$p$-N via transmission lines 50-1-$p$-1 to 50-1-$p$-N. The power splitter 56 outputs a wavelength-multiplexed signal obtained by wavelength-multiplexing uplink optical signals with the wavelengths $\lambda_{21}$ to $\lambda_{2N}$ to the transmission line 50-1-$p$. The optical SW 1003 receives, from the port 11-1-$p$, the wavelength-multiplexed signals obtained by wavelength-multiplexing the uplink optical signals with the wavelengths $\lambda_{21}$ to $\lambda_{2N}$. The optical SW 1003 outputs the uplink wavelength-multiplexed signal from the port 11-2-$q$ which is the output destination to the transmission line 50-2-$q$. The WDM device 97 receives the wavelength-multiplexed uplink optical signal from the transmission line 50-2-$q$ and performs wavelength separation. The WDM device 97 outputs an uplink optical with having the wavelength $\lambda_{2n}$ to the transmission line 50-2-$n$ connected to the ground #n. Accordingly, the optical signal with the wavelength $\lambda_{2n}$ transmitted by the subscriber device 40-$p$-$n$ is transmitted to the ground #n.

Figure 19:
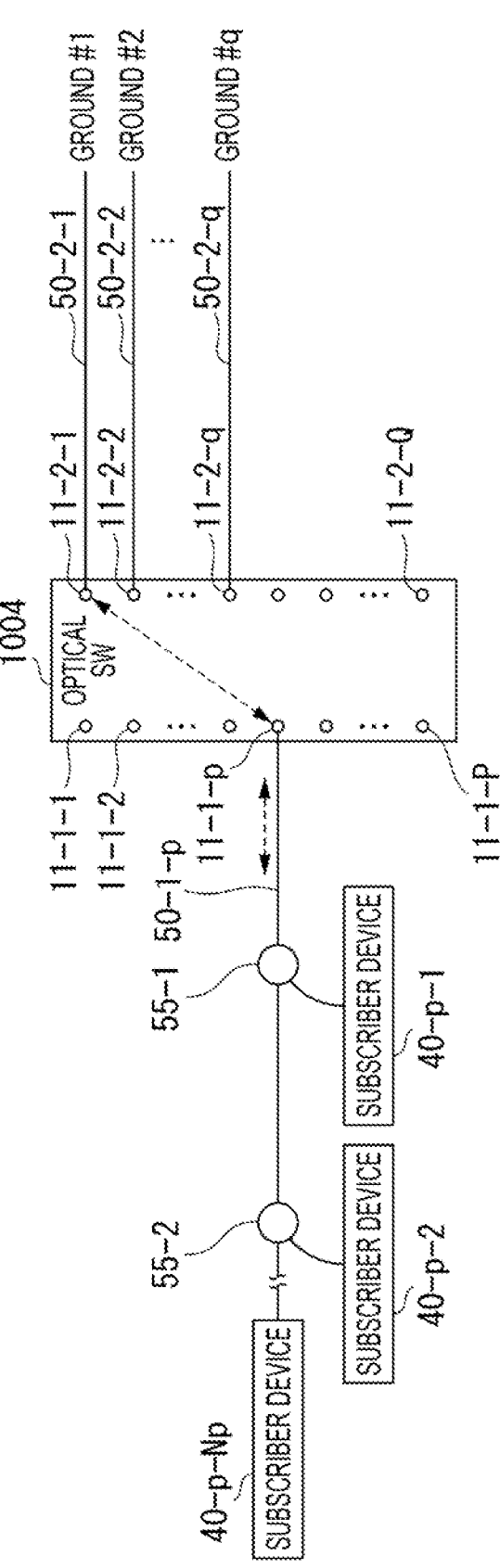
FIG. 19 is a diagram illustrating an example of an access topology in a basic configuration.

FIG. 19 is a diagram illustrating a bus type access topology using time division multiplexing. As the optical SW 1004, any of the above-described optical SWs 10$a$ to 10$i$ can be used. The access topology illustrated in FIG. 19 is different from the access topology illustrated in FIG. 16 in that a plurality of bus type subscriber devices 40-$p$-1 to 40-$p$-Np are connected to the transmission line 50-1-$p$. One or more power splitters 55 are provided in the transmission line 50-1-$p$. The power splitter 55 to which the subscriber device 40-$p$-$n$ (where n is an integer equal to or greater than 1 and equal to or less than Np−1) is connected is referred to as a power splitter 55-$n$.

The subscriber devices 40-$p$-1 to 40-$p$-Np use the same wavelength by time division multiplexing. The wavelength used for an uplink optical signal is different from a wavelength used for a downlink optical signal. The transmission line 50-2-1 connected to the ground #1 transmits time-division-multiplexed downlink optical signals with the wavelength $\lambda_1$ addressed to the subscriber devices 40-$p$-1 to 40-$p$-Np. The optical SW 1004 receives, from the port 11-2-1, the time-division-multiplexed downlink optical signal with the wavelength $\lambda_1$ transmitted through the transmission line 50-2-1. The optical SW 1004 routes the input downlink optical signal to the port 11-1-$p$ which is the output destination according to a combination of the port 11-2-1 (or ground #1) and the wavelength $\lambda_1$. The optical SW 1004 outputs the time-division-multiplexed downlink optical signal with the wavelength $\lambda_1$ from the port 11-1-$p$ to the transmission line 50-1-$p$. The power splitter 55-$n$ branches the time-division-multiplexed downlink optical signal from the transmission line 50-1-$p$ and outputs the branched downlink optical signal to the subscriber device 40-$p$-$n$. The subscriber devices 40-$p$-1 to 40-$p$-Np receive time-division-multiplexed downlink optical signals and select downlink optical signals addressed to the own devices from the received downlink optical signals.

The subscriber devices 40-$p$-1 to 40-$p$-Np transmit uplink optical signals time-division-multiplexed with the same wavelength $\lambda_2$ by TDMA. Each power splitter 55-$n$ time-division-multiplexes an uplink optical signal with the wavelength $\lambda_2$ input from the subscriber device 40-$p$-$n$ on the uplink optical signal transmitted along the transmission line 50-1-$p$. The optical SW 1004 inputs the time-division-multiplexed uplink optical signal from the port 11-1-$p$, routes the signal to the port 11-2-1 which is an output destination according to a combination of the port 11-1-$p$ and the wavelength $\lambda_2$, and outputs the signal to the transmission line 50-2-1 connected to the ground #1.

The bus type access topology can be applied to any one or more of the transmission lines 50-1-1 to 50-1-P.

Figure 20:
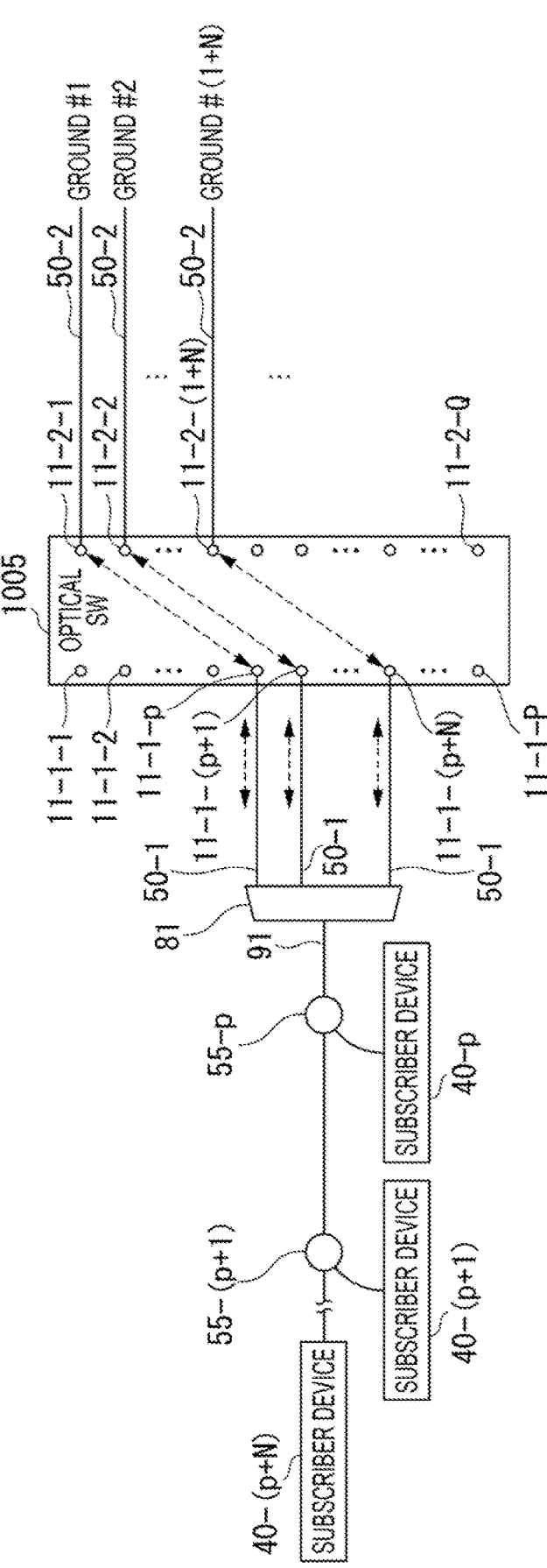
FIG. 20 is a diagram illustrating an example of an access topology in a basic configuration.

FIG. 20 is a diagram illustrating a bus type access topology using wavelength multiplexing. As an optical SW 1005, any of the above-described optical SWs 10$a$ to 10$i$ can be used. The access topology illustrated in FIG. 19 is different from the access topology illustrated in FIG. 17 in that a plurality of bus type subscriber devices 40-$p$ to are connected to the multiplexing communication transmission line 91. The subscriber devices 40-$p$ to 40-($p$+N) transmit and receive optical signals with different wavelengths. One or more power splitters 55 are provided in the multiplexing communication transmission line 91. The power splitter 55 to which the subscriber device 40-($p$+n) (where n is an integer of 0 to N−1 and N is an integer equal to or greater than 1) is connected will be referred to as a power splitter 55-($p$+n).

Like the optical SW 1002 illustrated in FIG. 17, the optical SW 1005 inputs a downlink optical signal addressed to the subscriber device 40-($p$+n) with the wavelength $\lambda_{1(1+n)}$ from the port 11-2-($q$+n) (where q is an integer equal to or greater than 1 and n is an integer equal to or greater than 0 and equal to or less than N). FIG. 20 illustrates an example in a case where q=1. The optical SW 1005 routes the downlink optical signal of the wavelength $\lambda_{1(1+n)}$ input from the port 11-2-($q$+n) to the port 11-1-($p$+n) which is the output destination corresponding to the combination of the port 11-2-($q$+n) and the wavelength $\lambda_{1\ (1+n)}$.

The WDM device 81 multiplexes the downlink optical signals with the wavelengths $\lambda_{11}$ to $\lambda_{1N}$ output from the ports 11-1-$p$ to 11-1-($p$+N) and outputs the multiplexed optical signal to the multiplexing communication transmission line 91. The power splitter 55-($p$+n) branches the wavelength-multiplexed downlink optical signal from the multiplexing communication transmission line 91 and outputs the branched downlink optical signal to the subscriber device 40-($p$+n). The subscriber devices 40-$p$ to 40-($p$+N) receive the wavelength-multiplexed downlink optical signals and select the downlink optical signals addressed to the own devices from the received downlink optical signals.

Figure 21:
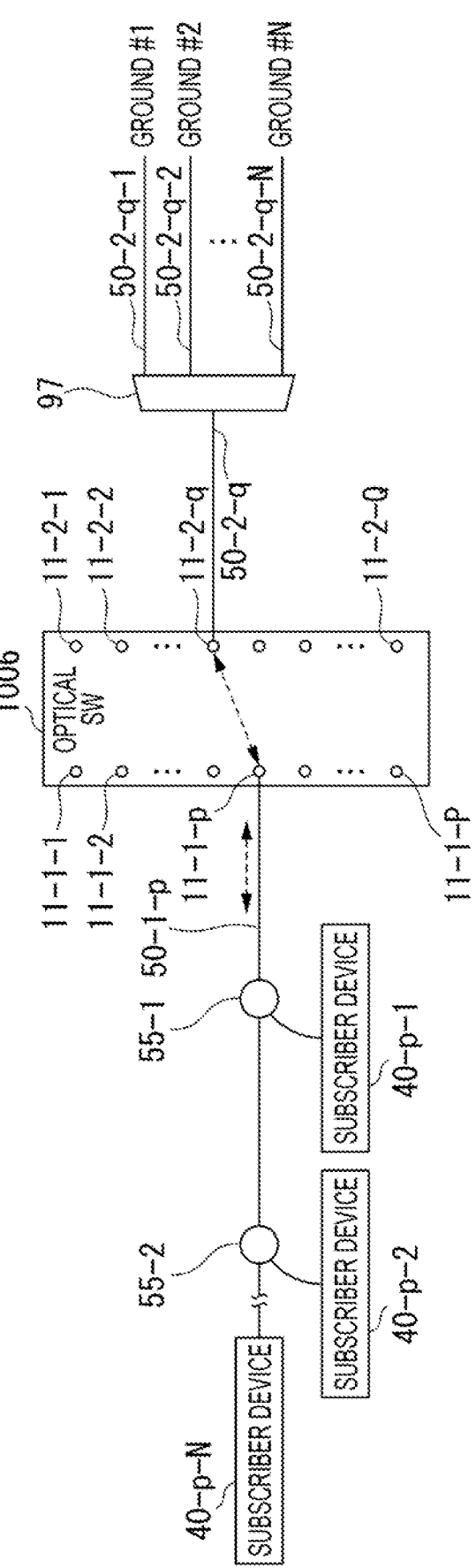
FIG. 21 is a diagram illustrating an example of an access topology in a basic configuration.

The subscriber device 40-($p$+n) transmits an uplink optical signal with a wavelength $\lambda_{2(1+n)}$. Each power splitter 55-($p$+n) multiplexes the uplink optical signal with the wavelength $\lambda_{2(1+n)}$ input from the subscriber device 40-($p$+n) to the uplink optical signal with the wavelengths $\lambda_{2(2+n)}$ to $\lambda_{2N}$ transmitted along the multiplexing communication transmission line 91. The WDM device 81 receives the wavelength-multiplexed uplink optical signal from the multiplexing communication transmission line 91 and separates the optical signal into uplink optical signals with wavelengths $\lambda_{21}$ to $\lambda_{2N}$. The WDM device 81 inputs an uplink optical signal with a wavelength $\lambda_{2(1+n)}$ to the port 11-1-($p$+n). Like the optical SW 1002 illustrated in FIG. 16, the optical SW 1005 outputs the uplink optical signal with the wavelength $\lambda_{2(1+n)}$ from the port 11-1-($q$+n) which is the output destination corresponding to a combination of the input port 11-2-($p$+n) and the wavelength $\lambda_{2(1+n)}$. Accordingly, the uplink optical signal with the wavelength $\lambda_{21}$ transmitted by the subscriber device 40-$p$ is input from the port 11-1-$p$ and output from the port 11-2-1. The uplink optical signal with the wavelength $\lambda_{22}$ transmitted by the subscriber device 40-($p$+1) is input from the port 11-1-($p$+1) and is output from the port 11-2-2. As illustrated in FIG. 21, a WDM device may be disposed at a subsequent stage of the optical SW.

FIG. 21 is a diagram illustrating a bus type access topology in which wavelength multiplexing is used and a WDM device is disposed at a subsequent stage of an optical SW. As an optical SW 1006, any of the above-described optical SWs 10a to 10i can be used. In description of FIG. 21, the same portions as those of FIG. 18 will be denoted by the same reference numerals. A port 11-2-$q$ (where q is an integer between 1 and Q) of the optical SW 1006 is connected to the WDM device 97 via the transmission line 50-2-$q$. The WDM device 97 is connected to a ground #n (where n is an integer equal to or greater than 1 and equal to or less than N, and N is an integer equal to or greater than 2) via the transmission line 50-2-$q$-$n$. One or more power splitters 55 are provided in the transmission line connected to the port 11-1-$p$ (where p is an integer equal to or greater than 1 and equal to or less than P) of the optical SW 1006. The power splitter 55 to which the subscriber device 40-$p$-$n$ is connected is referred to as a power splitter 55-$n$.

The WDM device 97 inputs a downlink optical signal addressed to the subscriber device 40-$p$-$n$ with the wavelength $\lambda_{1n}$ transmitted from the ground #n from the transmission line 50-2-$q$-$n$. The WDM device 97 inputs, to the optical SW 1006, a wavelength-multiplexed signal obtained by multiplexing downlink optical signals with wavelengths $\lambda_{11}$ to $\lambda_{1N}$ input from each of the ground #1 to the ground #N. The optical SW 1006 outputs the downlink wavelength-multiplexed signal input from the port 11-2-$q$ from the port 11-1-$p$ which is the output destination. The power splitter 55-$n$ branches the downlink wavelength-multiplexed signal from the transmission line 50-1-$p$ and outputs the branched downlink wavelength-multiplexed signal to the subscriber device 40-$p$-$n$. The subscriber devices to 40-$p$-N select downlink optical signals addressed to the own devices from the received downlink wavelength multiplexing signals. Accordingly, the subscriber device receives the optical signal with the wavelength $\lambda_{1n}$ from the ground #n.

The subscriber device 40-$p$-$n$ transmits an uplink optical signal with a wavelength $\lambda_{2n}$. Each power splitter wavelength-multiplexes the uplink optical signal with the wavelength $\lambda_{2n}$ input from the subscriber device 40-$p$-$n$ into the uplink optical signal transmitted through the transmission line 50-1-$p$. The optical SW 1006 receives, from the port 11-1-$p$, a wavelength-multiplexed signal obtained by wavelength-multiplexing the uplink optical signals with the wavelengths $\lambda_{21}$ to $\lambda_{2N}$. The optical SW 1006 outputs the uplink wavelength-multiplexed signal from the port 11-2-$q$ which is output destination to the transmission line 50-2-$q$. The WDM device 97 receives a wavelength-multiplexed signal from the transmission line and performs wavelength separation. The WDM device 97 outputs an uplink optical signal with the wavelength $\lambda_{2n}$ to the transmission line 50-2-$q$-$n$ connected to the ground #n. Accordingly, the optical signal with the wavelength $\lambda_{2n}$ transmitted by the subscriber device 40-$p$-$n$ is transmitted to the ground #n.

Figure 22:
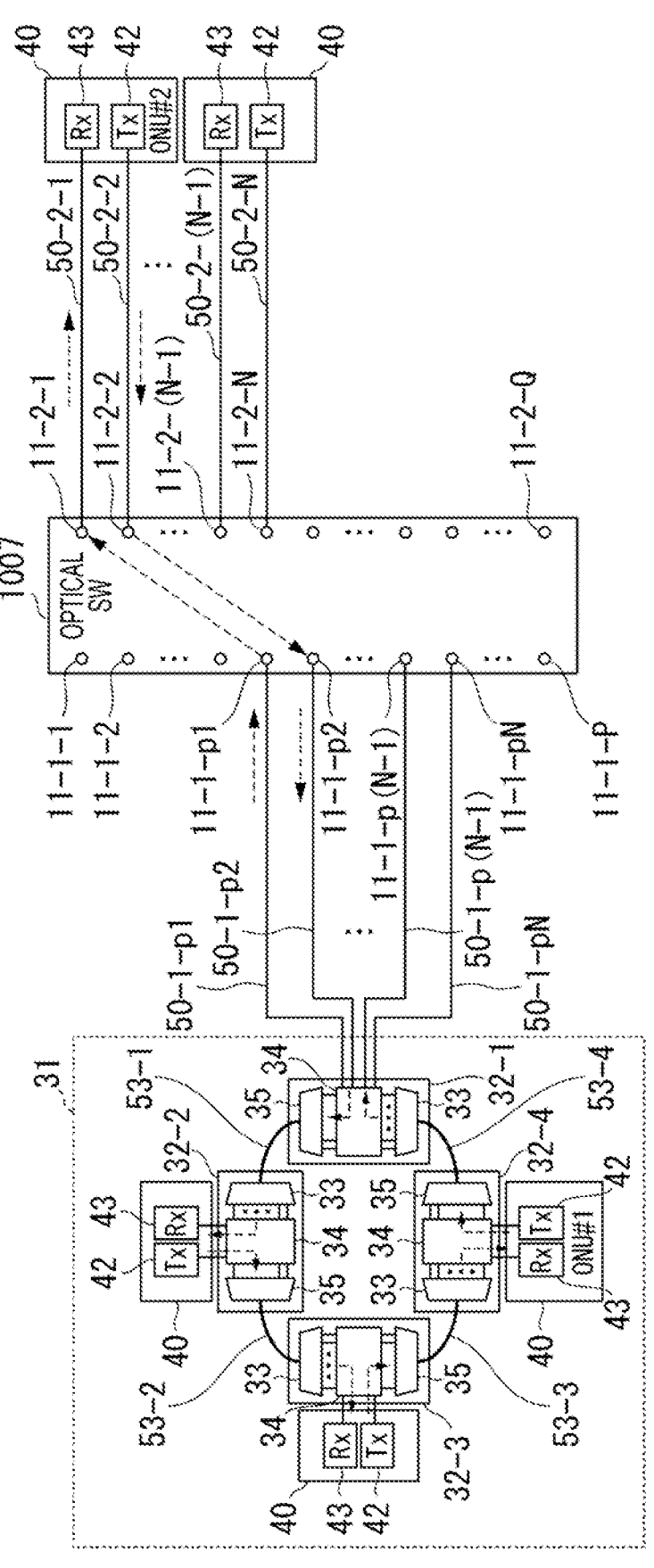
FIG. 22 is a diagram illustrating an example of an access topology in a basic configuration.

FIG. 22 is a diagram illustrating a loop type access topology. As the optical SW 1007, any of the above-described optical SWs 10a to 10i can be used. Some ports 11-1-$p1$ to 11-1-$p$N (where p1<pN, p1 is an integer equal to or greater than 1, and pN is an integer equal to or less than P) of the optical SW 1007 are connected to a WDM access ring network 31 that transmits optical signals with a plurality of wavelengths. Optical signals with several wavelengths used in the WDM access ring network 31 are transmitted to the communication destination subscriber device 40 or an upper NW via the optical SW 1007. In the topology illustrated in FIG. 22, the WDM multiplexer/demultiplexer is not used, and the facing subscriber devices 40 are connected by two transmission lines to perform communication.

The WDM access ring network 31 is a network in which R Add/Drop nodes 32 are connected by a transmission line 53. FIG. 21 illustrates an example of R=4. The R Add/Drop nodes 32 will be referred to as Add/Drop nodes 32-1 to 32-R, and a transmission line 53 between an Add/Drop node 32-$r$ (where r is an integer equal to or greater than 1 and equal to or less than R) and an Add/Drop node 32-($r$+1) will be referred to as a transmission line 53-$r$. However, the Add/Drop node 32-($r$+1) is regarded as an Add/Drop node 32-1. The Add/Drop node 32-1 is connected to a port 11-1-$pn$ (where pn is an integer equal to or greater than p1 and equal to or less than pN) of the optical SW 1007 via a transmission line 50-1-$pn$.

The Add/Drop node 32 includes a demultiplexing unit 33, an optical SW 34, and a multiplexing unit 35. The demultiplexing unit 33 of the Add/Drop node 32-$r$ (where r is an integer equal to or greater than 2 and equal to or less than R) demultiplexes a wavelength-multiplexed optical signal input from a transmission line 53-($r$–1), and outputs an optical signal obtained by the demultiplexing to the optical SW 34. The optical SW 34 is connected to one or more subscriber devices 40. In the drawing, only one subscriber device 40 connected to the optical SW 34 is illustrated. The optical SW 34 drops an optical signal with a wavelength corresponding to the own node among the optical signals input from the demultiplexing unit 33. The optical receiver 43 of the subscriber device 40 receives an optical signal dropped by the optical SW 34. The optical SW 34 receives the optical signal transmitted from the optical transmitter 42 of the subscriber device 40 and outputs the received optical signal and the optical signals that have not been dropped to the multiplexing unit 35. The multiplexing unit 35 of the Add/Drop node 32-$r$ multiplexes the optical signals input from the optical SW 34 and outputs the multiplexed optical signal to the transmission line 53-$r$. The optical SW 34 of the Add/Drop node 32-1 drops an optical signal with a wavelength corresponding to the own node among the optical signals demultiplexed by the demultiplexing unit 33 and inputs the optical signal with each wavelength to the transmission line 50-1-$pn_1$ (where $pn_1$=1, 3, 5, . . . , p (N−1)). The port 11-1-$pn_1$ of the optical SW 1007 inputs the optical signal dropped by the Add/Drop node 32-1 from the transmission line 50-1-$pn_1$. The optical SW 34 of the Add/Drop node 32-1 inputs an optical signal output from a port 11-1-$pn_2$ (where $pn_2$=2, 4, 6, . . . , $p_N$) by the optical SW 1007 from the transmission line 50-1-$pn_2$ and outputs the input optical signal and the optical signals that have not been dropped to the multiplexing unit 35.

Accordingly, ONU #1 that is the subscriber device 40 connected to the Add/Drop node 32-4 of the WDM access ring network 31 and ONU #2 that is the subscriber device 40 connected to the port 11-2-1 and the port 11-2-2 of the optical SW 1007 communicate as follows.

ONU #1 transmits an optical signal with the wavelength to the Add/Drop node 32-4. The multiplexing unit 35 of the Add/Drop node 32-4 multiplexes the optical signal with the wavelength $\lambda_1$ input by the optical SW 34 and the optical signal not dropped by the optical SW 34, and outputs the multiplexed signal to the Add/Drop node 32-1. The optical SW 34 of the Add/Drop node 32-1 drops the optical signal with the wavelength demultiplexed by the demultiplexing unit 33 and outputs the optical signals that have not been dropped to the multiplexing unit 35. The port 11-1-$p1$ of the optical SW 1007 inputs the optical signal having the wavelength $\lambda1$ dropped by the Add/Drop node 32-1 from the transmission line 50-1-$p1$. The optical SW 1007 outputs the optical signal with the wavelength $\lambda_1$ input from the port 11-1-$p1$ from the port 11-2-1. The optical receiver 43 of ONU #2 receives the optical signal with the wavelength $\lambda_1$ transmitted along the transmission line 50-2-1.

The optical transmitter 42 of ONU #2 transmits a downlink optical signal with the wavelength $\lambda_2$. The port 11-2-2 of the optical SW 1007 inputs the optical signal transmitted by ONU #2 from the transmission line 50-2-2. The optical SW 1007 outputs the downlink optical signal with the wavelength $\lambda_2$ input from the port 11-2-2 from the port 11-1-$p2$. The optical SW 34 of the Add/Drop node 32-1 inputs the optical signal with the wavelength $\lambda_2$ output from the optical SW 1007 from the transmission line 50-1-$p2$, and outputs the input optical signal and the optical signals that have not been dropped to the multiplexing unit 35. The optical signal with the wavelength $\lambda_2$ is input to the Add/Drop node 32-4 via the Add/Drop nodes 32-2 and 32-3. The optical SW 34 of the Add/Drop node 32-4 drops the optical signal with the wavelength $\lambda_2$. The optical receiver 43 of ONU #1 receives the optical signal with the wavelength $\lambda_2$ dropped by the Add/Drop node 32-4.

Figure 23:
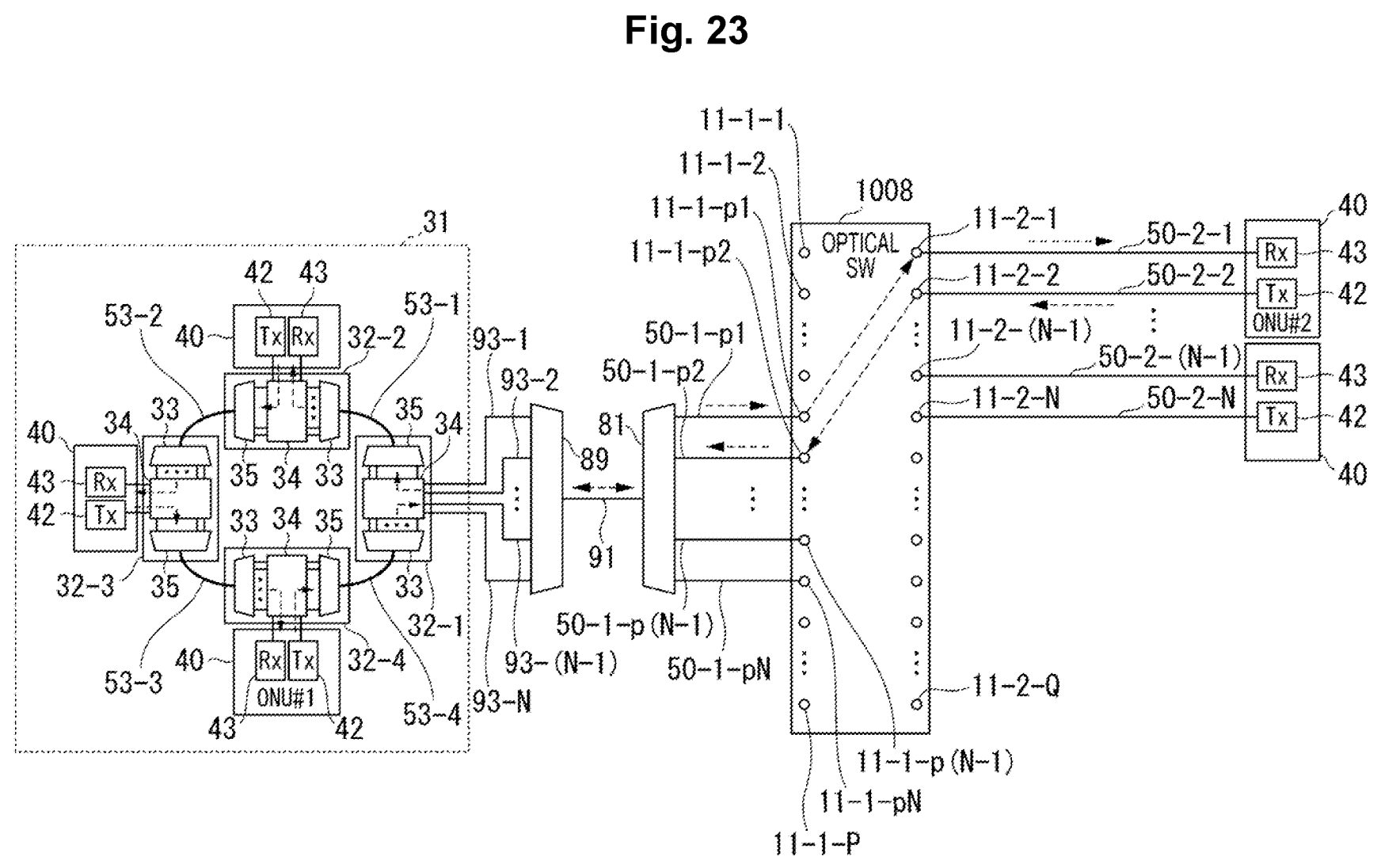

FIG. 23 is a diagram illustrating a loop type access topology using a WDM multiplexer/demultiplexer. As an optical SW 1008, any of the above-described optical SWs 10$a$ to 10$i$ can be used. The access topology illustrated in FIG. 23 is different from the access topology illustrated in FIG. 22 in that the optical SW 1008 and the WDM access ring network 31 are connected via the WDM device 81 and the WDM device 89.

The Add/Drop node 32-1 of the WDM access ring network 31 and the WDM device 89 are connected by transmission lines 93-1 to 93-N (N is an integer equal to or greater than 2). The WDM device 89 receives the uplink optical signal having the wavelength $\lambda_{n1}$ from the transmission line 93-$n_1$ (where $n_1$=1, 3, 5, . . . , N−1) and outputs a multiplexed signal obtained by multiplexing the received uplink optical signals to the multiplexing communication transmission line 91. The WDM device 89 demultiplexes the downlink wavelength-multiplexed optical signal received via the multiplexing communication transmission line 91 and inputs the demultiplexed downlink optical signal with the wavelength to the transmission line 93-$n_2$ (where $n_2$=2, 4, 6, . . . , N).

The WDM device 81 demultiplexes the uplink wavelength-multiplexed optical signal received via the multiplexing communication transmission line 91, and inputs the demultiplexed uplink optical signal with the wavelength $\lambda_{n1}$ to the port 11-1-$n_1$. The WDM device 81 receives the downlink optical signal with the wavelength $\lambda_{n2}$ output from each of the ports 11-1 to $pn_2$, multiplexes the received downlink signals, and outputs the multiplexed signal to the multiplexing communication transmission line 91.

Accordingly, ONU #1 that is the subscriber device 40 connected to the Add/Drop node 32-4 of the WDM access ring network 31 and ONU #2 that is the subscriber device 40 connected to the port 11-2-1 and the port 11-2-2 of the optical SW 1008 communicate as follows. The case of N=18 will be described as an example.

ONU #1 transmits an uplink optical signal with the wavelength $\lambda_1$ to the Add/Drop node 32-4. Another ONU transmits an uplink optical signal with the wavelengths $\lambda_3$ and $\lambda_5$ to the Add/Drop node 32-4. The optical SW 34 of the Add/Drop node 32-4 receives optical signals with wavelengths $\lambda_1$, $\lambda_3$, and $\lambda_5$. The multiplexing unit 35 of the Add/Drop node 32-4 multiplexes the optical signals with the wavelengths $\lambda_1$, $\lambda_3$, and $\lambda_5$ input by the optical SW 34 and the optical signal not dropped by the optical SW 34, and outputs the multiplexed signal to the Add/Drop node 32-1. The optical SW 34 of the Add/Drop node 32-1 drops the optical signals with the wavelengths $\lambda_1$, $\lambda_3$, $\lambda_5$, . . . $\lambda_{17}$ demultiplexed by the demultiplexing unit 33 and outputs the optical signals that have not been dropped to the multiplexing unit 35. The WDM device 89 outputs, to the multiplexing communication transmission line 91, the multiplexed signal obtained by multiplexing the uplink optical signals with the wavelengths $\lambda_1$, $\lambda_3$, $\lambda_5$, . . . $\lambda_{17}$ input from the transmission lines 93-1, 93-3, 93-5, . . . , and 93-17, respectively.

The WDM device 81 receives the wavelength-multiplexed uplink optical signal from the multiplexing communication transmission line 91 and performs wavelength separation. The WDM device 81 inputs the uplink optical signals with the wavelengths $\lambda_1$, $\lambda_3$, $\lambda_5$, . . . $\lambda_{17}$ to the ports 11-1-$p1$, 11-1-$p3$, 11-1-$p5$, . . . , and 11-1-$p17$ of the optical SW 1008, respectively. The optical SW 1008 outputs an upward optical signal with a wavelength from the output destination port 11-2-1. The optical receiver 43 of ONU #2 receives the optical signal with the wavelength $\lambda_1$ transmitted along the transmission line 50-2-1.

The optical transmitter 42 of ONU #2 transmits a downlink optical signal with the wavelength $\lambda_2$. The port 11-2-2 of the optical SW 1008 inputs the optical signal transmitted by ONU #2 from the transmission line 50-2-2. The optical SW 1008 outputs the downlink optical signal with the wavelength $\lambda_2$ input from the port 11-2-2 from the port 11-1-$p$2. Further, the optical SW 1008 outputs downlink optical signals with wavelengths $\lambda_4$, $\lambda_6$, . . . , and $\lambda_{18}$ input from the ports 11-2-4, 11-2-6, . . . , and 11-2-18, respectively, from the ports 11-1-$p$4, 11-2-$p$6, . . . , and 11-2-$p$18.

The WDM device 81 outputs, to the multiplexing communication transmission line 91, the wavelength-multiplexed signal obtained by multiplexing the downlink optical signals with the wavelengths $\lambda_2$, $\lambda_4$, $\lambda_6$, . . . , and $\lambda_{18}$ output from the ports 11-1-$p$2, 11-1-$p$4, 11-1-$p$6, . . . , and 11-1-$p$18, respectively. The WDM device 89 separates the wavelength-multiplexed signal transmitted along the multiplexing communication transmission line 91, and outputs the downlink optical signals of the wavelengths $\lambda_2$, $\lambda_4$, $\lambda_6$, . . . , and $\lambda_{18}$ obtained by the separation to the transmission lines 93-2, 93-4, 93-6, . . . , and 93-18, respectively. The optical SW 34 of the Add/Drop node 32-1 inputs the optical signals having the wavelengths $\lambda_2$, $\lambda_4$, $\lambda_6$, . . . , and $\lambda_{18}$ output from the WDM device 89 from the transmission lines 93-2, 93-4, 93-6, . . . , and 93-18, respectively, and outputs the input optical signal and the optical signals that have not been dropped to the multiplexing unit 35. The multiplexing unit 35 multiplexes the optical signals input from the optical SW 34 and outputs the multiplexed optical signals to the transmission line 53-1.

The demultiplexing unit 33 of the Add/Drop node 32-2 demultiplexes the optical signal input from the transmission line 53-1 and outputs the signals to the optical SW 34. The optical SW 34 drops optical signals with wavelengths $\lambda_{14}$, $\lambda_{16}$, and $\lambda_{18}$ corresponding to the own node. The optical signals with the wavelengths $\lambda_{14}$, $\lambda_{16}$, and $\lambda_{18}$ are transmitted to the optical receiver 43 of the subscriber device 40 corresponding to the wavelengths. The optical SW 34 of the Add/Drop node 32-2 receives optical signals of the wavelengths $\lambda_{13}$, $\lambda_{15}$, and $\lambda_{17}$ transmitted by the optical transmitter 42 of each subscriber device 40, and outputs the input optical signals and the optical signals that have not been dropped to the multiplexing unit 35. The multiplexing unit 35 multiplexes the optical signals input from the optical SW 34 and outputs the multiplexed optical signal to the transmission line 53-2.

The Add/Drop node 32-3 also operates like the Add/Drop node 32-2. However, the optical SW 34 of the Add/Drop node 32-3 drops the optical signals with the wavelengths $\lambda_8$, $\lambda_{10}$, and $\lambda_{12}$ corresponding to the own node, and inputs the optical signals with the wavelengths $\lambda_7$, $\lambda_9$, and $\lambda_{11}$. The demultiplexing unit 33 of the Add/Drop node 32-4 demultiplexes the wavelength-multiplexed optical signal input from the transmission line 53-3 and outputs the signal to the optical SW 34. The optical SW 34 of the Add/Drop node 32-4 drops the optical signals having wavelengths $\lambda_2$, $\lambda_4$, and $\lambda_6$ corresponding to the own node. The optical receiver 43 of ONU #1 receives the optical signal with the wavelength $\lambda_2$ dropped by the optical SW 34 of the Add/Drop node 32-4.

Figure 24:
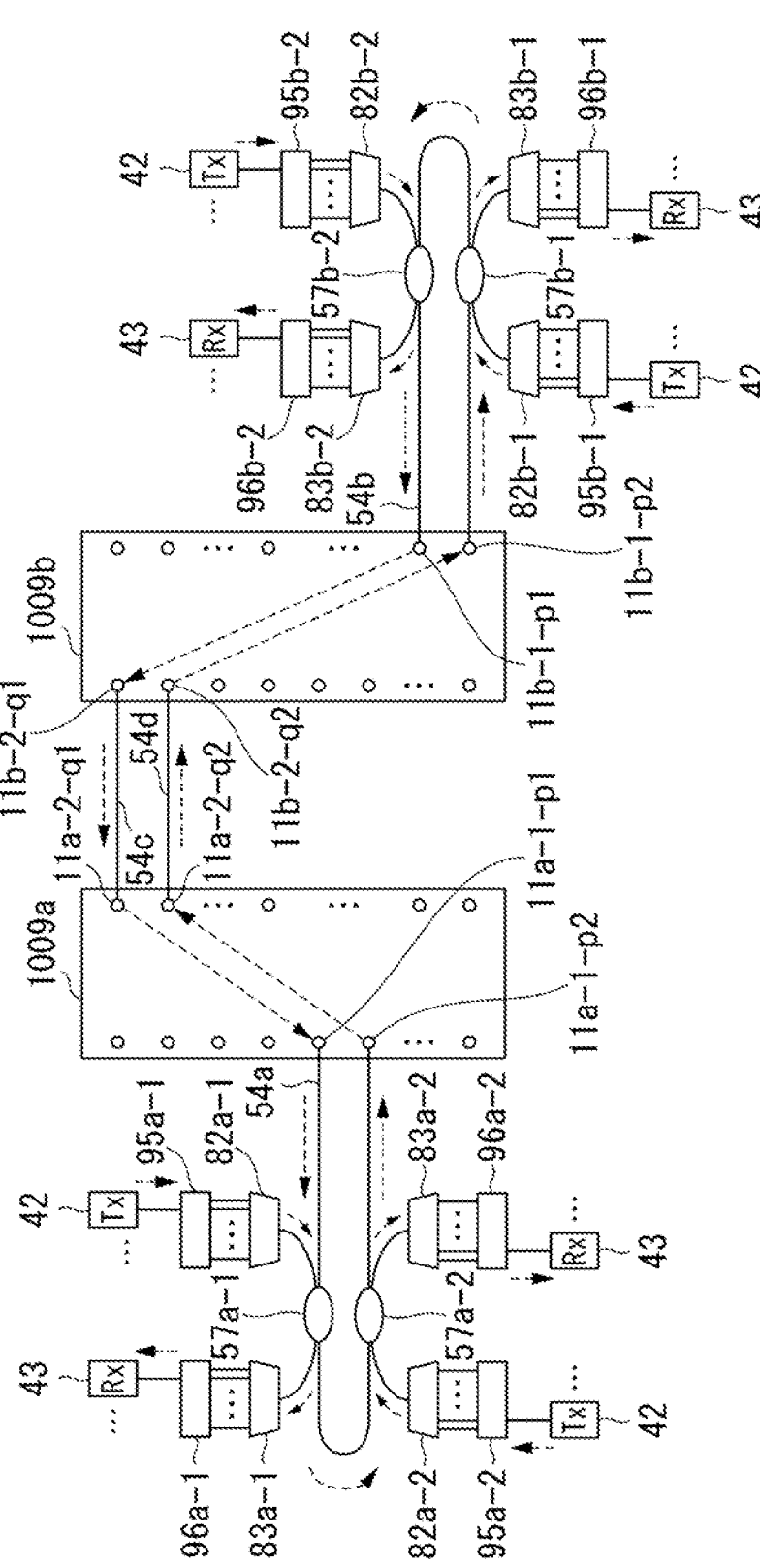
FIG. 24 is a diagram illustrating an example of an access topology in a basic configuration.

FIG. 24 is a diagram illustrating an access topology in which two access surfaces form one loop. As optical SWs 1009$a$ and SW 1009$b$, any of the above-described optical SWs to 10$i$ can be used. The optical SWs 1009$a$ and SW 1009$b$ are collectively referred to as an optical SW 1009. The two ports 11-1 of the optical SW 1009 are connected to both ends of one transmission line 54. One or more power splitters 57 are connected to the transmission line 54. The power splitter 57 is connected to the optical transmitters 42 of the one or more subscriber devices 40 via a multiplexer 82 and the optical SW 95, and is connected to the optical receivers 43 of the one or more subscriber devices 40 via a demultiplexer 83 and the optical SW 96. Each of the subscriber devices 40 transmits and receives optical signals with different wavelengths.

The transmission line 54 connected to the optical SW 1009$a$ is referred to as a transmission line 54$a$, the two ports 11-1 connected to the transmission line 54$a$ are referred to as ports 11$a$-1-$p$1 and 11$a$-1-$p$2, the transmission line 54 connected to the optical SW 1009$b$ is referred to as a transmission line 54$b$, and the two ports 11-1 connected to the transmission line 54$b$ are referred to as ports 11$b$-1-$p$1 and 11$b$-1-$p$2. N (where N is an integer equal to or greater than 1) power splitters 57 connected to the transmission line 54$a$ are referred to as power splitters 57$a$-1 to 57$a$-N, and M (where M is an integer equal to or greater than 1) power splitters 57 connected to the transmission line 54$b$ are referred to as power splitters 57$b$-1 to 57$b$-M. The multiplexer 82 and the demultiplexer 83 connected to the power splitters 57$a$-$n$ (where n is an integer equal to or greater than 1 and equal to or less than N) are referred to as a multiplexer 82$a$-$n$ and a demultiplexer 83$a$-$n$, respectively. The multiplexer 82 and the demultiplexer 83 connected to the power splitters 57$b$-$m$ (where m is an integer equal to or greater than 1 and equal to or less than M) are referred to as a multiplexer 82$b$-$m$ and a demultiplexer 83$b$-$m$, respectively. The optical SW 95 connected to the multiplexer 82$a$-$n$ is referred to as an optical SW 95$a$-$n$, and the optical SW 96 connected to the demultiplexer 83$a$-$n$ is referred to as an optical SW 96$a$-$n$. The optical SW 95 connected to the multiplexer 82$b$-$m$ is referred to as an optical SW 95$b$-$m$, and the optical SW 96 connected to the demultiplexer 83$b$-$m$ is referred to as an optical SW 96$b$-$m$.

Optical SW 1009$a$ and optical SW 1009$b$ are connected by transmission lines 54$c$ and 54$d$. The port 11-2 of the optical SW 1009$a$ connected to the transmission line 54$c$ is referred to as a port 11$a$-2-$q$1, and the port 11-2 of the optical SW 1009$a$ connected to the transmission line 54$d$ is referred to as a port 11$a$-2-$q$2. The port 11-2 of the optical SW 1009$b$ connected to the transmission line 54$c$ is referred to as a port 11$b$-2-$q$1, and the port 11-2 of the optical SW 1009$b$ connected to the transmission line 54$d$ is referred to as a port 11$b$-2-$q$2.

In the above configuration, the optical SW 95$b$-$m$ outputs optical signals with different wavelengths transmitted by the optical transmitter 42 of each of the subscriber devices 40 to the port corresponding to each wavelength of the multiplexer 82$b$-$m$. The multiplexer 82$b$-$m$ inputs optical signals with different wavelengths transmitted by the optical transmitters 42 of the subscriber devices 40 via the optical SW 95$b$-$m$ and outputs a wavelength-multiplexed optical signal obtained by multiplexing the input optical signals. The power splitter 57$b$-$m$ multiplexes the wavelength-multiplexed optical signal output from the multiplexer 82$b$-$m$ into the wavelength-multiplexed optical signal transmitted along the transmission line 54$b$ in a direction from the port 11$b$-1-$p$2 to the port 11$b$-1-$p$1, and outputs the multiplexed optical signal.

The port 11$b$-1-$p$1 of the optical SW 1009$b$ receives the wavelength-multiplexed optical signal from the transmission line 54$b$ and outputs the wavelength-multiplexed optical signal from the port 11$b$-2-$q$1. The port 11$a$-2-$q$1 of the optical SW 1009$a$ inputs the wavelength-multiplexed optical signal output from the port 11$b$-2-$q$1 of the optical SW 1009*b* from the transmission line 54*c*. The optical SW 1009*a* outputs the wavelength-multiplexed optical signal input from the port 11*a*-2-*q*1 to the transmission line 54*a* from the port 11*a*-1-*p*1.

The power splitter 57*a*-*n* branches the wavelength-multiplexed optical signal transmitted along the transmission line 54*a* in a direction from the port 11*a*-1-*p*1 to the port 11*a*-1-*p*2, and outputs the branched wavelength-multiplexed optical signal to the demultiplexer 83*a*-*n*. The demultiplexer 83*a*-*n* demultiplexes the wavelength-multiplexed optical signal received from the power splitter 57*a*-*n*, and outputs the demultiplexed optical signal to the optical SW 96*a*-*n* from a port corresponding to a wavelength. The optical SW 96*a*-*n* outputs the optical signal with each wavelength input from the demultiplexer 83*a*-*n* to the optical receiver 43 of the subscriber device 40 that receives the optical signal with the wavelength.

On the other hand, the optical SW 95*a*-*n* output optical signals with different wavelengths transmitted by the optical transmitters 42 of the respective subscriber devices 40 to ports corresponding to the wavelengths of the multiplexers 82*a*-*n*. The multiplexers 82*a*-*n* input optical signals with different wavelengths transmitted by the optical transmitters 42 of the subscriber devices 40 via the optical SWs 95*a*-*n*, and output wavelength-multiplexed optical signals obtained by multiplexing the input optical signals. The power splitter 57*a*-*n* multiplexes the wavelength-multiplexed optical signal output from the multiplexer 82*a*-*n* into the wavelength-multiplexed optical signal transmitted through the transmission line 54*a* in a direction from the port 11*a*-1-*p*1 to the port 11*a*-1-*p*2, and outputs the multiplexed optical signal.

The port 11*a*-1-*p*2 of the optical SW 1009*a* receives the wavelength-multiplexed optical signal from the transmission line 54*a* and outputs the wavelength-multiplexed optical signal from the port 11*a*-2-*q*2. The port 11*b*-2-*q*2 of the optical SW 1009*b* inputs the wavelength-multiplexed optical signal output from the port 11*a*-2-*q*2 of the optical SW 1009*a* from the transmission line 54*d*. The optical SW 1009*b* outputs the wavelength-multiplexed optical signal input from the port 11*b*-2-*q*2 from the port 11*b*-1-*p*2 to the transmission line 54*b*.

The power splitter 57*b*-*m* branches the wavelength-multiplexed optical signal transmitted along the transmission line 54*b* in a direction from the port 11*b*-1-*p*2 to the port 11*b*-1-*p*1, and outputs the branched wavelength-multiplexed optical signal to the demultiplexer 83*b*-*m*. The demultiplexer 83*b*-*m* demultiplexes the wavelength-multiplexed optical signal received from the power splitter 57*b*-*m* and outputs the demultiplexed optical signal to the optical SW 96*b*-*m* from a port corresponding to the wavelength. The optical SW 96*b*-*m* outputs the optical signal with each wavelength input from the demultiplexer 83*b*-*m* to the optical receiver 43 of the subscriber device that receives the optical signal with the wavelength.

Although FIG. 24 illustrates a case where the optical signal is transmitted counterclockwise, the optical signal may be transmitted clockwise, and a pair of left and right dual cores may be used for redundancy.

Figure 25:
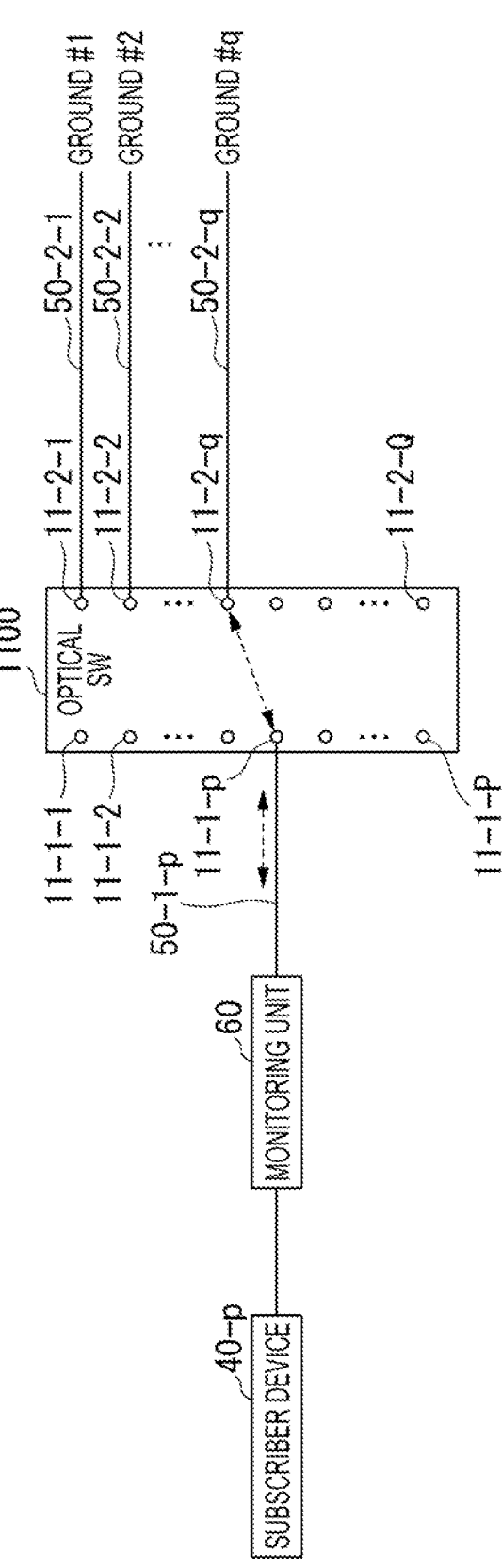
FIG. 25 is a diagram illustrating an example of an access topology in a basic configuration.

FIG. 25 is a diagram illustrating a line type access topology. As an optical SW 1100, any of the above-described optical SWs 10*a* to 10*i* can be used. The access topology illustrated in FIG. 25 is different from the access topology illustrated in FIG. 16 in that the monitoring unit 60 is connected between the subscriber device 40-*p* and the optical SW 1100. The monitoring unit monitors the optical signal output from the subscriber device 40-*p* or the optical signal output from the port 11-1-*p*.

Figure 26:
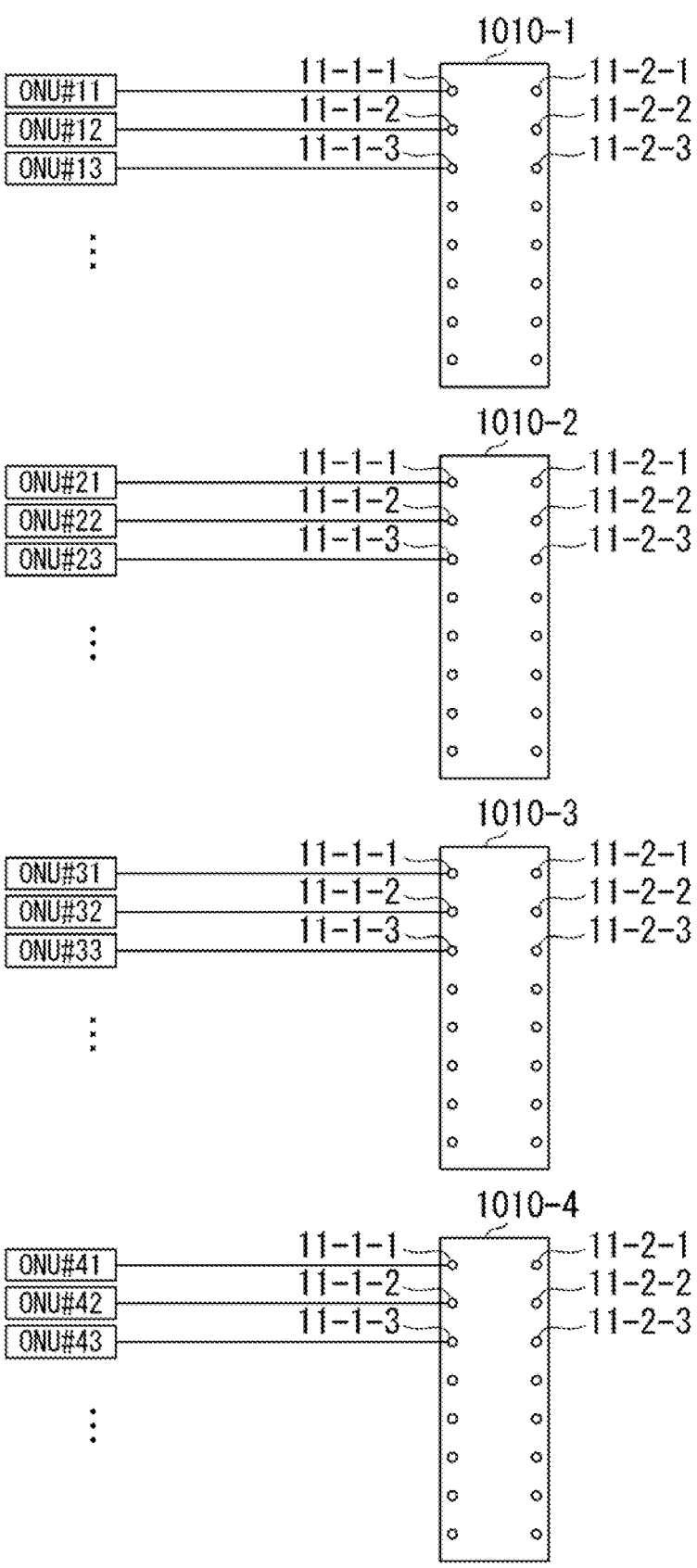
FIG. 26 is a diagram illustrating an example in which scalability of an optical SW in a basic configuration is required.

Next, a connection configuration in a case where the number of user connections increases will be described. FIG. 26 is a diagram illustrating an example in which scalability of the optical SW is required. FIG. 26 illustrates N (N is an integer equal to or greater than 1) optical SWs 1010-1 to 1010-N. As the optical SWs 1010-1 to 1010-N, any of the optical SWs 10*a* to 10*i* described above can be used. FIG. 26 illustrates an example of N=4. In the drawing, ONU #np serving as the subscriber device 40 is connected to the port 11-1-*p* of the optical SW 1010-*n* (where n is an integer equal to or greater than 1 and equal to or less than N). The port 11-2-*q* of the optical SW 1010-*n* is connected to an uplink. The uplink is a transmission line 50-2 connected to a higher network.

When the number of users becomes enormous and the number of ONUs increases, the optical SW 1010 may exceed an allowable size. In the present embodiment, even in such a case, a function similar to that in a case where the number of users is small, for example, connection in which any uplink is selected or optical folding to any subscriber device is realized in the connection configuration illustrated in FIG. 27 or 28.

Figure 27:
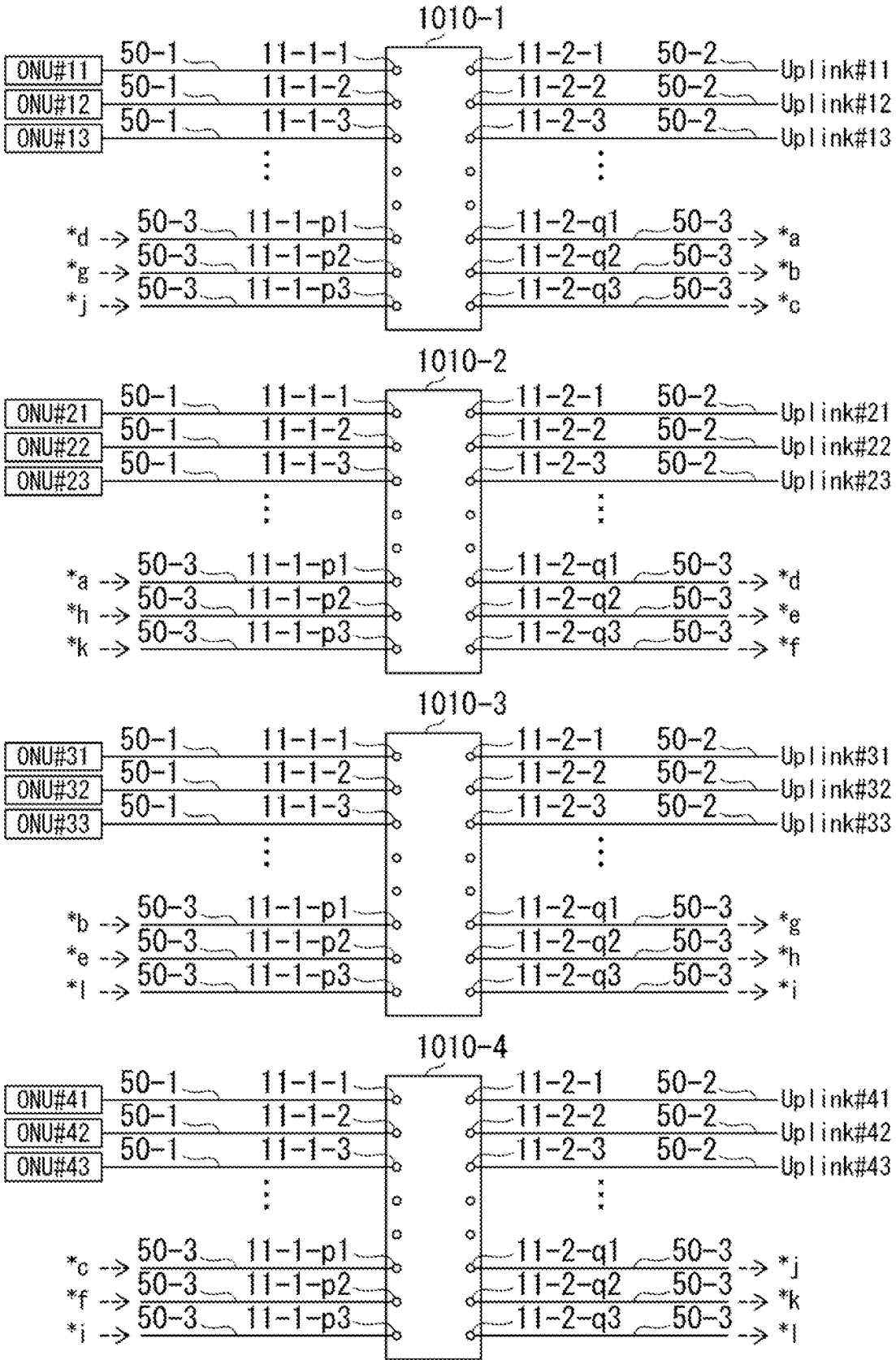
FIG. 27 is a diagram illustrating an example in which scalability of an optical SW in a basic configuration is required.

FIG. 27 is a diagram illustrating an example of optical SW scalability by a mesh configuration. Some of the ports 11-1 of the optical SW 1010 are connected to the ONU by the transmission line 50-1, and some of the ports 11-2 are connected to the uplink transmission line 50-2. Further, some of the ports 11-1 of the optical SW 1010 and some of the ports 11-2 of the other optical SW 1010 are connected by a transmission line 50-3. In the drawing, one optical SW 1010 is connected to all the other optical SWs 1010.

The plurality of ports 11-1 of the optical SW 1010 are referred to as ports 11-1-1, 11-1-2, 11-1-3, . . . , 11-1-*p*1, 11-1-*p*2, and 11-1-*p*3. The plurality of ports 11-2 of the optical SW 1010 are referred to as ports 11-2-1, 11-2-2, 11-2-3, . . . , 11-2-*q*1, 11-2-*q*2, and 11-2-*q*3.

In FIG. 27, the ports 11-1-1, 11-1-2, 11-1-3, . . . of the optical SW 1010-*n* (where n is an integer equal to or greater than 1 and equal to or less than N) are connected to ONUs #n1, #n2, #n3, . . . , and the ports 11-2-1, 11-2-2, 11-2-3, . . . are connected to the transmission lines 50-2 or uplinks #n1, #n2, #n3, . . . . Further, the optical SWs 1010-*n* are connected to the ports 11-1 of all the other optical SW 1010-*j* (where j≠n and j is an integer equal to or greater than 1 and equal to or less than N) by some of the ports 11-2. For example, the port 11-2-*q*1 of the optical SW 1010-1 is connected to the port 11-1-*p*1 of the optical SW 1010-2, the port 11-2-*q*2 of the optical SW 1010-1 is connected to the port 11-1-*p*1 of the optical SW 1010-3, and the port 11-2-*q*3 of the optical SW 1010-1 is connected to the port 11-1-*p*1 of the optical SW 1010-4. The port 11-2-*q*1 of the optical SW 1010-2 is connected to the port 11-1-*p*1 of the optical SW 1010-1, the port 11-2-*q*2 of the optical SW 1010-2 is connected to the port 11-1-*p*2 of the optical SW 1010-3, and the port 11-2-*q*3 of the optical SW 1010-2 is connected to the port 11-1-*p*2 of the optical SW 1010-4. The optical SW 1010-*n* may be connected to some of the ports 11-1 of the optical SW 1010-*j* among all the other optical SWs 1010-*j* (where j≠n, and j is an integer equal to or greater than 1 and equal to or less than N) by some of the ports 11-2.

For example, when ONU #11 transmits an uplink optical signal with the wavelength $\lambda_1$ addressed to uplink #41, the optical SW 1010-1 outputs the optical signal input from the port 11-1-1 from the port 11-2-*q*3. The port 11-1-*p*1 of the optical SW 1010-4 receives the optical signal with the wavelength $\lambda_1$ output from the port **11-2-*q*3 of the optical SW 1010-1, and outputs the optical signal from the port 11-2-1**.

When ONU #12 transmits the uplink optical signal with the wavelength $\lambda_2$ addressed to ONU #31, the optical SW 1010-1 outputs the optical signal input from the port 11-1-2 from the port **11-2-*q*2. The port 11-1-*p*1 of the optical SW 1010-3 receives the optical signal output from the port 11-2-*q*2 of the optical SW 1010-1. The optical SW 1010-3 performs folded communication similar to the optical SW 10*b* illustrated in FIG. 3 for the optical signal with the wavelength $\lambda_2$ input from the port 11-1-*p*1, and outputs the optical signal from the port 11-1-1**.

In FIG. 27, only the uplink optical signal is illustrated. When vertical bidirectional communication is performed, a WDM filter (a separation unit) that separates and transmits an uplink optical signal and a downlink optical signal is provided in the transmission lines 50-1, and 50-3. Then, the downlink optical signal is connected in a direction opposite to the above-described uplink optical signal.

Figure 28:
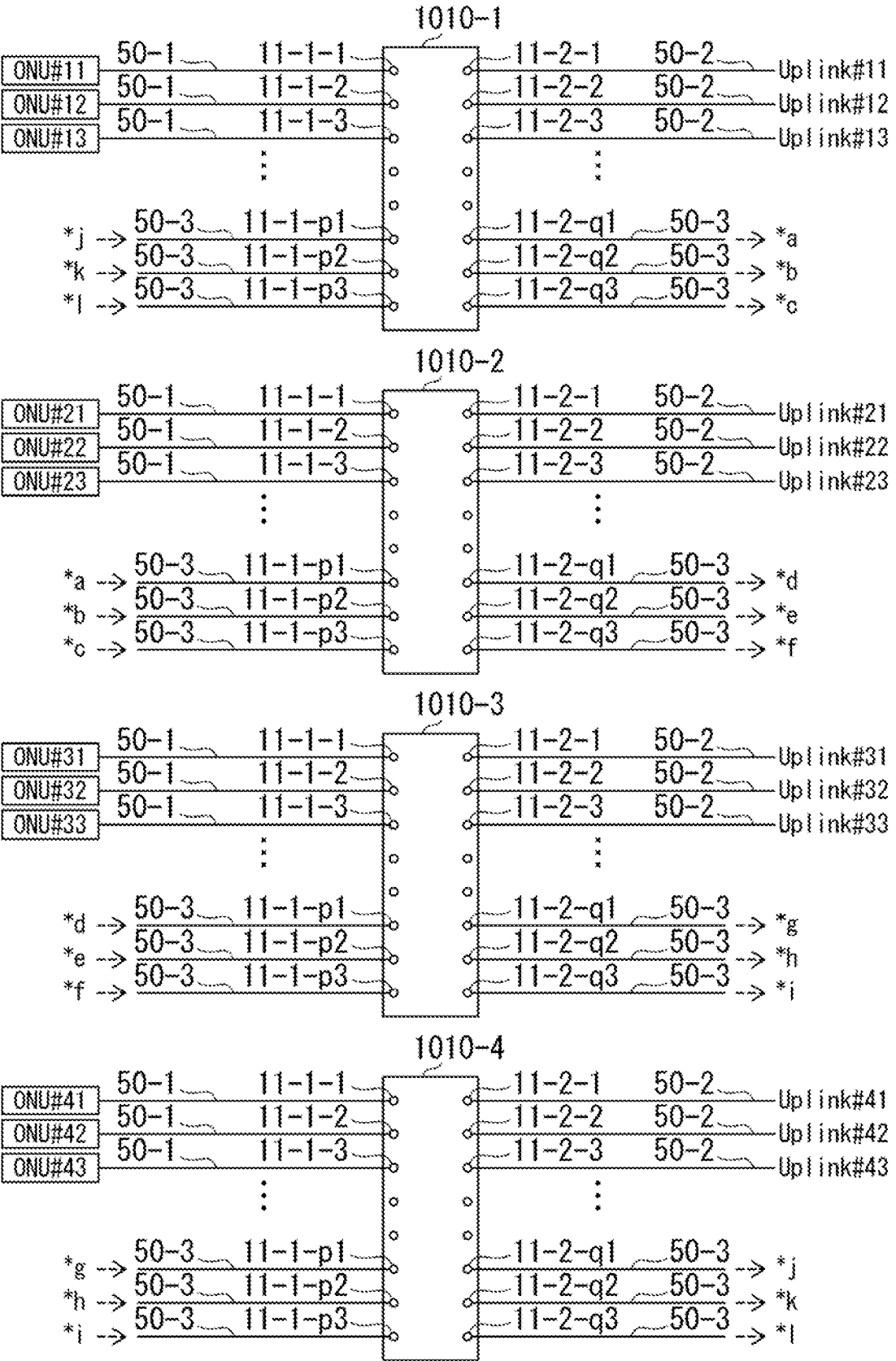
FIG. 28 is a diagram illustrating an example in which scalability of an optical SW in a basic configuration is required.

FIG. 28 is a diagram illustrating another example of the optical SW scalability by a cascade configuration. The configuration illustrated in FIG. 28 is different from the configuration illustrated in FIG. 27 in that an optical SW **1010-*n* (where n is an integer equal to or greater than 1 and equal to or less than N) is connected to the port 11-1 of any other optical SW 1010-(*n*+1) by some ports 11-2. The optical SW 1010-(N+1) is assumed to be the optical SW 1010-1. Accordingly, the plurality of optical SWs 1010** are connected in series.

In FIG. 28, the ports 11-1-1, 11-1-2, 11-1-3, . . . of the optical SW **1010-*n* (where n is an integer equal to or greater than 1 and equal to or less than N) are connected to ONUs #n1, #n2, #n3, . . . , and the ports 11-2-1, 11-2-2, 11-2-3, . . . are connected to the transmission lines 50-2 of uplinks #n1, #n2, #n3, . . . . Further, the port 11-2-*q*1 of the optical SW 1010-*n* is connected to the port 11-1-*p*1 of the optical SW 1010-(*n*+1), the port 11-2-*q*2 of the optical SW 1010-*n* is connected to the port 11-1-*p*2 of the optical SW 1010-(*n*+1), and the port 11-2-*q*3 of the optical SW 1010-*n* is connected to the port 11-1-*p*3 of the optical SW 1010-(*n*+1)**.

For example, when ONU #11 transmits an uplink optical signal with the wavelength $\lambda_1$ addressed to uplink #41, the optical SW 1010-1 outputs the optical signal input from the port 11-1-1 from the port **11-2-*q*1. The port 11-1-*p*1 of the optical SW 1010-2 receives the optical signal output from the port 11-2-*q*1 of the optical SW 1010-1 and outputs the optical signal from the port 11-2-*q*1 in accordance with the wavelength $\lambda_1$. The port 11-1-*p*1 of the optical SW 1010-3 receives the optical signal output from the port 11-2-*q*1 of the optical SW 1010-2 and outputs the optical signal from the port 11-2-*q*1 according to the wavelength $\lambda_1$. The port 11-1-*p*1 of the optical SW 1010-4 receives the optical signal output from the port 11-2-*q*1 of the optical SW 1010-3, and outputs the optical signal from the port 11-2-1** in accordance with the wavelength $\lambda_1$.

When ONU #12 transmits the uplink optical signal with the wavelength $\lambda_2$ addressed to ONU #31, the optical SW 1010-1 outputs the optical signal input from the port 11-1-2 from the port **11-2-*q*2. The port 11-1-*p*2 of the optical SW 1010-2 receives the optical signal output from the port 11-2-*q*2 of the optical SW 1010-1. The optical SW 1010-2 outputs the optical signal input from the port 11-1-*p*2 from the port 11-2-*q*2 in accordance with the wavelength $\lambda_2$. The port 11-1-*p*2 of the optical SW 1010-3 receives the optical signal output from the port 11-2-*q*2** of the optical SW

1010-2. The optical SW 1010-3 performs folded communication similar to the optical SW **10*b* illustrated in FIG. 3 on the optical signal input from the port 11-1-*p*2 according to the wavelength $\lambda_2$ and outputs the optical signal from the port 11-1-1**.

In FIG. 28, only the uplink optical signal is illustrated. When vertical bidirectional communication is performed, a WDM filter that separates and transmits an uplink optical signal and a downlink optical signal is provided in the transmission lines 50-1, 50-2, and 50-3. Then, the downlink optical signal is connected in a direction opposite to the above-described uplink optical signal.

Figure 29:
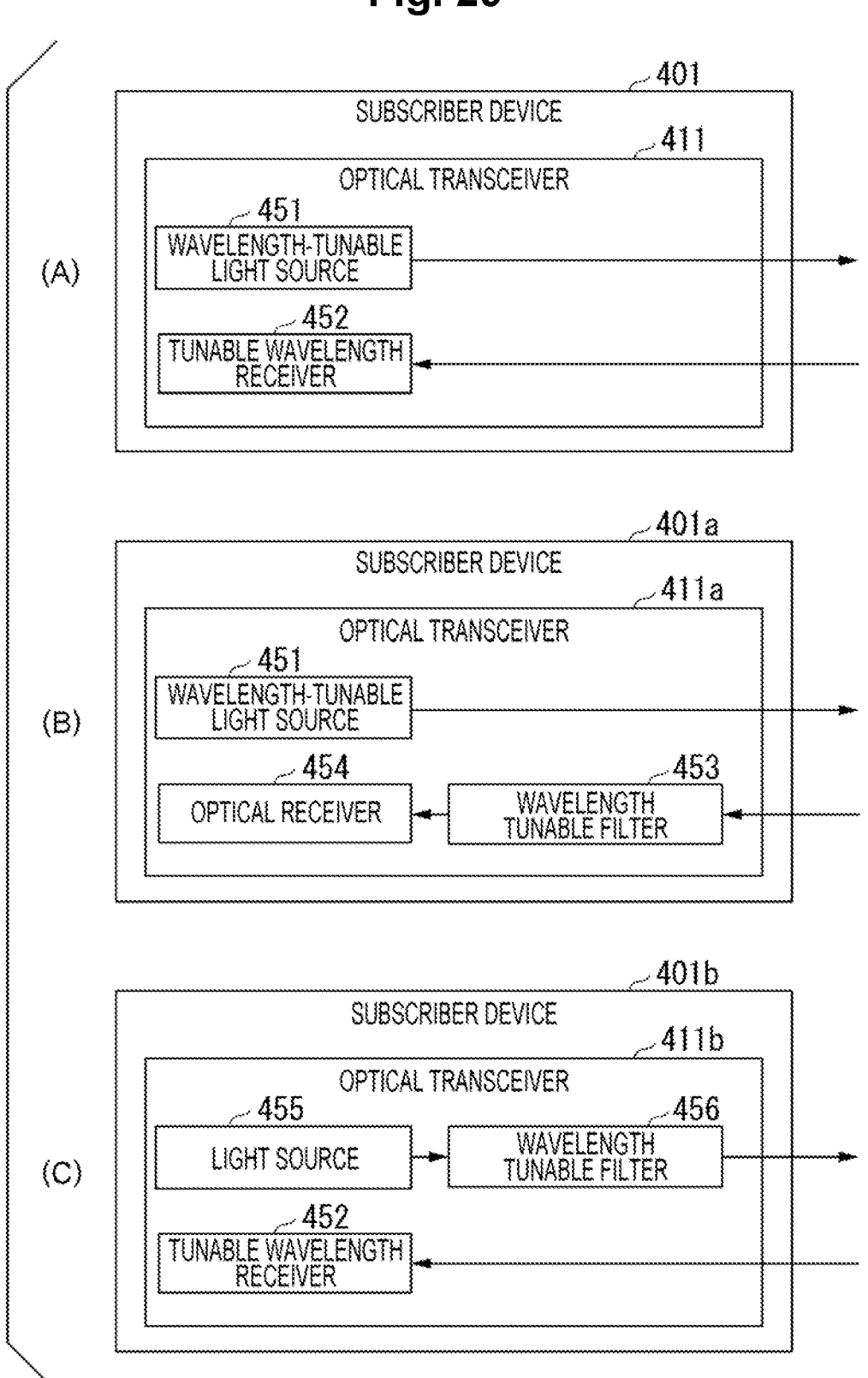
FIG. 29 is a diagram illustrating a configuration example of a dual-core subscriber device in a basic configuration.
Figure 30:
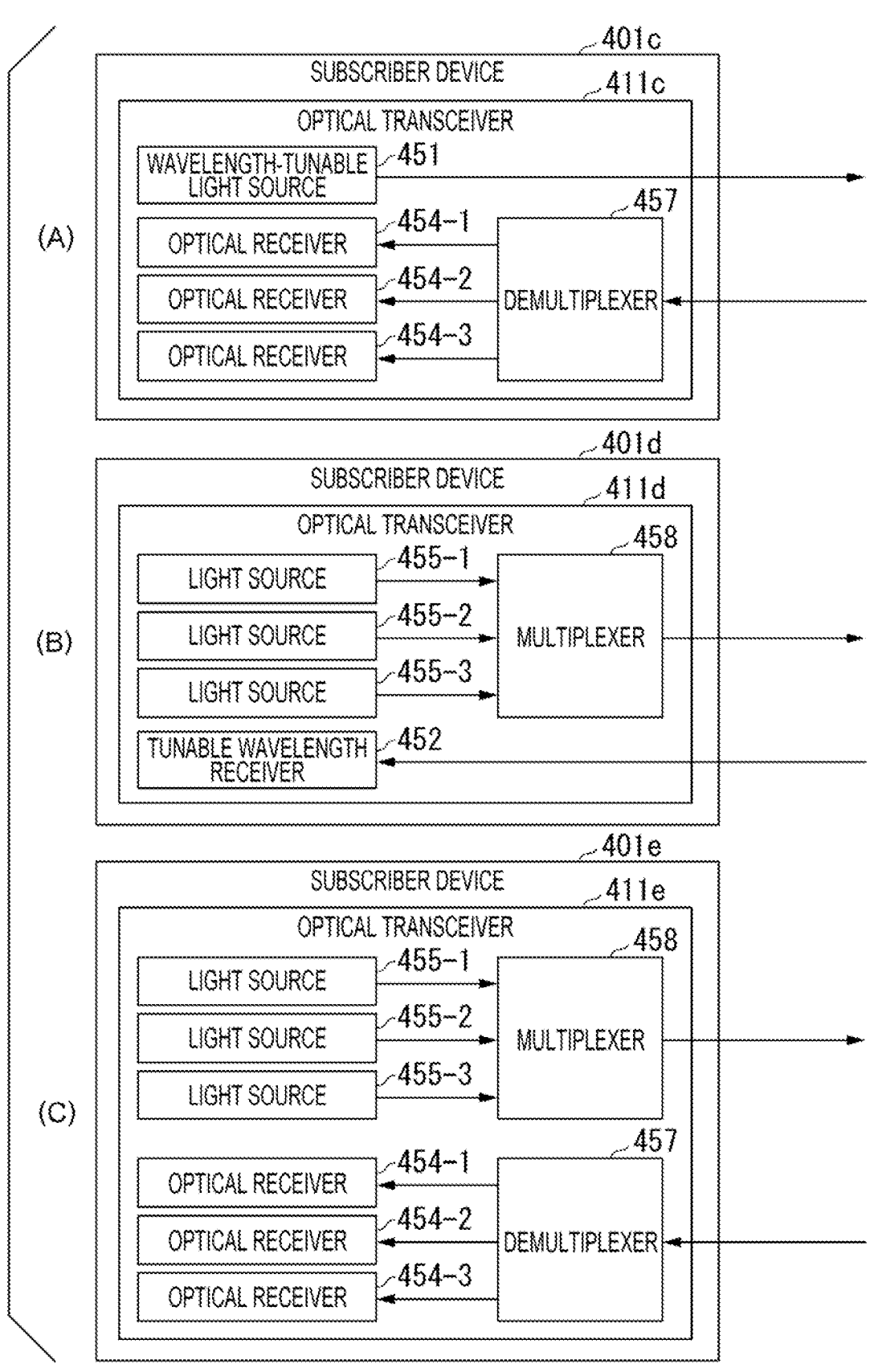
FIG. 30 is a diagram illustrating a configuration example of a dual-core subscriber device in a basic configuration.

Next, a configuration of an optical transceiver will be described with reference to FIGS. 29 to 32. Although a part of the configuration example of the subscriber device 40 connected to the optical SW will be described, the configuration example may be used in a control unit, a monitoring unit, and the like and may be used as a pair for transmission and reception, but may be used for only transmission or only reception depending on a use form. FIGS. 29 and 30 are diagrams illustrating a configuration of a dual-core subscriber device 401. In FIGS. 29 to 32, in order to describe a plurality of configurations, the same configurations are denoted by the same reference numerals, and description thereof may be omitted.

The subscriber device 401 illustrated in FIG. 29(A) includes an optical transceiver 411. The optical transceiver 411 includes a wavelength-tunable light source 451 and a tunable wavelength receiver 452. The wavelength-tunable light source 451 is an example of an optical transmission unit and the tunable wavelength receiver 452 is an example of an optical reception unit.

The wavelength-tunable light source 451 outputs light with a set wavelength. A wavelength set in the wavelength-tunable light source 451 is tunable. The wavelength-tunable light source 451 includes, for example, a tunable wavelength laser diode (LD). The wavelength-tunable light source 451 includes, for example, any one of a combination of a gain medium and a resonator with a tunable resonator length, a combination of a gain medium and a wavelength-selective medium, or a combination of a gain medium, a resonator with a tunable resonator length, and a wavelength-selective medium. For example, the wavelength-tunable light source 451 includes a multiplexer/demultiplexer or a power splitter and an optical transmitter (Tx) for each wavelength and transmits an optical signal from the optical transmitter with a set wavelength. The multiplexer/demultiplexer is, for example, an AWG. The multiplexer/demultiplexer or the power splitter multiplexes input light and outputs an optical signal with the wavelength. For example, the multiplexer/demultiplexer or the power splitter has a multi-wavelength light source or a broadband light source, and a tunable wavelength filter (tf) that selects and outputs a set wavelength. The tunable wavelength filter passes an optical signal with a set wavelength (tunable) among the input optical signals. The wavelength-tunable light source 451 can output a main signal (or a signal obtained by superimposing a control signal on the main signal) in accordance with, for example, a direct modulation scheme. Alternatively, the wavelength-tunable light source 451 further includes an external modulator, and can output a main signal (or a signal obtained by superimposing a control signal on the main signal) using the external modulator. As the external modulator, a Mach-Zender (MZ), an electro-absorption (EA), a semiconductor optical amplifier (SOA), or the like can be used. The external modulator can have a structure integrated with a light source. The external modulator can be modulated with the main signal and the control signal by the same modulator, or can be separately modulated with the main signal and the control signal by different modulators.

The tunable wavelength receiver 452 includes a tunable wavelength filter and an optical receiver. The tunable filter passes light with a set wavelength (tunable) in the input optical signal. The optical receiver receives the optical signal passing along the tunable wavelength filter. The tunable wavelength filter, that is, a signal with a predetermined wavelength may be selected after the light is received. For example, a beat signal centering on a frequency corresponding to a wavelength difference from a local light with a predetermined wavelength may be selected with a frequency width corresponding to the band of the signal. Depending on the configuration of the optical SW, a multiplexing scheme, or the like, a configuration in which a transmitter that has not a tunable wavelength is used or a configuration in which a tunable wavelength filter or a multiplexer/demultiplexer is not used may be adopted.

A subscriber device 401a illustrated in FIG. 29(B) includes an optical transceiver 411a. The optical transceiver 411a includes a wavelength-tunable light source 451, a wavelength-tunable filter 453, and an optical receiver 454. The wavelength-tunable light source 451 is an example of an optical transmission unit, and the wavelength-tunable filter 453 and the optical receiver 454 are examples of an optical reception unit. The wavelength-tunable filter 453 inputs an optical signal from a transmission line and passes light with a set wavelength to the optical receiver 454. The wavelength set to the wavelength-tunable filter 453 is tunable. The optical receiver 454 receives the optical signal passed by the wavelength-tunable filter 453. The subscriber device 40 on the reception side may not use the wavelength-tunable filter 453 depending on the configuration of the optical SW, the multiplexing scheme, or the like.

Figure 35:
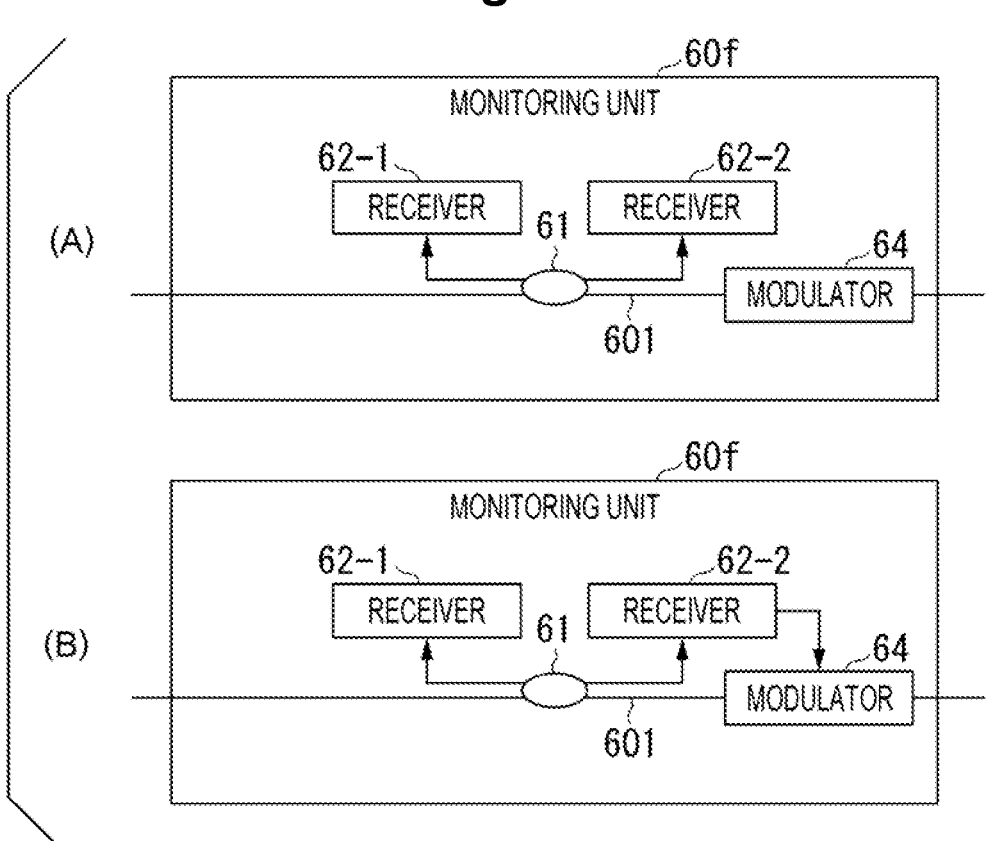
FIG. 35 is a diagram illustrating a configuration example of a monitoring unit in a basic configuration.

The subscriber device 401b illustrated in FIG. 29(C) includes an optical transceiver 411b. The optical transceiver 411b includes a light source 455, a wavelength-tunable filter 456, and a tunable wavelength receiver 452. The light source 455 and the wavelength-tunable filter 456 are an example of an optical transmission unit, and the tunable wavelength receiver 452 is an example of an optical reception unit. The light source 455 outputs light with a single wavelength (for example, the wavelength $\lambda_1$). That is, the light source 455 is not wavelength-tunable. The wavelength-tunable filter 456 receives the optical signal output from light source 455, and outputs the optical signal with the set wavelength to the transmission line. The wavelength set in the wavelength-tunable filter 456 is the wavelength of the optical signal output from the light source 455.

Figure 50:
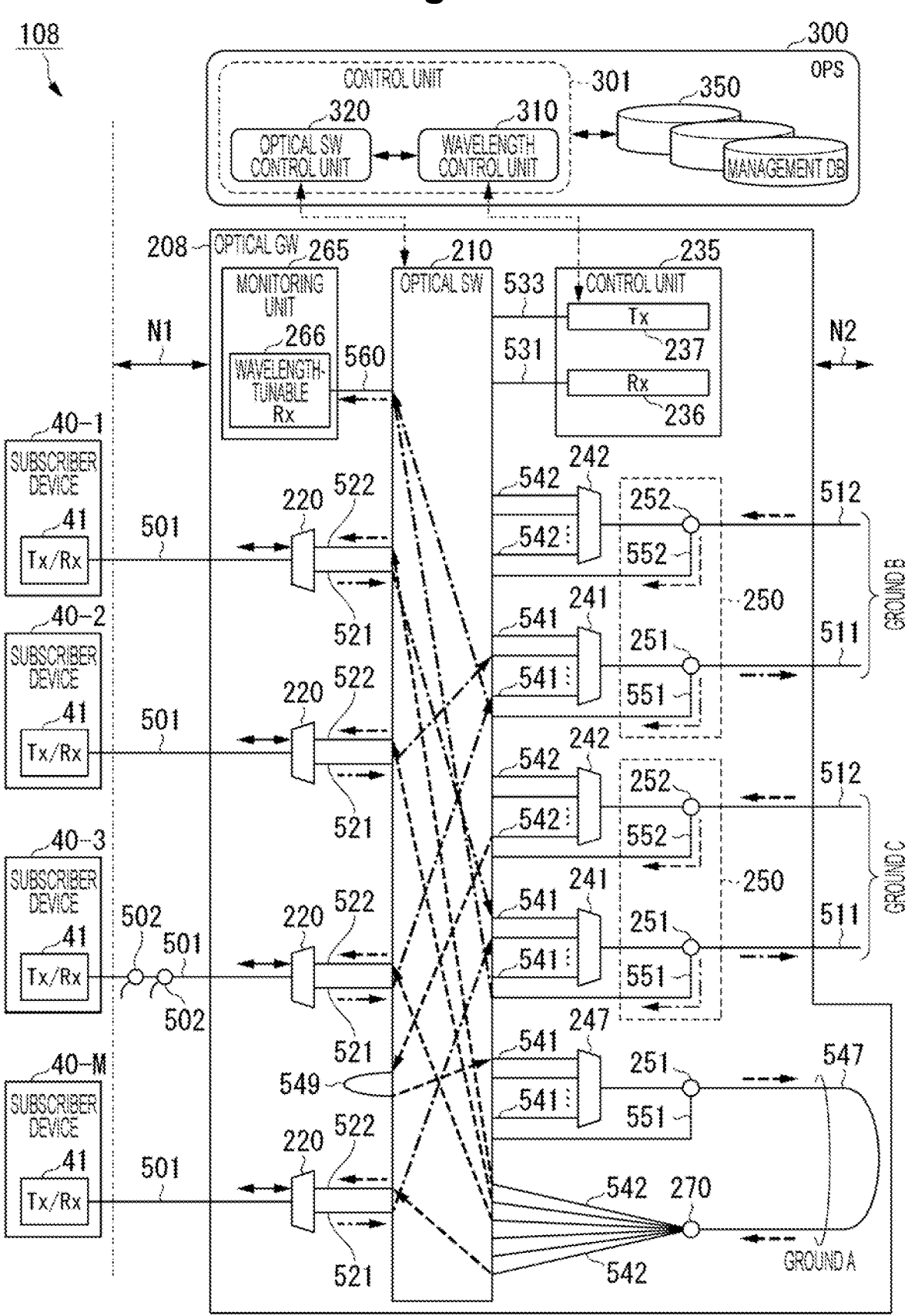
FIG. 50 is a diagram illustrating a configuration example of an optical access system according to an eighth configuration example.

The subscriber device 401c illustrated in FIG. 30(A) includes an optical transceiver 411c. The optical transceiver 411c includes a wavelength-tunable light source 451, a plurality of optical receivers 454-1 to 454-3, and a demultiplexer 457. The wavelength-tunable light source 451 is an example of an optical transmission unit, and the optical receivers 454-1 to 454-3 and the demultiplexer 457 are examples of an optical reception unit. FIG. 30(A) illustrates a case where there are three optical receivers 454-1 to 454-3, but the number of optical receivers 454-1 to 454-3 is not limited. In the following description, the number of the optical receivers 454-1 to 454-3 is not particularly limited. The demultiplexer 457 demultiplexes the optical signal input from the transmission line in accordance with a wavelength. The optical signals demultiplexed by the demultiplexer 457 are input to the optical receivers 454-1 to 454-3. The optical receivers 454-1 to 454-3 receive the optical signals demultiplexed by the demultiplexer 457.

A subscriber device 401d illustrated in FIG. 30(B) includes an optical transceiver 411d. The optical transceiver 411d includes a plurality of light sources 455-1 to 455-3, a multiplexer 458, and a tunable wavelength receiver 452. The light sources 455-1 to 455-3 and the multiplexer 458 are an example of an optical transmission unit, and the tunable wavelength receiver 452 is an example of an optical reception unit. Note that FIG. 30(B) illustrates a case where there are three light sources 455-1 to 455-3, but the number of light sources 455-1 to 455-3 is not limited. Also in the following description, the number of light sources 455 is not particularly limited. The light sources 455-1 to 455-3 transmit optical signals of different wavelengths. The multiplexer 458 multiplexes the plurality of optical signals output from the light sources 455-1 to 455-3 and outputs the multiplexed optical signals to the transmission line.

The subscriber device 401e illustrated in FIG. 30 (C) includes an optical transceiver 411e. The optical transceiver 411e includes a plurality of light sources 455-1 to 455-3, a multiplexer 458, a plurality of optical receivers 454-1 to 454-3, and the demultiplexer 457. The light sources 455-1 to 455-3 and the multiplexer 458 are an example of an optical transmission unit, and the optical receivers 454-1 to 454-3 and the demultiplexer 457 are an example of an optical reception unit. In the subscriber device 401e, optical signals output from the light sources 455-1 to 455-3 are multiplexed by the multiplexer 458 to be output to the transmission line. In the subscriber device 401e, the optical signal input from the transmission line is demultiplexed with a wavelength by the demultiplexer 457, and the demultiplexed optical signals are received by the optical receivers 454-1 to 454-3.

It is preferable to combine a plurality of branch combiners/splitters or multiplexers if wavelengths to be multiplexed/demultiplexed after combination are equal. That is, the demultiplexer 457 and the multiplexer 458 may be combined.

Figure 31:
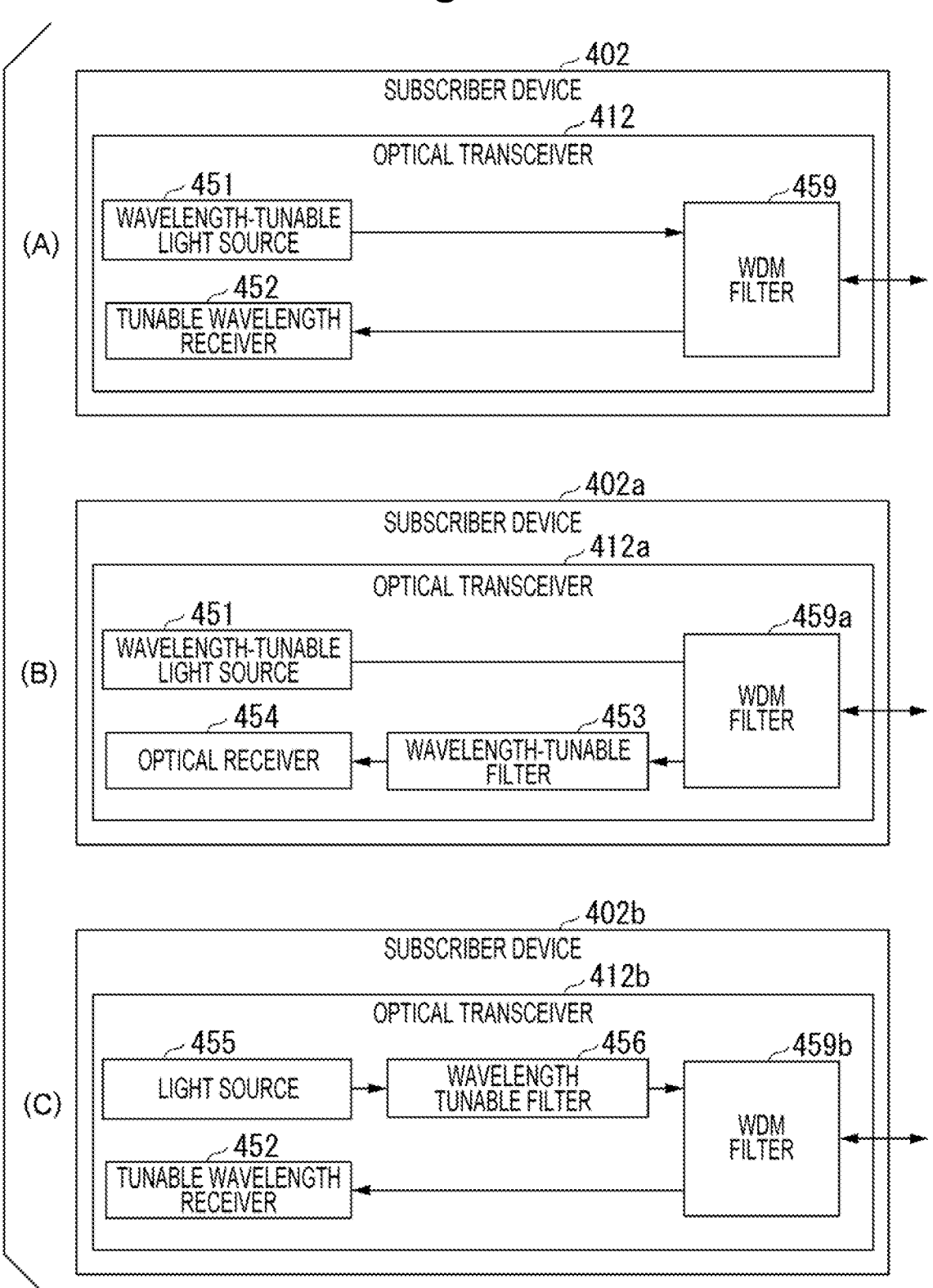
FIG. 31 is a diagram illustrating a configuration example of a single-core subscriber device in a basic configuration.
Figure 32:
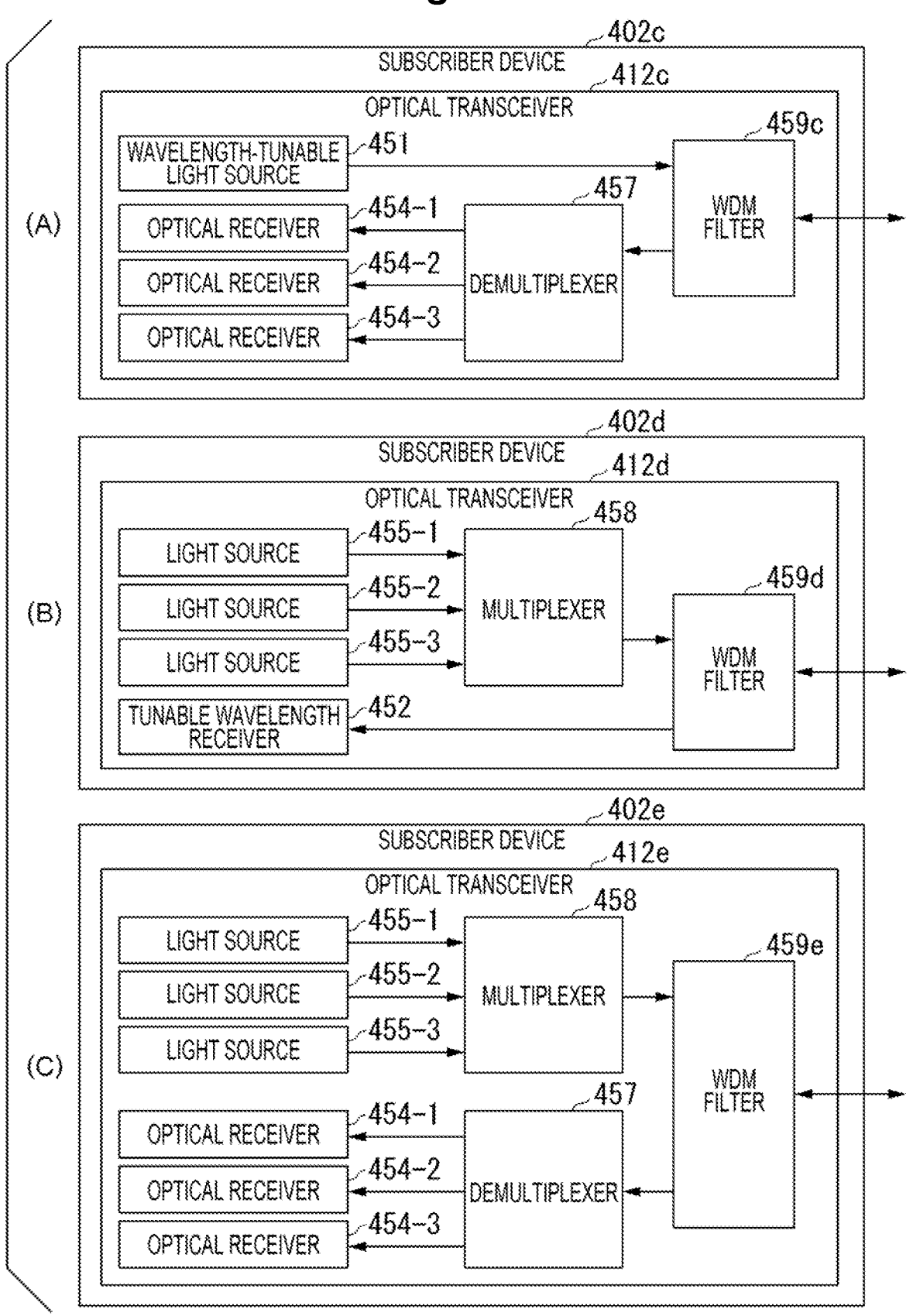
FIG. 32 is a diagram illustrating a configuration example of a single-core subscriber device in a basic configuration.
Figure 33:
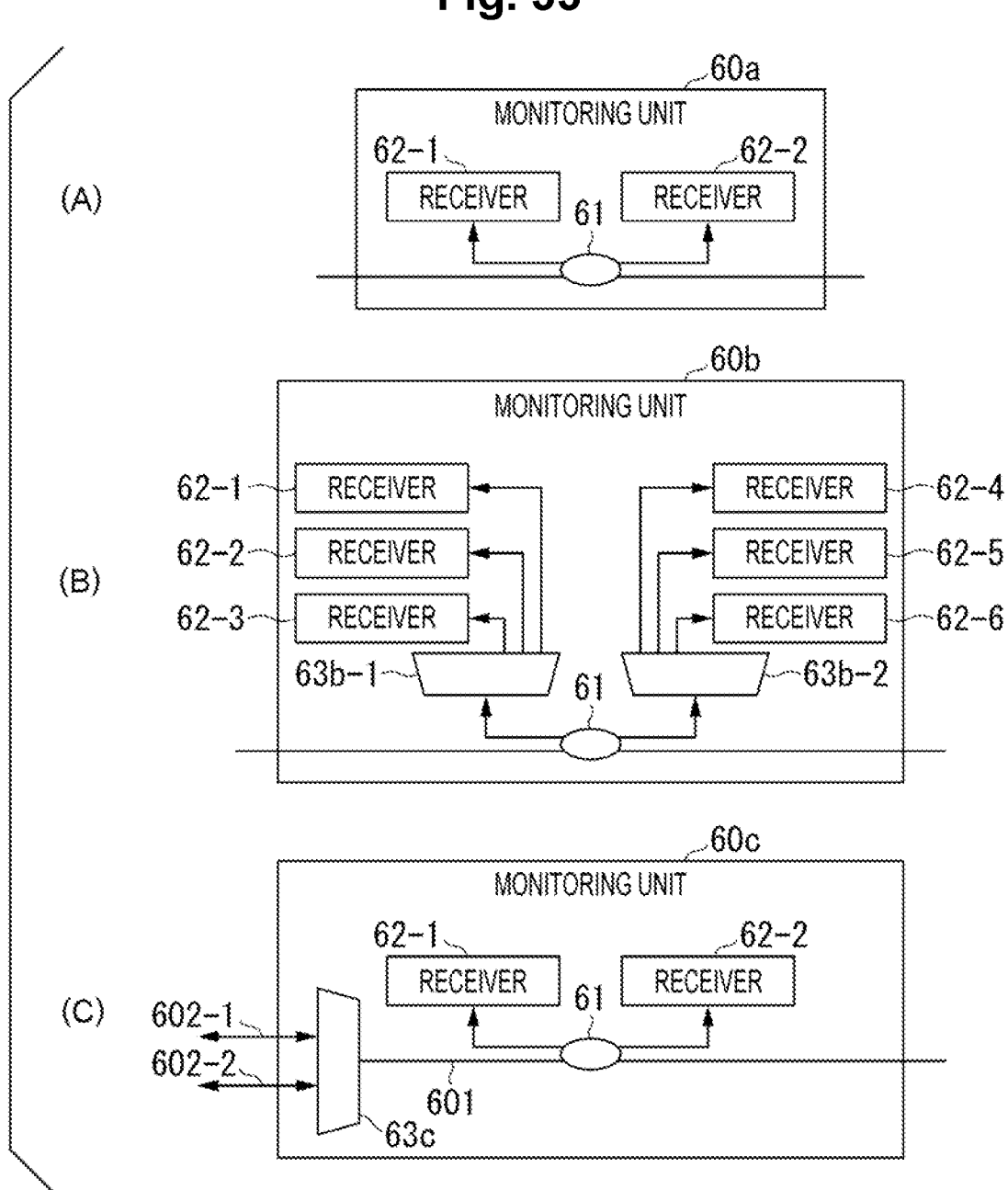
FIG. 33 is a diagram illustrating a configuration example of a monitoring unit in a basic configuration.
Figure 34:
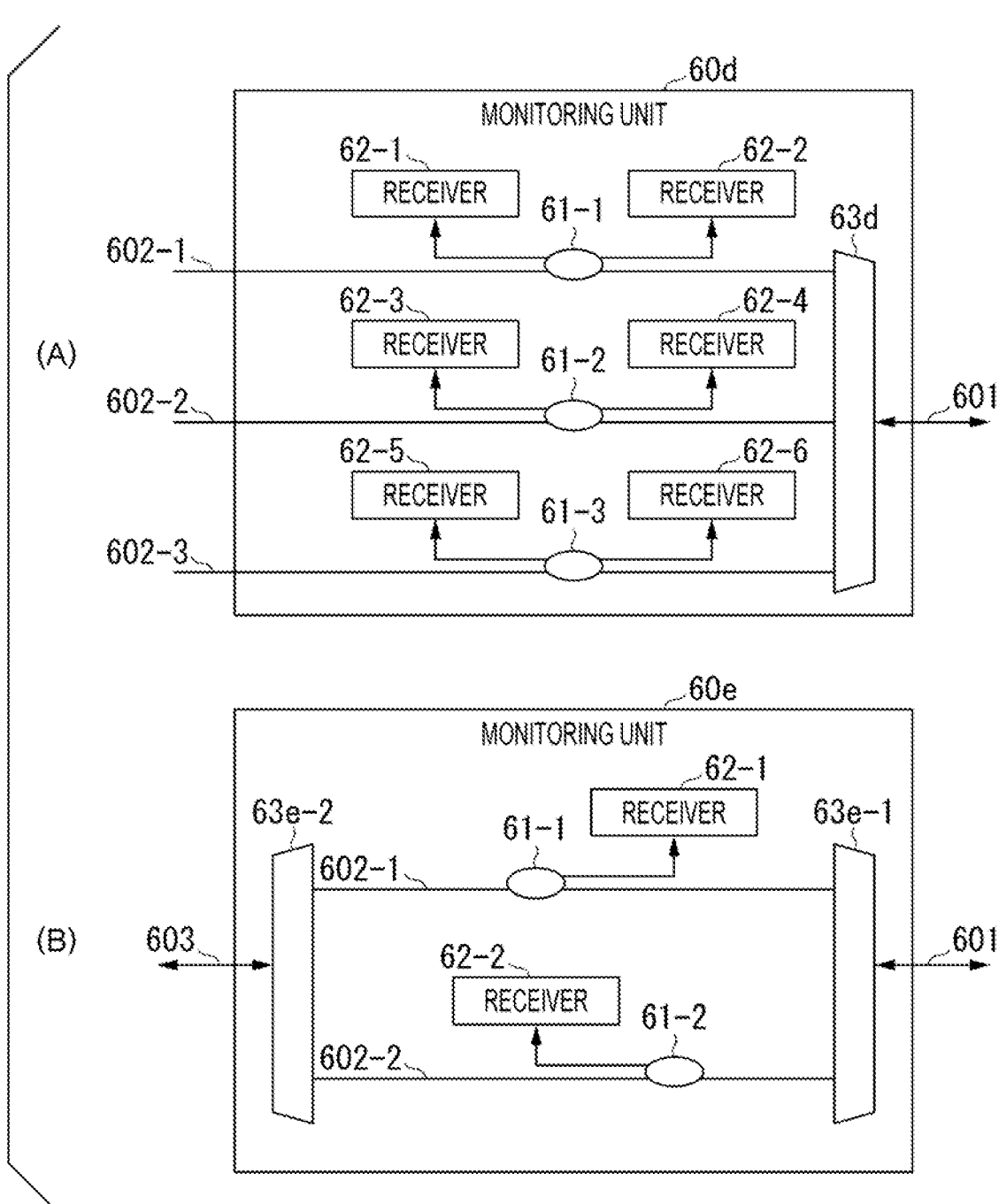
FIG. 34 is a diagram illustrating a configuration example of a monitoring unit in a basic configuration.

FIGS. 31 and 32 are diagrams illustrating configurations of single-core subscriber devices 402. The subscriber device 402 illustrated in FIG. 31(A) includes an optical transceiver 412. The optical transceiver 412 includes a wavelength-tunable light source 451, a tunable wavelength receiver 452, and a WDM filter 459. The optical transceiver 412 illustrated in FIG. 31(A) is different from the optical transceiver 411 illustrated in FIG. 29(A) in that the WDM filter 459 is further provided. The WDM filter 459 separates the uplink signal and the downlink signal in accordance with a wavelength. The WDM filter 459 outputs the optical signal generated by the wavelength-tunable light source 451 to the transmission line, and outputs the optical signal input from the transmission line to the tunable wavelength receiver 452. Like the subscriber device 401, the subscriber device 402 further includes an external modulator and can output a main signal (or a signal obtained by superimposing a control signal on the main signal) using the external modulator.

Here, the WDM filter 459 illustrated in FIGS. 31 and 32 may be a power splitter. The WDM filter 459 is appropriate for a case where an insertion loss is sufficiently low with respect to the power splitter and the wavelengths used on the transmission side and the reception side do not overlap. The case where the wavelengths used on the transmission side and the reception side overlap each other is appropriate, for example, in the case of folded communication or the like between the same type of subscriber devices.

In FIGS. 31 and 32, the WDM filter 459 is contained in the optical transceiver 412, but may be outside of the optical transceiver 412 or outside of the subscriber device 40.

The subscriber device 402a illustrated in FIG. 31(B) includes an optical transceiver 412a. The optical transceiver 412a includes a wavelength-tunable light source 451, a wavelength-tunable filter 453, an optical receiver 454, and a WDM filter 459a. The optical transceiver 412a illustrated in FIG. 31(B) is different from the optical transceiver 411a illustrated in FIG. 29(B) in that a WDM filter 459a is further provided. The WDM filter 459a separates the uplink signal and the downlink signal in accordance with a wavelength. The WDM filter 459a outputs the optical signal generated by the wavelength-tunable light source 451 to the transmission line, and outputs the optical signal input from the transmission line to the wavelength-tunable filter 453. The subscriber device 402 on the reception side may not use the wavelength-tunable filter 453 in accordance with the configuration of the optical SW, a multiplexing scheme, or the like.

The subscriber device 402b illustrated in FIG. 31(C) includes an optical transceiver 412b. The optical transceiver 412b includes a light source 455, a wavelength-tunable filter 456, a tunable wavelength receiver 452, and a WDM filter 459b. The optical transceiver 412b illustrated in FIG. 31(C) is different from the optical transceiver 411b illustrated in FIG. 29(C) in that a WDM filter 459b is further provided. The WDM filter 459b separates an uplink signal and a downlink signal in accordance with a wavelength. The WDM filter 459b outputs the optical signal that has passed through the wavelength-tunable filter 456 to the transmission line and outputs the optical signal input from the transmission line to the tunable wavelength receiver 452.

The subscriber device 402c illustrated in FIG. 32(A) includes an optical transceiver 412c. The optical transceiver 412c includes a wavelength-tunable light source 451, a plurality of optical receivers 454-1 to 454-3, a demultiplexer 457, and a WDM filter 459c. The optical transceiver 412c illustrated in FIG. 32(A) is different from the optical transceiver 411c illustrated in FIG. 30(A) in that a WDM filter 459c is further provided. The WDM filter 459c separates the uplink signal and the downlink signal in accordance with a wavelength. The WDM filter 459c outputs the optical signal generated by the wavelength-tunable light source 451 to the transmission line and outputs the optical signal input from the transmission line to the demultiplexer 457.

A subscriber device 402d illustrated in FIG. 32(B) includes an optical transceiver 412d. The optical transceiver 412d includes a plurality of light sources 455-1 to 455-3, a multiplexer 458, a tunable wavelength receiver 452, and a WDM filter 459d. The optical transceiver 412d illustrated in FIG. 32(B) is different from the optical transceiver 411d illustrated in FIG. 30(B) in that a WDM filter 459d is further provided. The WDM filter 459d separates the uplink signal and the downlink signal in accordance with a wavelength. The WDM filter 459d outputs the optical signal multiplexed by the multiplexer 458 to the transmission line and outputs the optical signal input from the transmission line to the tunable wavelength receiver 452.

A subscriber device 402e illustrated in FIG. 32(C) includes an optical transceiver 412e. The optical transceiver 412e includes a plurality of light sources 455-1 to 455-3, a multiplexer 458, a plurality of optical receivers 454-1 to 454-3, a demultiplexer 457, and a WDM filter 459e. The optical transceiver 412e illustrated in FIG. 32(C) is different from the optical transceiver 411e illustrated in FIG. 30(C) in that the WDM filter 459e is further provided. The WDM filter 459e separates the uplink signal and the downlink signal in accordance with a wavelength. The WDM filter 459e outputs the optical signal multiplexed by the multiplexer 458 to the transmission line and outputs the optical signal input from the transmission line to the demultiplexer 457.

It is preferable to combine a plurality of branch combiners/splitters or multiplexers if wavelengths to be multiplexed/demultiplexed after combination are equal. That is, the demultiplexer 457 and the multiplexer 458, the multiplexer 458 and the WDM filter 459e, the demultiplexer 457 and the WDM filter 459e, and the demultiplexer 457, the multiplexer 458, and the WDM filter 459e may be collected.

The configurations of the single-core subscriber device 401 and the double-core subscriber device 402 have been described above. In the present invention, any of the configurations illustrated in FIGS. 29 to 32 may be used as the subscriber device 40.

Next, configuration examples of the monitoring unit and the monitoring unit 65 will be described. First, in the foregoing description, a signal is branched and monitored using a power splitter, but a medium in which a gain, an applied voltage, a current, or a resistance changes due to conduction of the signal at a frequency of at least about a carrier wave of the AMCC, for example, a semiconductor amplifier or the like, may be incorporated in a transmission line without branching. The wavelength-multiplexed signal may also be monitored without being branched by using a medium that has high wavelength dependency on changes in a gain, a voltage, a current, resistance, or the like using a superlattice structure such as multiple quantum well (MQW) or a photonic crystal.

Hereinafter, a configuration example of the monitoring unit 60 and the monitoring unit 65 will be described with reference to FIGS. 33 to 37 in the case of branching. In FIGS. 33 to 37, the monitoring unit 60 will be described as an example. Although FIGS. 33 to 37 illustrate examples of monitoring in an uplink direction and a downlink direction, the monitoring unit 60 may monitor only one direction output from the subscriber device 40, for example, from the viewpoint of monitoring any one device, for example, the subscriber device 40. In the case of an example of only one direction, both directions are obtained, for example, by replacing a transmitter and a receiver with a combination of a transmitter and a receiver connected to a transceiver, a power splitter, or a multiplexer/demultiplexer.

Although the receiver and the transmitter in proximity to the power splitter 61, the multiplexer/demultiplexer, and the like branched from the transmission line are described. The receiver and the transmitter may be arranged far away, for example, via one or a plurality of optical SWs, and the receiver and the transmitter of the control unit may be connected to the receiver and the transmitter of the monitoring unit 60 on the assumption that the receiver and the transmitter of the control unit also serve as the receiver and the transmitter of the monitoring unit 60.

The monitoring unit 60 monitors an optical signal. At the time of monitoring, an optical receiver or an optical transceiver is arranged near the branch combiner/splitter or the multiplexer/demultiplexer or at a location where an optical signal can be connected. The branch combiner/splitter or the multiplexer/demultiplexer branches the optical signal, and the monitoring unit 60 performs monitoring by a received optical signal, and further receives a control signal superimposed on the received optical signal.

The monitoring unit 60 includes a branch combiner/splitter or a multiplexer/demultiplexer provided at a port, a transmission line, or a connection point thereof on the input side, the passing side, or the output side of the optical SW, and a blocking unit that blocks a main signal depending on a case. For example, a multiplexer/demultiplexer may be disposed at the port 11-2 on the ground side, the transmission line 2, or a connection point thereof. An uplink optical signal from the optical SW and a downlink optical signal input from another ground or an upper network may be separated in accordance with a wavelength of the input optical signal and may be output to the optical SW. The disposition of the blocking unit in the case of including the blocking unit is preferably in a multiplexed or merged state, for example, in a case where the disposition is set or changed in both upper and lower directions, and is preferably in a demultiplexed or branched state, for example, in a case where the disposition is separately set or changed in upper and lower directions.

The monitoring unit 60 may be connected via an optical SW different from the optical SW to which the subscriber device 40 to be controlled is connected. For example, an optical signal separated from the transmission line through which the branch combiner/splitter transmits the optical signal of the subscriber device 40 to be controlled is input to the optical SW connected to the monitoring unit 60 separately from the connection of the subscriber device 40, is multiplexed as necessary, is transmitted to the optical SW connected to the monitoring unit 60, and is connected to the monitoring unit 60. Alternatively, the optical signal is directly input to the optical SW connected to the control unit or the monitoring unit 60 without being input to the optical SW.

The branch combiner/splitter or the multiplexer/demultiplexer may divide the ports included in the optical SW into a plurality of groups, and may be provided in the port 11-2 belonging to one group in a case where the ports are not connected in the group, the transmission line 2 connected thereto, or the transmission line 2 connected to the port 2. The branching may be performed before or after the wavelength separation. The multiplexer/demultiplexer may be provided closer to the optical SW than the multiplexer/demultiplexer for vertical multiplexing, or may be provided closer to the transmission line. When the multiplexer/demultiplexer is provided on the transmission line side, uplink and downlink optical signals transmitted through the transmission line can be branched by one device. In this case, the branched uplink optical signal and downlink optical signal are input to the port of each optical SW. The optical SW outputs an input optical signal from a port connected to the monitoring unit 60. Accordingly, the monitoring unit 60 receives the branched optical signal.

A monitoring unit 60a illustrated in FIG. 33(A) illustrates a specific configuration of the monitoring unit 60. The monitoring unit 60a includes the power splitter 61 and a plurality of receivers 62-1 to 62-2. The receivers 62-1 and 62-2 receive the optical signals branched by the power splitter 61. The number of receivers 62-1 to 62-2 corresponding to the number of branches of the power splitter 61 may be provided. FIG. 33(A) illustrates an example in which 2×2 power splitters 61 are used, and a sum of the number of branches (2)–the path (1) of the main signal=1 except for a path of the main signal on the input side and the output side is each one. In the case of a 3×3 power splitters 61, two receivers can be provided. From the viewpoint of a reduction in an influence of reflection and the like, the power splitter 61 of 1×2, 1×3, or the like that does not include the ports not to be monitored may be used. In this case, the receiver 62-1 or 62-2 may set the number of branches (2)–the main signal path (1)=1 and the number of branches (1)–the main signal path (1)=0; the number of branches (3)–the main signal path (1)=2 and the number of branches (1)–the main signal path (1)=0.

Note that a path other than the main signal branched by the power splitter 61 may be branched and received as in the WDM device 63b of FIG. 33(B), or a plurality of power splitters 61 may be installed in the main signal path and may be branched and received.

A monitoring unit 60a illustrated in FIG. 33(A) illustrates a specific configuration of the monitoring unit 60. The monitoring unit 60a includes the power splitter 61 and a plurality of receivers 62-1 to 62-2. The receivers 62-1 and 62-2 receive the optical signals branched by the power splitter 61. The number of receivers 62 is not particularly limited.

A monitoring unit 60b illustrated in FIG. 33(B) illustrates a specific configuration of the monitoring unit 60. The monitoring unit 60b includes a power splitter 61, a plurality of receivers 62-1 to 62-6, and a plurality of WDM devices 63b-1 to 63b-2. The receivers 62-1 to 62-3 are connected to the WDM device 63b-1. The receivers 62-4 to 62-6 are connected to the WDM device 63b-2. The WDM device 63b-1 demultiplexes an optical signal branched by the power splitter 61 and outputs the demultiplexed optical signals to the receivers 62-1 to 62-3. The WDM device 63b-2 demultiplexes an optical signal branched by the power splitter 61 and outputs the demultiplexed optical signals to the receivers 62-4 to 62-6. The number of the WDM devices 63b is not particularly limited.

The monitoring unit 60c illustrated in FIG. 33(C) includes a power splitter 61, a plurality of receivers 62-1 to 62-2, and a WDM device 63c. The WDM device 63c multiplexes the plurality of input optical signals and outputs the multiplexed optical signal to the transmission line 601. The WDM device 63c demultiplexes an optical signal input from the transmission line 601 and outputs the demultiplexed optical signals to transmission lines 602-1 and 602-2.

A monitoring unit 60d illustrated in FIG. 34(A) includes a plurality of power splitters 61-1 to 61-3, a plurality of receivers 62-1 to 62-6, and a WDM device 63d. The transmission line 602-1 is provided with the power splitter 61-1, the transmission line 602-2 is provided with the power splitter 61-2, and the transmission line 602-3 is provided with the power splitter 61-3. The receivers 62-1 and 62-2 are connected to the power splitter 61-1, receivers 62-3 and 62-4 are connected to the power splitter 61-2, and receivers 62-5 and 62-6 are connected to the power splitter 61-3. The WDM device 63d demultiplexes an optical signal input from the transmission line 601 and outputs the demultiplexed optical signals to the transmission lines 602-1 to 602-3. The WDM device 63d multiplexes the optical signals input from the transmission lines 602-1 to 602-3 and outputs the multiplexed optical signal to the transmission line 601.

In FIG. 34(A), the receivers 62-1 to 62-6 are respectively provided in the transmission lines 602-1 to 602-3 after demultiplexing by the WDM device 63d when viewed from the transmission line 601, or before multiplexing by the WDM device 63d when viewed from the transmission line 602, but the receivers 62 may not be provided in a transmission line that does not require reception.

A monitoring unit 60e illustrated in FIG. 34(B) includes a plurality of power splitters 61-1 and 61-2, a plurality of receivers 62-1 and 62-2, and a plurality of WDM devices 63e-1 and 63e-2. The transmission lines 602-1 and 602-2 are provided between the WDM devices 63e-1 and 63e-2. The power splitter 61-1 is provided in the transmission line 602-1, and the power splitter 61-2 is provided in the transmission line 602-2. The receiver 62-1 is connected to the power splitter 61-1 and the receiver 62-2 is connected to the power splitter 61-2. The WDM device 63e-1 demultiplexes an optical signal input from the transmission line 601 and outputs the demultiplexed optical signals to the transmission lines 602-1 and 602-2. The WDM device 63e-1 multiplexes the optical signals input from the transmission lines 602-1 and 602-2 and outputs the multiplexed optical signal to the transmission line 601. The WDM device 63e-2 demultiplexes the optical signal input from the transmission line 603 and outputs the demultiplexed optical signals to the transmission lines 602-1 and 602-2. The WDM device 63e-2 multiplexes the optical signals input from the transmission lines 602-1 and 602-2 and outputs the multiplexed optical signal to the transmission line 603.

In FIG. 34(B), the receivers 62-1 and 62-2 are provided in the transmission lines 602-1 and 602-2 after demultiplexing and before multiplexing, but the receiver 62 may not be provided in a transmission line that does not require reception.

The monitoring unit may control the subscriber device 40. When the control signal is exchanged with the subscriber device 40, the monitoring unit may set or change a wavelength of the subscriber device 40 like the control unit 20. However, when the setting, particularly, changing the wavelength, an optical signal other than the wavelength set at the time of the change does not reach an unintended destination. Therefore, it is preferable to perform setting such that an output from the target device does not reach the destination until the change is completed.

A configuration controlled by the monitoring unit will be described with reference to FIG. 35.

A monitoring unit 60f illustrated in FIG. 35(A) includes the power splitter 61, a plurality of receivers 62-1 and 62-2, and a modulator 64. The transmission line 601 is provided with the power splitter 61 and the modulator 64. As described above, in the monitoring unit a modulator is provided in the middle of the path of the main signal, and the main signal is modulated by the modulator 64. As the modulator, modulation may be performed by an amplifier that modulates an amplification factor according to an external modulator or a control signal, gain saturation according to an optical signal from the monitoring unit 60f, intermodulation, nonlinear effects such as four-wave mixing and the Raman effect, or the like.

As long as an extinction ratio of the modulator is high enough not to affect other optical signals, the modulator may also serve as a blocking unit.

Although FIG. 35(A) illustrates the configuration in which the monitoring unit 60f includes the power splitter 61, the receivers 62-1 and 62-2, and the modulator 64, the modulator 64 can be replaced with a device capable of modulating an intensity monitor of an input and an output at a frequency of about a carrier wave of the AMCC, for example, an optical semiconductor amplifier of a multi-electrode.

In the case of modulation with external light, the power splitter 61 also serves as a modulator without separately providing the modulator 64. The power splitter 61 includes a semiconductor optical amplifier, a highly nonlinear fiber (HNLF), a nonlinear optical crystal, or a periodically poled optical element (for example, periodically polarized potassium titanyl phosphate (PPKTP), periodically polarized lithium niobate (PPLN), and periodically polarized lithium tantalate (PPLT)) that facilitates quasi-phase matching for nonlinear interaction, which have large gain saturation and a large nonlinear effect, and acts a signal and external light.

When a signal that has already been modulated by the AMCC is re-modulated, an influence of the previous modulation is assumed. In such a case, a frequency band of the control signal is preferably different from the previous modulated frequency band. For example, when a modulation band of a signal is B to the degree that modulation sidebands of previous modulation and new modulation do not overlap each other, a difference between the frequency bands may be set to be equal to or greater than 2B from the viewpoint of preventing interference, or may be conversely set to about 0.5 times to 0.8 times on the assumption that the signal is cut out by a filter. In addition, the modulation may be performed by another modulator 64 after the inverse modulation illustrated in FIG. 35(B). In this case, since the influence of the previously modulated signal is reduced, the frequency bands may overlap. Modulation may be performed with a signal corresponding to a product of the inverse modulation of the previously modulated signal and the new modulation, and modulation in the plurality of modulators 64 may be performed by modulation of one modulator 64.

In order to reduce the influence of the AMCC on the main signal, the monitoring unit 60f may perform the process described with reference to FIG. 35(B).

As illustrated in FIG. 35(B), the monitoring unit 60f may modulate the main signal modulated by the AMCC using the same modulation scheme as that of the AMCC received by the receiver 62-2 and a reverse signal (in the case of I/O intensity modulation, 0 is superimposed on a signal modulated by 1, 1 is superimposed on a signal modulated by 0, and the modulation has an opposite phase and an intensity that exactly offsets the signal). Accordingly, the influence of the AMCC on the main signal can be reduced.

Figure 36:
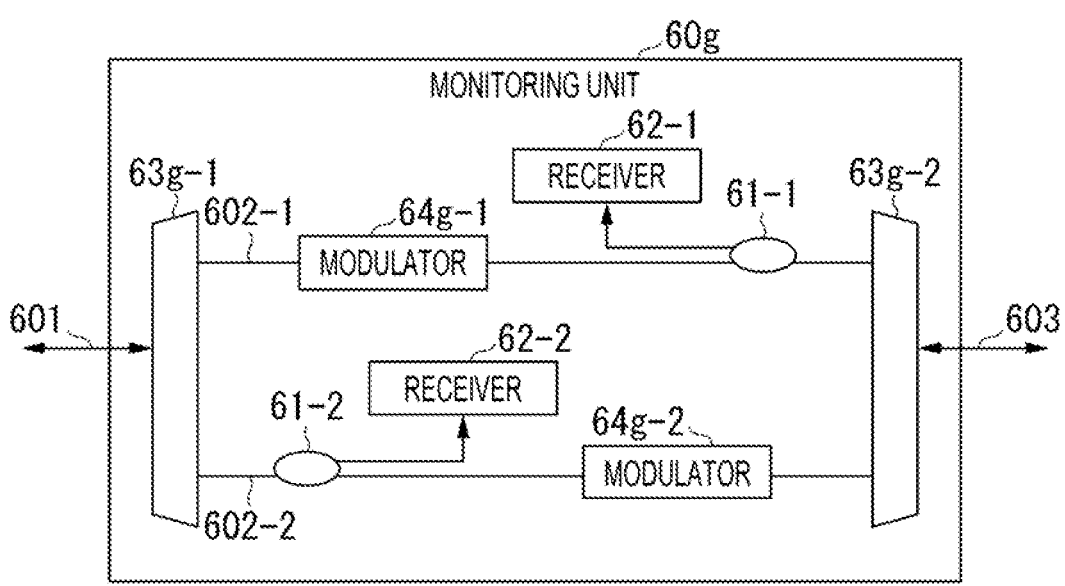
FIG. 36 is a diagram illustrating a configuration example of a monitoring unit in a basic configuration.

A monitoring unit 60g illustrated in FIG. 36 includes a plurality of power splitters 61-1 to 61-2, a plurality of receivers 62-1 to 62-2, a plurality of WDM devices 63g-1 to 63g-2, and a plurality of modulators 64g-1 to 64g-2. The transmission lines 602-1 and 602-2 are provided between the WDM device 63g-1 and the WDM device 63g-2. The transmission line 602-1 is provided with a modulator 64g-1 and a power splitter 61-1, and the transmission line 602-2 is provided with a 64g-2 and a power splitter 61-2. The receiver 62-1 is connected to the power splitter 61-1 and the receiver 62-2 is connected to the power splitter 61-2. The WDM device 63g-1 demultiplexes an optical signal input from the transmission line 601 and outputs the demultiplexed optical signals to the transmission lines 602-1 to 602-2. The WDM device 63g-1 multiplexes optical signals input from the transmission lines 602-1 to 602-2 and outputs the multiplexed optical signal to the transmission line 601. The WDM device 63e-2 demultiplexes the optical signal input from the transmission line 603 and outputs the demultiplexed optical signals to the transmission lines 602-1 and 602-2. The WDM device 63e-2 multiplexes the optical signals input from the transmission lines 602-1 and 602-2 and outputs the multiplexed optical signal to the transmission line 603. The optical signals input from the transmission lines 602-1 to 602-2 to the WDM device 63e-1 and the WDM device 63e-2 are modulated by modulators 64g-1 and 64g-2.

In FIG. 36, the branched optical signals are modulated after being received by the receivers 62-1 to 62-2. However, when it is not necessary to consider quality of the received optical signals in modulation, for example, deterioration in a signal-to-noise ratio (SN) of a received control signal or the like, the modulated optical signal may be branched by the power splitters 61-1 to 61-2 and may be received by the receivers 62-1 to 62-2.

A configuration in which the monitoring unit uses a transmitter will be described. Like the subscriber device 40 and the control unit 20, the monitoring unit includes optical transceivers, that is, optical transceivers with a tunable wavelength or a non-tunable wavelength, and is connected to a port of the optical SW. If the transmitter is a tunable wavelength transmitter, an optical signal with an any wavelength can be transmitted. The monitoring unit transmits a control signal to the subscriber device 40 by an optical signal. The power splitter of a transmission line for transmitting an optical signal of the subscriber device 40 to be controlled merges the control signal with the optical signal transmitted through the transmission line. In this configuration, even in a state where the subscriber device 40 is performing normal communication, the monitoring unit can receive a connection destination change request or the like from the subscriber device 40, transmit a control signal, and perform wavelength switching or the like to the subscriber device 40. A specific configuration in which the monitoring unit includes a transmitter will be described below.

When the subscriber device 40 performs normal communication, communication with the control unit 20 in a case where the control unit 20 controls the subscriber device 40 by an optical signal directly or via an optical SW or the like cannot be performed. Since the monitoring unit includes the transmitter, it is possible to give an instruction for various settings of the subscriber device 40. That is, the monitoring unit inputs the optical signal inserted and separated into the transmission line through which the optical signal is transmitted to the subscriber device 40 to be controlled by the power splitter.

An example will be described using AMCC. Usually, the AMCC modulates the main signal and the AMCC signal with a signal obtained by superimposing the main signal and the AMCC signal at an electrical stage or further modulates the main signal at an optical stage. In contrast, the transmitter of the monitoring unit inputs and multiplexes an optical signal corresponding to the control signal separately from the main signal. The wavelength of the optical signal corresponding to the control signal is a wavelength that passes through the same path as that of the main signal from the transmitter to a location where at least the control signal corresponding to the AMCC is received. The monitoring unit does not modulate the main signal but performs intensity modulation or the like on the separately input optical signal intensity at a frequency of a carrier wave of the AMCC, so that an optical signal obtained by combining the main signal and the control signal corresponding to the AMCC is equivalent to the optical signal modulated at the frequency of the carrier wave of the AMCC.

Here, the example in which the intensity modulation of the control signal is received along with the main signal has been described. In the case of phase modulation or the like, the control signal may be received using delay detection or local light.

Here, when a wavelength difference between the main signal and the control signal corresponding to the AMCC is separated to the extent that beat noise can be ignored, for example, a sum of the line widths of both pieces of light, and if the line widths are equal, the distance is twice or more the line width, demodulation can be performed in the same way as in the case of modulation with the AMCC similarly to an average value of the light intensities of both pieces of light for a time of one bit or one baud of the AMCC. When the modulation sideband at the frequency of the carrier wave in the AMCC and the modulation sideband at the bit rate or the baud rate of the main signal are superimposed, it is difficult to perform demodulation in direct detection with the same modulation as usual. However, for example, coherent reception or the like may be performed, and reception may be performed after removal at an electrical stage through maximum likelihood determination or the like, or the phase of the light of the optical signal of the control signal corresponding to the AMCC may be synchronized with the phase of the light of the optical signal of the main signal. The phase synchronization can be performed even when the AMCC is modulation using the phase. In this case, modulation is performed such that the phase after multiplexing becomes the phase after modulation.

For example, the intensity and wavelengths of the signal light and the control light may be measured by different measurement means or may be measured by the same measurement means such that the optical signal of the main signal and a part of the optical signal input from the transmitter of the monitoring unit to the power splitter can be received by a receiver of the monitoring unit. The latter has an effect that the measurement means is less. For example, an influence of beat noise between pieces of multiplexed light on the main signal may be observed and adjusted. For example, the main signal is measured before the control light is multiplexed. Thereafter, the signal after multiplexing of the control light is equivalent to the signal to which the desired AMCC is applied, or the influence of the beat noise between the pieces of multiplexed light on the main signal is measured. Then, the intensity and wavelength of the optical signal of the control signal are adjusted. In the case of phase synchronization, feedback may be performed in measurement after the multiplexing.

Figure 37:
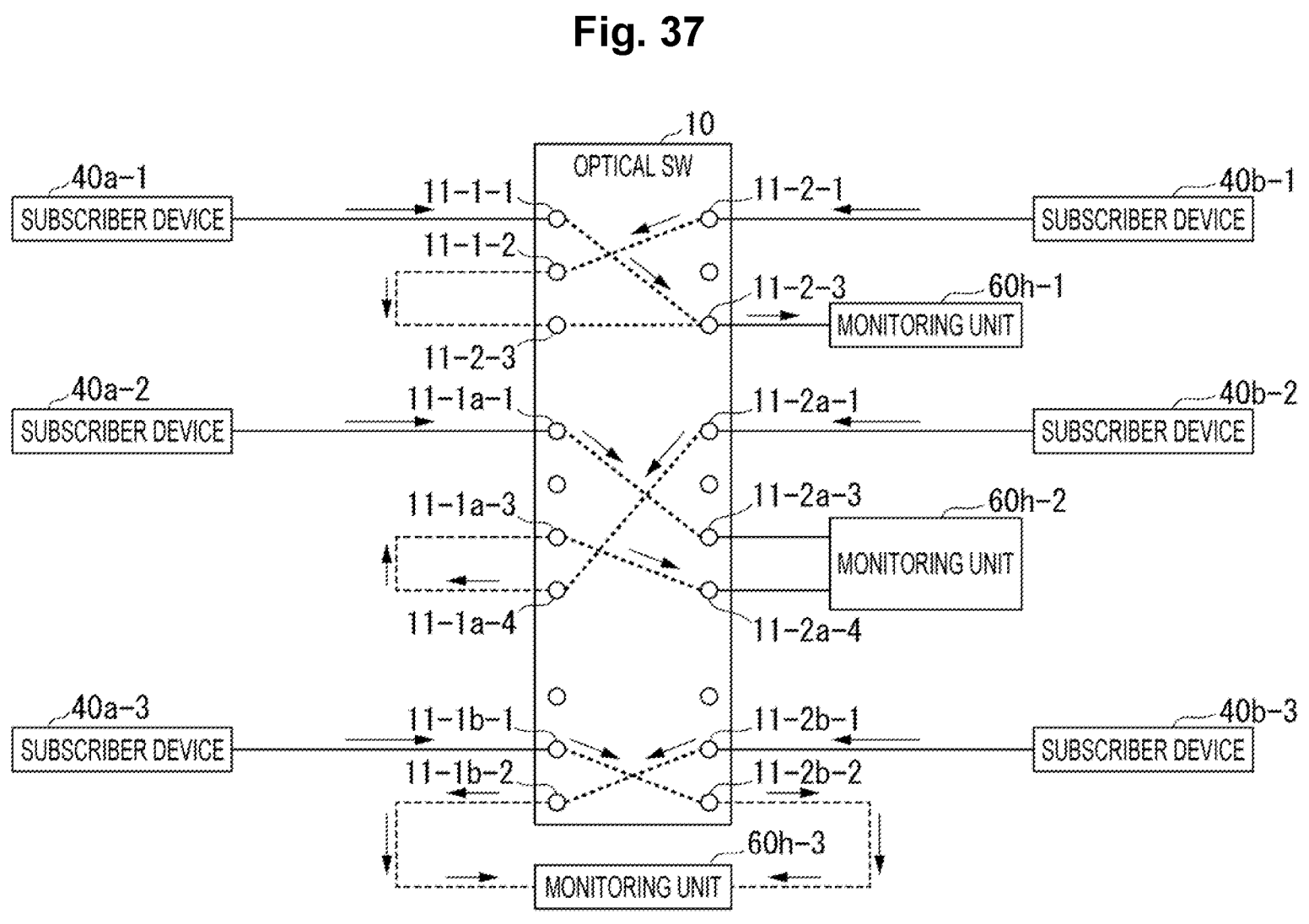

Next, an example of another configuration in which a transmitter is used in the monitoring unit will be described with reference to FIG. 37. Instead of being installed in a port, a transmission line, or a connection point thereof of the optical SW 10, as illustrated in FIG. 37, the control unit 20 may loop using a folded transmission line (the upper side in the drawing) or may cross the optical SW 10 (the lower side in the drawing) like an electrical processing unit to be described below.

For example, a monitoring unit 60h terminates the main signal, and the transmitter transmits an optical signal obtained by superimposing the AMCC on a photoelectrically converted main signal and further modulating the optical signal modulated with the main signal by the AMCC. Unlike the monitoring unit 60h, as described above, the monitoring unit 60h does not include a power splitter that combines and branches the main signal, but may be similarly installed in a port, a transmission line, or a connection point thereof on the input side, the passing side, or the output side of the optical SW. In this configuration, since the signal is once terminated, a wavelength to the monitoring unit 60h and a wavelength from the monitoring unit may be different as long as they are wavelengths transmitted through a desired path.

The monitoring unit 60h may not include an optical receiver or an optical transceiver, and the branched optical signal may be transmitted and output to the control unit 20 via the optical SW 10, for example. When the optical signal is output to the control unit 20, the control unit 20 includes an optical receiver or an optical transceiver, and the monitoring unit 60h is a function of setting a path between a power splitter or a multiplexer/demultiplexer provided in a port or a transmission line on an input side, a passing side, or an output side of the optical SW, or a connection point thereof, a path until the control unit 20, and a path of the power splitter or the multiplexer/demultiplexer as necessary.

The path may be realized by the optical SW, and the setting may also be performed by the control unit.

The monitoring unit 60*h* may include an optical receiver or an optical transceiver and may further include a blocking unit. In the initial setting, the setting change, and the abnormality detection, the path from the monitoring unit to the output destination may be blocked (corresponding to #input monitoring) or blocked (corresponding to #output monitoring) by the blocking unit to set, change, and block the subscriber device.

As described above, the monitoring units 60 to 60*h* monitor optical signals. The monitoring units 60 to 60*h* perform monitoring by an optical signal branched by a power splitter or a WDM device and further receive a control signal superimposed on the received optical signal. Although FIGS. 33 to 37 illustrate the configuration in which the monitoring units 60 to 60*h* includes the receiver 62, the monitoring units 60 to 60*h* may include transmitters.

The monitoring units 60 to 60*h* may be connected via an optical SW different from the optical SW connected to the subscriber device 40 to be controlled. In this case, the optical signal separated by the power splitter 61 in the transmission line through which the optical signal of the subscriber device 40 to be controlled is transmitted is input to the optical SW different from the optical SW connected to the subscriber device 40 and connected to the monitoring units 60 to 60*h*. At this time, the signals are multiplexed as necessary, are transmitted to the optical SW connected to the monitoring units 60 to 60*h*, and are connected to the monitoring units 60 to 60*h*.

In the following description, the monitoring units 60 to 60*h* will be described as the monitoring unit 60 unless otherwise particularly distinguished.

Hereinafter, an example of an optical access system using the optical SW that has the above-described functions will be described.

(Configuration Example of Optical Access System 100)

Figure 38:
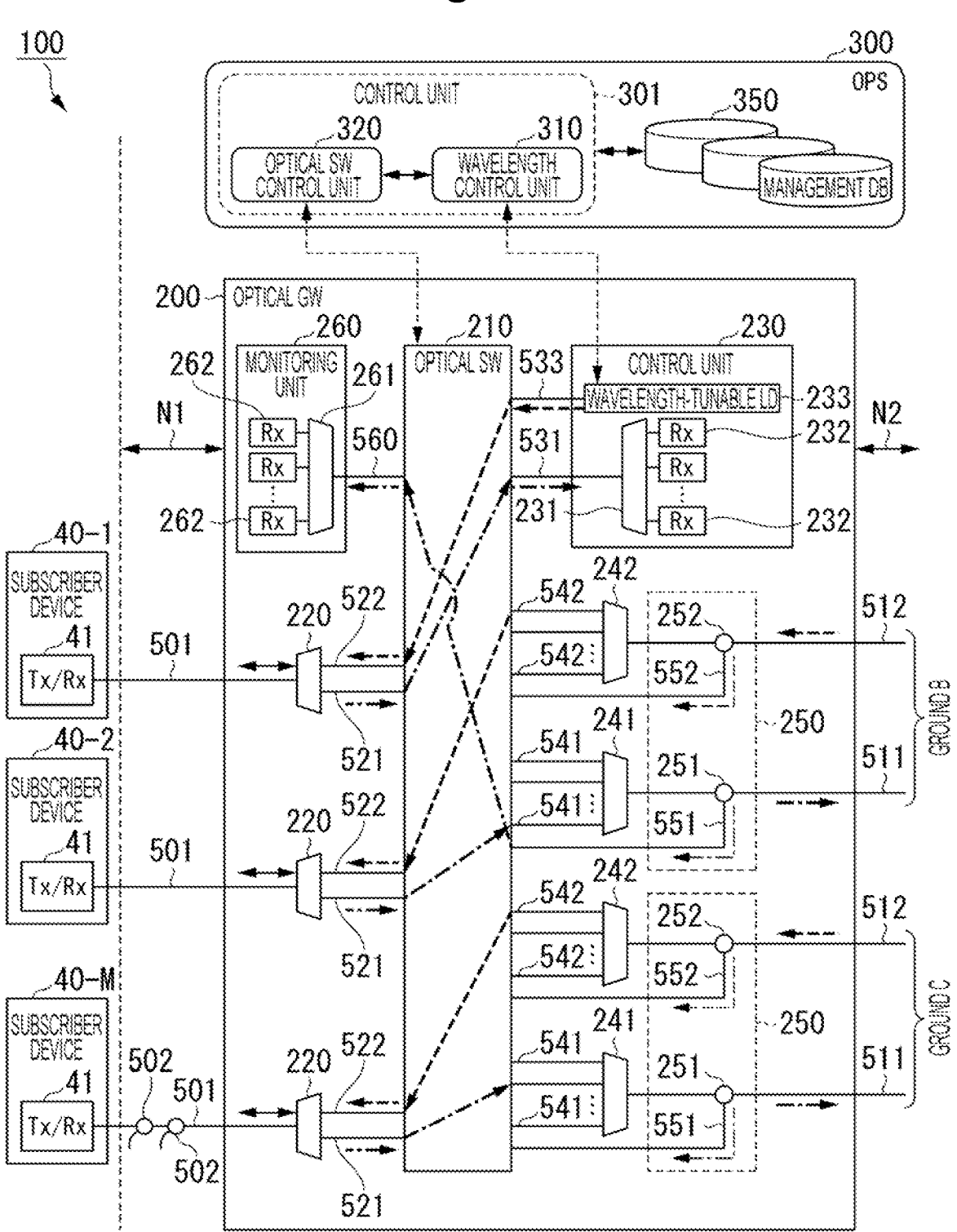
FIG. 38 is a diagram illustrating a configuration example of an optical access system according to a configuration example.

FIG. 38 is a diagram illustrating a configuration example of the optical access system 100. The optical access system 100 includes an optical gateway (GW) 200 and an operation system (OPS) 300. The OPS 300 may be integrated with the control unit 20, and both the OPS 300 and the control unit 20 may be referred to as a control unit or an OPS as a representative. The subscriber device 40 is communicably connected to a higher network such as the optical communication network 30 illustrated in FIG. 1 by the optical access system 100.

The subscriber device 40 is a device on the optical subscriber side. The subscriber device 40 is connected to the optical GW 200 via a transmission line 501. The transmission line 501 is, for example, an optical fiber. The optical GW 200 is a device in a communication station. The subscriber device 40 denoted by reference sign N1 and the optical GW 200 are connected via, for example, the transmission line 501 or the power splitter 502. The configuration of the network connected from the subscriber device 40 to the optical GW 200 may be any of various network topologies such as a point-to-point (PtoP) configuration, a PON configuration, a bus type, a mesh type, a ring type, and a multi-ring type. For example, a power splitter 502 or the like may be included in the transmission line 501, and a plurality of subscriber devices 40 may be connected to one transmission line 501. The optical GW 200 is connected to another station, a core network, or the like via the transmission line 511 and the transmission line 512. The transmission line 511 and the transmission line 512 are, for example, optical fibers. The transmission line 511 transmits an uplink signal and the transmission line 512 transmits a downlink signal. The transmission lines 511 and 512 are examples of a multiplexing communication transmission line through which a wavelength-multiplexed optical signal is transmitted. The connection from the optical GW 200 denoted by reference sign N2 to another station or a core network is made by, for example, the transmission line 511 or 512 of an optical fiber, and is made such that the connection between grounds is a full mesh. In this configuration, a case where the optical GW 200 is installed in a station on the ground A and is connected to an optical communication device set in a station on the ground B and an optical communication device installed in a station on the ground C via the optical communication network 30 or the like will be described as an example. The optical communication devices on the grounds B and C to which the optical GW 200 is connected may be the optical GW 200.

The subscriber device 40 is connected to the optical GW 200 via a transmission line 501. The subscriber device includes the optical transceiver 41. The optical transceiver 41 is a wavelength-tunable optical transceiver. The optical transceiver 41 is, for example, an optical transceiver that mutually converts an optical signal and an electrical signal. The subscriber device 40 can select and set a unique wavelength in the optical transceiver 41 in accordance with a transmission/reception destination. The subscriber device 40 sets a wavelength to be used in the optical transceiver 41 in response to the instruction received from the optical GW 200. M (where M is an integer equal to or greater than 1) subscriber devices 40 connected to the optical GW 200 are referred to as subscriber devices 40-1 to 40-M.

The optical GW 200 includes an optical SW 210, a wavelength multiplexer/demultiplexer 220, a control unit 230, a multiplexer 241, a demultiplexer 242, a branching unit 250, and a monitoring unit 260. The monitoring unit 260 may be replaced with any one of the monitoring units 60 to 60*h* described above.

The optical SW 210 has a plurality of input/output ports (hereinafter referred to as a "port"), and connects two or more ports. The optical SW 210 can freely switch an optical path between ports. A port through which an uplink signal is input and output is referred to as an uplink port and a port through which a downlink signal is input and output is referred to as a downlink port. Each port of the optical SW 210 is connected to a transmission line.

The wavelength multiplexer/demultiplexer 220 performs vertical demultiplexing in which an uplink signal and a downlink signal are separated in accordance with a wavelength. The wavelength multiplexer/demultiplexer 220 inputs an uplink optical signal transmitted by the subscriber device 40 from the transmission line 501 and outputs the uplink optical signal to the optical SW 210 via a transmission line 521. The wavelength multiplexer/demultiplexer 220 inputs a downlink optical signal output from the optical SW 210 from a transmission line 522 and outputs the downlink optical signal to the subscriber device 40 via the transmission line 501.

The control unit 230 is connected to an uplink port and a downlink port to which the subscriber device 40 is not connected among the ports of the optical SW 210. An uplink port of the optical SW 210 is connected to a port on the transmission side of the control unit 230 by a transmission line 531. A downlink port of the optical SW 210 is connected to a port on the transmission side of the control unit 230 by a transmission line 533. The control unit 230 includes a wavelength demultiplexer 231, an optical receiver (Rx) 232 for each wavelength channel, and a wavelength-tunable transmitter 233. The wavelength demultiplexer 231 is, for example, an AWG. The wavelength demultiplexer 231 demultiplexes the light input to the port on the reception side via the transmission line 540 for each wavelength. The wavelength demultiplexer 231 outputs the demultiplexed light to the optical receiver 232 that receives an optical signal with the wavelength of the light. The wavelength-tunable transmitter 233 includes a wavelength-tunable laser diode (LD) that generates light with a tunable wavelength. The wavelength-tunable transmitter 233 transmits an optical signal with a tunable wavelength by using light generated by the wavelength-tunable laser diode. The wavelength-tunable transmitter 233 outputs an optical signal in which the generated light is used from the port on the transmission side to the transmission line 533.

The multiplexer 241 multiplexes the uplink optical signals with different wavelengths output from the plurality of transmission lines 541 by the optical SW 210 and outputs the multiplexed signal to the transmission line 511 connected to another ground. The demultiplexer 242 inputs an optical signal transmitted from any other ground from the transmission line 512 and demultiplexes the input downlink optical signal in accordance with a wavelength. The demultiplexer 242 inputs each of the demultiplexed downlink optical signals to the optical SW 210 via a plurality of transmission lines 542 connected to the uplink port corresponding to the wavelength of the optical signal.

The branching unit 250 is provided in the transmission lines 511 and 512. The branching unit 250 includes power splitters 251 and 252. The power splitter 251 branches an uplink optical signal transmitted along the transmission line 511 and inputs the signal to the optical SW 210 via the transmission line 551. The power splitter 252 branches a downlink optical signal transmitted through the transmission line 512 and inputs the signal to the optical SW 210 via the transmission line 552.

The monitoring unit 260 includes a wavelength demultiplexer 261 and an optical receiver (Rx) 262 for each wavelength. The wavelength demultiplexer 261 is connected to the optical SW 210 via a transmission line 560. The optical SW 210 outputs an optical signal input from a port connected to the transmission line 541 or the transmission line 542 to a port connected to the transmission line 560. Accordingly, the wavelength demultiplexer 261 receives the optical signal branched by the branching unit 250. The wavelength demultiplexer 261 demultiplexes the input optical signal for each wavelength. The wavelength demultiplexer 261 outputs the demultiplexed light to the optical receiver 262 receiving an optical signal with the wavelength of the light. The monitoring unit 260 monitors a state of communication transmitted and received by the subscriber device 40 by using the optical signal received by the optical receiver 262. The monitoring unit 260 may output a monitoring result to the control unit 230 or the control unit 301 included in the OPS 300. Here, the control unit 230 and the control unit 301 are used, but the control units may be the same. The monitoring unit 260 may output the monitoring result to the control unit 230, and the control unit 230 may output the output to the control unit 301. The control units 230 and 301 may be the same. In that case, the output from the control unit 230 to the control unit 301 may not be output to the outside of the control unit.

The OPS 300 includes a control unit 301 and a management DB 350. The control unit 301 is connected to the optical GW 200. The control unit 301 includes a wavelength control unit 310 and an optical SW control unit 320. The wavelength control unit 310 stores information indicating a wavelength of light used by each user (or each service). The wavelength control unit 310 dynamically allocates a wavelength to be used by each user with reference to this information. The wavelength control unit 310 may be installed in a building different from the optical GW 200 and may be connected to the optical SW 210 and the optical SW control unit 320 via a network. The wavelength control unit 310 manages and controls information which a port connected to the optical SW 210 and which user use which wavelength in real time by sharing each piece of connection information. The control unit 301 may be installed for each optical SW 210 or may be installed for each plurality of optical SWs. As described above, the wavelength control unit 310 performs a process similar to that of the wavelength control unit 25 in FIG. 2.

The control unit 301 is connected to the management database (DB) 350. The control unit 301 exchanges information regarding the user and the used wavelength with the management DB 350. The management DB 350 stores a use wavelength and destination information of each user. The destination is represented by, for example, ground A, ground B, or the like. The management DB 350 manages information regarding all users connected to the optical access system 100.

FIG. 39 is a diagram illustrating an example of a SW connection table. The SW connection table indicates a connection destination of each port of the optical SW 210. That is, a port through which the optical signal is input and output can be used as information for identifying the subscriber device 40, the control unit 230, the branching unit 250, the monitoring unit 260, the ground, and the like of a transmission source or a transmission destination of the optical signal.

The wavelength table includes a user wavelength table and an inter-station wavelength table.

FIG. 40 is a diagram illustrating an example of the user wavelength table. The user wavelength table indicates a wavelength which is used for transmission by each user, a wavelength which is used for reception, a free wavelength which is not used for transmission and reception, and a wavelength that cannot be used due to a failure. The management DB 350 may manage the wavelength table for each transmission line connected to the optical SW 210.

FIG. 41 is a diagram illustrating an example of the inter-station wavelength table. The inter-station wavelength table indicates a wavelength which is used for communication with each of the other ground, a free wavelength which is not used for communication with each of the other ground, and a wavelength that cannot be used due to a failure in communication with each of the other ground.

Figure 42:
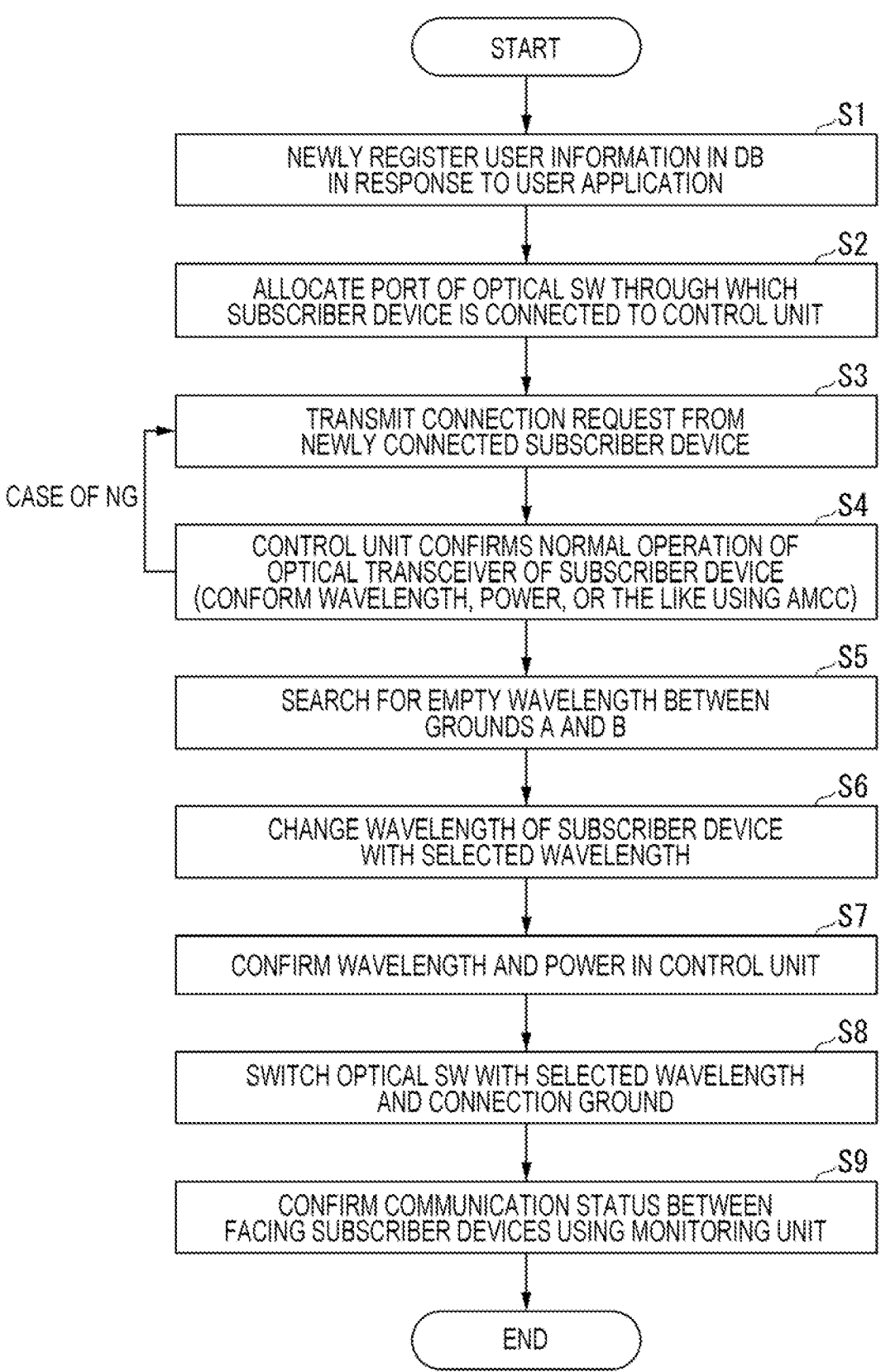
FIG. 42 is a flowchart illustrating an initial setting process of the optical access system according to the configuration example.

Here, an operation when the subscriber device 40 is newly connected will be described. FIG. 42 is a flowchart illustrating an initial setting process of the optical access system 100 when a new subscriber device is connected. An operation of the optical access system 100 when the subscriber device 40-1 is newly connected to the optical GW 200 will be described with reference to FIGS. 38 and 42. It is assumed that a port of the optical SW 210 to which each port of the wavelength demultiplexer 261 (AWG) of the control unit 230 is connected is confirmed in advance by the control unit 230.

First, user application is performed before the new subscriber device 40-1 is connected. For example, communication between the grounds A and B can be performed by the user application. A service provider registers user information, initial destination information, and the like in the management DB 350 of the OPS 300 based on the user application (step S1). The user information is, for example, information that can obtain a wavelength or the like that can be used by the optical transceiver 41. The OPS 300 allocates the port of the optical SW 210 to which the subscriber device 40-1 is connected among the free ports of the optical SW 210 with reference to the SW connection table (step S2). Here, at least two ports of an uplink port and a downlink port are allocated in the case of dual cores, and at least one port is allocated in the case of both single-cores. The OPS 300 registers information indicating that the allocated port is connected to the subscriber device 40-1 in the SW connection table. When the control unit 20 controls the subscriber device 400 with an optical signal, the optical SW control unit 320 of the OPS 300 controls the optical SW 210 such that an optical signal is transmitted and received between the port allocated to the target subscriber device 40-1 and the port to which the control unit 230 is connected. When the subscriber device 40 is controlled with an optical signal via the optical SW 210 and the monitoring unit 260, the optical SW 210 is connected via the monitoring unit 260. When the control is not performed with the optical signal without being involved with the optical SW 210 and via the monitoring unit 260 or the communication unit, or when the control is not performed with the optical signal, if the port to be connected is not connected by the optical SW 210, the state may retain, or if the port to be connected is blocked, the state may remain.

When the new subscriber device 40-1 is connected, the subscriber device 40-1 performs an initialization process and transmits a connection request (register request) with an optical signal (step S3).

When a propagation delay or a transmission distance is measured with a register request and when a functional unit receiving a request, for example, the control unit 230, the monitoring unit 260, the communication unit, or the like, and a functional unit using a measured value, for example, a control unit, a monitoring unit, a communication unit, or the like different from the received value, a band allocating unit notifying of a transmission permission, a facing device, or the like use the value, the measurement is performed again by a functional unit to be used, or the propagation delay or the transmission distance between the measured functional unit and the functional unit to be used is adjusted and used in consideration of wavelength dispersion, polarization dispersion, or mode dispersion.

The subscriber device 40-1 automatically performs the initialization process before connection or immediately after the connection. The wavelength multiplexer/demultiplexer 220 receives a connection request from the transmission line 501 and outputs a connection request to the optical SW 210 via the transmission line 521. The optical SW 210 outputs a connection request input from a port connected to the subscriber device 40-1 to an output port to which the control unit 230 is connected when the control unit 20 controls the subscriber device 400 with an optical signal. The input to the reception port of the control unit may be performed via the monitoring unit 260. The control unit 230 receives the connection request from the reception port via the transmission line 531. The control unit 230 analyzes the input optical signal, and confirms whether there is a problem in an initially set wavelength or optical power (step S4).

When there is a problem in the wavelength or optical power, the control unit 230 transmits a restarting or initialization instruction to the subscriber device 40-1. After the restarting or the initial setting, the process returns to step S3 and the subscriber device 40-1 transmits the connection request again.

The control unit 230 analyzes the optical signal received from the subscriber device 40-1 and outputs a connection request to the control unit 301 when it is confirmed that there is no problem. The control unit 301 registers the information regarding the subscriber device 40-1 in the management DB 350. The connection request includes information regarding a connection source, information regarding a connection destination, and a type of signal to be transmitted. For example, address information such as a medium access control (MAC) address is used as the information regarding the connection source. For example, destination address information is used as the information regarding the connection destination. As the type of the signal to be transmitted, for example, a service, a modulation method, or the like is used. The wavelength control unit 310 registers the connection source information in the management DB 350 based on these pieces of information. Accordingly, identification of a user using the subscriber device 40-1 and the fact that the wavelength that can be used by the subscriber device 40-1 is free are set in the user wavelength table. Further, the wavelength control unit 310 calculates an optimum path between the subscriber device 40-1 and the communication destination such as between the grounds A and B in comparison with connection information stored in the management DB 350. The wavelength control unit 310 searches vacancy indicated by the inter-station wavelength table in accordance with the calculated path. The wavelength control unit 310 selects a wavelength to be used by the subscriber device 40-1 among free wavelengths and transmits information regarding the selected wavelength to the control unit 230 (step S5).

Another subscriber device 40 that is a communication destination of the subscriber device 40-1 is referred to as a communication destination subscriber device 40. In this case, the wavelength control unit 310 selects a transmission wavelength that is a wavelength used by the subscriber device 40-1 to transmit an optical signal to the communication destination subscriber device 40 and a reception wavelength that is a wavelength used by the subscriber device 40-1 to receive an optical signal from the communication destination subscriber device 40. The wavelength control unit 310 transmits the selected transmission wavelength and reception wavelength to the control unit 230 as wavelengths to be used by the subscriber device 40-1. When the subscriber device 40-1 performs only transmission to the communication destination subscriber device 40, the wavelength control unit 310 may not select the reception wavelength. When the subscriber device 40-1 performs only reception from the communication destination subscriber device 40, the wavelength control unit 310 may not select the transmission wavelength.

The control unit 230 transmits the information regarding the wavelength as follows. The wavelength-tunable transmitter 233 of the control unit 230 transmits a wavelength instruction in which the information regarding the wavelength selected by the wavelength control unit 310 is set, with an optical signal with a wavelength addressed to the subscriber device 40-1. When the wavelength instruction is transmitted as an optical signal and when the communication unit is used from the port connected to the wavelength-tunable transmitter 233 of the control unit 20 or via the monitoring unit, the optical SW 210 outputs the optical signal input from the port connected to the communication unit to the transmission line 522 connected to the subscriber device 40-1. The wavelength multiplexer/demultiplexer 220 causes the optical signal input from the optical SW 210 via the transmission line 522 to be incident on the transmission line 501. The subscriber device 40-1 receives the optical signal transmitted through the transmission line 501. The wavelength may be branched in the middle of the path or may be different from the setting as long as the wavelength reaches the subscriber device 40. When there is no multiplexer/demultiplexer or the like that performs demultiplexes in accordance with a wavelength between the control unit 20 and the subscriber device 40, the wavelength of the signal to be transmitted may not be changed. When the transmission wavelength is set in the instruction by the received optical signal, the subscriber device 40-1 sets a wavelength of the optical transceiver 41 in accordance with the wavelength instruction (step S6). That is, the subscriber device 40-1 sets the wavelength of the optical transceiver 41 (the wavelength-tunable light source 451) to transmit an optical signal using the transmission wavelength set in the wavelength instruction. When the reception wavelength is set in the wavelength instruction, the subscriber device 40-1 sets the optical transceiver 41 (the wavelength-tunable filter 453) to receive the wavelength signal of the reception wavelength.

When the optical transceiver 41 of the subscriber device 40-1 transmits an optical signal, the optical transceiver transmits a notification signal for notifying that the wavelength has been set with the optical signal of an instructed wavelength. Like the request signal, the notification signal is transmitted to the control unit 230 via the optical SW 210, the monitoring unit 260, or the communication unit. Based on the received notification signal, the control unit 230 confirms whether the specified wavelength is set correctly, whether the output power is sufficient, and the like (step S7). The control unit 230 confirms whether the value of the notification signal is a value as instructed. Further, when the optical signal is received, the control unit 230 may perform the confirming with a measurement value of the optical signal. When determining that there is no problem as a result of the confirmation, the control unit 230 transmits a permission notification indicating a permission to start communication to the subscriber device 40-1 with the optical signal. The permission notification is transmitted to the subscriber device 40-1, like the wavelength instruction.

The optical SW control unit 320 transmits the connection information of the optimum port in the optical SW 210 to the optical SW 210 according to the transmission destination of the subscriber device 40-1. The optical SW 210 sets an uplink port and a downlink port of the subscriber device 40-1 in response to an instruction from the optical SW control unit 320 based on the connection information (step S8).

The optical access system 100 controls a timing such that path switching in the optical SW 210 is performed after the permission to start communication is transmitted from the control unit 230 to the subscriber device 40-1. For example, it is assumed that a time required for the path switching of the optical SW 210 is known in advance. In this case, the control unit 230 waits for a time required for the optical SW 210 to receive an instruction to switch the path and actually switch the path until the subscriber device 40-1 receives permission to start communication and then actually starts communication, and subsequently gives the instructs to start the communication. After the communication is started, the monitoring unit 260 of the GW 200 confirms a communication status between the facing subscriber devices (step S9). The monitoring unit 260 notifies the OPS 300 of a confirmation result. When the confirming is NG, the control unit 230 or the OPS 300 performs a cause isolation procedure.

The connection request transmitted by the subscriber device 40-1 and the control signal transmitted by the control unit 230 to the subscriber device 40-1 are optical signals of which a speed is lower than the main signal. As the control signal, for example, a protocol-free control signal (control scheme) typified by AMCC can be used.

The control unit or the OPS 300 instructs the communication destination subscriber device 40 to use a transmission wavelength of the subscriber device 40-1 as a reception wavelength of the communication destination subscriber device 40 and use a reception wavelength of the subscriber device 40-1 as a transmission wavelength of the communication destination subscriber device 40. For example, in the control unit 301 that controls the optical GW 200 in which the communication destination subscriber device 40 is accommodated, the wavelength control unit 310 instructs the control unit 230 to transmit a wavelength instruction in which the reception wavelength and the transmission wavelength of the communication destination subscriber device 40 are set. The communication destination subscriber device 40 receives the wavelength instruction from the control unit 230 by the control signal, and sets the reception wavelength and the transmission wavelength in the optical transceiver 41 in accordance with the received wavelength instruction. That is, when the transmission wavelength is set in the wavelength instruction, the communication destination subscriber device 40 sets the wavelength of the optical transceiver 41 (the wavelength-tunable light source 451) so that the optical signal is transmitted with the transmission wavelength. When the reception wavelength is set in the wavelength instruction, the communication destination subscriber device 40 sets the optical transceiver 41 (the wavelength-tunable filter 453) so that the wavelength signal of the reception wavelength is received.

The optical access system 100 may transmit and receive information to be registered in the management DB 350 in response to the user application between the new subscriber device 40-1 and the control unit 301 without performing the user application in step S1. Accordingly, the subscriber device 40-1 can communicate with another subscriber device 40 without performing the user application. Transmission and reception of information between the subscriber device 40-1 and the control unit 301 are performed using, for example, the AMCC via the control unit 230.

An operation when a new subscriber device is connected has been described above. Next, a normal communication operation after the connection of the new subscriber device will be described by exemplifying a case where the subscriber device 40-2 in FIG. 38 performs communication.

First, an uplink optical signal describing uplink communication and output from the subscriber device 40-2 is transmitted to the optical GW 200 via the transmission line 501. The wavelength multiplexer/demultiplexer 220 of the optical GW 200 separates the input optical signal into an uplink optical signal and a downlink optical signal in accordance with a wavelength. The uplink optical signal demultiplexed by the wavelength multiplexer/demultiplexer 220 is input to the optical SW 210 via the transmission line 521. The optical SW 210 connects a port to which the uplink optical signal has been input from the wavelength multiplexer/demultiplexer 220 to another port corresponding to a path to the transmission destination on the path to the communication destination of the subscriber device 40-2, and outputs an optical signal. When the wavelength is used as the destination information, the optical SW 210 is connected to another port corresponding to the transmission destination on the path to the communication destination specified by the wavelength allocated to the subscriber device 40-2 and outputs an optical signal. The uplink signal output from the optical SW 210 is multiplexed with an optical signal with a different wavelength transmitted by another subscriber device 40 in the multiplexer 241 to be transmitted to another station (for example, the ground B) via one transmission line 511. Each multiplexer 241 multiplexes the wavelength channels for each station such as the ground B and the ground C. It is also possible to use the same wavelength between the ground B and the ground C by separating the transmission line 511 with the ground B and the transmission line 511 with the ground C.

Next, the downlink communication will be described. A downlink is communication from the ground B or C toward the subscriber device 40. The downlink optical signal is transmitted to the optical GW 200 via one transmission line 512. The demultiplexer 242 of the optical GW 200 demultiplexes the downlink optical signal transmitted through the transmission line 512 in accordance with the wavelength. The demultiplexer 242 inputs the demultiplexed light to the downlink port corresponding to the wavelength of the demultiplexed light via the transmission line 542. The optical SW 210 connects a port to which the downlink optical signal is input from the demultiplexer 242 to another port corresponding to the wavelength, and outputs an optical signal. The wavelength multiplexer/demultiplexer 220 separates the optical signal input from the optical SW 210 via the transmission line 522 into an uplink optical signal and a downlink optical signal in accordance with a wavelength. The downlink optical signal demultiplexed by the wavelength multiplexer/demultiplexer 220 is input to the subscriber device 40-2 via the transmission line 501. Wavelength channels transmitted from the optical GW 200 to stations (the ground B, C, and the like) are assumed to be the same wavelength band, but different wavelength bands may be used for the stations.

The monitoring unit 260 of the optical GW 200 receives the light branched by the branching unit 250. The light branched by the branching unit 250 is an optical signal transmitted and received by each subscriber device 40. The monitoring unit 260 monitors signals transmitted and received by the subscriber devices 40 by monitoring the received optical signals. When an abnormality such as a wavelength shift, a decrease in an output, or a communication abnormality is detected through the monitoring, the monitoring unit 260 transmits an abnormality detection signal to the control unit 301. The optical SW control unit 320 of the control unit 301 controls the optical SW 210 such that the target subscriber device 40 is reconnected to the control unit 230. Then, the control unit 301 performs an allocation process for new wavelengths different from the wavelengths used when the abnormality is detected, like the time at which the subscriber device 40 is newly connected. Accordingly, when an optical signal with a changed wavelength is input from the subscriber device 40, the optical SW 210 connects the input optical signal to the port specified by the wavelength before the change by the subscriber device 40.

First Configuration Example of Optical Access System 100

Figure 43:
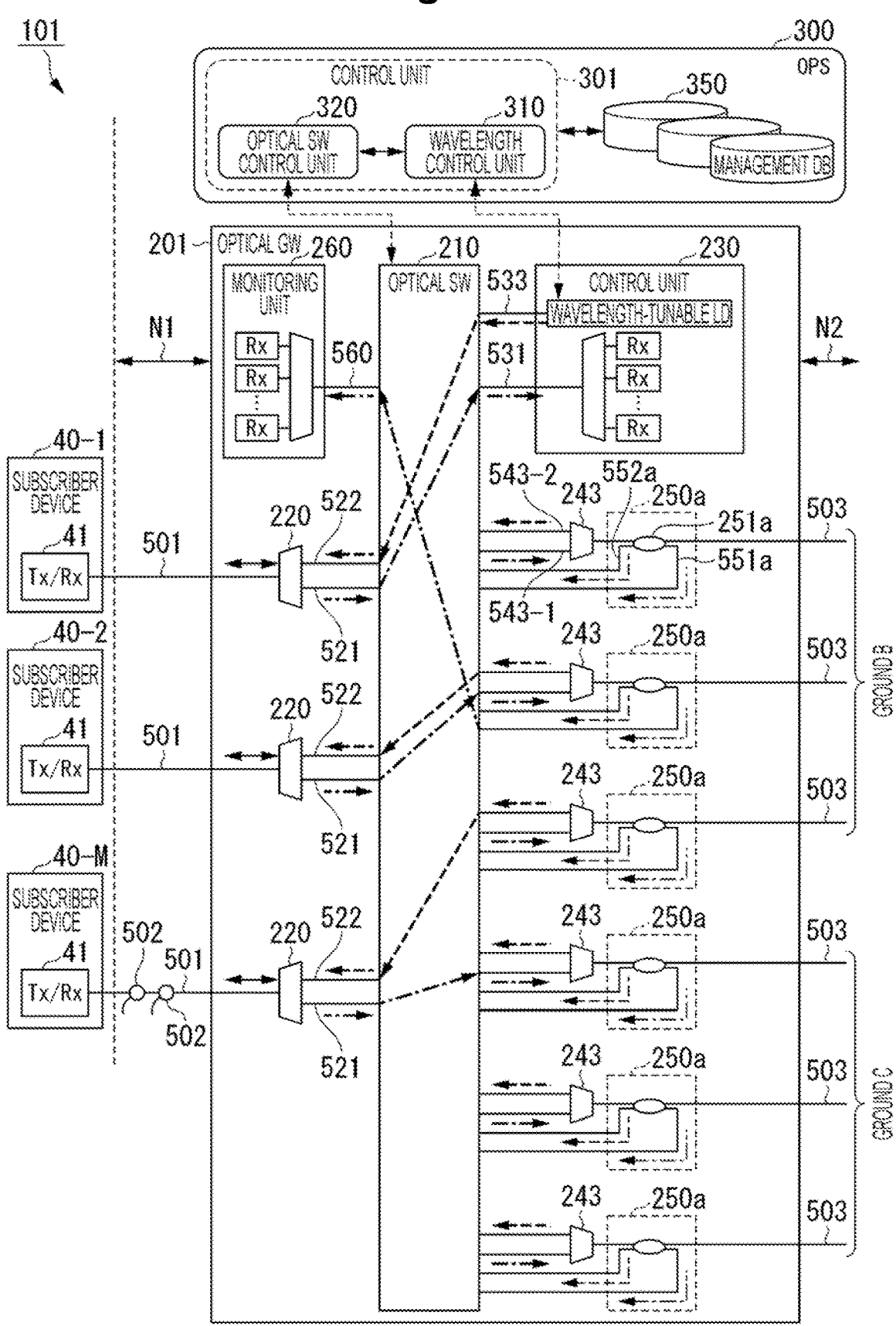
FIG. 43 is a diagram illustrating a configuration example of an optical access system according to a first configuration example.
Figure 44:
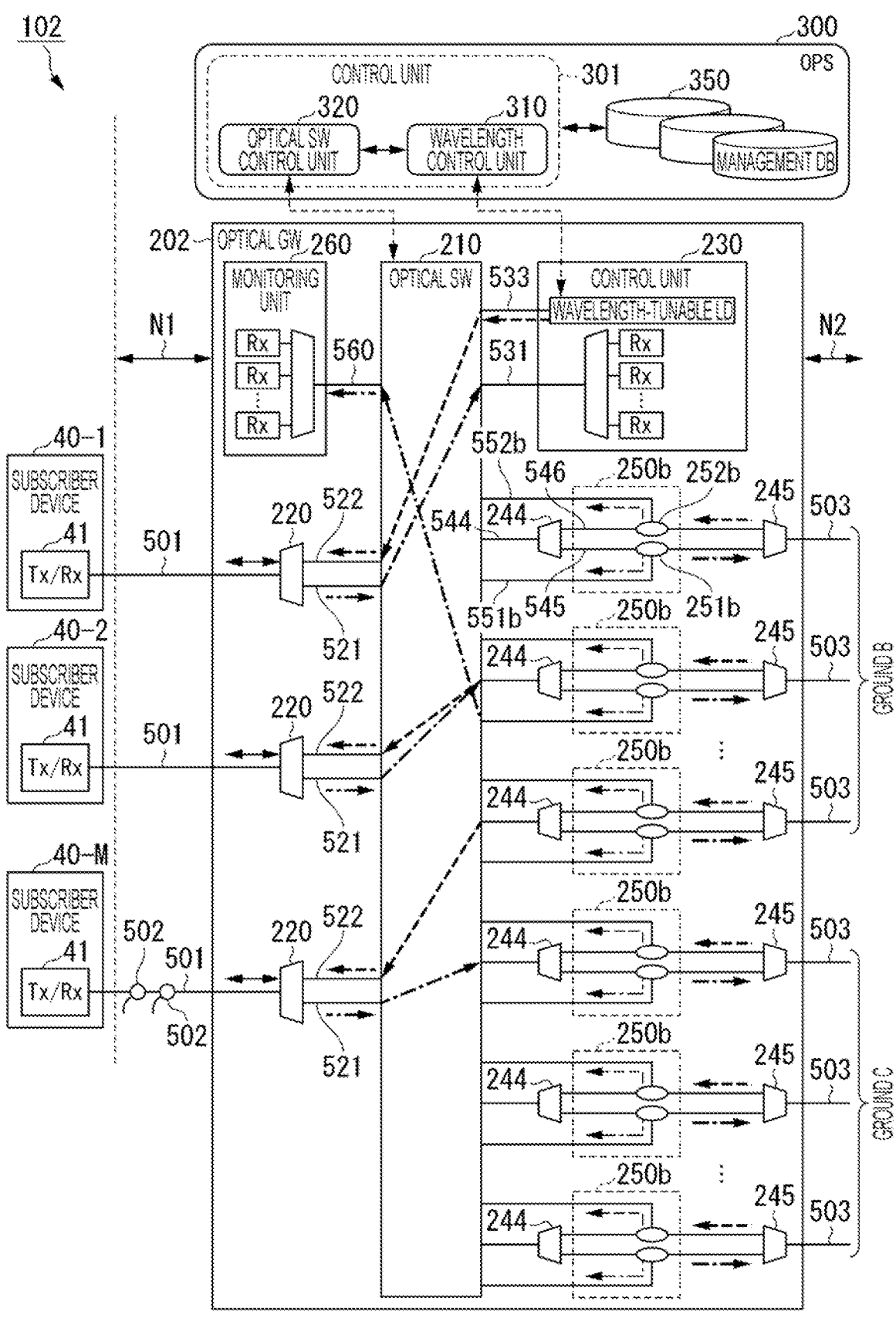
FIG. 44 is a diagram illustrating a configuration example of an optical access system according to a second configuration example.

Although the optical GW 200 illustrated in FIG. 38 performs wavelength multiplexing, it is not necessary to perform wavelength multiplexing as illustrated in FIGS. 43 and 44. FIG. 43 is a diagram illustrating a configuration example of the optical access system 101. The optical access system 101 illustrated in FIG. 43 is different from the optical access system 100 illustrated in FIG. 38 in that a GW 201 is included instead of the GW 200. The GW 201 is different from the GW 200 in that a wavelength multiplexer/demultiplexer 243 and a branching unit 250a instead of the multiplexer 241, the demultiplexer 242, and the branching unit 250 are included. The GW 201 is connected to a communication device of a station of another ground via a transmission line 503. Along one transmission line 503, an uplink signal and a downlink signal are transmitted to any ground.

The wavelength multiplexer/demultiplexer 243 separates the input optical signal into an uplink optical signal and a downlink optical signal in accordance with a wavelength. The wavelength multiplexer/demultiplexer 243 separates the uplink optical signal input from the optical SW 210 via the transmission line 543-1 and transmits the signal to another ground or an upper network via the transmission line 503. The wavelength multiplexer/demultiplexer 243 separates a downlink optical signal input from another ground via the transmission line 503 and outputs the signal to the optical SW 210 via the transmission line 543-2.

The branching unit 250a is provided in the transmission line 503. The branching unit 250a includes a power splitter 251a. The power splitter 251a branches uplink and downlink optical signals transmitted through the transmission line 503. The power splitter 251a inputs the branched uplink optical signal to the port of the optical SW 210 via a transmission line 551a and inputs the branched downlink optical signal to the port of the optical SW 210 via a transmission line 551b. The optical SW 210 outputs an optical signal input from a port connected to the transmission line 551a and an optical signal input from a port connected to the transmission line 551b from a port connected to the transmission line 560. Accordingly, the wavelength demultiplexer 261 of the monitoring unit 260 receives the optical signal branched by the branching unit 250a.

Second Configuration Example of Optical Access System 100

FIG. 44 is a diagram illustrating a configuration example of an optical access system 102. The optical access system 102 illustrated in FIG. 44 is different from the optical access system 101 illustrated in FIG. 43 in that an optical GW 202 is included instead of the optical GW 201. The optical GW 202 is different from the optical GW 201 in that a wavelength multiplexer/demultiplexer 244, a wavelength multiplexer/demultiplexer 245, and a branching unit 250b are included instead of the wavelength multiplexer/demultiplexer 243 and the branching unit 250a.

The wavelength multiplexer/demultiplexer 244 separates an uplink optical signal and a downlink optical signal in accordance with the wavelength. The wavelength multiplexer/demultiplexer 244 inputs the uplink optical signal input from the optical SW 210 via the transmission line 544 to the wavelength multiplexer/demultiplexer 245 via the transmission line 545. The wavelength multiplexer 244 inputs the downlink optical signal input from the wavelength multiplexer/demultiplexer 245 via the transmission line 546 to the optical SW 210 via the transmission line 544.

The wavelength multiplexer/demultiplexer 245 separates an uplink optical signal and a downlink optical signal in accordance with the wavelength. The wavelength multiplexer/demultiplexer 245 transmits the uplink optical signal input from the wavelength multiplexer/demultiplexer 245 via the transmission line 545 to another ground or an upper network via the transmission line 503. In addition, the wavelength multiplexer/demultiplexer 245 inputs the downlink optical signal received via the transmission line 503 to the wavelength multiplexer/demultiplexer 244 via the transmission line 546.

The branching unit 250b includes a power splitter 251b and a power splitter 252b. The power splitter 251b branches an uplink optical signal transmitted along the transmission line 545. The power splitter 251b inputs the branched uplink optical signal to the port of the optical SW 210 via the transmission line 551b. The power splitter 252b branches the downlink optical signal transmitted along the transmission line 546. The power splitter 252b inputs the branched downlink optical signal to the port of the optical SW 210 via the transmission line 552b. The optical SW 210 outputs an optical signal input from a port connected to the transmission line 551b and an optical signal input from a port connected to the transmission line 552b from a port connected to the transmission line 560. Accordingly, the optical signal branched by the branching unit 250b is input to the wavelength demultiplexer 261 of the monitoring unit 260.

The above-described monitoring unit 260 has a receiver configuration including the wavelength demultiplexer 261 and the optical receiver 262 for each wavelength. The monitoring unit 260 may include a wavelength-tunable optical receiver instead of the receiver configuration. The transceiver of the control unit may include a transmitter that is not wavelength-tunable, or may have a receiver configuration in which a wavelength demultiplexer is not included. An example of such a configuration will be described with reference to FIG. 45.

Third Configuration Example of Optical Access System 100

Figure 45:
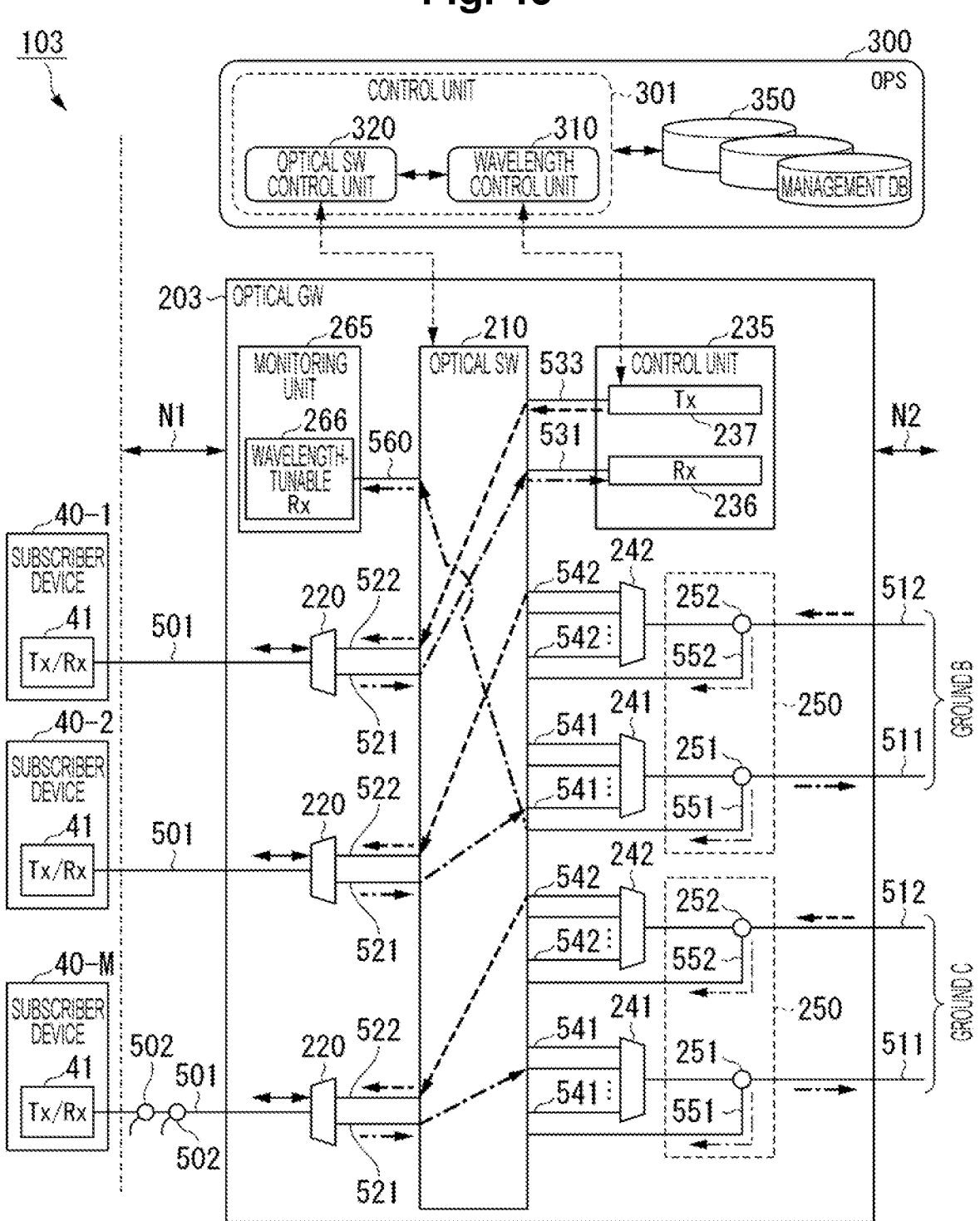
FIG. 45 is a diagram illustrating a configuration example of an optical access system according to a third configuration example.

FIG. 45 is a diagram illustrating a configuration example of an optical access system 103. The optical access system 103 illustrated in FIG. 45 is different from the optical access system 100 illustrated in FIG. 38 in that an optical GW 203 is included instead of the optical GW 200. The optical GW 203 is different from the optical GW 200 in that a control unit 235 and a monitoring unit 265 are included instead of the control unit 230 and the monitoring unit 260. The control unit 235 includes an optical receiver 236 and an optical transmitter 237 that is not wavelength-tunable. The monitoring unit 265 includes a wavelength-tunable optical receiver 266. The monitoring unit 265 may be replaced with any of the monitoring units 60 to 60h described above.

Fourth Configuration Example of Optical Access System 100

Figure 46:
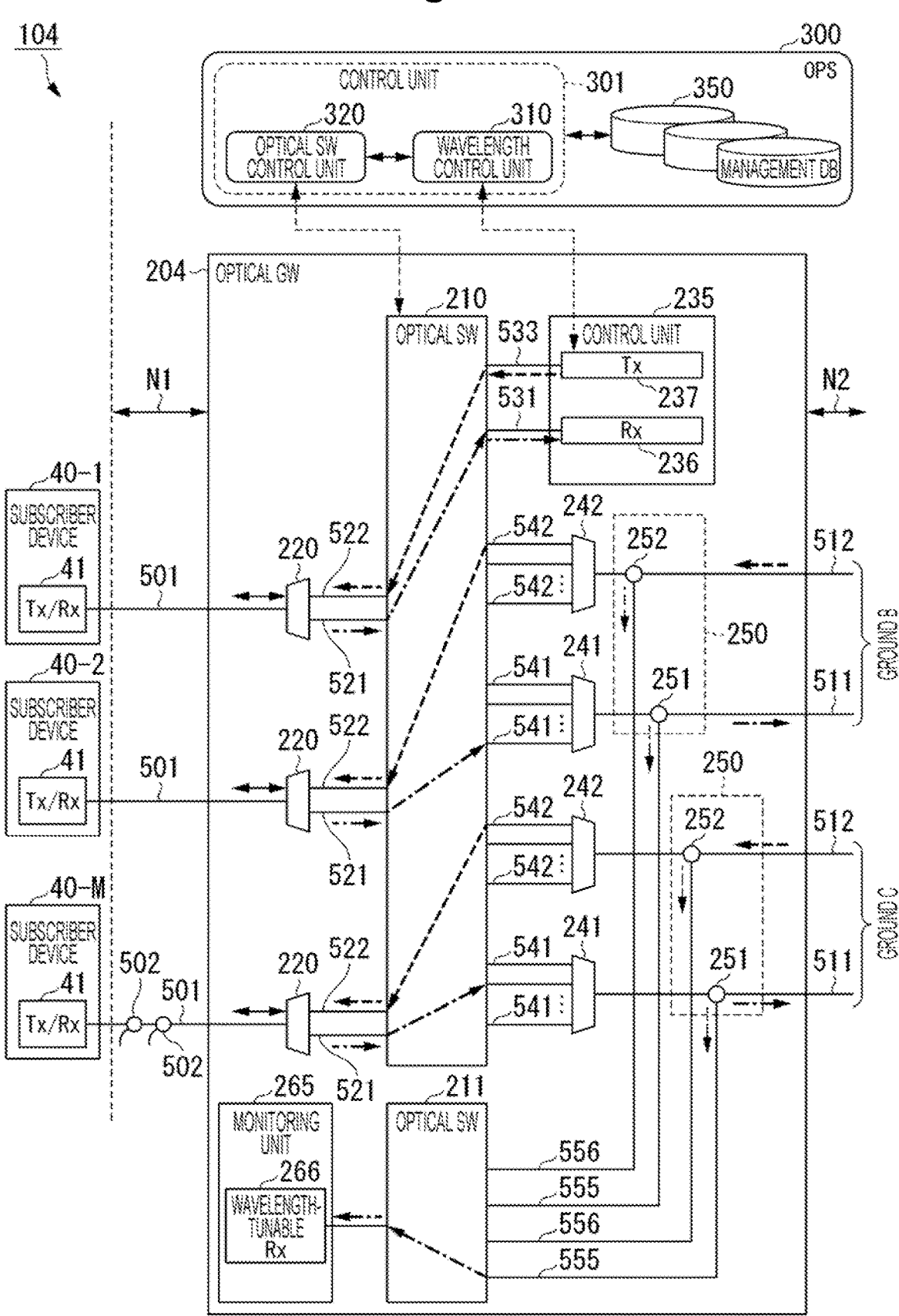
FIG. 46 is a diagram illustrating a configuration example of an optical access system according to a fourth configuration example.

The monitoring unit may be connected via an optical SW different from the above-described optical SW. An example of such a configuration will be described with reference to FIG. 46. FIG. 46 is a diagram illustrating a configuration example of an optical access system 104. The optical access system 104 illustrated in FIG. 46 is different from the optical access system 103 illustrated in FIG. 45 in that an optical GW 204 is included instead of the optical GW 203. The optical GW 204 is different from the optical GW 203 in that an optical SW 211 is further included and that the monitoring unit 265 is connected to the optical SW 211.

An uplink optical signal separated from the transmission line 511 by the power splitter 251 of the branching unit 250 is input to the optical SW 211 via a transmission line 555, and a downlink optical signal separated from the transmission line 512 by the power splitter 252 is input to the optical SW 211 via the transmission line 555. The optical SW 211 is, for example, a small optical SW or the like. The number of ports of the optical SW 211 is one on the monitoring unit 260 side and are 2M on a side to which an optical signal to be monitored is input. 2M is twice the number M of the subscriber devices 40 connected to the optical GW 204. The monitoring units may be prepared by the number of connected grounds without using the small optical SW, and the signals transmitted to and received from all the grounds may be monitored for each ground.

In the present configuration example, communication is performed between a plurality of subscriber devices connected to the same optical GW using a folded transmission line. In the description below, differences from the configuration example will be mainly explained.

Fifth Configuration Example of Optical Access System 100

Figure 47:
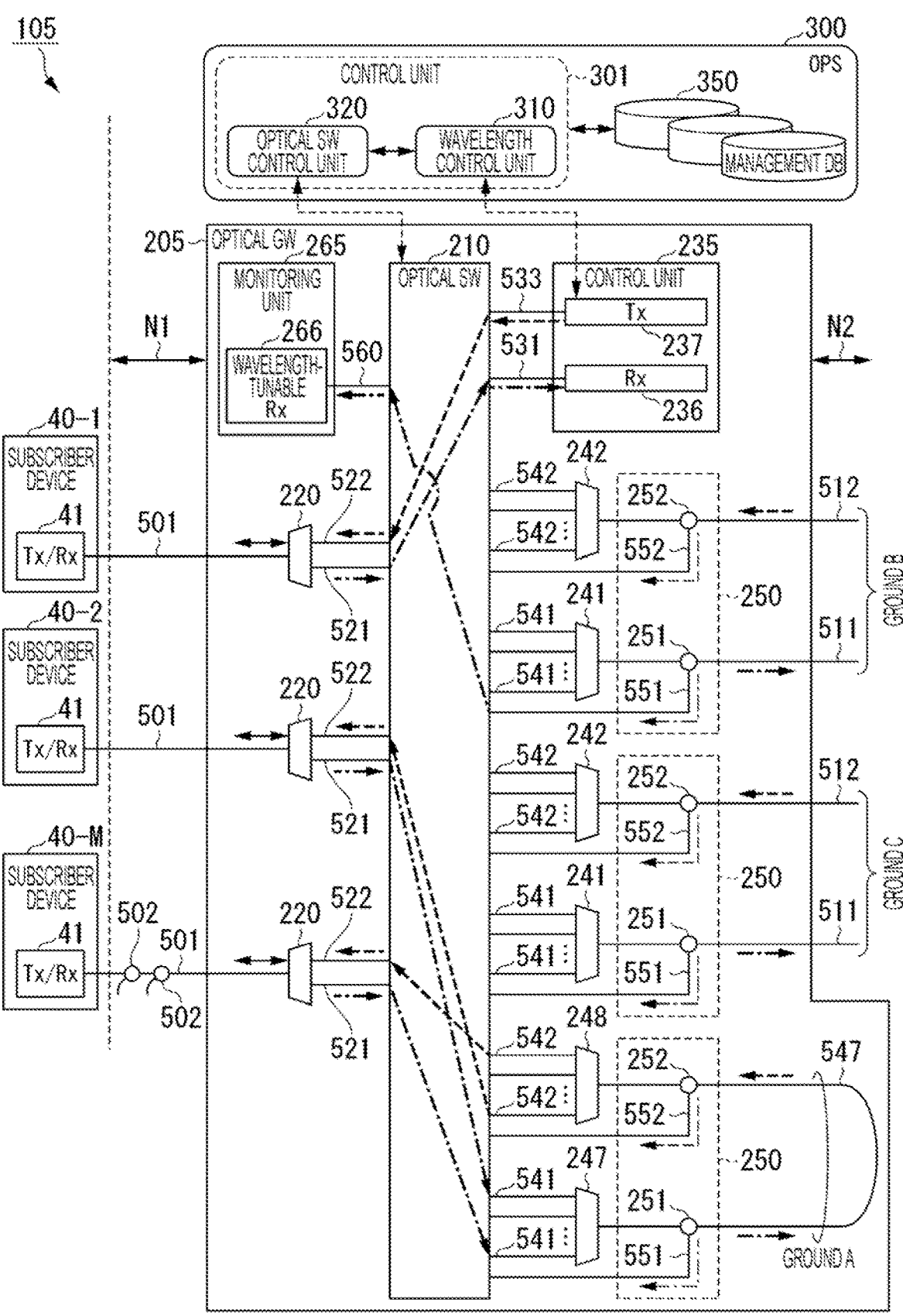
FIG. 47 is a diagram illustrating a configuration example of an optical access system according to a fifth configuration example.

FIG. 47 is a diagram illustrating a configuration example of an optical access system 105. The optical access system 105 illustrated in FIG. 47 is different from the optical access system 103 illustrated in FIG. 45 in that an optical GW 205 is included instead of the optical GW 203. The optical GW 205 is different from the optical GW 203 in that a multiplexer 247 and a demultiplexer 248 corresponding to the ground A where the optical GW 205 is installed are further included. The multiplexer 247 and the demultiplexer 248 are connected by a transmission line 547. The transmission line 547 is a folded transmission line.

Like the multiplexer 241, the multiplexer 247 multiplexes uplink optical signals with different wavelengths output from the plurality of transmission lines 541 by the optical SW 210 and outputs the multiplexed signal to the transmission line 547. Like the demultiplexer 242, the demultiplexer 248 demultiplexes a downlink optical signal input from the transmission line 547 in accordance with the wavelength. The demultiplexer 248 inputs each of the demultiplexed downlink optical signals to the optical SW 210 via a plurality of transmission lines 542 connected to a downlink port corresponding to the wavelength of the optical signal. The transmission line 547 includes the branching unit 250.

In the foregoing configuration example, the subscriber device connected to the ground A is connected to a port for connecting to the ground B or the ground C via the optical SW. In the present configuration example, another set that is the same as the combination of the multiplexer 241 and the demultiplexer 242 connected to the ground B or the ground C is added. The added set includes the multiplexer 247 and the demultiplexer 248. Then, the output port of the added multiplexer 247 and the input port of the added demultiplexer 248 are connected by a transmission line 547. In this configuration, the signal output from the subscriber device 40 can be input to the optical SW 210 again. Accordingly, the optical GW 205 folds an optical signal output from a certain subscriber device 40 and causes the optical SW 210 to be incident again as a downlink signal. By connecting this folded signal to another subscriber device 40 in the optical SW 210, folded communication, that is, communication between the subscriber devices 40 connected to the same optical GW 205, becomes possible.

For example, a state in which the subscriber device and the subscriber device 40-M communicate with each other will be described. It is assumed that each of K (where K is an integer equal to or greater than 2) uplink ports corresponding to the ground A of the optical SW 210 is connected to the multiplexer 247 by the transmission line 541, and each of K downlink ports corresponding to the ground A of the optical SW 210 is connected to the demultiplexer 248 by the transmission line 542. Then, it is assumed that kth (where k is an integer equal to or greater than 1 and equal to or less than K) uplink port and downlink port among the K downlink ports and uplink ports corresponding to the ground A correspond to a wavelength $\lambda_k$. The uplink optical signal with the wavelength $\lambda_1$ output from the subscriber device 40-2 is connected to a first uplink port corresponding to the ground A. The input optical signal is folded back along the transmission line 547 and is input to the optical SW 210 again as a downlink optical signal from the first downlink port corresponding to the ground A. The optical SW control unit 320 sets a path in the optical SW 210 so that the optical signal is transmitted to the subscriber device 40-M in accordance with the wavelength. Similarly, the uplink optical signal with the wavelength $\lambda_k$ output from the subscriber device is connected to a kth uplink port corresponding to the ground A. The input optical signal is folded back along the transmission line 547 and is input to the optical SW 210 again as a downlink optical signal from the kth downlink port corresponding to the ground A. The optical SW control unit 320 sets a path in the optical SW 210 so that the optical signal is transmitted to the subscriber device 40-2 in accordance with the wavelength. Accordingly, communication is performed between the subscriber device 40-2 and the subscriber device 40-M.

Sixth Configuration Example of Optical Access System 100

Figure 48:
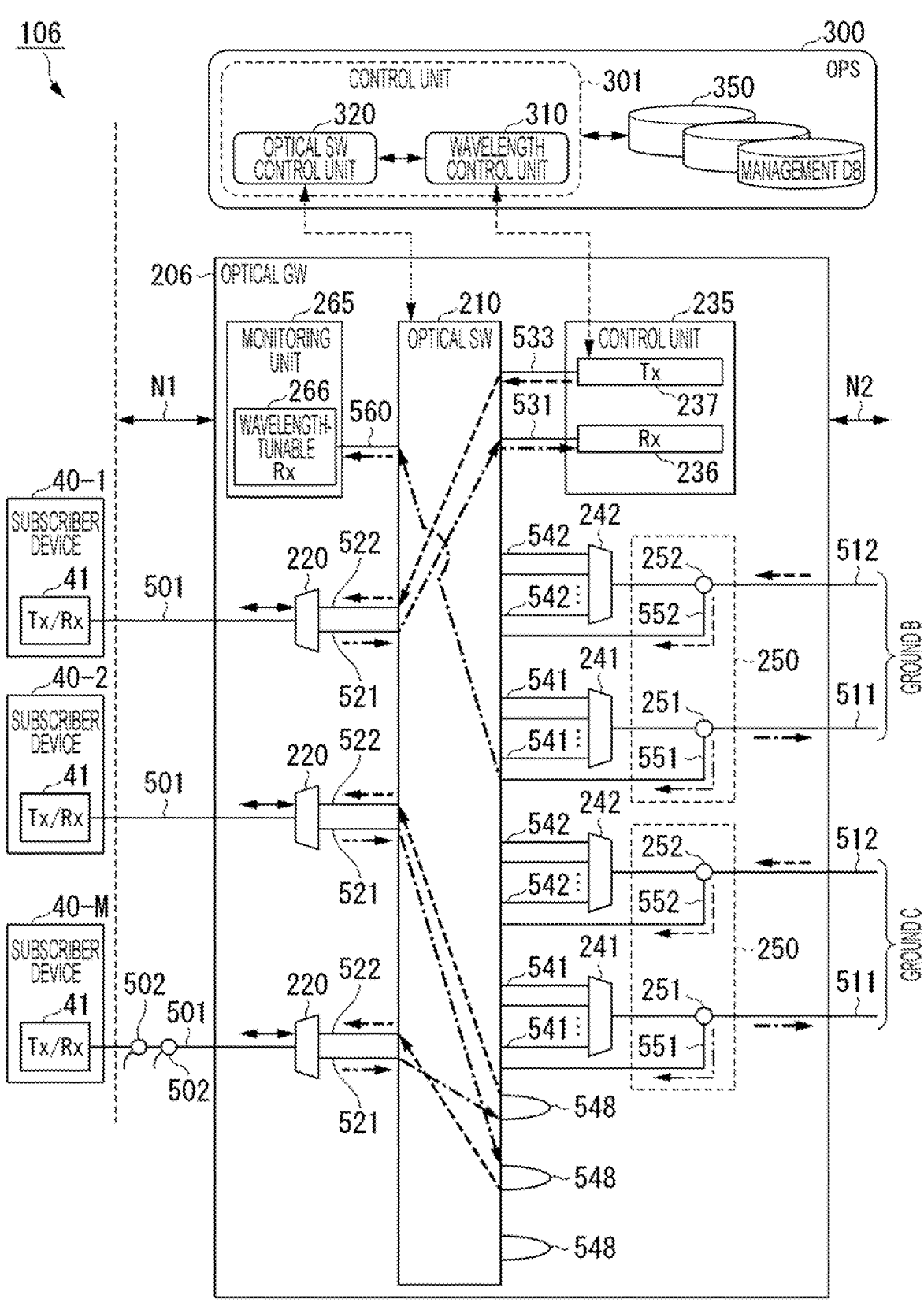
FIG. 48 is a diagram illustrating a configuration example of an optical access system according to a sixth configuration example.

Another configuration of the present configuration example will be described with reference to FIGS. 48 and 49. FIG. 48 is a diagram illustrating a configuration example of an optical access system 106. The optical access system 106 illustrated in FIG. 48 is different from the optical access system 105 illustrated in FIG. 47 in that an optical GW 206 is included instead of the optical GW 205. The optical GW 206 is different from the optical GW 205 in that the multiplexer 247 and the demultiplexer 248 are not provided, and the uplink port and the downlink port for the ground A of the optical SW 210 are directly connected by the transmission line 548 without wavelength multiplexing, so that a signal is folded back.

Seventh Configuration Example of Optical Access System 100

Figure 49:
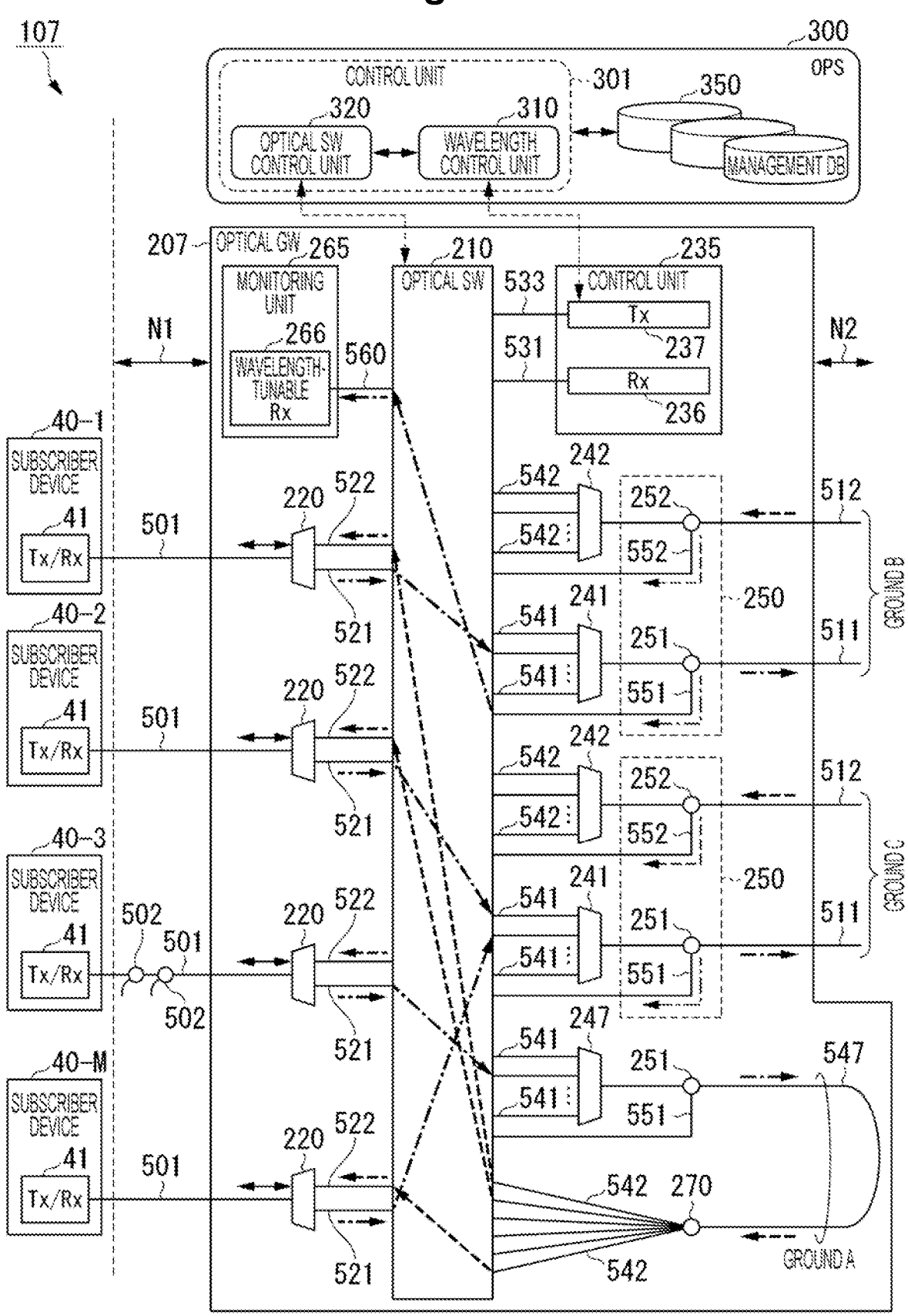
FIG. 49 is a diagram illustrating a configuration example of an optical access system according to a seventh configuration example.

FIG. 49 is a diagram illustrating a configuration example of an optical access system 107. The optical access system 107 illustrated in FIG. 49 is different from the optical access system 105 illustrated in FIG. 47 in that an optical GW 207 is included instead of the optical GW 205. The optical GW 207 is different from the optical GW 205 in that a power splitter 270 is included instead of the demultiplexer 248. The power splitter 270 branches the downlink optical signal input from the multiplexer 247 via the transmission line 547 into a plurality of signals and inputs the plurality of signals to the optical SW 210 via the plurality of transmission lines 542.

A power splitter may be provided at a subsequent stage of the demultiplexer 248 of the optical GW 205 in FIG. 47. The power splitter branches the optical signal demultiplexed by the demultiplexer 248 into a plurality of signals and inputs the plurality of signals to different ports of the optical SW

210. In this way, multicast communication of folded communication can be performed.

Although the difference from the optical access system 103 has been described above, the difference can also be applied to the optical access systems 100, 101, and 102.

Eighth Configuration Example of Optical Access System 100

The optical access system of the present configuration example performs multicast communication. In the present configuration example, the difference will be mainly described.

First, multicasting in downlink communication will be described with reference to FIG. 50. FIG. 50 is a diagram illustrating a configuration example of an optical access system 108. The optical access system 108 illustrated in FIG. 50 is different from the optical access system 107 illustrated in FIG. 49 in that an optical GW 208 is included instead of the optical GW 207. The optical GW 208 is different from the optical GW 207 in that a transmission line 549 that connects a folded port of the optical SW 210 is further provided.

A case where a downlink optical signal transmitted from the ground C is multicast will be described. The optical SW control unit 320 controls a port to which a downlink optical signal from the ground C is input such that the port is connected to a folded port to which the transmission line 549 is connected in accordance with the wavelength. Accordingly, the downlink optical signal from the ground C is transmitted along the transmission line 549 and is input again to the optical SW 210 as an uplink signal of the ground A. The optical SW control unit 320 controls the downlink optical signal input from the folded port such that the downlink optical signal is connected to the uplink signal port of the ground A. Accordingly, the optical signal folded back along the transmission line 549 and input to the optical SW 210 is output to the port connected to the multiplexer 247. The multiplexer 247 multiplexes the optical signals output from the optical SW 210 from each of the plurality of transmission lines 541 and outputs the multiplexed optical signals to the transmission line 547. The optical signal output to the transmission line 547 is branched into a plurality of optical signals by the power splitter 270. The power splitter 270 inputs the plurality of branched optical signals to the optical SW 210 as downlink signals of the ground A via the plurality of transmission lines 542. The optical SW 210 outputs the optical signal input from each transmission line 542 to a port connected to the subscriber device 40 in accordance with the wavelength. Accordingly, the downlink signals can be multicast.

Ninth Configuration Example of Optical Access System 100

Figure 51:
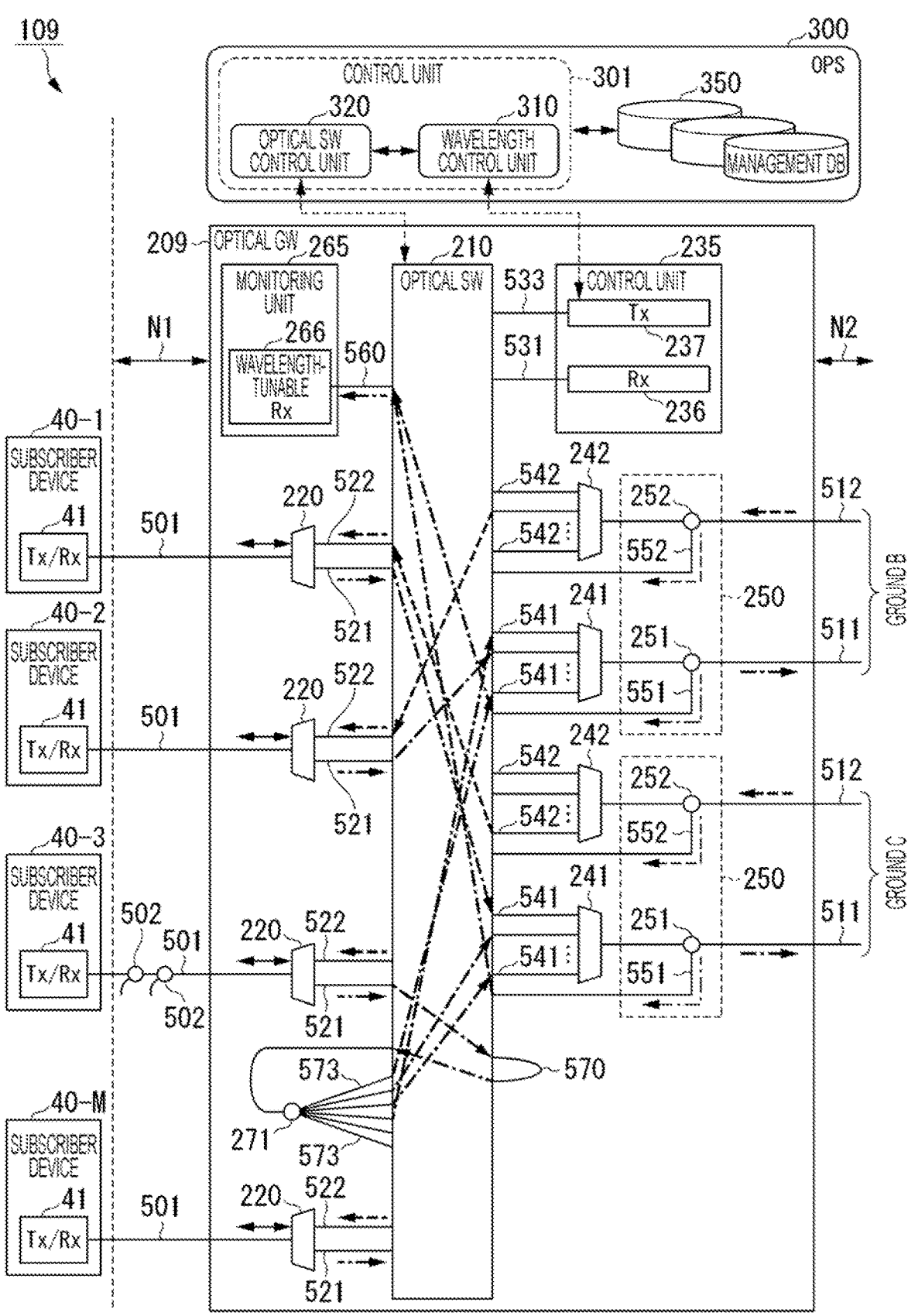
FIG. 51 is a diagram illustrating a configuration example of an optical access system according to a ninth configuration example.

Next, multicasting of uplink communication will be described with reference to FIG. 51. FIG. 51 is a diagram illustrating a configuration example of an optical access system 109. The optical access system 109 illustrated in FIG. 51 is different from the optical access system 103 illustrated in FIG. 45 in that an optical GW 209 is included instead of the optical GW 203. The optical GW 209 is different from the optical GW 203 in that a transmission line 570 that connects a folded port to the optical SW 210 and a multicast power splitter 271 are further included. The power splitter 271 is connected to the optical SW 210 via the transmission line 572 and the plurality of transmission lines 573.

A case where the uplink optical signal transmitted from the ground A is multicast will be described. The optical SW control unit 320 controls the port to which the uplink optical signal from the ground A is input is connected to the folded port to which the transmission line 570 is connected in accordance with the wavelength. Accordingly, the uplink optical signal from the ground A is transmitted through the transmission line 570 and is input to the optical SW 210 again. The optical SW control unit 320 performs control such that the optical signal input from the folded port is output to the port connected to the power splitter 271. Accordingly, the optical signal that is input to the optical SW 210 and folded along the transmission line 570 is output to the transmission line 572. The optical signal output to the transmission line 572 is branched into a plurality of optical signals by the power splitter 271. The power splitter 271 inputs the plurality of branched optical signals to the optical SW 210 as uplink signals via the plurality of transmission lines 573. The optical SW 210 outputs the optical signal input from each transmission line 573 to a port connected to the ground B or the ground C in accordance with the wavelength. Accordingly, the uplink signals can be multicast.

Tenth Configuration Example of Optical Access System 100

Figure 52:
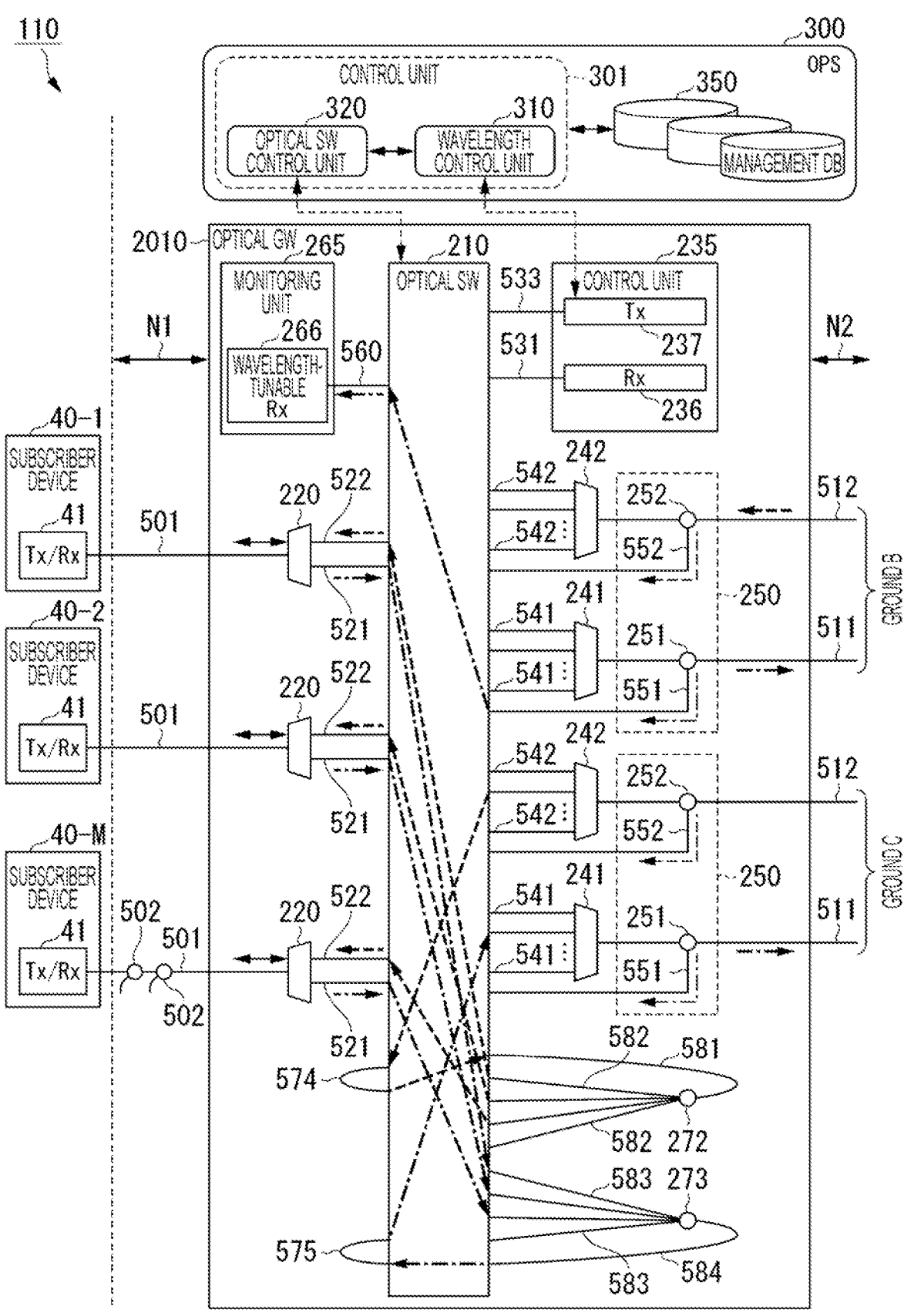
FIG. 52 is a diagram illustrating a configuration example of an optical access system according to a tenth configuration example.

Next, a configuration in which point-to-multipoint communication including uplink communication is performed while multicasting of downlink communication is performed will be described with reference to FIG. 52. FIG. 52 is a diagram illustrating a configuration example of an optical access system 110. The optical access system 110 illustrated in FIG. 52 is different from the optical access system 103 illustrated in FIG. 45 in that an optical GW 2010 is included instead of the optical GW 203. The optical GW 2010 is different from the optical GW 203 in that transmission lines 574 and 575 connecting a folded port to the optical SW 210 and power splitters 272 and 273 are further included. The power splitter 272 is connected to the optical SW 210 via a transmission line 581 and a plurality of transmission lines 582. The power splitter 273 is connected to the optical SW 210 via a plurality of transmission lines 583 and a transmission line 584.

A case where a downlink optical signal transmitted from the ground C is multicast will be described. The optical SW control unit 320 controls a port to which a downlink optical signal from the ground C is input is connected to the folded port to which the transmission line 574 is connected in accordance with the wavelength. Accordingly, the downlink optical signal from the ground C is transmitted along the transmission line 574 and is input again to the optical SW 210 as an uplink signal of the ground A. The optical SW control unit 320 performs control such that the downlink optical signal input from the folded port is output to the port to which the power splitter 272 is connected. Accordingly, the optical signal that is input to the optical SW 210 and folded along the transmission line 574 is output to the transmission line 581. The optical signal output to the transmission line 581 is branched into a plurality of optical signals by the power splitter 272. The power splitter 272 inputs the plurality of branched optical signals to the optical SW 210 as downlink signals via the plurality of transmission lines 582. The optical SW 210 outputs the optical signal input from each transmission line 582 to a port connected to the subscriber device 40 according to the wavelength. Accordingly, the downlink signals can be multicast.

A case where an uplink optical signal transmitted from the ground A is transmitted to the ground C will be described. The optical SW control unit 320 performs control such that a port to which an uplink optical signal from the ground A is input is connected to a port to which the power splitter 273 is connected in accordance with the wavelength. Accordingly, the uplink optical signals from the ground A is output to the transmission lines 583. The optical signals output to the plurality of transmission lines 583 are multiplexed by the power splitter 273. The power splitter 273 inputs the multiplexed optical signal to the optical SW 210 via the transmission line 584. The optical SW 210 controls the optical signal input from the transmission line 584 such that the optical signal is connected to the folded port to which the transmission line 575 is connected. Accordingly, the optical signal is transmitted along the transmission line 575 and is input to the optical SW 210 again. The optical SW 210 outputs the optical signal input from the transmission line 575 to the multiplexer 241 connected to the ground C in accordance with the wavelength.

As described above, by providing two sets of configurations using a power splitter for multicasting, not only downlink multicast communication but also point-to-multipoint communication including uplink communication can be performed.

Eleventh Configuration Example of Optical Access System 100

In the present configuration example, communication is performed without separating an uplink signal and a downlink signal. In the description below, differences from the configuration example will be mainly explained.

Figure 53:
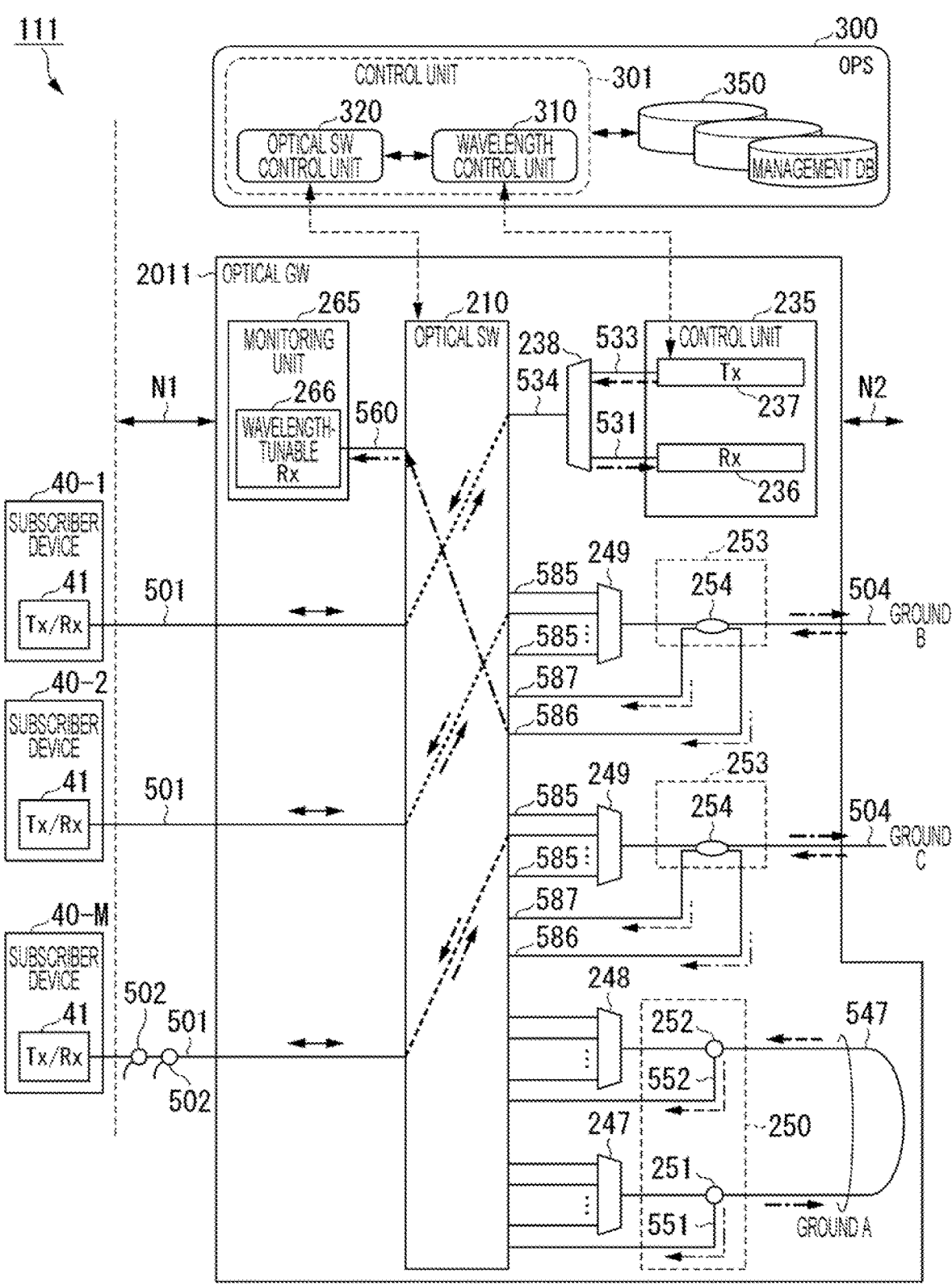
FIG. 53 is a diagram illustrating a configuration example of an optical access system according to an eleventh configuration example.

FIG. 53 is a diagram illustrating a configuration example of an optical access system 111. The optical access system 111 illustrated in FIG. 53 is different from the optical access system 105 illustrated in FIG. 47 in that an optical GW 2011 is included instead of the optical GW 205. The optical GW 2011 is different from the optical GW 205 in that the wavelength multiplexer/demultiplexer 220 is not included, a wavelength multiplexer/demultiplexer 249 and a branching unit 253 are included instead of the multiplexer 241, the demultiplexer 242, and the branching unit 250, and a wavelength multiplexer/demultiplexer 238 is further included.

The wavelength multiplexer/demultiplexer 249 is connected to the optical SW 210 by a plurality of transmission lines 585. The wavelength multiplexer/demultiplexer 249 multiplexes the uplink optical signals with different wavelengths output from the plurality of transmission lines 585 by the optical SW 210 and outputs the multiplexed signal to the transmission line 504 connected to any other ground. The wavelength multiplexer/demultiplexer 249 demultiplexes a downlink optical signal input from another ground via the transmission line 504 in accordance with a wavelength. The wavelength multiplexer/demultiplexer 249 inputs each of the demultiplexed downlink optical signals to the optical SW 210 via the plurality of transmission lines 585 connected to an uplink port corresponding to the wavelength of the optical signal.

The branching unit 253 includes a power splitter 254. The power splitter 254 branches an uplink optical signal and a downlink optical signal transmitted through the transmission line 504. The power splitter 254 inputs the branched uplink optical signals to the port of the optical SW 210 via the transmission line 586, and inputs the branched downlink optical signals to the port of the optical SW 210 via the transmission line 587. The optical SW 210 outputs an optical signal input from the transmission line 586 or a port connected to the transmission line 587 to a port connected to the transmission line 560.

The wavelength multiplexer/demultiplexer 238 is connected to the optical SW 210 by the transmission line 534 and is connected to the control unit 235 by the transmission line 531 and the transmission line 533. The wavelength multiplexer/demultiplexer 238 separates the input optical signal into an uplink optical signal and a downlink optical signal in accordance with a wavelength. The wavelength multiplexer/demultiplexer 238 outputs the uplink optical signal input from the optical SW 210 via the transmission line 534 to the control unit 235 via the transmission line 531. The wavelength multiplexer/demultiplexer 238 outputs the downlink optical signal input from the control unit 235 via the transmission line 533 to the optical SW 210 via the transmission line 534.

Figure 54:
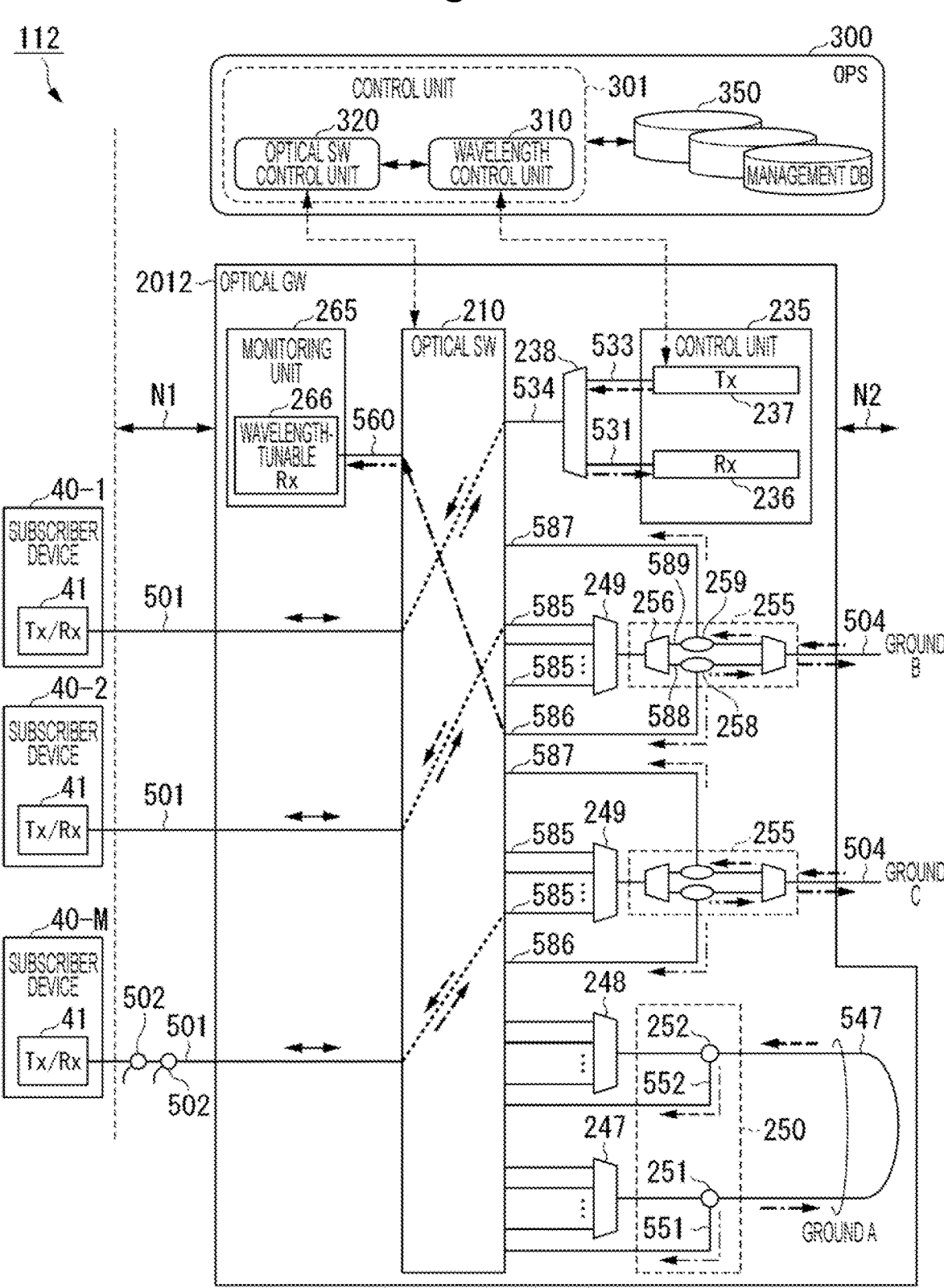
FIG. 54 is a diagram illustrating a configuration example of an optical access system according to a twelfth configuration example.

As described above, the optical GW 2011 has a configuration in which there is no wavelength multiplexer/demultiplexer between the optical SW 210 and the subscriber device 40 and an uplink signal and a downlink signal are not separated. Accordingly, the number of ports used for the optical SW 210 can be considerably reduced, and an amount of information to be managed can be considerably reduced. As illustrated in FIG. 54, a portion that separates the optical signal to the monitoring unit 265 may have the configuration illustrated in FIG. 44.

Twelfth Configuration Example of Optical Access System 100

FIG. 54 is a diagram illustrating a configuration example of an optical access system 112 according to the present embodiment. The optical GW 2012 of the optical access system 112 illustrated in FIG. 54 includes a branching unit 255 instead of the branching unit 253 included in the optical GW 2011 illustrated in FIG. 53. The branching unit 255 includes a wavelength multiplexer/demultiplexer 256, a wavelength multiplexer/demultiplexer 257, a power splitter 258, and a power splitter 259.

The wavelength multiplexer/demultiplexer 256 separates an input optical signal into an uplink optical signal and a downlink optical signal in accordance with a wavelength. The wavelength multiplexer/demultiplexer 256 outputs an uplink optical signal input from the wavelength multiplexer/demultiplexer 249 to the wavelength multiplexer/demultiplexer 257 via the transmission line 588. The wavelength multiplexer/demultiplexer 256 outputs a downlink optical signal input from the wavelength multiplexer/demultiplexer 257 via the transmission line 589 to the wavelength multiplexer/demultiplexer 249.

The wavelength multiplexer/demultiplexer 257 separates an uplink optical signal and a downlink optical signal in accordance with the wavelength. The wavelength multiplexer/demultiplexer 257 outputs the uplink optical signal input from the wavelength multiplexer/demultiplexer 256 via the transmission line 588 to the transmission line 504. The wavelength multiplexer/demultiplexer 257 inputs a downlink optical signal received from another ground via the transmission line 504 to the wavelength multiplexer/demultiplexer 256 via the transmission line 589.

The power splitter 258 branches an uplink optical signal transmitted along the transmission line 588 and inputs the signal to the port of the optical SW 210 via the transmission line 586. The power splitter 259 branches a downlink optical signal transmitted along the transmission line 589 and inputs the signal to the port of the optical SW 210 via the transmission line 587. The optical SW 210 outputs an optical signal input from the transmission line 586 or a port connected to the transmission line 587 to a port connected to the transmission line 560.

The optical GW 2011 illustrated in FIG. 53 performs wavelength multiplexing. However, as illustrated in FIG. 55, a signal to be transmitted to each of the stations (the ground B and the ground C) may be transmitted along individual transmission lines without performing wavelength multiplexing.

Thirteen Configuration Example of Optical Access System 100

Figure 55:
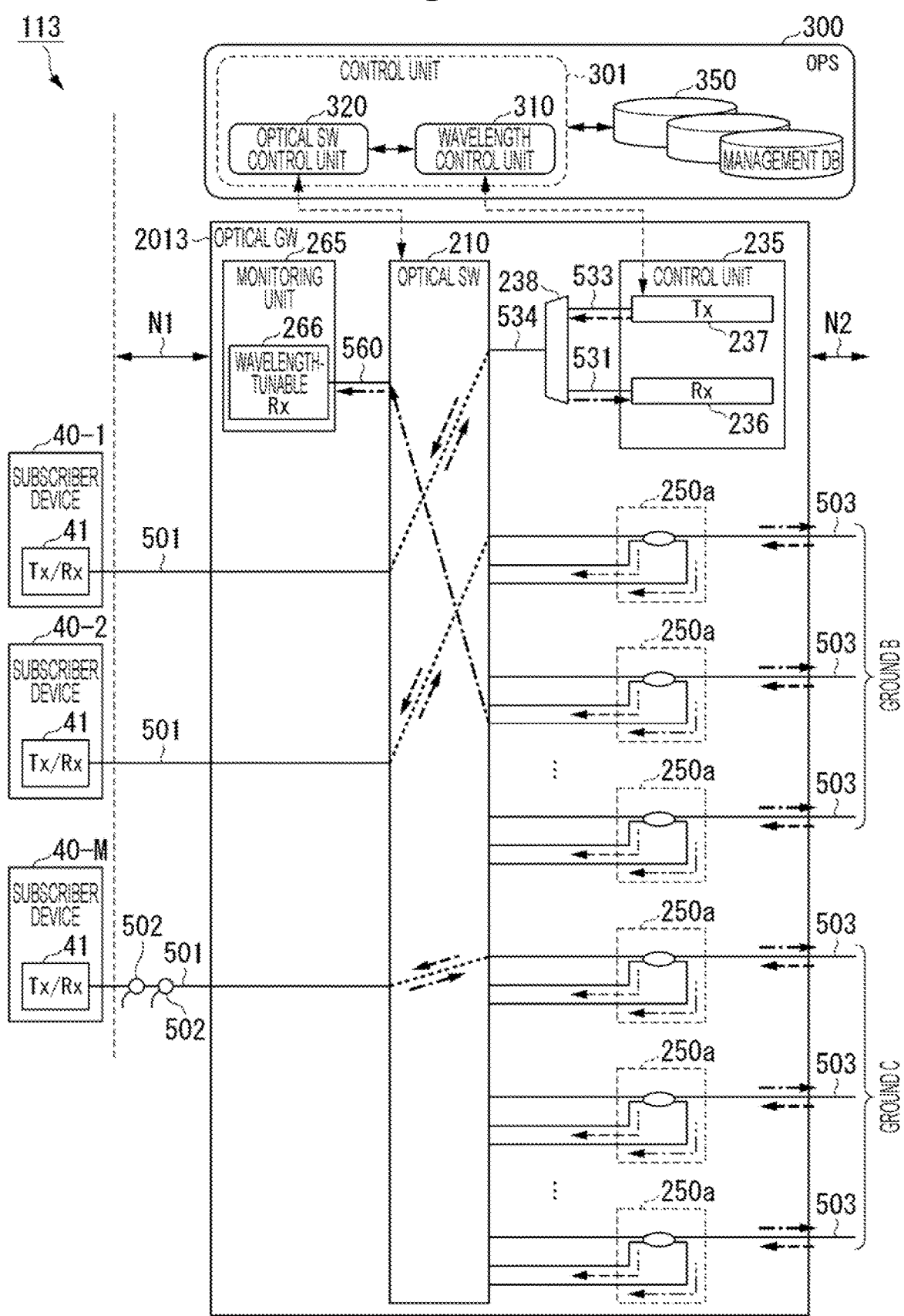
FIG. 55 is a diagram illustrating a configuration example of an optical access system according to a thirteenth configuration example.

FIG. 55 is a diagram illustrating a configuration example of an optical access system 113. The optical access system 113 illustrated in FIG. 55 is different from the optical access system 101 illustrated in FIG. 43 in that an optical GW 2013 is included instead of the optical GW 201. The optical GW 2013 is different from the optical GW 201 in that the wavelength multiplexer/demultiplexer 220 and the wavelength multiplexer/demultiplexer 243 are not included, and the control unit 235, the wavelength multiplexer/demultiplexer 238, and the monitoring unit 265 illustrated in FIG. 53 are included instead of the control unit 230 and the monitoring unit 260. Along a port of the optical SW 210 connected to the transmission line 503, an uplink optical signal is output and a downlink optical signal is input.

Fourteenth Configuration Example of Optical Access System 100

Figure 56:
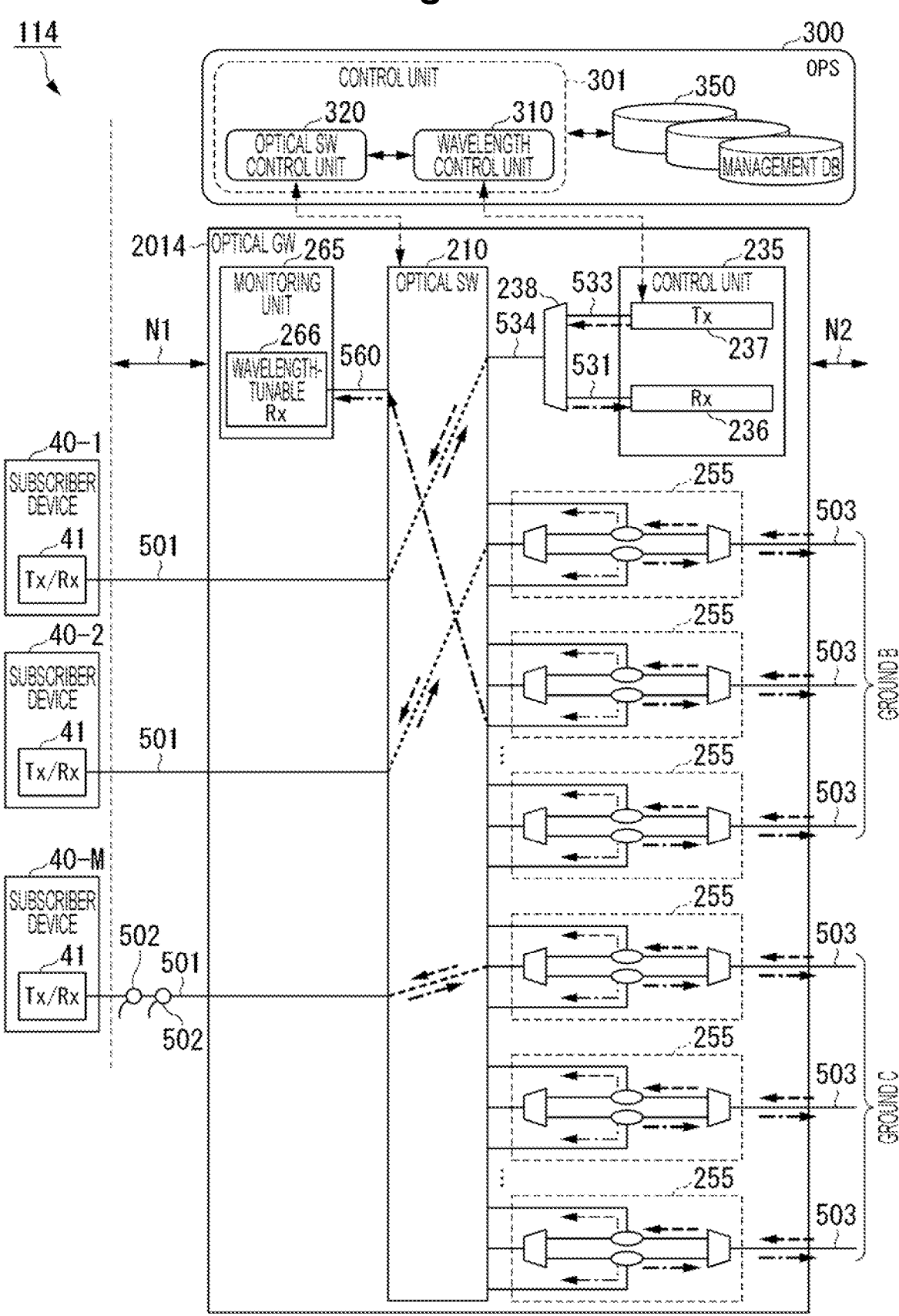
FIG. 56 is a diagram illustrating a configuration example of an optical access system according to a fourteenth configuration example.

The branching unit 250a in the optical GW 2013 may have a configuration illustrated in FIG. 56. FIG. 56 is a diagram illustrating a configuration example of an optical access system 114. An optical GW 2014 of the optical access system 114 illustrated in FIG. 56 has a configuration similar to that of the branching unit 255 illustrated in FIG. 54 instead of the branching unit 250a included in the optical GW 2013 illustrated in FIG. 55.

Fifteenth Configuration Example of Optical Access System 100

The present configuration example enables \ a subscriber device during communication to be controlled. In the description below, differences from the configuration example will be mainly explained.

Figure 57:
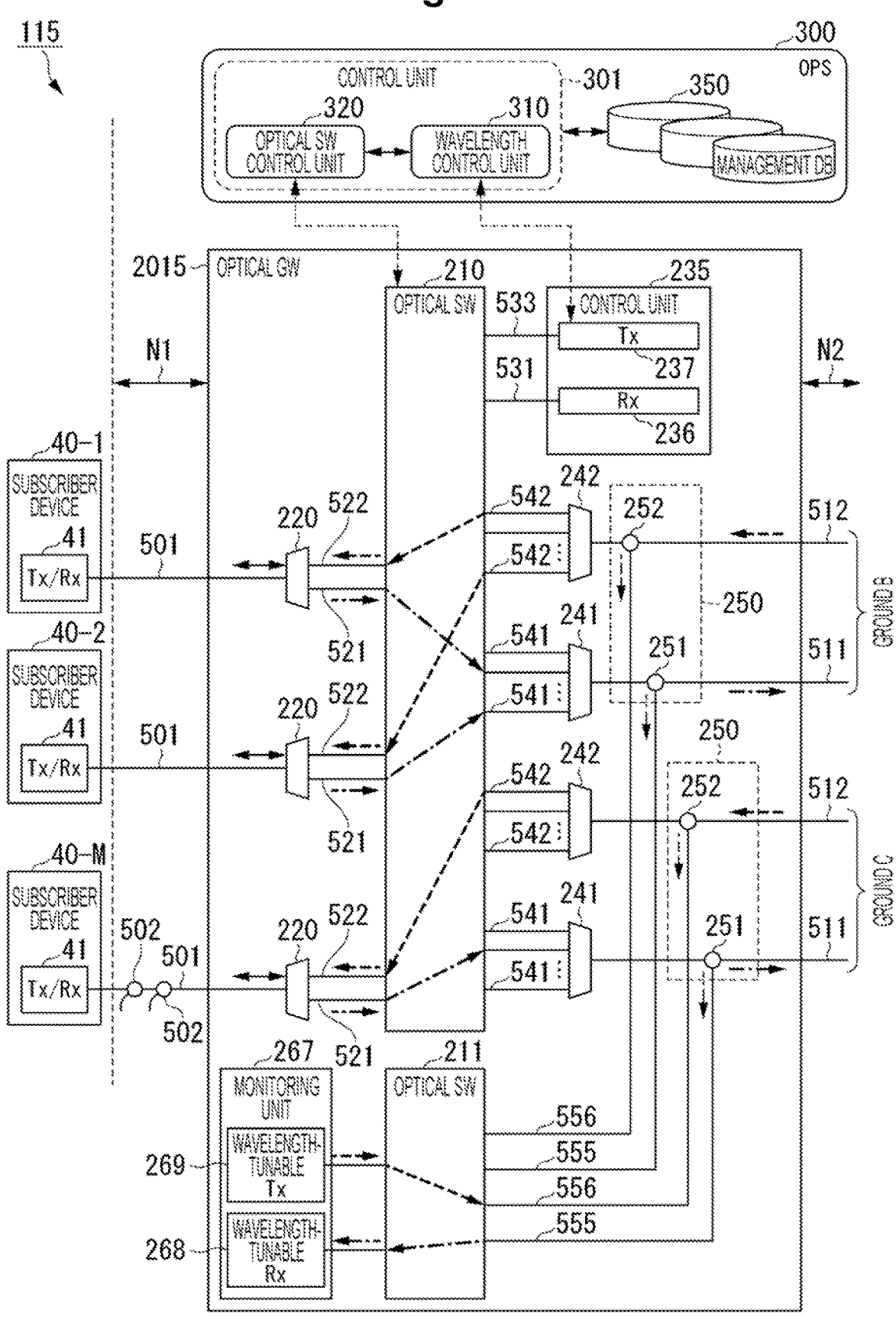
FIG. 57 is a diagram illustrating a configuration example of an optical access system according to a fifteenth configuration example.

FIG. 57 is a diagram illustrating a configuration example of an optical access system 115. The optical access system 115 illustrated in FIG. 57 is different from the optical access system 104 illustrated in FIG. 46 in that an optical GW 2015 is included instead of the optical GW 204. The optical GW 2015 is different from the optical GW 204 in that a monitoring unit 267 is connected to the optical SW 211 instead of the monitoring unit 265.

The monitoring unit 267 includes a wavelength-tunable receiver 268 and a wavelength-tunable transmitter 269. The monitoring unit 267 can receive an optical signal with any wavelength by the wavelength-tunable receiver 268 and can transmit an optical signal with any wavelength by the wavelength-tunable transmitter 269. In addition, the optical GW 2015 includes the control unit 235. When the subscriber device 40 is connected, the optical GW 2015 performs connection processing (registration, wavelength allocation, or the like) of the subscriber device 40 using the control unit 235, and starts normal communication.

Here, a state in which the subscriber device 40-1 is connected to the ground B will be considered. The subscriber device 40-1 cannot communicate with the control unit 235 because of a state in which the normal communication is being performed. Accordingly, by providing the monitoring unit 267 connected to the optical SW 211 which is the small optical SW, it is possible not only to monitor a communication state of the subscriber device 40-1 but also to give an instruction for various settings of the subscriber device 40-1. That is, the optical signal separated by the power splitter 251 is output to the optical SW 211 via the transmission line 555. The optical SW 211 outputs an input optical signal to the monitoring unit 267. The monitoring unit 267 performs monitoring using the optical signal received from the optical SW 211 by the wavelength-tunable receiver 268, and further receives a control signal superimposed on the received optical signal. The wavelength-tunable transmitter 269 of the monitoring unit 267 transmits a control signal to the subscriber device 40 by an optical signal. The optical SW 211 outputs the optical signal input from the wavelength-tunable transmitter 269 to a port corresponding to the wavelength. The power splitter 251 multiplexes the control signal input from the optical SW 211 via the transmission line 556 with the optical signal transmitted along the transmission line 512. In this configuration, even in a state where the subscriber device is performing the normal communication, it is possible to receive a connection destination change request or the like from the subscriber device 40-1, transmit the control signal, and perform wavelength switching or the like on the subscriber device 40-1.

In the communication of the control signal between the monitoring unit 267 and each subscriber device 40, a control signal that is slower than the optical main signal between the subscriber devices and can be superimposed on the main signal is used. For example, a technology such as AMCC can be used.

Sixteenth Configuration Example of Optical Access System 100

In the present configuration example, electrical processing is performed on the optical signal extracted from the optical SW. In the description below, differences from the configuration example will be mainly explained.

Figure 58:
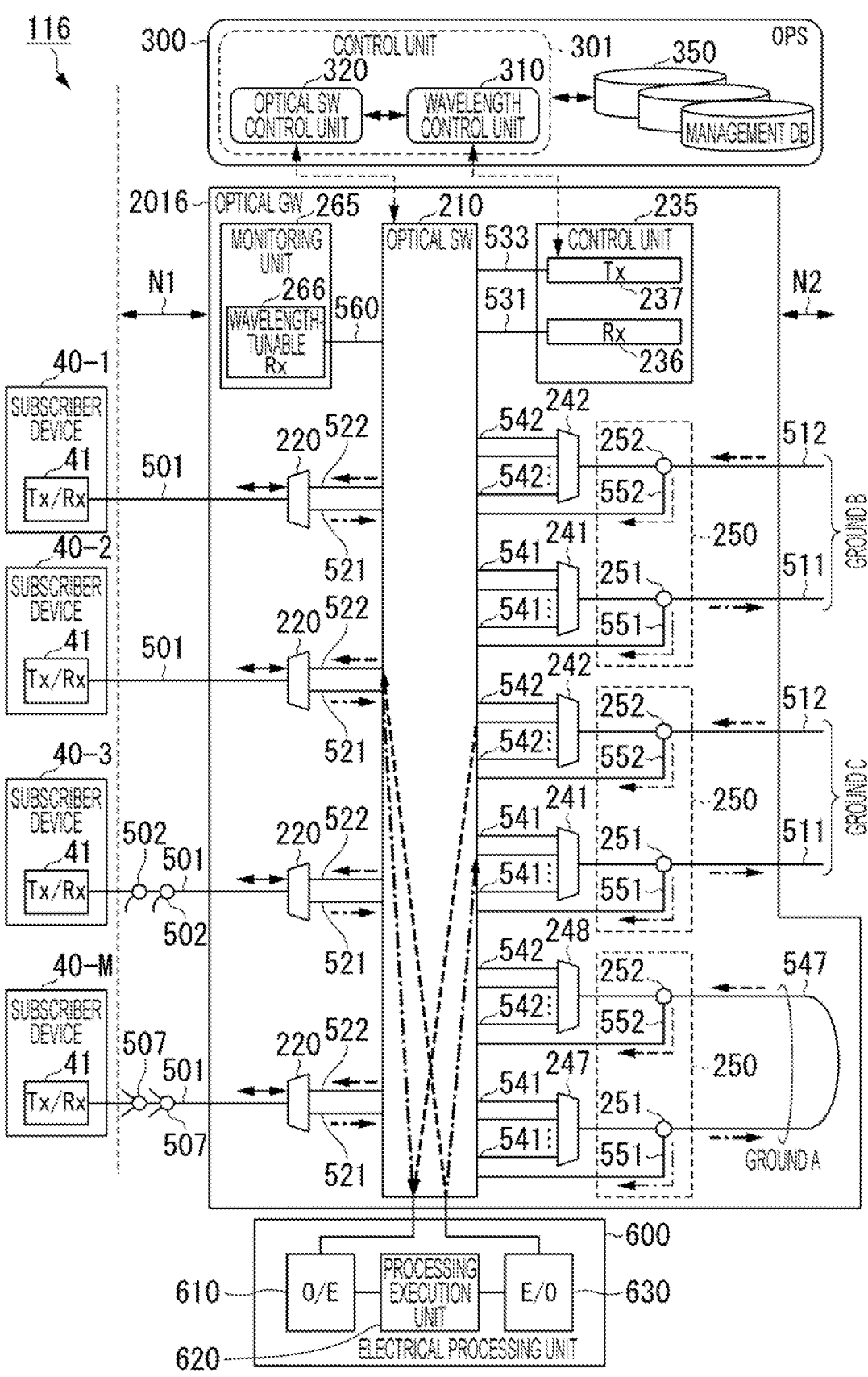
FIG. 58 is a diagram illustrating a configuration example of an optical access system according to a sixteenth configuration example.

FIG. 58 is a diagram illustrating a configuration example of an optical access system 116. The optical access system 116 illustrated in FIG. 58 is different from the optical access system 105 illustrated in FIG. 47 in that an optical GW 2016 is included instead of the optical GW 202. The optical GW 2016 is different from the optical GW 202 in that an electrical processing unit 600 is connected.

The electrical processing unit 600 converts an optical signal into an electrical signal, performs electrical processing on the electrical signal, and then converts the electrical signal into the optical signal again and outputs the optical signal. The electrical processing unit 600 includes an O/E conversion unit 610, a processing execution unit 620, and an E/O converter 630. The O/E conversion unit 610 corresponds to the O/E conversion unit 85 in FIG. 13. The O/E conversion unit 610 converts an optical signal input from the optical SW 210 into an electrical signal and outputs the electrical signal to the processing execution unit 620. The processing execution unit 620 corresponds to the processing execution unit 86 and the storage unit 88 in FIG. 13. In the processing execution unit 620, a processor such as a CPU or an accelerator performs electrical processing on the electrical signal converted by the O/E conversion unit 610 by reading a program from a storage unit (not illustrated) and executing the program. In this electrical processing, an electrical signal processing function, a function such as an OLT, and the like are implemented. The signal processing function is, for example, code error correction such as FEC. The E/O converter 630 corresponds to the E/O conversion unit 87 in FIG. 13. The E/O conversion unit 87 converts the electrical signal into an optical signal and outputs the optical signal to the optical SW 210. The O/E conversion unit 610 and the E/O converter 630 are, for example, wavelength-tunable transceivers.

In FIG. 58, a subscriber device 40-M is an ONU of a PON. The subscriber device 40-M is connected to the optical GW 2016 via the transmission line 501 such as an optical fiber and the power splitter 507. An error correction function, an OLT function, and the like are implemented in the processing execution unit 620 of the electrical processing unit 600.

The wavelength control unit 310 notifies the processing execution unit 620 of a determination condition for determining a signal to be subjected to electrical processing and a type of electrical processing to be performed on the signal. The processing execution unit 620 stores information regarding the determination condition and the type of electrical processing notification of which is provided by the wavelength control unit 310.

For example, in step S5 of FIG. 42, the wavelength control unit 310 determines whether to perform electrical processing on communication between the subscriber device (hereinafter referred to as a request source subscriber device 40) that is a transmission source of a connection request and the communication destination subscriber device 40. The wavelength control unit 310 determines whether to perform the electrical processing according to a distance between the request source subscriber device 40 and the communication destination subscriber device 40 facing each other, a service to be provided to the request source subscriber device 40 or the communication destination subscriber device 40, or the like. When the electrical processing is performed, the wavelength control unit 310 determines which electrical processing is performed. When the wavelength control unit 310 determines to perform electrical processing (hereinafter referred to as transmission signal electrical processing) on a signal addressed from the request source subscriber device 40 to the communication destination subscriber device 40, the wavelength control unit 310 allocates a first transmission wavelength and a second transmission wavelength among free wavelengths. When the wavelength control unit 310 determines to perform the electrical processing (hereinafter referred to as reception signal electrical processing) on a signal addressed from the communication destination subscriber device 40 to the request source subscriber device 40, the wavelength control unit 310 allocates a first reception wavelength and a second reception wavelength among free wavelengths.

The first transmission wavelength is a wavelength for routing an optical transmission signal, which is an optical signal addressed from the request source subscriber device 40 to the communication destination subscriber device 40, to the electrical processing unit 600. The second transmission wavelength is a wavelength for routing the transmission signal on which the transmission signal electrical processing is performed by the electrical processing unit 600 to a port corresponding to the communication destination subscriber device 40. The first reception wavelength is a wavelength for routing a reception signal, which is an optical signal addressed from the communication destination subscriber device 40 to the request source subscriber device 40, to the electrical processing unit 600. The second reception wavelength is a wavelength for routing the reception signal on which the reception signal electrical processing is performed by the electrical processing unit 600 to a port corresponding to the request source subscriber device 40. The first transmission wavelength may be the same as the second transmission wavelength and the first reception wavelength may be the same as the second reception wavelength.

When it is determined that the transmission signal electrical processing is performed, the wavelength control unit 310 sets information regarding the first transmission wavelength as a transmission wavelength in a wavelength instruction to be transmitted to the request source subscriber device 40. When it is determined that the reception signal electrical processing is performed, the wavelength control unit 310 sets information regarding the second reception wavelength as a reception wavelength in a wavelength instruction to be transmitted to the request source subscriber device 40.

When it is determined that the transmission signal electrical processing is performed, the OPS 300 gives an instruction to use the second transmission wavelength as a reception wavelength of the communication destination subscriber device 40. When it is determined that the reception signal electrical processing is performed, the OPS 300 gives an instruction to use the first transmission wavelength as a transmission wavelength of the communication destination subscriber device 40. For example, in the control unit 301 that controls the optical GW 200 in which the communication destination subscriber device 40 is accommodated, the wavelength control unit 310 instructs the control unit 230 to transmit a wavelength instruction in which the reception wavelength and the transmission wavelength of the communication destination subscriber device 40 are set.

Further, when it is determined that the transmission signal electrical processing is performed, the wavelength control unit 310 generates first instruction information in which a determination condition for determining that the signal is a transmission signal addressed from the request source subscriber device 40 to the communication destination subscriber device 40, a type of transmission signal electrical processing to be performed on the transmission signal, a first transmission wavelength, and a second transmission wavelength are associated with each other. When it is determined that the reception signal electrical processing is performed, the wavelength control unit 310 generates second instruction information in which a determination condition for determining that the reception signal is addressed from the communication destination subscriber device 40 to the request source subscriber device 40, a type of the reception signal electrical processing to be applied to the reception signal, the first reception wavelength, and the second reception wavelength are associated with each other. The wavelength control unit 310 transmits an electrical processing execution instruction in which the generated first instruction information and second instruction information are set to the electrical processing unit 600.

When the transmission signal electrical processing is performed, the optical SW control unit 320 controls the optical SW 210 such that the transmission signal with the first transmission wavelength transmitted by the request source subscriber device 40 is output to the electrical processing unit 600, and the transmission signal with the second transmission wavelength input from the electrical processing unit 600 is output to the transmission line 541 corresponding to the communication destination subscriber device 40. When the reception signal electrical processing is performed, the optical SW control unit 320 controls the optical SW 210 such that the reception signal with the first transmission wavelength input from the transmission line 542 corresponding to the communication destination subscriber device 40 is output to the electrical processing unit 600 and the reception signal of the second transmission wavelength input from the electrical processing unit 600 is output to the transmission line 522 corresponding to the request source subscriber device 40.

For example, it is assumed that transmission signal electrical processing and reception signal electrical processing are performed on an optical signal between the subscriber device 40-2 and the communication destination subscriber device 40 on the ground C. The transmission signal with the first transmission wavelength transmitted by the subscriber device 40-2 is output to the electrical processing unit 600 via the optical SW 210. The O/E conversion unit 610 converts the transmission signal input from the optical SW 210 into an electrical signal. When it is determined that the determination condition included in the first instruction information is satisfied with reference to predetermined information included in the transmission signal converted into the electrical signal, the processing execution unit 620 performs the transmission signal electrical processing corresponding to the determination condition on the transmission signal. For example, the processing execution unit 620 performs error correction such as forward error correction (FEC). The E/O converter 630 converts the transmission signal of the electrical signal subjected to the error correction by the processing execution unit 620 into an optical signal with the second transmission wavelength indicated by the first instruction information and outputs the optical signal to the optical SW 210. The optical SW 210 outputs the transmission signal with the second transmission wavelength to the transmission line 541 corresponding to the ground C. By performing the error correction, transmission characteristics are improved.

The optical SW 210 outputs the reception signal with the first reception wavelength input from the transmission line 542 corresponding to the communication destination subscriber device 40 on the ground C to the electrical processing unit 600. The O/E conversion unit 610 converts the reception signal input from the optical SW 210 into an electrical signal. When it is determined that the determination condition included in the second instruction information is satisfied with reference to the predetermined information included in the transmission signal converted into the electrical signal, the processing execution unit 620 performs the reception signal electrical processing corresponding to the determination condition on the reception signal. The E/O converter 630 converts the reception signal of the electrical signal subjected to the reception signal electrical processing by the processing execution unit 620 into the optical signal with the second reception wavelength indicated by the second instruction information, and outputs the optical signal to the optical SW 210. The optical SW 210 outputs the transmission signal with the second reception wavelength to the transmission line 522 corresponding to the subscriber device 40-2.

Figure 59:
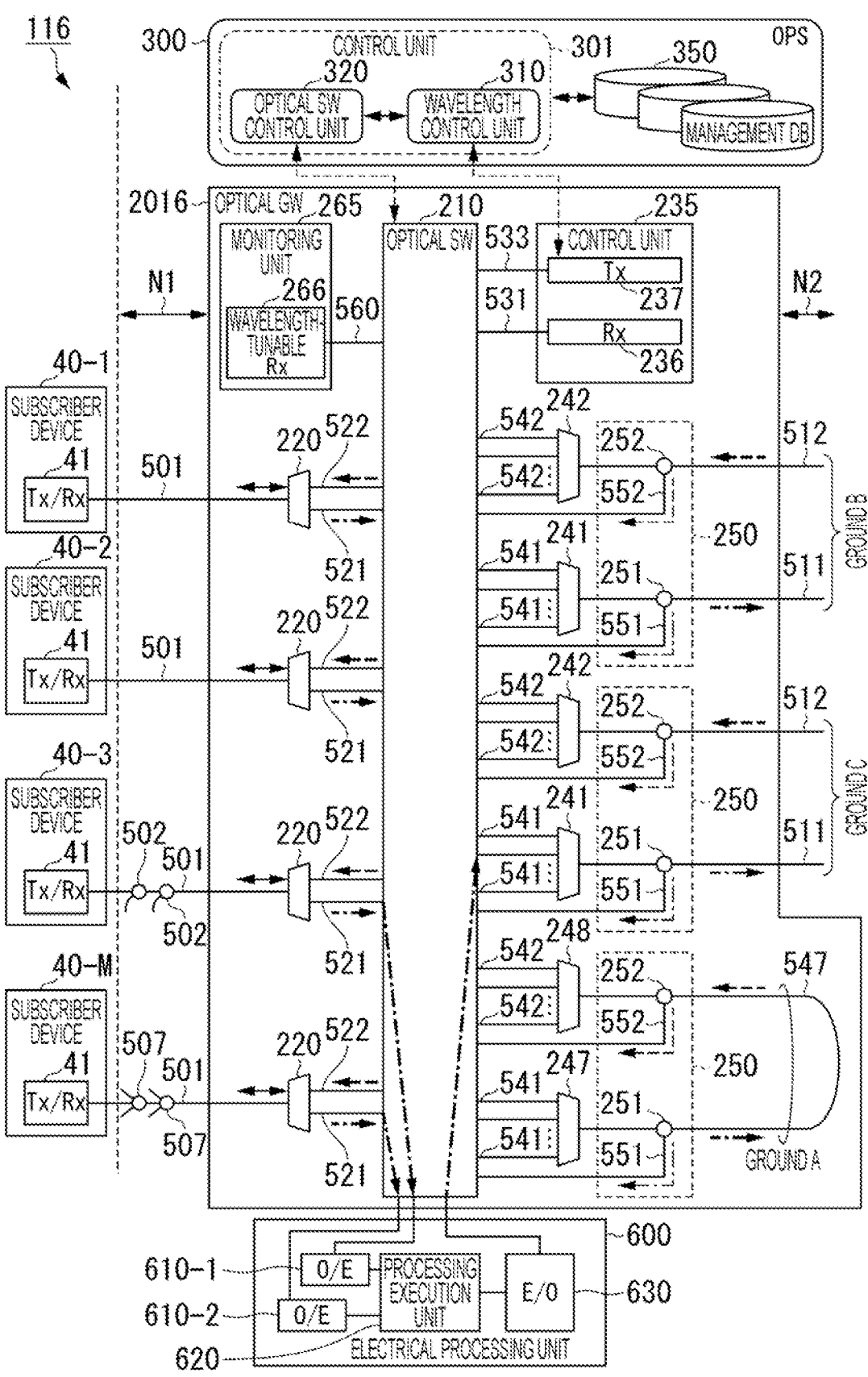
FIG. 59 is a diagram illustrating a configuration example of an optical access system according to the sixteenth configuration example when an electrical processing unit multiplexes signals.

FIG. 59 is a diagram illustrating a configuration example of the optical access system 116 when the electrical processing unit 600 multiplexes signals. The electrical processing unit 600 includes O/E converters 610-1 and 610-2 as the plurality of O/E converters 610.

An uplink optical signal of the subscriber device and an uplink optical signal of the subscriber device are connected to the electrical processing unit 600 via the optical SW 210. An OLT function is implemented in the electrical processing unit 600. The processing execution unit 620 of the electrical processing unit 600 performs processing of an electrical stage of the OLT function. A plurality of subscriber devices 40 is connected to the OLT. The processing execution unit 620 in which the OLT function is implemented collectively manages the subscriber devices 40.

The O/E conversion unit 610-1 converts the uplink optical signal of the subscriber device 40-3 input from the optical SW 210 into an electrical signal and outputs the electrical signal to the processing execution unit 620. The O/E conversion unit 610-2 converts the uplink optical signal of the subscriber device 40-M input from the optical SW 210 into an electrical signal and outputs the electrical signal to the processing execution unit 620. The processing execution unit 620 combines the uplink electrical signals transmitted from the subscriber device and the subscriber device 40-M into one signal and outputs the combined signal to the E/O converter 630. The E/O converter 630 converts the uplink electrical signal output from the processing execution unit 620 into an optical signal in accordance with the wavelength instructed from the control unit 230 and outputs the optical signal to the optical SW 210. The optical SW 210 outputs the uplink optical signal input from the electrical processing unit 600 to the transmission line 541 corresponding to the ground C. As described above, the electrical processing unit 600 receives each of the plurality of optical signals dropped by the optical GW 2016 and converts the reception signal into an electrical signal, multiplexes signals having the same target ground by the multiplexing circuit, converts the signal into an optical signal again, and transmits the optical signal to the optical GW 2016. Accordingly, a transmission rate can be maximized. FIGS. 58 and 59 illustrate an example in which one electrical processing unit is provided, but a plurality of electrical processing units may be provided.

The power splitter 507 between the subscriber device and the optical GW 2016 may be a wavelength multiplexer/demultiplexer. For example, when the optical access system 116 is a WDM-PON, a wavelength demultiplexer is used between the subscriber device 40 and the optical GW 2016.

Seventeenth Configuration Example of Optical Access System 100

The present configuration example is a mode in which optical SWs on different ground are connected in a ring. In the description below, differences from the configuration example will be mainly explained.

Figure 60:
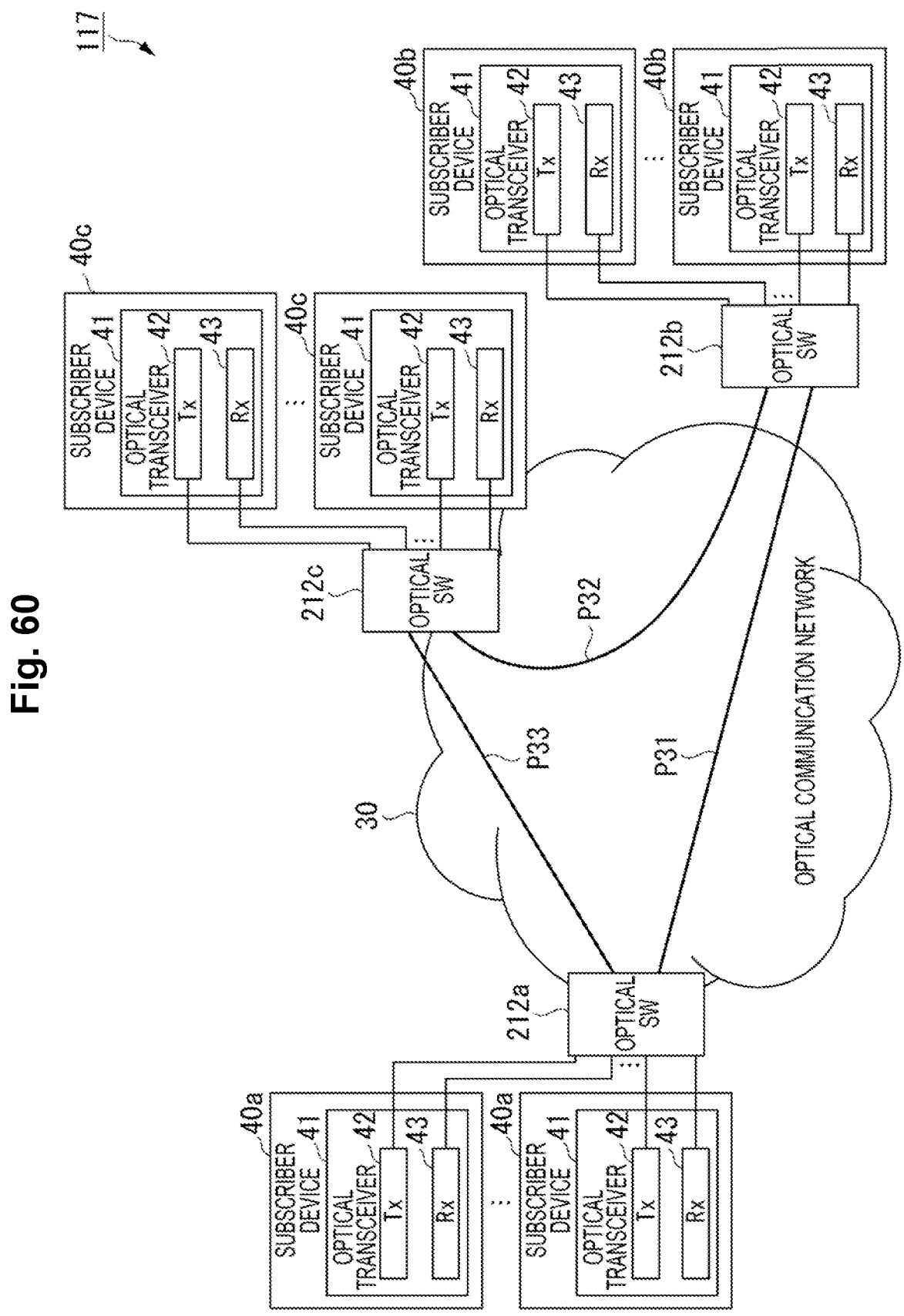
FIG. 60 is a diagram illustrating a configuration example of an optical access system according to a seventeenth configuration example.

FIG. 60 is a diagram illustrating a configuration example of an optical access system 117. The optical access system 117 has a configuration in which three or more different ground optical SWs 212 are connected in a ring form via the optical communication network 30. In the example illustrated in FIG. 60, the optical access system 117 has a configuration in which an optical SW 212a which is the optical SW 212 of the ground A, an optical SW 212b which is the optical SW 212 of the ground B, and an optical SW 212c which is the optical SW 212 of the ground C are connected in the ring form. A path between the optical SW 212a and the optical SW 212b in the optical communication network 30 is referred to as a path P31, a path between the optical SW 212b and the optical SW 212c in the optical communication network 30 is referred to as a path P32, and a path between the optical SW 212c and the optical SW 212a in the optical communication network 30 is referred to as a path P33. One or more subscriber devices 40a are connected to the optical SW 212a, one or more subscriber devices 40b are connected to the optical SW 212b, and one or more subscriber devices 40c are connected to the optical SW 212c.

As the optical SW 212, the above-described optical SW or optical GW is used. For example, the ground B in FIGS. 6 to 10, 38, and 43 to 59 is defined as a counterclockwise ground in the ring illustrated in FIG. 60, and the ground C in FIGS. 6 to 10, 38, and 43 to 59 is defined as a clockwise ground in the ring illustrated in FIG. 60. In this case, connection is made from the optical SW 212a of the ground A to the optical SW 212b of the ground B by the path P31, and connection is made from the optical SW 212b of the ground B to the optical SW 212a of the ground A via the path P32, the optical SW 212-c of the ground C, and the path P33. The optical SW 212a of the ground A is connected to the optical SW 212c of the ground C by the path P33, and the optical SW 212c of the ground C is connected to the optical SW 212a of the ground A via the path P32, the optical SW 212b of the ground B, and the path P31.

Therefore, the counterclockwise connection from the optical SW 212a of the ground A to the optical SW 212b of the ground B is set as a backup system, connection by a clockwise path connecting from the optical SW 212a of the ground A to the optical SW 212b of the ground B via the optical SW 212c of the ground C is also possible, and the counterclockwise connection is also possible. Similarly, the clockwise connection from the optical SW 212-a of the ground A to the optical SW 212c of the ground C is set as a backup system, connection by a counterclockwise path from the optical SW 212a of the ground A to the optical SW 212c of the ground C via the optical SW 212b of the ground B is also possible, and the counterclockwise connection is also possible.

In addition, as a backup system of the connection between the subscriber devices 40a connected to the optical SW 212a of the ground A, a counterclockwise path through the path P31, the optical SW 212b of the ground B, the path P32, the optical SW 212c of the ground C, and the path P33, or a counterclockwise path through the path P33, the optical SW 212c of the ground C, the path P32, the optical SW 212b of the ground B, and the path P31 can be used.

For example, in FIG. 14, the middle distance line P2 may be a counterclockwise path of the ring, and the middle distance line P3 may be a clockwise path of the ring. Any one of grounds #1 to #q in FIGS. 16 and 19 may be a counterclockwise ground of the ring, and the others may be clockwise grounds of the ring. When FIGS. 27 and 28 illustrate the optical SW 1010 in one GW, any one of uplinks #11 to #43 may be set as a counterclockwise path of the ring, and another uplink may be set as a clockwise path of the ring. Here, the path not selected as the path of the ring may be a path of a ring similarly to the path selected as the path of the ring, may be an oblique line other than the ring, may be connected to the subscriber device 40, or may be connected to another optical SW 1010 illustrated in FIGS. 27 and 28.

As described above, when multicasting is performed as the basic configuration, multicasting in the uplink direction or the downlink direction is realized via the folded transmission line, as illustrated in FIG. 4 or 5. For example, in the example illustrated in FIG. 4, in order to realize the multicasting in the uplink direction, an optical signal output from the port 11-2 of the optical SW 10c is input to the other port 11-2 via the folded transmission line, and the optical SW 10c outputs the input optical signal to the port 11-1 to which the 1×N power splitter 71 is connected. Then, the multicasting in an uplink direction is realized by distributing optical signals output from the ports 11-1 by the power splitter 71 and inputting the optical signals to the plurality of other ports 11-1. However, in such a configuration, it is necessary to use a port for folding when multicasting is performed. Therefore, the number of ports in use may increase. This problem occurs not only when multicast routing is performed but also when broadcast routing is performed. Accordingly, in the following embodiment, a configuration for reducing the number of ports when multicast or broadcast routing is performed will be described. In the following description of the embodiment, the description of the control unit 20 and the OPS 300 may be omitted in the drawings. However, in the optical access system, wavelength setting and connection setting of the optical SW by the control unit 20 and the OPS 300 are performed.

First Embodiment

In the following embodiments including the present embodiment, the uplink multicasting from the subscriber device 40*a* connected to the port 11-1 to the subscriber device 40*b* or 40*c* connected to the port 11-2 or the uplink will be mainly described. However, if the port 11-1 and the port 11-2 are interchanged in line symmetry in the center optical SW 210, the uplink or the multicasting from the subscriber device 40*b* or 40*c* connected to the port 11-2 to the subscriber device 40*a* connected to the port 11-1 or the like is performed. Even in broadcasting, a flow of processing is similar to that in multicasting.

Figure 61:
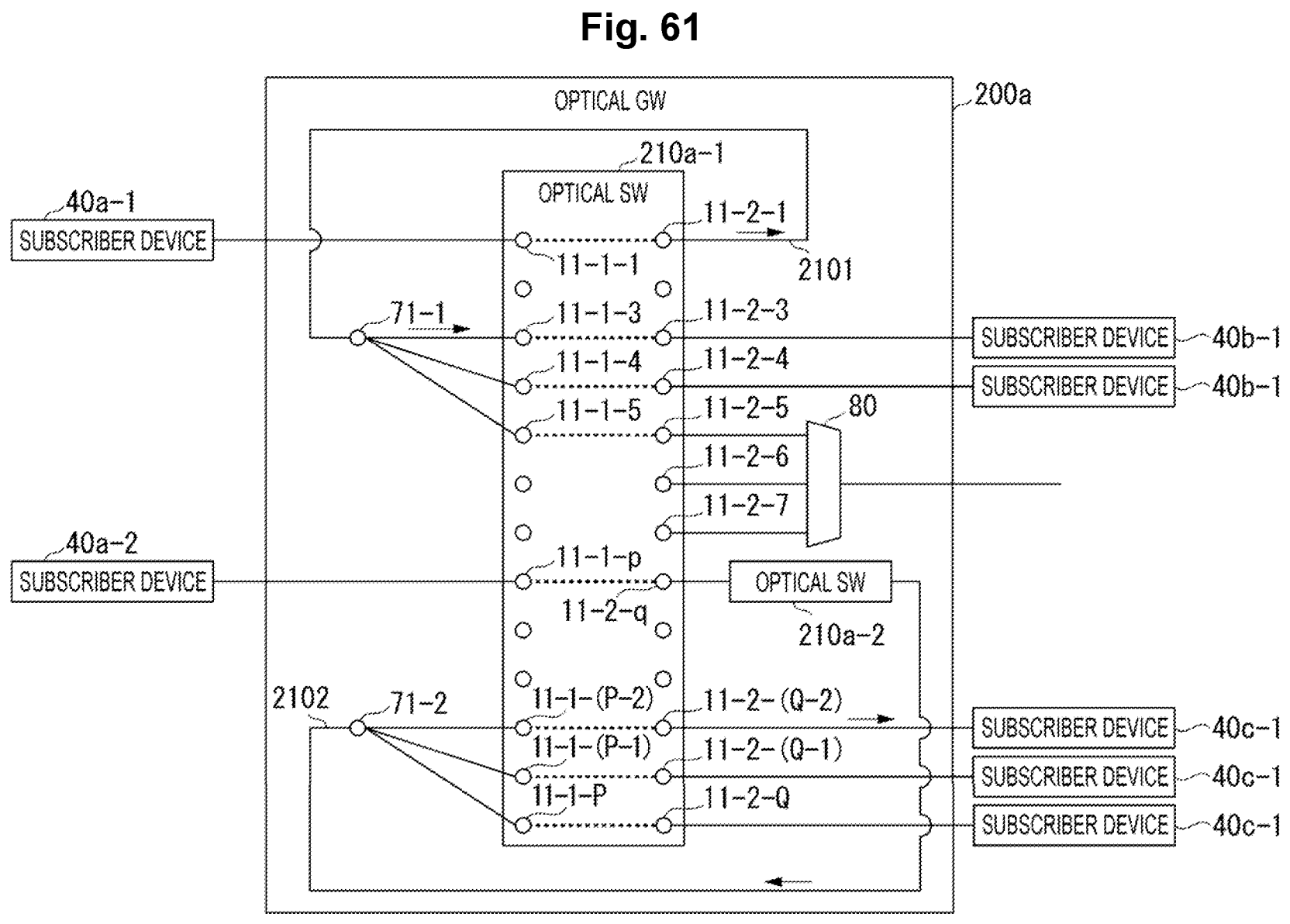

FIG. 61 is a diagram illustrating a configuration example of an optical GW 200*a* in an optical access system of a first embodiment. In FIG. 61, a case where uplink optical signals transmitted from the subscriber devices 40*a*-1 and 40*a*-2 located at the ground A are multicast will be described. Here, in description, as illustrated in FIG. 61, it is assumed that ports connected by a dotted line are connected inside the optical SW 210*a*. This connection between the ports is made by the optical SW control unit 320 (not illustrated).

The optical GW 200*a* folds an optical signal output from the port 11-2 without passing through the optical SW 210*a*-1 and inputs the optical signal to the power splitter 71 connected to the port 11-1. Accordingly, multicasting is possible. FIG. 61 illustrates two configurations, that is, a configuration in which an optical signal passes through another optical switch and a configuration in which an optical signal does not pass through another optical switch when the optical signal is folded without passing through the optical SW 210*a*-1. Each of the configurations will be described below.

(Configuration in which an Optical Signal does not Pass Through Another Optical Switch)

In the configuration in which an optical signal does not pass through another optical switch, the optical GW 200*a* includes an optical SW 210*a*-1, a transmission line 2101, and a power splitter 71-1. The transmission line 2101 connects a port (for example, the port 11-2-1) on the output side of the optical SW 210*a*-1 and the power splitter 71-1 via the outside of the optical SW 210*a*-1. The passing of the outside of the optical SW 210*a*-1 means that the optical signal does not pass through the inside (between ports) of the optical SW 210*a*-1. That is, the transmission line 2101 is a transmission line that is provided outside of the optical SW 210*a*-1 and directly connects the port 11-2-1 and the power splitter 71-1. The transmission line 2101 is, for example, an optical fiber. The power splitter 71-1 divides an input optical signal into a plurality of signals and inputs the plurality of divided optical signals to different ports 11-1. A new power splitter may be provided between the power splitter 71-1 and the port 11-1. In this case, the power splitter 71-1 divides the input optical signal into a plurality of signals, and inputs some or all of the plurality of divided optical signals to the port 11-1 via the power splitter.

A flow of a process in the case of a configuration in which the optical GW 200*a* does not pass through another optical switch will be described. In FIG. 61, the optical GW 200*a* outputs, from the port 11-2-1, an optical signal transmitted by the subscriber device 40*a*-1 and input to the port 11-1-1. The optical signal output from the port 11-2-1 is input to the power splitter 71-1 connected to the plurality of ports 11-1-*n* to 11-1-(*n*+2) via the transmission line 2101. For example, in FIG. 61, the power splitter 71-1 is connected to ports 11-1-3 to 11-1-5.

The power splitter 71 divides the input optical signals and inputs the optical signals to the plurality of ports 11-1-3 to 11-1-5. The optical SW 210*a*-1 outputs the optical signals input from the plurality of ports 11-1-3 to 11-1-5 to the different ports 11-2-3 to 11-2-5, respectively. Bidirectional communication is also possible. The optical signal in the downlink direction is routed in a direction reverse to the uplink direction.

In this case, the uplink direction is one-to-many communication, and the downlink direction is many-to-one communication. In this case, the power splitter 71 is used as a branch combiner/splitter. The power splitter 71 used here has H×I input/output ports. H and I are integers equal to or greater than 1, and a relation of is satisfied. In the case of H=1 and I=2, for example, the power splitter 71 branches the optical signal in the uplink direction and multiplexes the optical signal in the downlink direction. In the example of FIG. 61, the power splitter 71 branches the input optical signal, inputs the optical signals to the plurality of ports 11-1-3 to 11-1-5, multiplexes the optical signals output from the plurality of ports 11-1-3 to 11-1-5, and outputs the multiplexed optical signal to the transmission line 2101.

In order to realize the above processing, when a multicast transmission request is given from the subscriber device 40*a*-1, the optical SW control unit 320 connects the port 11-1-1 to which the subscriber device 40*a*-1 is connected and the port 11-2-1 to which the power splitter 71-1 for performing multicasting is connected.

Accordingly, the optical signal transmitted from the subscriber device 40*a*-1 is output from the port 11-2-1. Further, the optical SW control unit 320 connects the ports 11-1-3 to 11-1-5 to which the power splitter 71-1 is connected and the port 11-2 (In FIGS. 61, 11-2-3 to 11-2-5) corresponding to the transmission destination on the path to the communication destination. Accordingly, each optical signal branched by the power splitter 71-1 is output from the port 11-2 to which the destination subscriber device 40*b* is connected. In such a configuration, the optical signal is folded to enable multicasting.

In the case of downlink multicasting, the following applies.

The optical GW 200*a* includes an optical SW 210*a*-1, a transmission line, and a power splitter. The transmission line connects a port (for example, the port 11-1-1) on the output side of the optical SW 210*a*-1 and the power splitter via the outside of the optical SW 210*a*-1. The transmission line is a transmission line that directly connects the port 11-1-1 and the power splitter. The transmission line is, for example, an optical fiber. The power splitter divides the input optical signal into a plurality of signals and inputs the plurality of divided optical signals to the different ports 11-2. The optical SW 210a-1 outputs the optical signal input to the port 11-2-1 from the port 11-1-1. The optical signal output from the port 11-1-1 is input to a power splitter connected to the plurality of ports 11-2-n to 11-2-(n+2) via a transmission line. For example, the power splitter is connected to the ports 11-2-3 to 11-2-5.

The power splitter distributes the input optical signal and inputs the optical signals to the plurality of ports 11-2-3 to 11-2-5. The optical SW 210a-1 outputs the optical signals input from the plurality of ports 11-2-3 to 11-2-5 to the different ports 11-1-3 to 11-1-5, respectively.
(Configuration in which Optical Signal Passes Through Another Optical Switch)

In the configuration in which an optical signal passes through another optical switch, the optical GW 200a includes an optical SW 210a-1, an optical SW 210a-2, a transmission line 2102, and a power splitter 71-2. The optical SW 210a-2 is connected to a port (for example, the port 11-2-q) on the output side of the optical SW 210a-1. The transmission line 2102 connects the optical SW 210a-2 and the power splitter 71-2 via the outside of the optical SW 210a-1. The optical SW 210a-2 outputs the optical signal output from the port 11-2 on the output side of the optical SW 210a-1 to the power splitter 71-2 via the transmission line 2102. The power splitter 71-2 divides the input optical signal into a plurality of signals and inputs the plurality of divided optical signals to the different ports 11-1. A new power splitter may be provided between the power splitter 71-2 and the port 11-1. In this case, the power splitter 71-1 divides the input optical signal into a plurality of signals, and inputs some or all of the plurality of divided optical signals to the port 11-1 via the power splitter. The optical GW 200a may have only one or both of the configuration in which an optical signal does not pass through another optical switch and the configuration in which an optical signal passes through another optical switch.

A flow of a process in the case of the configuration in which the optical GW 200a passes through another optical switch will be described. In FIG. 61, the optical GW 200a outputs the optical signal transmitted by the subscriber device 40a-2 and input to the port 11-1-p from the port 11-2-q. The optical signal output from the port 11-2-1 is input to the optical SW 210a-2. The optical SW 210a-2 outputs the optical signal output from the port 11-2-q to the power splitter 71-2 connected to the plurality of ports 11-1-(P−2) to 11-1-P via the transmission line 2102.

The power splitter 72 distributes the input optical signal and inputs the optical signals to the plurality of ports 11-1-(P−2) to 11-1-P. The optical SW 210a-1 outputs the optical signals input from the plurality of ports 11-1-(P−2) to 11-1-P to different ports 11-1-(Q−2) to 11-1-Q, respectively. Bidirectional communication is also possible. The optical signal in the downlink direction is routed in a direction reverse to the uplink direction. In this case, the uplink direction is one-to-many communication, and the downlink direction is many-to-one communication. In this case, the power splitter 71 is used as a branch combiner/splitter. The power splitter 71 used here has H×I input/output ports. In the case of H=1 and I=2, for example, the power splitter 71 branches the optical signal in the uplink direction and multiplexes the optical signal in the downlink direction. In the example of FIG. 61, the power splitter 71 branches the input optical signal, inputs the optical signals to the plurality of ports 11-1-(Q−2) to 11-1-Q, multiplexes the optical signals output from the plurality of ports 11-1-(Q−2) to 11-1-Q, and outputs the multiplexed optical signal to the transmission line 2102.

In order to realize the above process, when a multicast transmission request is given from the subscriber device 40a-2, the optical SW control unit 320 connects the port 11-1-p to which the subscriber device 40a-2 is connected and the port 11-2-q to which the power splitter 71-2 for performing multicasting is connected. Accordingly, the optical signal transmitted from the subscriber device 40a-2 is output from the port 11-2-q. Further, the optical SW control unit 320 connects the ports 11-1-(P−2) to 11-1-P to which the power splitter 71-2 is connected and the port 11-2 (in FIG. 61, 11-2-(Q−2) to 11-2-Q) corresponding to the transmission destination on the path to the communication destination. Accordingly, each optical signal branched by the power splitter 71-2 is output from the port 11-2 to which the destination subscriber device 40c is connected. In such a configuration, the optical signal is folded back to enable multicasting to the destination.

In the case of downlink multicasting, the following applies.

The optical GW 200a includes an optical SW 210a-1, an optical SW 210a-2, a transmission line, and a power splitter. The optical SW 210a-2 is connected to a port (for example, the port 11-1 q) on the output side of the optical SW 210a-1. The transmission line connects the optical SW 210a-2 and the power splitter via the outside of the optical SW 210a-1. The optical SW 210a-2 outputs the optical signal output from the port on the output side of the optical SW 210a-1 to the power splitter via the transmission line. The power splitter divides the input optical signal into a plurality of signals and inputs the plurality of divided optical signals to the different ports 11-2. The optical GW 200a may have only one or both of the configuration in which an optical signal does not pass through another optical switch and the configuration in which an optical signal passes through another optical switch.

According to the optical GW 200a that has the foregoing configuration, the port of the optical SW 210a-1 is not used as a folded path when multicast or broadcast routing is performed. Accordingly, even when routing is performed, the number of paths inside the optical SW 210a-1 is reduced by one path, that is, one port for each of the ports 11-1-p and 11-2-q. Therefore, it is possible to transmit an optical signal according to a transmission destination on a path to a communication destination while reducing the number of use ports when the multicast or broadcast routing is performed in the optical SW 210a-1.

In the first embodiment, the power splitter is mainly used, but a multiplexer/demultiplexer may be used in the case of multicasting demultiplexed for each wavelength (effectively, unicasting demultiplexed in accordance with a wavelength).

Second Embodiment

In the first embodiment, the configuration in which the optical signal output from the port 11-2 once via the optical SW is folded via the outside of the optical SW has been described. In this case, in order to fold the optical signal, it is necessary to transmit the optical signal between the ports of the optical SW once. Therefore, the corresponding number of ports cannot be used. Therefore, in the second embodiment, a configuration for reducing the number of ports when multicasting is performed as compared with the first embodiment will be described. Even in broadcasting, a flow of processing is similar to that in multicasting.

Figure 62:
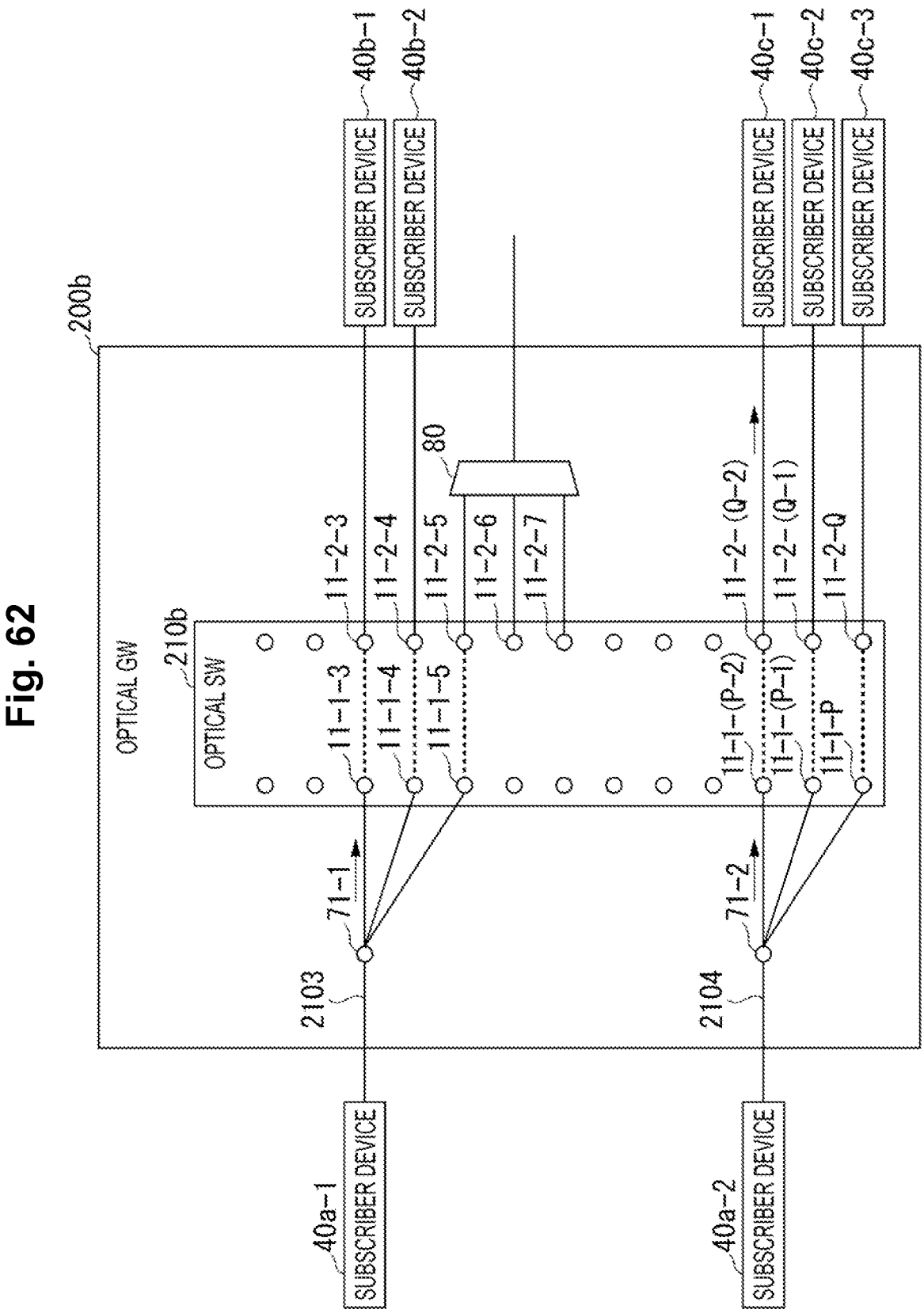
FIG. 62 is a diagram illustrating a configuration example of an optical GW in an optical access system according to a second embodiment.

FIG. 62 is a diagram illustrating a configuration example of an optical GW 200b in the optical access system according to a second embodiment. In FIG. 62, a case of multicasting uplink optical signals transmitted from the subscriber devices 40a-1 and 40a-2 located at the ground A will be described. Here, in the description, as illustrated in FIG. 62, it is assumed that ports connected by a dotted line are connected inside the optical SW 210b. This connection between the ports is made by the optical SW control unit 320 (not illustrated).

The optical GW 200b distributes the optical signal output from the subscriber device 40a-1 into a plurality of signals and inputs the plurality of distributed optical signals to different ports 11-1. Accordingly, it is possible to reduce the number of sets of ports for folding back optical signals and perform multicasting. The optical GW 200b includes power splitters 71-1 and 71-2. The optical GW 200b may include either the power splitter 71-1 or the power splitter 71-2, or may include both the power splitters.

In FIG. 62, the power splitter 71-1 divides the optical signal output from the subscriber device 40a-1 into a plurality of signals, and inputs the plurality of divided optical signals to different ports 11-1 (in FIG. 62, ports 11-1-3 to 11-1-5). The power splitter 71-1 is connected to the subscriber device 40a-1 via the transmission line 2103. The power splitter 71-2 divides the optical signal output from the subscriber device 40a-2 into a plurality of signals, and inputs the plurality of divided optical signals to different ports 11-1 (in FIG. 62, 11-1-(P–2) to 11-1-P). The power splitter 71-2 is connected to the subscriber device 40a-2 via the transmission line 2104. New power splitters may be provided between the power splitter 71-1 and the port 11-1 and between the power splitter 71-2 and the port 11-1. In this case, the power splitters 71-1 and 71-2 divide the input optical signal into a plurality of signals and input some or all of the plurality of divided optical signals to the port 11-1 via the power splitter.

As described above, in the second embodiment, the power splitter 71 and the power splitter 72 are provided at the preceding stage at which the optical signal is input to the port 11-1, and the optical signal output from the subscriber device 40a is multicast. The optical SW 210b outputs the optical signals input from the plurality of ports 11-1 to the different ports 11-2. Bidirectional communication is also possible. The optical signal in the downlink direction is routed in a direction reverse to the uplink direction. In this case, the power splitter 71 is used as a branch combiner/splitter. The power splitter 71 used here has H×I input/output ports. In the case of H=1 and I=2, for example, the power splitter 71 branches the optical signal in the uplink direction and multiplexes the optical signal in the downlink direction. In the example of FIG. 62, the power splitter 71 branches the input optical signal, inputs the optical signal to the plurality of ports 11-1-3 to 11-1-5, multiplexes the optical signals output from each of the plurality of ports 11-1-3 to 11-1-5, and outputs the multiplexed optical signal to the subscriber device 40a-1.

In order to realize the foregoing process, when a multicast transmission request is given from the subscriber device 40a, the optical SW control unit 320 connects the port 11-1 to which the power splitter 71 to which the subscriber device 40a that is the transmission source of the transmission request is connected is connected and the port 11-2 corresponding to the transmission destination on the path to the communication destination. Accordingly, the optical signal transmitted from the subscriber device 40a is branched by the power splitter 71, and each of the plurality of branched optical signals is output from the transmission destination port 11-2 on the path to the communication destination. In such a configuration, it is possible to perform multicasting to a destination while reducing the number of ports.

According to the optical GW 200b that has the foregoing configuration, the basic configuration or the folded path as described in the first embodiment is not used to perform multicasting. Therefore, it is possible to reduce the number of ports used for the folded path. For example, in the second embodiment, as compared with the first embodiment, the number of paths inside the optical SW 210b is further reduced by one path, that is, by one port of each of the ports 11-1-p and 11-2-q. Therefore, it is possible to transmit an optical signal in accordance with a transmission destination on the path to the communication destination while reducing the number of use ports in the optical SW 210b.

In the second embodiment, the power splitter is mainly used, but a multiplexer/demultiplexer may be used in the case of multicasting demultiplexed for each wavelength (effectively, unicasting demultiplexed in accordance with a wavelength).

Third Embodiment

In the second embodiment, although the number of ports can be reduced, it is necessary to select whether to make connection to the power splitter or connection to an unconnected port of the power splitter when the subscriber device 40a is connected. As described above, in the second embodiment, when a communication source starts or stops multicasting, the port to be connected is changed. In a third embodiment, a configuration for suppressing a change in a port will be described. In the configurations, the above-described optical SW is replaced with a set of cascade-connected optical SWs.

Figure 63:
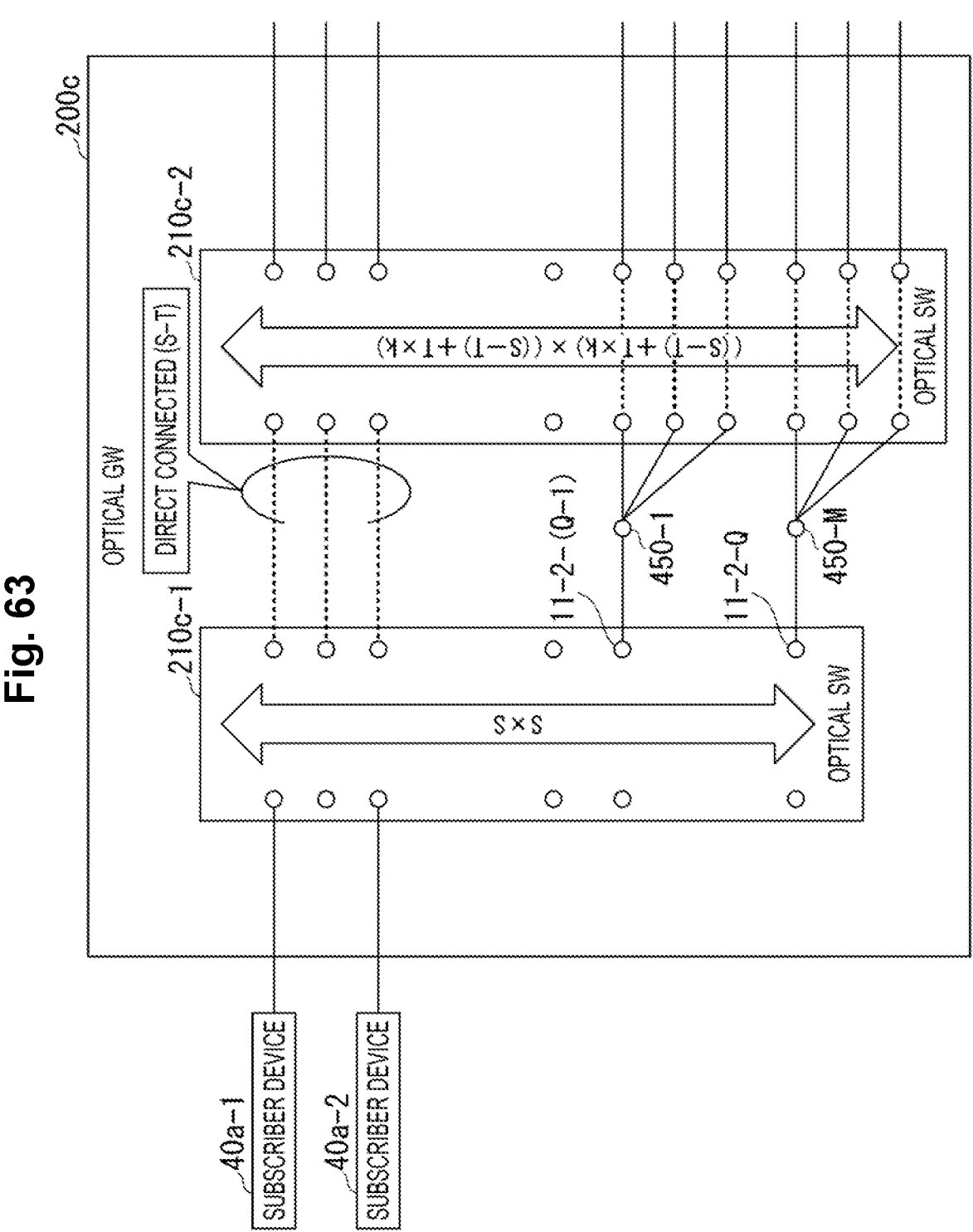
FIG. 63 is a diagram illustrating a configuration example of an optical GW in an optical access system according to a third embodiment.

FIG. 63 is a diagram illustrating a configuration example of an optical GW 200c in the optical access system of the third embodiment. In FIG. 63, to facilitate explanation, the optical SW that has a (11-1-P)×(11-2-Q) configuration will be described as a symmetric SW of S×S or the like (where S is an integer equal to or greater than 1), but the optical SW can be easily expanded even in the case of an asymmetric optical SW such as a SW which has the (11-1-P)×(11-2-Q) configuration.

The optical GW 200c illustrated in FIG. 63 includes a first optical switch 210c-1, a second optical switch 210c-2, and power splitters 450-1 to 450-M. The first optical switch 210c-1 and the second optical switch 210c-2 are cascade-connected. In the cascade configuration of the optical GW 200c in the third embodiment, an S×S first optical switch 210c-1 and a $((S–T)+T×k)×((S–T)+T×k)$ second optical switch 210c-2 are used. Here, S is the number of subscriber devices 40a, T is the number of ports to be branched, and k is the number of branches for each port. The number of ports to be branched is the number of ports to which the power splitter is connected.

When the number of branches k is different for each port, T×k is replaced with a sum of the number of branches of the ports. An output of the branching T ports in the S×S optical SW 210c-1 is directly connected to ports of the remaining (S–T) ports $((S–T)+T×k)×((S–T)+T×k)$ optical SW 210c-2 via the power splitters 450-1 to 450-M.

Advantageous effects obtained in the third embodiment will be described.

An SW sizes of the two optical SWs illustrated in FIG. 63 are as follows: a first stage: $S^2$ and a second stage: $((S–T)+T×k)^2=(S+T×(k–1))^2$. Therefore, a maximum size $(S+T×k)^2$ decreases to $(S+Tx(k-1))^2$, and a total number of SW fabrics does not decrease at $(S+Txk)^2-f(s)^2+[(S+Tx(k-1))^2]=S(2S-2k+1)-S^2$.

Although all the ports are connected, there may be a free port or a port connected to an electrical processing unit or the like. Here, a configuration in a case where the electrical processing unit and the like are connected in the third embodiment will be described. In the optical GW 200c, the electrical processing units are connected by optical SW (for example, the optical switch 210c-1) near the subscriber device 40a in a case where the optical GW passes through the optical GW before multicasting or without multicasting, and the electrical processing units are connected by other optical SW (for example, the optical switch 210c-2) in a case where the optical GW passes through the optical GW after multicasting. It is preferable to pass through before multicasting in a case where forward error correction (FEC), encryption, or the like is collectively processed, and it is preferable to pass through after multicasting in a case where FEC, encryption, or the like is changed for each destination.

In the third embodiment, bidirectional communication is also possible. The optical signal in the downlink direction is routed in a direction reverse to the uplink direction. In this case, the power splitter 450 is used as a branch combiner/splitter. The power splitter 450 used here has H×I input/output ports. In the case of H=1 and I=2, the power splitter 450, for example, branches the optical signal in the uplink direction and multiplexes the optical signal in the downlink direction. In the example of FIG. 63, the power splitter 450 branches the input optical signal, inputs the optical signal to a plurality of ports of the optical SW 210c-2, multiplexes the optical signals output from each of the plurality of ports of the optical SW 210c-2, and outputs the multiplexed optical signal to the port 11-2 (for example, port 11-2-(Q–1)) of the optical SW 210c-1.

Fourth Embodiment

Figure 64:
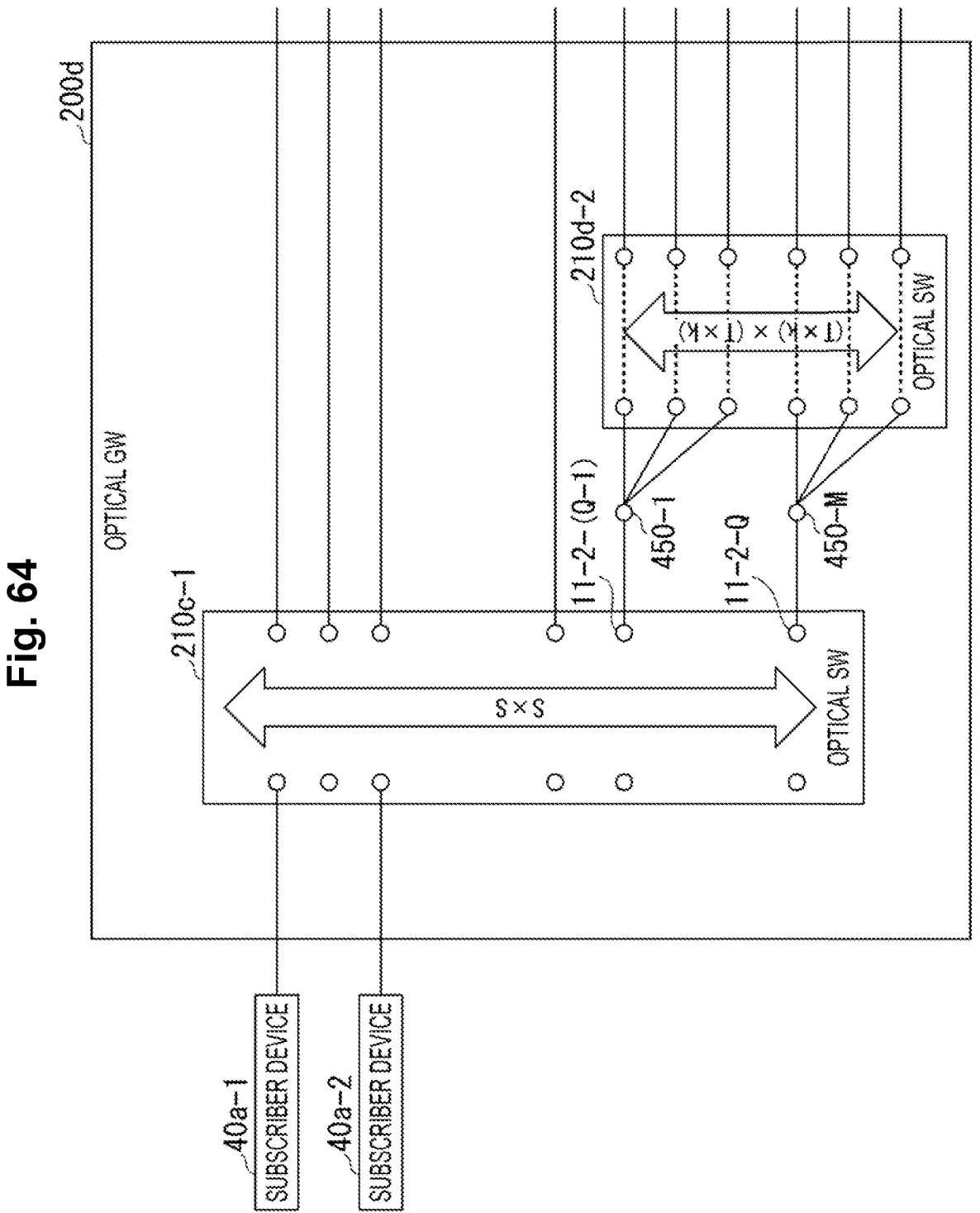
FIG. 64 is a diagram illustrating a configuration example of an optical GW in an optical access system according to a fourth embodiment.

FIG. 64 is a diagram illustrating a configuration example of an optical GW 200d in an optical access system of the third embodiment. In FIG. 64, for simplification of description, the optical SW which has the (11-1-P)×(11-2-Q) configuration has been described as a symmetric SW such as S×S, but can also be easily expanded to the case of an asymmetric optical SW such as a SW which has the (11-1-p)×(11-2-Q) configuration.

The optical GW 200d illustrated in FIG. 64 includes the first optical switch 210c-1, the second optical switch 210d-2, and power splitters 450-1 to 450-M. The optical GW 200d is different from the optical GW 200c in that a second optical switch 210d-2 is included instead of the second optical switch 210c-2. In the cascade configuration of the optical GW 200d in the fourth embodiment, an S×S optical SW and a (T×k)×(T×k) optical SW are used.

When the number of branches k is different for each port, T×k is replaced with a sum of the number of branches of the ports. An output corresponding to branched T ports in the S×S optical SW 210c-1 is connected to the second optical switch 210d-2 via the power splitters 450-1 to 450-M. An output of the remaining (S–T) ports does not pass through the second optical switch 210d-2.

Advantageous effects obtained in the fourth embodiment will be described.

The SW sizes of the two optical SWs illustrated in FIG. 64 are $S^2$ at the first stage and $(T×k)^2$ at the second stage. Accordingly, a maximum size $(S+T×k)^2$ decreases to MAX $(S^2, (T×k)^2)$, and the total number of SW fabrics decreases by $(S+Txk)^2-\{(5)^2 (T×k)^2\}=2STk$.

Although all the ports are connected, there may be a free port or a port connected to an electrical processing unit or the like. Here, a configuration in a case where the electrical processing unit and the like are connected in the fourth embodiment will be described. In the optical GW 200d, the electrical processing unit is connected by an optical SW (for example, the optical switch 210c-1) close to the subscriber device 40a, and the electrical processing unit is connected to another optical SW (for example, the optical switch 210d-2) in a case where each path is passed after multicasting. It is preferable to pass through before multicasting in a case where forward error correction (FEC), encryption, or the like is collectively processed, and it is preferable to pass through after multicasting in a case where FEC, encryption, or the like is changed for each destination.

In the fourth embodiment, bidirectional communication is also possible. The optical signal in the downlink direction is routed in a direction reverse to the uplink direction. In this case, the power splitter 450 is used as a branch combiner/splitter. The power splitter 450 used here has H×I input/output ports. In the case of H=1 and I=2, the power splitter 450, for example, branches the optical signal in the uplink direction and multiplexes the optical signal in the downlink direction. In the example of FIG. 64, the power splitter 450 branches the input optical signal, inputs the optical signal to the plurality of ports of the optical SW 210d-2, multiplexes the optical signals output from the plurality of ports of the optical SW 210d-2, and outputs the multiplexed optical signal to the port 11-2 (for example, port 11-2-(Q–1)) of the optical SW 210c-1.

Fifth Embodiment

In the basic configuration, as illustrated in FIGS. 3 to 5, the configuration in which the power splitter or the WDM device is not provided in the folded transmission line, and the ports are directly connected to fold the optical signal has been described. In a fifth embodiment, a variation of the folded configuration of an optical signal will be described. For example, the folded transmission line may be configured by a network that is folded via a network such as an optical SW of an intermediate layer such as a Folded Clocks network. The folded transmission line may be configured such that some of the ports of some of the input/output SWs of the Folded Clos network to the intermediate layer SW and some of the ports of the intermediate layer SW are on a 11-2-Q side, and some of the ports of some of the input/output SWs to the intermediate layer SW and some of the ports of the intermediate layer SW are on a 11-2-Q side. Accordingly, the optical SW enables folded communication.

Figure 65:
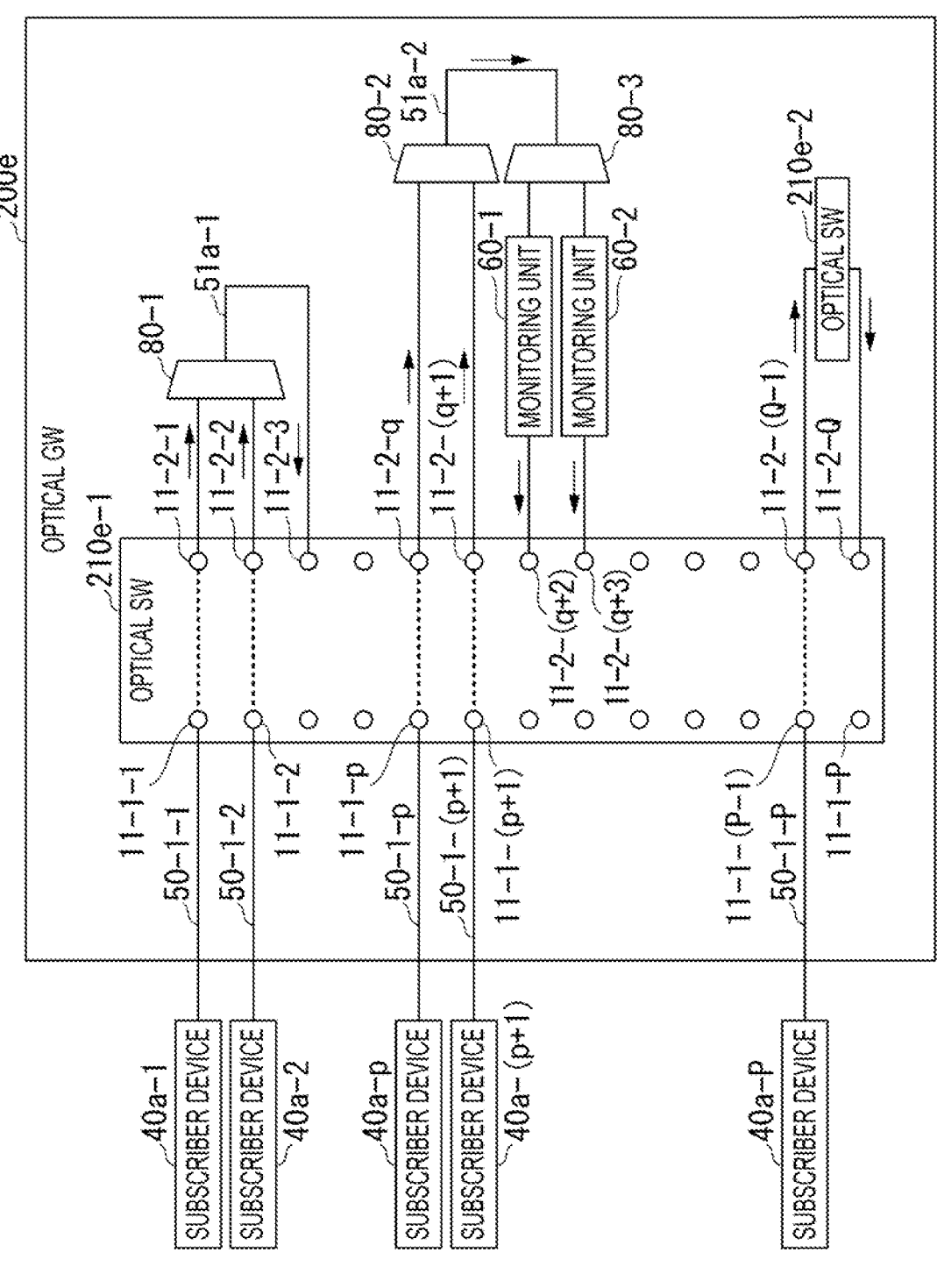
FIG. 65 is a diagram illustrating a configuration example of an optical GW in an optical access system according to a fifth embodiment.

FIG. 65 is a diagram illustrating a configuration example of an optical GW 200e in an optical access system according to the fifth embodiment. In FIG. 65, three configurations (first to third configurations) will be described as variations of the configuration of folding of the optical signal.

(First Configuration of Folding of Optical Signal)

In the first configuration of the folding back of the optical signals, the optical GW 200e includes an optical SW 210e-1 and a WDM device 80-1. The subscriber devices 40a-1 to 40a-2 are connected to the ports 11-1-1 to 11-1-2 of the optical GW 200e by transmission lines 50-1-1 to 50-1-2. The WDM device 80-1 is connected to the ports 11-2-1 to 11-2-2 of the optical GW 200e. The subscriber devices 40a-1 to 40a-2 transmit and receive optical signals with different wavelengths. The WDM device 80-1 multiplexes the optical signals output from the ports 11-2-1 and 11-2-2 and outputs the multiplexed optical signal to the folded transmission line 51*a*-1. The folded transmission line 51*a*-1 is connected to the port 11-2-3. Such a configuration enables folding of the optical signals.

(Second Configuration of Folding of Optical Signal)

In the second configuration of the folding of the optical signal, the optical GW 200*e* includes an optical SW 210*e*-1, a plurality of WDM devices 80-2 to 80-3, and a plurality of monitoring units 60-1 and 60-2. The subscriber devices 40*a*-*p* to 40*a*-(p+1) are connected to the ports 11-1-*p* to 11-1-(*p*+1) of the optical GW 200*e* by transmission lines 50-1-*p* to 50-1-(*p*+1). The WDM device 80-2 is connected to the ports 11-2-*q* to 11-2-(*q*+1) of the optical GW 200*e*.

The subscriber devices 40*a*-*p* to 40*a*-(p+1) transmit and receive optical signals with different wavelengths. The WDM device 80-2 multiplexes the optical signals output from the ports 11-2-1 and 11-2-2 and outputs the multiplexed optical signal to the folded transmission line 51*a*-2. The folded transmission line 51*a*-2 is connected to the WDM device 80-3. The WDM device 80-3 demultiplexes the input optical signal and outputs the demultiplexed optical signals to the monitoring units 60-1 and 60-2. The monitoring units 60-1 and 60-2 monitor the optical signals transmitted through the transmission lines. Such a configuration enables folding of the optical signals.

(Third Configuration of Folding of Optical Signal)

In the third configuration of the folding of the optical signal, the optical GW 200*e* includes an optical SW 210*e*-1 and an optical SW 210*e*-2. A subscriber device 40*a*-P is connected to a port 11-1-(P−1) of the optical GW 200*e* through a transmission line 50-1-P. The optical SW 210*e*-2 is connected to the port 11-2-(Q−1) of the optical GW 200*e*. The subscriber devices 40*a*-P transmit and receive optical signals. The optical SW 210*e*-1 outputs the optical signal input from the port 11-1-(P−1) from the port 11-2-(Q−1). The optical signal output from the port 11-2-(Q−1) is output to the optical SW 210*e*-2. The optical SW 210*e*-2 outputs the input optical signal to the port 11-2-Q. Such a configuration enables folding of the optical signals.

According to the optical GW 200*e* configured as described above, a configuration of the folded communication other than the configuration illustrated in the basic configuration can be applied. Accordingly, the degree of freedom of combination is improved, and convenience can be improved.

Next, a configuration for reducing the used ports of the optical SW accommodating the subscriber device 40 will be presented. Here, the optical SW 1010 illustrated in FIGS. 27 and 28 will be described as an example. However, the optical SW can be similarly applied to other optical SWs (for example, the optical SW 10, the optical SW 210, and the like) described above.

In the configuration illustrated in FIGS. 27 and 28, for example, when viewed from the subscriber device 40 (in FIGS. 27 and 28, the ONU) on the port 11-1 side as a transmission line, it clearly corresponds to an increase in the number of connections of output paths connected to the port 11-2. Therefore, when the optical SW 1010 is connected to the subscriber device 40 on the port 11-1 side of another optical SW 1010 (for example, optical SW 1010-2 to 1010-4), as described above, and the optical SW 1010 is connected in the full mesh type illustrated in FIG. 27, the port 11-1 (for example, the port 11-1-1 (connected to ONU #11) and the port 11-2 (for example, the port 11-2-*q*1 (connected to *a)) of the optical SW 1010-1, the port 11-1 and the port 11-2 (for example, the port 11-1-*p*1 (connected to *a) of the optical SW 1010-2 to which the facing subscriber device 40 is connected on the port 11-1 side, a port 11-2-*x* (connected to the folded transmission line) and the port 11-2 and the port 11-2 (for example, a port 11-2-*y* and a port 11-2-*z*) connected to the folded transmission line, and the port 11-1 to which the opposing ONU is connected (for example, the port 11-1-1 (connected to ONU #21)) and 6 ports are occupied. The same applies to a case where a folded transmission line is installed in the optical SW 1001.

In the case of the ring-type connection illustrated in FIG. 28, the port 11-1 and the port 11-2 (for example, the port 11-1-1 (connected to ONU #11) and a port 11-2-*q*1 (connected to *a)) of the optical SW 1010-1, the port 11-1 and the port 11-2 (for example, the port 11-1-*p*1 (connected to *a)) of the optical SW 1010-2 passing therethrough, the port 11-2-*q*1 (connected to *d), the port 11-1 and the port 11-2 (for example, the port 11-1-*p*1 (connected to *d)) of the optical SW 1010-3 to which the facing subscriber device 40 is connected on the port 11-1 side, the port 11-2-*x* (connection with the folded transmission line), the port 11-2 and the port 11-2 (for example, a port 11-2-*y* and a port 11-2-*z*) connected to the folded transmission line, and the port 11-1 (for example, the port 11-1-1 (connection with ONU #21) to which the opposing ONU is connected, and eight ports are occupied. The same applies to a case where the folded transmission line is installed in the optical SW 1010-1 or the optical SW 1010-2.

Figure 66:
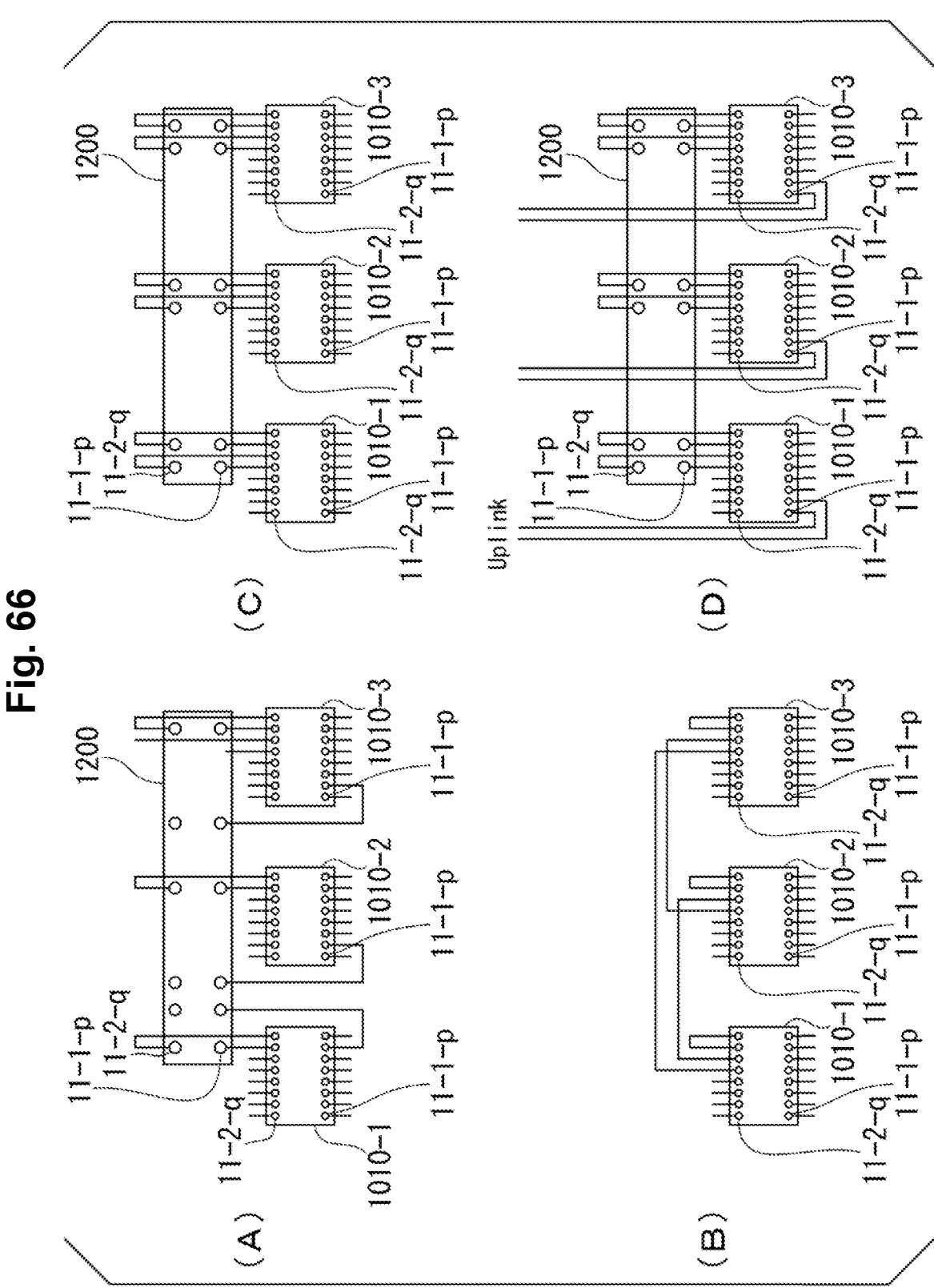
FIG. 66 is a diagram illustrating another aspect of scalability of the optical SW.

In view of the foregoing description, a configuration for reducing the used ports of the optical SW accommodating the subscriber device 40 will be described with reference to FIG. 66. In FIG. 66, four configurations are illustrated as configurations for reducing used ports of the optical SW.

(First Configuration)

As illustrated in FIG. 66(A), in the first configuration, the optical SW 1010-1 to the optical SW 1010-3 and the optical SW 1200 are illustrated. In the first configuration, from the viewpoint of an improvement in the degree of freedom of connection for changing a ratio of the ports of the optical SW passed along a transmission line across the optical SW, the transmission line across the optical SW is assumed to be the optical SW 1200. The configuration of the optical SW 1200 is basically similar to that of the other optical SWs 1010. When the transmission line across the optical SW is the optical SW, the used ports of the optical SW accommodating the subscriber device 40 can be reduced.

Means for reducing used ports of the optical SW accommodating the subscriber device 40 will be described. In FIG. 27, the transmission lines connected across each of the optical SWs 1010-1 to 1010-4 is are as one set, but the transmission lines across from the single optical SW 1010 are occupied and connected to an ONU of the same optical SW. For example, in the example of FIG. 27, when ONU #11, ONU #12, and ONU #13 are connected to ONU #21, ONU #22, or ONU #23, 22 ports, for example, 6 ports, 8 ports, or 8 ports, are occupied via other optical SW. On the other hand, as illustrated in FIG. 66(A), when the transmission line across the optical SW is the optical SW 1200, only 18 ports are used as the ports of the optical SW 1010-1 and the optical SW 1010-2 that accommodate the subscriber device 40. The optical SWs 1010-1 to 1010-4 are kinds of plurality of optical switches. In this description, the optical SW 1010-1 will be described as a kind of first optical switch among the plurality of optical switches, and the optical SW 1010-2 will be described as a kind of second optical switch among the plurality of optical switches.

More specifically, the optical SW 1200 is connected to the port 11-1 and the port 11-2 of the optical SW 1010-1 and is further connected to the port 11-1 and the port 11-2 of the optical SW 1010-2 and the port 11-1 and the port 11-2 of the optical SW 1010-3. In this way, the optical SW 1200 is connected to the first port (For example, port 11-1) of the plurality of optical switches and the second port (for example, the port 11-2) on the side different from the first port (for example, the side different from the side on which the port 11-1 is provided among the plurality of optical switches.). The first port and the second port illustrated here are exemplary, and the port 11-1 may be the second port and the port 11-2 may be the first port. The same applies to the following description. The optical SW 1200 connects the port 11-2 on the output side of the plurality of optical SWs 1010 and the port 11-1 on the input side of the plurality of optical SWs 1010. For example, the optical SW 1200 connects the port 11-2 on the output side of the optical SW 1010-1 and the port 11-1 on the input side of the optical SW 1010-2. The optical SW control unit 320 controls the optical SW 1200 such that the path inside the optical SW 1200 becomes a path oriented to a transmission destination on the path to the communication destination. In such a configuration, as illustrated in FIG. 27, it is possible to reduce the number of ports passing through other optical SWs 1010-2 and 1010-3.

(Second Configuration)

As illustrated in FIG. 66(B), in the second configuration, the optical SW 1010-1 to the optical SW 1010-3 are illustrated. In the second configuration, the folded transmission line is not connected to the same optical SW, but is connected between the optical SWs connected by the facing subscribers. For example, the connection is made by the port 11-1-1 that connects the optical SW 1010-1 and ONU #11, a port 11-2-$x$ of the optical SW 1010-1, a folded transmission line, a port 11-2-$y$ of the optical SW 1010-2, and a port 11-1-1 that connects the optical SW 1010-2 and ONU #21. That is, in the second embodiment, the ports 11-2 on the same side of the different optical SWs 1010 are connected by the folded transmission line. In the example illustrated in FIG. 66(B), the port 11-2 of the optical SW 1010-1 and the port 11-2 of the optical SW 1010-2 are connected by the folded transmission line, the port 11-2 of the optical SW 1010-2 and the port 11-2 of the optical SW 1010-3 are connected by the folded transmission line, and the port 11-2 of the optical SW 1010-1 and the port 11-2 of the optical SW 1010-3 are connected by the folded transmission line. In this case, since four ports are used, it can be understood that two ports can be reduced in use as compared with use of six ports.

(Third Configuration)

As illustrated in FIG. 66(C), in the third configuration, optical SW 1010-1 to optical SW 1010-3 and optical SW 1200 are illustrated. In the third configuration, the optical SW 1200 is used as the folded transmission line. When the optical SW 1200 is an SW that has a configuration of (11-1-P)×(11-2-Q), a single optical SW (for example, the optical SW 1010-1) accommodating the subscriber device 40 is connected to each of the ports 11-1 and 11-2 of the optical SW 1200, which is a transmission line across the optical SW, and is connected from the port 11-1 to the port 11-2 and from the port 11-2 to the port 11-1. When different optical SWs accommodating the subscriber device 40 are connected to each other, a transmission line across the optical SW is formed. When connected is made through the same optical SW, a folded transmission line in the same SW is formed. That is, in the third configuration, some of the ports 11-2 on the output side of the optical SW 1010-1 to the optical SW 1010-3 are connected to the ports 11-1 of the optical SW 1200, and the others of the port 11-2 on the output side of the optical SW 1010-1 to the optical SW 1010-3 are connected to the ports 11-2 of the optical SW 1200. Accordingly, the optical SW 1200 connects the ports 11-2 on the output side of the optical SW 1010-1 to the optical SW 1010-3. The optical SW control unit 320 controls the optical SW 1200 such that the path inside the optical SW 1200 connects the ports 11-2 on the output side of the optical SW 1010-1 to the optical SW 1010-3.

The second or third configuration may be combined with the transmission line across the mesh type optical SW of FIG. 27 or the ring type optical SW of FIG. 28 or the first configuration.

(Fourth Configuration)

As illustrated in FIG. 66(D), in the fourth configuration, the optical SW 1010-1 to the optical SW 1010-3 and the optical SW 1200 are illustrated. The fourth configuration is an extension of the third configuration. In the third configuration, at least some of the uplinks are installed not on the port 11-2 side but on the port 11-1 side, and are connected to the uplinks via a folded transmission line at the time of connection to the uplinks. That is, in the fourth configuration, the ports 11-1 of the optical switches 1010-1 to 1010-3 that are not connected to the optical SW 1200 are connected to the uplink. This configuration is appropriate when the folding is mainly performed. For example, when the subscriber devices 40 are connected to each other in a full mesh or a form close to the full mesh, the number of the ports 11-2 is less than the number of the ports 11-1. In such a case, when the optical SW is a P×P symmetric SW, the ports 11-1 side to which subscribers are connected are left, the optical SW is diverted to the uplink side and the ports are effectively used.

Figure 67:
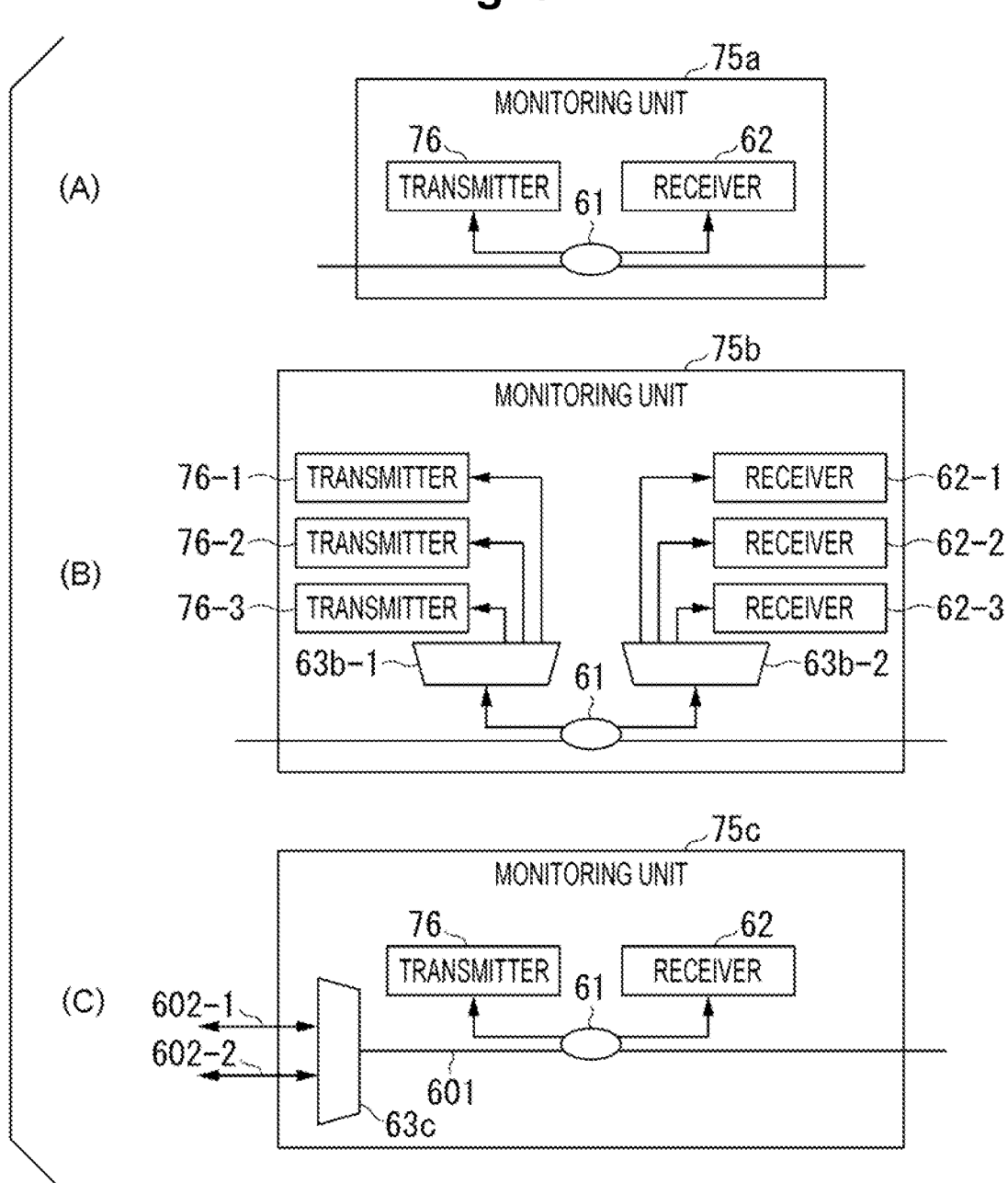
FIG. 67 is a diagram illustrating another aspect of the monitoring unit.
Figure 68:
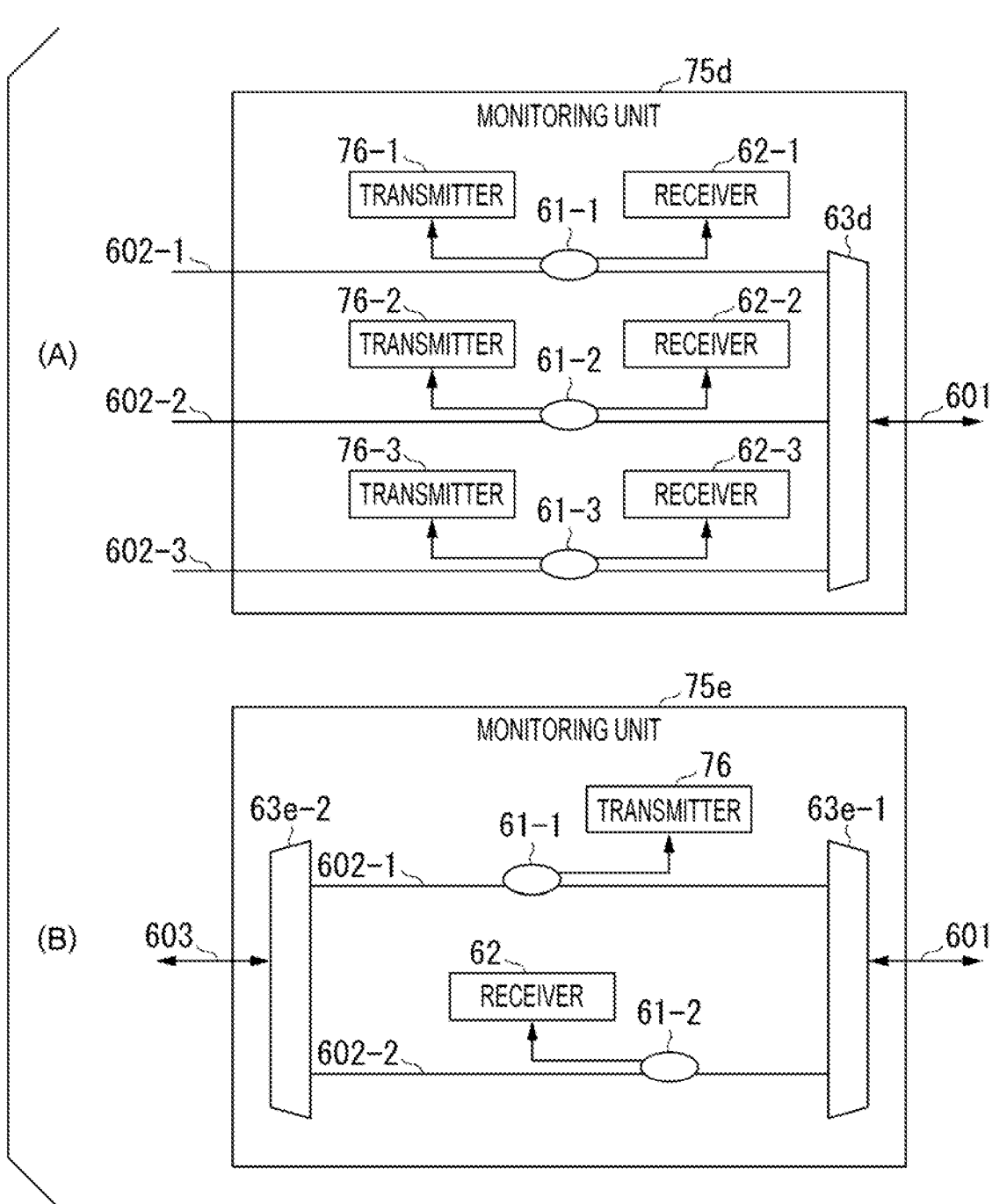
FIG. 68 is a diagram illustrating another aspect of the monitoring unit.
Figure 69:
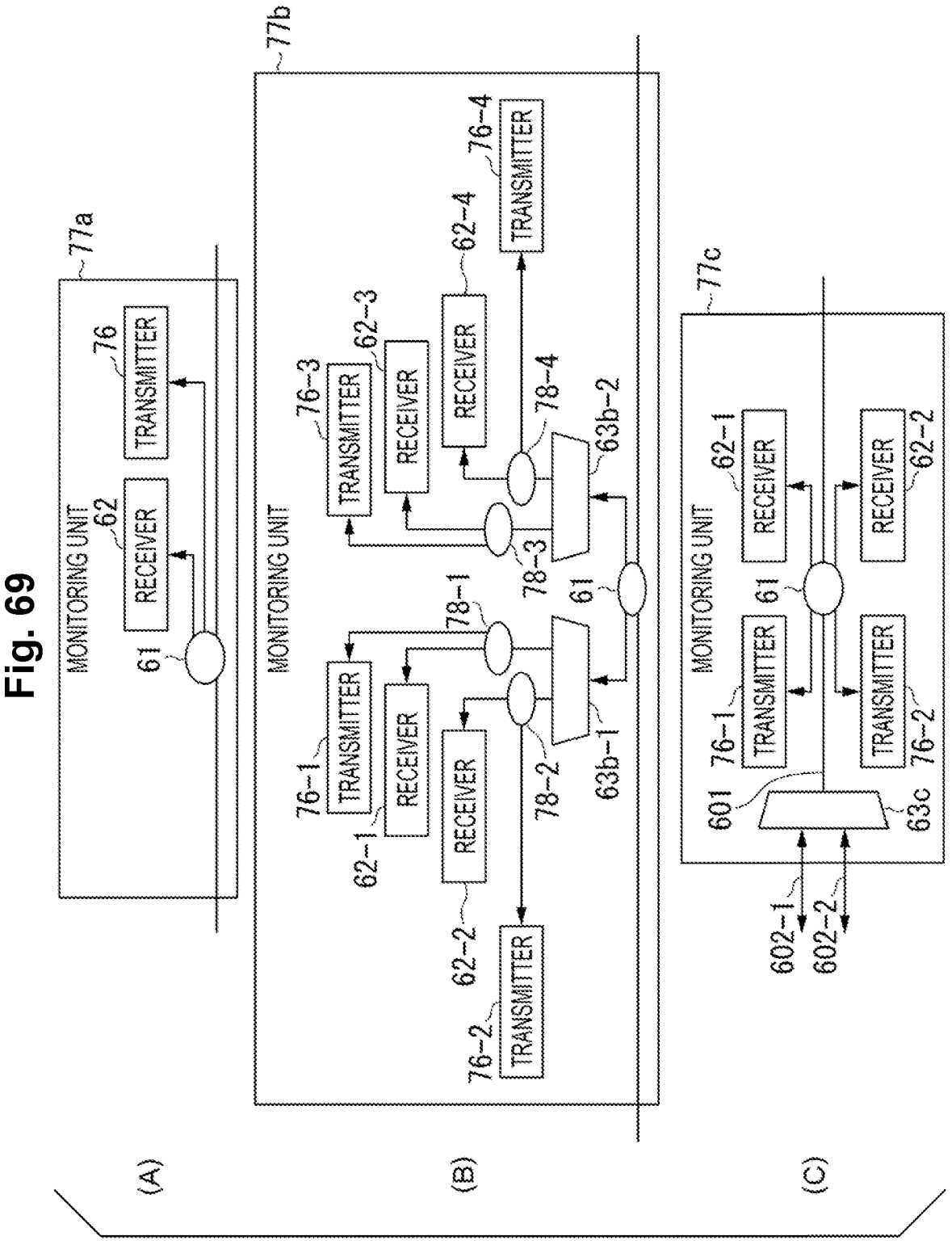
FIG. 69 is a diagram illustrating another aspect of the monitoring unit.

Next, as other aspects (modifications) of the monitoring unit 60 illustrated in FIGS. 33 to 36, configurations in which the monitoring unit includes a transmitter will be specifically described with reference to FIGS. 67 to 69. FIGS. 67 to 69 are configuration diagrams of other aspects (modifications) of the monitoring unit 60. Although the monitoring unit 60 will be described as an example in FIGS. 67 to 69, the monitoring unit 260 may be used instead of the monitoring unit 60, and the configuration of the monitoring unit 260 may be the configurations illustrated in FIGS. 67 to 69. FIGS. 67 and 68 illustrate examples in which a transmitter and a receiver are connected to the transmission line on the same side in opposite directions as a configuration in which a signal is transmitted to a target to be monitored. FIG. 69 illustrates a configuration in which the transmitter and the receiver are connected in the same direction in the case of merging into the transmission line on the opposite side of the input of the main signal in the same direction as the main signal.

A monitoring unit 75$a$ illustrated in FIG. 67(A) includes a power splitter 61, a receiver 62, and a transmitter 76. The monitoring unit 75$a$ illustrated in FIG. 67(A) is different from the monitoring unit 60$a$ illustrated in FIG. 33(A) in that one transmitter 76 and one receiver 62 are included. The transmitter 76 transmits an optical signal input via the power splitter 61 to a monitor target (for example, the control unit 20 or the OPS 300). As illustrated in FIG. 67(A), the transmitter 76 and the receiver 62 are connected to the same transmission line in opposite directions.

A monitoring unit 75$b$ illustrated in FIG. 67(B) includes a power splitter 61, a plurality of receivers 62-1 to 62-3, a plurality of WDM devices 63$b$-1 to 63$b$-2, and a plurality of transmitters 76-1 to 76-3. The monitoring unit illustrated in FIG. 67(B) is different from the monitoring unit 60$b$ illustrated in FIG. 33(B) in that three receivers 62-1 to 62-3 and three transmitters 76-1 to 76-3 are included instead of the six receivers 62-1 to 62-6. The transmitters 76-1 to 76-3 are connected to the WDM device 63b-1. The receivers 62-1 to 62-3 are connected to the WDM device 63b-2. The WDM device 63b-1 demultiplexes the optical signal branched by the power splitter 61 and outputs the demultiplexed optical signals to the transmitters 76-1 to 76-3. As illustrated in FIG. 67(B), the transmitters 76-1 to 76-3 and the receivers 62-1 to 62-3 are connected to the same transmission line in opposite directions.

A monitoring unit 75c illustrated in FIG. 67(C) includes a power splitter 61, a receiver 62, a WDM device 63c, and a transmitter 76. The monitoring unit 75c illustrated in FIG. 67(C) is different from the monitoring unit 60c illustrated in FIG. 33(C) in that a receiver 62 and a transmitter 76 are included instead of the two receivers 62-1 to 62-2.

A monitoring unit 75d illustrated in FIG. 68(A) includes a plurality of power splitters 61-1 to 61-3, a plurality of receivers 62-1 to 62-3, a WDM device 63d, and a plurality of transmitters 76-1 to 76-3. The monitoring unit 75d illustrated in FIG. 68(A) is different from the monitoring unit 60d illustrated in FIG. 34(A) in that three receivers 62-1 to 62-3 and three transmitters 76-1 to 76-3 are included instead of the six receivers 62-1 to 62-6. The power splitter 61-1 is provided in the transmission line 606-1, and the receiver 62-1 and the transmitter 76-1 are connected to the power splitter 61-1. The power splitter 61-2 is provided in the transmission line 606-2, and the receiver 62-2 and the transmitter 76-2 are connected to the power splitter 61-2. The power splitter 61-3 is provided in the transmission line 606-3, and the receiver 62-3 and the transmitter 76-3 are connected to the power splitter 61-3.

A monitoring unit 75e illustrated in FIG. 68(B) includes a plurality of power splitters 61-1 to 61-2, a receiver 62, a plurality of WDM devices 63e-1 to 63e-2, and a transmitter 76. The monitoring unit 75e illustrated in FIG. 68(B) is different from the monitoring unit 60e illustrated in FIG. 34(B) in that the receiver 62 and the transmitter 76 are included instead of the two receivers 62-1 to 62-2. The power splitter 61-1 is provided in the transmission line 602-1, and the transmitter 76 is connected to the power splitter 61-1. The power splitter 61-2 is provided in the transmission line 602-2, and the receiver 62 is connected to the power splitter 61-2.

A monitoring unit 77a illustrated in FIG. 69(A) includes a power splitter 61, a receiver 62, and a transmitter 76. The monitoring unit 77a illustrated in FIG. 69(A) is different from the monitoring unit 60a illustrated in FIG. 33(A) in that a receiver 62 and a transmitter 76 are included instead of the two receivers 62-1 to 62-2. As illustrated in FIG. 69(A), the transmitter 76 and the receiver 62 are connected to the same transmission line in the same direction.

A monitoring unit 77b illustrated in FIG. 69(B) includes a power splitter 61, a plurality of receivers 62-1 to 62-4, a plurality of WDM devices 63b-1 to 63b-2, a plurality of transmitters 76-1 to 76-4, and a plurality of power splitters 78-1 to 78-4. The monitoring unit 77b illustrated 69 in FIG. 62 (B) is different from the monitoring unit 60b illustrated in FIG. 33(B) in that four receivers 62-1-1 to 62-4, four transmitters 76-1 to 76-4, and four power splitters 78-1 to 78-4 are included instead of the six receivers 62-1 to 62-6. The power splitters 78-1 and 78-2 are connected to the WDM device 63b-1, and the power splitters 78-3 and 78-4 are connected to the WDM device 63b-2. The transmitter 76-1 and the receiver 62-1 are connected to the power splitter 78-1, the transmitter 76-2 and the receiver 62-2 are connected to the power splitter 78-2, the transmitter 76-3 and the receiver 62-3 are connected to the power splitter 78-3, and the transmitter 76-4 and the receiver 62-4 are connected to the power splitter 78-4. As illustrated in FIG. 67(B), the transmitters 76-1 to 76-4 and the receivers 62-1 to 62-4 are connected to the same transmission line in the same direction of the same side in a set of the transmitter 76 and the receiver 62. In FIG. 69(B), the transmitters 76-2 and 76-4 are provided outside of the monitoring unit 77b, but may be provided inside the monitoring unit 77b.

A monitoring unit 77c illustrated in FIG. 69(C) includes a power splitter 61, a plurality of receivers 62-1 and 62-2, a WDM device 63c, and a plurality of transmitters 76-1 to 76-2. The monitoring unit 77c illustrated in FIG. 69(C) is different from the monitoring unit 60c illustrated in FIG. 33(C) in that two transmitters 76-1 and 76-2 are newly provided. The monitoring unit 77c illustrated in FIG. 69(C) has a different connection relationship with the receivers 62-1 and 62-2 of the monitoring unit 60c illustrated in FIG. 33(C). Specifically, in the monitoring unit 77c, the receivers 62-1 and 62-2 and the transmitters 76-1 and 76-2 are connected to the power splitter 61, the receiver 62-1 and the transmitter 76-1 are connected to the transmission line on the same side, and the receiver 62-2 and the transmitter 76-2 are connected to the transmission line on the same side.

The number of the power splitters 61, the receivers 62, the WDM devices 63, and the transmitters 76 illustrated in FIGS. 67 to 69 is exemplary, and may be changed in accordance with a situation.

The AMCC signal superimposed on the main signal will be described. Since the main signal and the AMCC signal are superimposed, the main signal and the AMCC signal are transferred with an optical signal with the same wavelength. The main signal is, for example, a signal such as a common public radio interface (CPRI) such as an on-off keying (OOK) signal of 10 Gbit/s (gigabits per second). The AMCC signal is superimposed on the main signal with, for example, a carrier wave which is not superimposed on an electrical main signal and has a carrier frequency such as 1 MHz or 500 kHz. A modulation scheme is intensity modulation, phase modulation, or the like. In the superimposition, for example, an electrical main signal of GHz and an electrical AMCC signal of 1 MHz are combined by a power combiner to be modulated as the combined signal, and thus a main signal on which the AMCC signal is superimposed is generated. The superimposed AMCC signal can be separated from the main signal.

In the electrical region, the AMCC signal and the main signal use different frequencies. The AMCC signal has a narrower band than the main signal. For example, as described in the OITDA standard TP 20 Fiber optic active components and devices-Performance standards-GPON transceivers (Reference Literature 1: http://www.oitda.or.jp/main/st/TP20-1.pdf) or ITU-T G. 958 Appendix I, when the reference of the identical code succession tolerance is assumed to be 72 bits, a lower limit of GE-PON of 1.25 Gbit/s may be sufficiently lower than about 20 MHz, for example, half thereof or sufficiently higher than 1.25 GHz, for example, twice thereof, or sufficiently lower than 720 kHz of the lower limit of STM-0 of 51.84 Mbit/s of the low-speed signal, for example, half thereof or sufficiently higher than 51.84 MHz, for example, twice thereof.

As the carrier frequency, another frequency that does not overlap with an electrical main signal, such as 500 kHz, may be used. As a modulation scheme, another modulation scheme such as phase modulation may be used.

In each of the above embodiments, when the subscriber device 40 and the control unit 20 have a single-core bidirectional transceiver, the power splitters used for both the upper and lower directions may be connected via the same path of the optical SW 210 in the single-core bidirectional state, or may be separated into dual cores and connected via the separate paths. When the subscriber device 40 and the control unit 20 have a dual-cores bidirectional transceiver, they may be bundled in a single-core bidirectional manner and then connected via the same path of the optical SW 210, or may be connected via separate paths in a dual-cores state. When one of the subscriber device 40 and the control unit 20 has a single-core bidirectional transceiver and the other thereof has a bidirectional transceiver, the bidirectional directions of the dual cores may be bundled to form a single core and connected via the same path of the optical SW 210, or the single-core bidirectional direction may be separated into dual cores and connected via the separate paths.

The power splitters used in both upper and lower directions are appropriate when wavelength bands that can be used do not overlap in the uplink direction and the downlink direction like, for example, the 1.3 micron band and the 1.55 micron band. When at least one of the subscriber device 40 and the control unit 20 transmits and receives an optical signal to and from a single-core bidirectional optical transceiver, they may be connected by a set of ports of the optical SW or may be connected by two sets of ports and multiplexed in opposite directions by a multiplexer/demultiplexer (for example, a WDM device or a WDM filter) or a power splitter. In each transmission and reception, different sets of ports may be used to connect one optical transmitter and the other optical receiver, and the other optical transmitter and the one optical receiver. This is appropriate when a dual-cores optical transceiver is used. In this case, different paths can be used on the transmission side and the reception side.

A plurality of sets may be connected to the transmission side or a plurality of sets may be connected to the reception side. In this case, connection with a plurality of devices or functional units or control thereof can be achieved. In the demultiplexing of connections and control, a transmission source or a destination port, a wavelength, a device, or a functional unit, for example, an identifier for identifying a subscriber device, for example, a MAC address, can be used.

The optical SW, the port, the transmission line, or the connection point thereof may include a power splitter or a multiplexer/demultiplexer between the optical SW and a transmission line connected to another ground, the optical SW, or an upper network. The multiplexer/demultiplexer multiplexes optical signals with different wavelengths output from different subscriber devices or the like from a plurality of ports of the optical SW, and outputs the multiplexed optical signals to another ground or a transmission line connected to the optical SW or an upper network. The multiplexer/demultiplexer demultiplexes an optical signal transmitted from any other ground, the optical SW, or the upper network in accordance with a wavelength, and inputs the optical signal to the optical SW from a port corresponding to the wavelength. In each of the above embodiments, the multiplexer/demultiplexer and the power splitter have been used for description. However, when the multiplexing/demultiplexing is not performed in accordance with a wavelength, the multiplexer/demultiplexer may be a power splitter. In the case of only the multiplexing or only demultiplexing in accordance with a wavelength, only merging multiplexing regardless of a wavelength, and only branching regardless of a wavelength, a multiplexer, a demultiplexer, a merging unit, or a branch splitter may be used, respectively.

The power splitter is appropriate when an uplink signal and a downlink signal are multiplexed in, for example, time division multiplexing manner other than a wavelength division multiplexing manner and when wavelength bands used for the uplink signal and the downlink signal at least partially overlap. In the latter case, it is sufficient to perform filtering in an optical receiver, a transmission line before arrival at the optical receiver, between the power splitter and the transmission line, or the like. When the optical receiver passes through a plurality of sections, it is desirable to perform filtering before multiplexing so that other signals are not influenced at the time of multiplexing with other signals. When a wavelength to be filtered by a multiplexer/demultiplexer or the combination of a power splitter and a filter can be changed, a subscriber device may change a wavelength according to a wavelength to be transmitted and received or the control unit may change the wavelength.

Each configuration described above with reference to FIGS. 1 to 69 may be modified as follows. The process of steps S1 and S3 to S6 in the flowchart illustrated in FIG. 42 may be performed in other aspects. Step S2 in the flowchart illustrated in FIG. 42 is not performed. Hereinafter, other aspects (modifications) of the process of steps S1 and S3 to S6 will be described.

Figure 70:
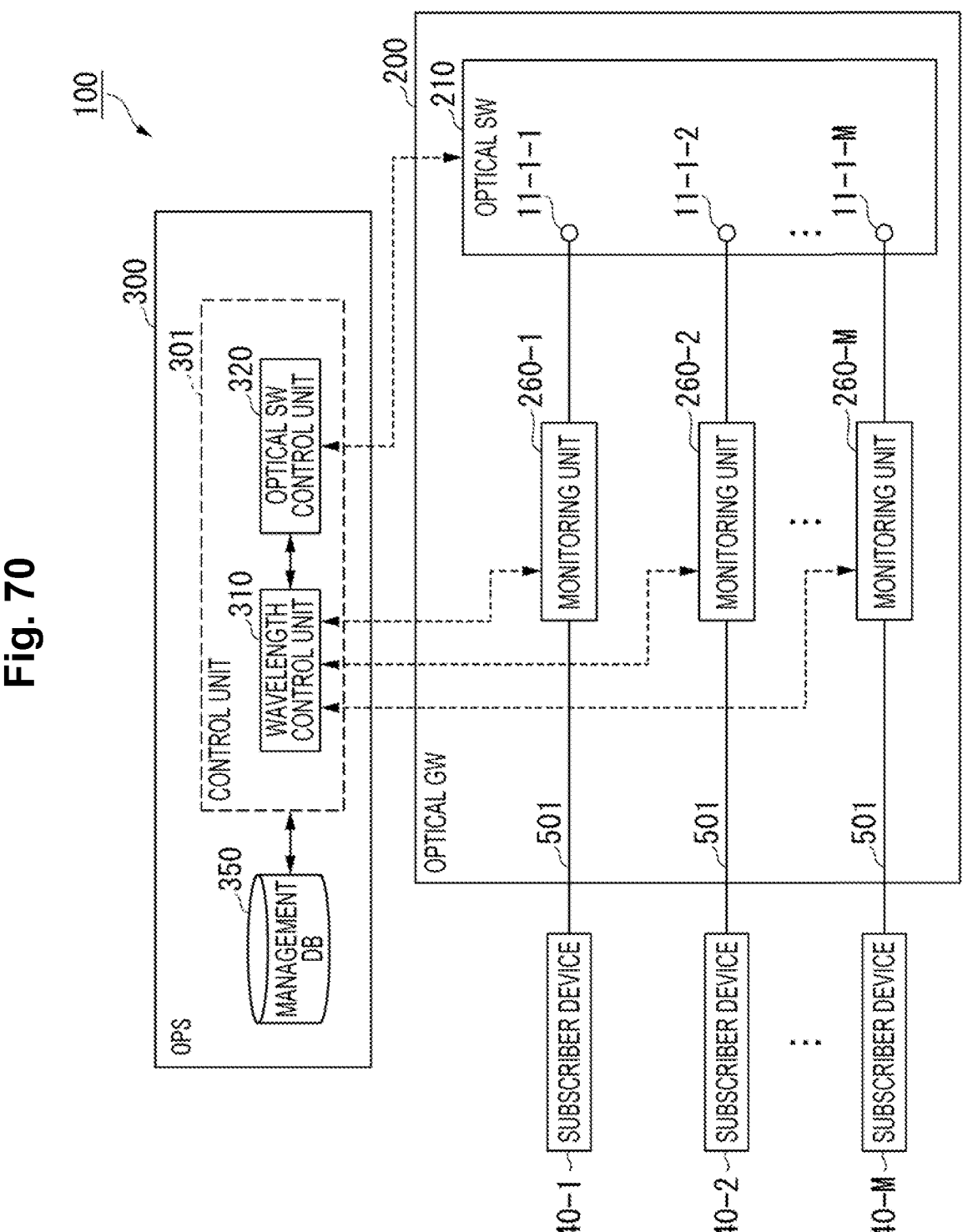
FIG. 70 is a diagram illustrating a configuration example in a first modification of the subscriber device and a control unit.

FIG. 70 is a diagram illustrating a configuration example of the subscriber device 40 and the control unit 301 according to a first modification. In the first modification, not only an optical signal can be transmitted according to a destination, but also the number of times the optical switch is switched at the time of setting a wavelength of an optical signal transmitted from the subscriber device can be reduced.

In the optical access system 100 (an optical communication device), the optical GW 200 includes a monitoring unit 260 for each input path in the transmission line 501 between the optical SW 210 and the subscriber device 40. That is, the monitoring unit 260 is connected to the port 11 on the input side of the optical SW 210. Accordingly, the wavelength control unit 310 is connected to the subscriber device 40 via the monitoring unit 260. The wavelength control unit 310 may not be connected for each subscriber device 40 as long as the wavelength control unit 310 can be connected to each subscriber device 40. For example, even when the wavelength control unit 310 is simultaneously connected to a plurality of subscriber devices 40, the optical SW 21 or the like may be able to select the subscriber device 40 to be connected, or the optical SW 21 or the like may be able to select the path to be connected, as in the initial connection of the PON. In accordance with the configuration of the monitoring unit 260, the monitoring unit 260 and the subscriber device 40 do not necessarily have a one-to-one correspondence. For example, a plurality of input paths may correspond to one monitoring unit 260. In this case, the monitoring unit 260 may monitor an optical signal of the input path in accordance with the setting of the switching of the input path. When the switching of the input path is not set, the monitoring unit 260 may collectively monitor optical signals of the plurality of input paths.

As illustrated in FIG. 70, the control unit 301 is connected to the subscriber device 40 via the monitoring unit 260. Specifically, when the wavelength or the like is allocated, an output of the allocation target device such as a wavelength or the like of the subscriber device 40 or the like is only monitored by the monitoring unit 260 installed on the input side of the optical SW 210 in a state of non-connection to another port of the optical SW 210 in accordance with the setting by the control unit 301. After the allocation of the wavelength or the like, a path to another port in the optical SW 210 is set in accordance with the setting by the control unit 301 with regard to the output of the allocation target device such as the wavelength of the subscriber device 40 or the like.

The optical GW 200 may include a monitoring unit 60 instead of the monitoring unit 260. The optical GW 200 may include a power splitter 502 (a monitoring unit) instead of the monitoring unit 260.

The monitoring unit 260 modulates optical signals transmitted and received by the subscriber device 40 with a control signal, receives some of the optical signals, multiplexes signals modulated with the control signal on the optical signal, transmits some of the optical signals to the wavelength control unit 310, and multiplexes the control signal transmitted from the wavelength control unit with the optical signals. When the monitoring unit 260 receives the optical signal, the monitoring control unit monitors the wavelength or the like based on the partially received optical signal. When the optical signal is transmitted, the wavelength control unit 310 monitors the wavelength or the like of the optical signal of the subscriber device 40 based on the optical signal transmitted from the monitoring unit 260.

In the first modification of the subscriber device 40 and the control unit 301, the wavelength allocation process (wavelength setting) and the path setting process are performed in this order. More specifically, the control unit 301 causes the subscriber device 40 to be in an unconnected state and exchanges data with the subscriber device 40. At the initial stage, since the subscriber device 40 is in the unconnected state, the subscriber device 40 remains. At the time of change, the subscriber device 40 is basically brought into the disconnected state. Only when there is no influence, the control unit 301 may exchange data with the subscriber device 40 while the connection of the subscriber device 40 is maintained or the subscriber device 40 is set to the changed connection state. The optical SW control unit 320 switches the output destination (path) of the optical SW 210 after the wavelength change so that there is no particular influence even if an output destination of the optical SW 210 is switched.

For example, cases where the first port and the first wavelength "λ1" are used before switching and the second port and the second wavelength "λ2" are used after switching are the following cases.

(1) A case where there is no subscriber device 40 using the first port and the second wavelength "λ2."

There is no influence despite switching from the first wavelength "λ1" to the second wavelength "λ2" in the first port. In this case, it is possible to perform wavelength switching before port switching.

(2) A case where there is the subscriber device 40 using the first port and the second wavelength "λ2."

There is an influence when the wavelength is switched from the first wavelength "λ1" to the second wavelength "λ2" in the first port. In this case, it is not possible to perform wavelength switching before port switching.

(3) A case where there is no subscriber device 40 using the second port and the first wavelength "λ1."

There is no influence despite switching from the first wavelength "λ1" to the second wavelength "λ2" in the second port. In this case, it is possible to perform wavelength switching before port switching.

(4) A case where there is the subscriber device 40 using the second port and the first wavelength "λ1":

There is an influence when the wavelength is switched from the first wavelength "λ1" to the second wavelength "λ2" in the second port. In this case, it is not possible to perform wavelength switching before port switching.

In the foregoing "(1)" and "(3) or (4)," the wavelength can be switched before the port switching.

In the above "(1) or (2)" and "(3)," the wavelength can be switched before the port switching.

In the above "(2)" and "(4)", it is not possible to perform wavelength switching before port switching.

In the wavelength allocation process, the optical SW control unit 320 controls the path in the optical SW 210 such that the optical SW 210 does not transmit the optical signal of the subscriber device 40 which is a wavelength allocation target.

When there is no particular influence despite switching of the output destination of the optical SW 210 before setting of the wavelength (before allocation of the wavelength), the optical SW control unit 320 may switch the output destination of the optical SW 210 before a change in the wavelength. In the wavelength allocation process, a functional unit other than the optical SW 210 may stop transmitting the optical signal transmitted from the subscriber device 40. When a blocking unit is provided so that an optical signal is blocked by the blocking unit, if the blocking unit blocks an optical signal, the optical SW control unit 320 can basically exchange with the subscriber device 40. As an exception, the blocking unit may not be able to selectively interrupt the output of the subscriber device 40. For example, when the subscriber device 40 shares a plurality of wavelengths or the like (wavelengths, times, polarized waves orthogonal to each other, modes orthogonal to each other, codes orthogonal to each other, frequencies, core wires (cores), or a combination thereof) by the blocking unit and the other sharing partner of the subscriber device 40 is in operation, when the wavelengths output in the initial setting are uncertain and there is a possibility of the wavelengths or the like (the wavelengths, the times, the polarized waves orthogonal to each other, the modes orthogonal to each other, the codes orthogonal to each other, the frequencies, the core wires (the cores), or a combination thereof) of the other subscriber devices 40 overlapping, when outputs at the time of changing of the wavelengths or the like overlap beyond an allowable time for the other wavelengths or the like in operation, when there is an abnormal case and what is output is unclear. In such cases, after connection is established without influence (for example, after reconnection to a port in no operation,), the optical SW control unit 320 exchanges data with the subscriber device 40.

In the wavelength allocation process, the wavelength control unit 310 performs the wavelength allocation process on the subscriber device 40 which is a wavelength allocation target via the monitoring unit 260. For example, the wavelength control unit 310 performs an allocation process for a new wavelength that is the same as or different from the wavelength used when the abnormality is detected on the subscriber device 40 which is a wavelength allocation target.

In the path setting process, the optical switch control unit 320 controls the optical SW 210 such that the optical signal input from the transmission line 501 of the subscriber device 40 which is a wavelength allocation target is output to the port 11 (another port) specified in accordance with the transmission destination. Here, the transmission destination is specified in accordance with a subscriber, the subscriber device 40, the port 11 of the optical SW 210, the wavelength of the optical signal, a combination of the subscriber device 40 and the wavelength of the optical signal, a combination of the port 11 and the wavelength of the optical signal, or the like.

In step S3, when the subscriber device 40 which is a wavelength allocation target is connected, the optical SW control unit 320 disconnects the subscriber device 40. When a blocking unit is provided instead, the blocking unit may block the optical signal. Here, in a case where the port 11-1 connected to the monitoring unit 260 is not connected to the other port 11 in the optical SW 210, the optical SW control unit 320 remains in the unconnected state. The subscriber device 40 which is a wavelength allocation target performs an initialization process before connection to the monitoring unit 260. The subscriber device 40 which is a wavelength allocation target may perform the initialization process immediately after connection to the monitoring unit 260. When a wavelength or the like is set in the initialization process or when at least a part of the initialization process such as allocation is performed after reception of a downlink signal or an allocation request permission of the downlink signal, at least a part of the initialization process is performed after connection. The subscriber device 40 which is a wavelength allocation target transmits a connection request (a register request) using an optical signal.

In step S4, the wavelength control unit 310 receives a connection request via the monitoring unit 260 from the subscriber device 40 which is a wavelength allocation target. "Via the monitoring unit 260" means that, for example, the monitoring unit 260 transmits an optical signal branched by the branch combiner/splitter to the wavelength control unit 310. For example, a state of an electrical signal (the monitoring unit 260 includes a reception unit, the reception unit converts the optical signal into an electrical signal, and the reception unit transmits the electrical signal to the connection unit may be achieved. The wavelength control unit 310 analyzes the received optical signal and determines an initially set wavelength. The wavelength control unit 310 may analyze the received optical signal and confirm whether there is a problem in optical power.

In step S6, the wavelength control unit 310 (a control unit) transmits a wavelength instruction indicating information regarding the wavelength determined (selected) by the wavelength control unit 310 to the subscriber device 40 which is a wavelength allocation target. The branch combiner/splitter of the monitoring unit 260 may combine the optical signal of the wavelength control unit 310. The monitoring unit 260 may include a transmission unit, the transmission unit may convert an electrical signal into an optical signal, and the multiplexer/demultiplexer may combine the optical signals. When the wavelength instruction is transmitted using an optical signal via a wavelength-selective element in the path from the monitoring unit 260 to the subscriber device 40, the wavelength instruction is transmitted to the subscriber device 40 using an optical signal with a wavelength addressed to the subscriber device 40. The wavelength instruction is transmitted to the subscriber device 40 which is a wavelength allocation target via the monitoring unit 260. The monitoring unit 260 outputs the optical signal input from the wavelength control unit 310 to the subscriber device 40. The optical signal indicating the wavelength instruction may be branched in the middle of the transmission line 501. When a transmission wavelength is set in the wavelength instruction, the subscriber device 40 which is a wavelength allocation target sets the transmission wavelength of the optical signal of the optical transceiver in response to the wavelength instruction.

In step S7, when the notification signal is transmitted using the optical signal, the subscriber device 40 transmits, to the wavelength control unit 310 via the monitoring unit 260, a notification signal for notifying that the wavelength is set using the optical signal with the wavelength instructed in the wavelength instruction. Based on the notification signal, the wavelength control unit 310 confirms whether the instructed wavelength is correctly set. Based on the notification signal, the wavelength control unit 310 may confirm whether the output power of the optical signal is sufficient.

In step S8, the optical SW control unit 320 transmits optimum connection information (path information) of each port 11 of the optical SW 210 to the optical SW 210 in accordance with the transmission destination (a destination) of the optical signal of the subscriber device 40. Based on the connection information, the optical SW 210 sets an uplink port and a downlink port of the subscriber device 40.

Figure 71:
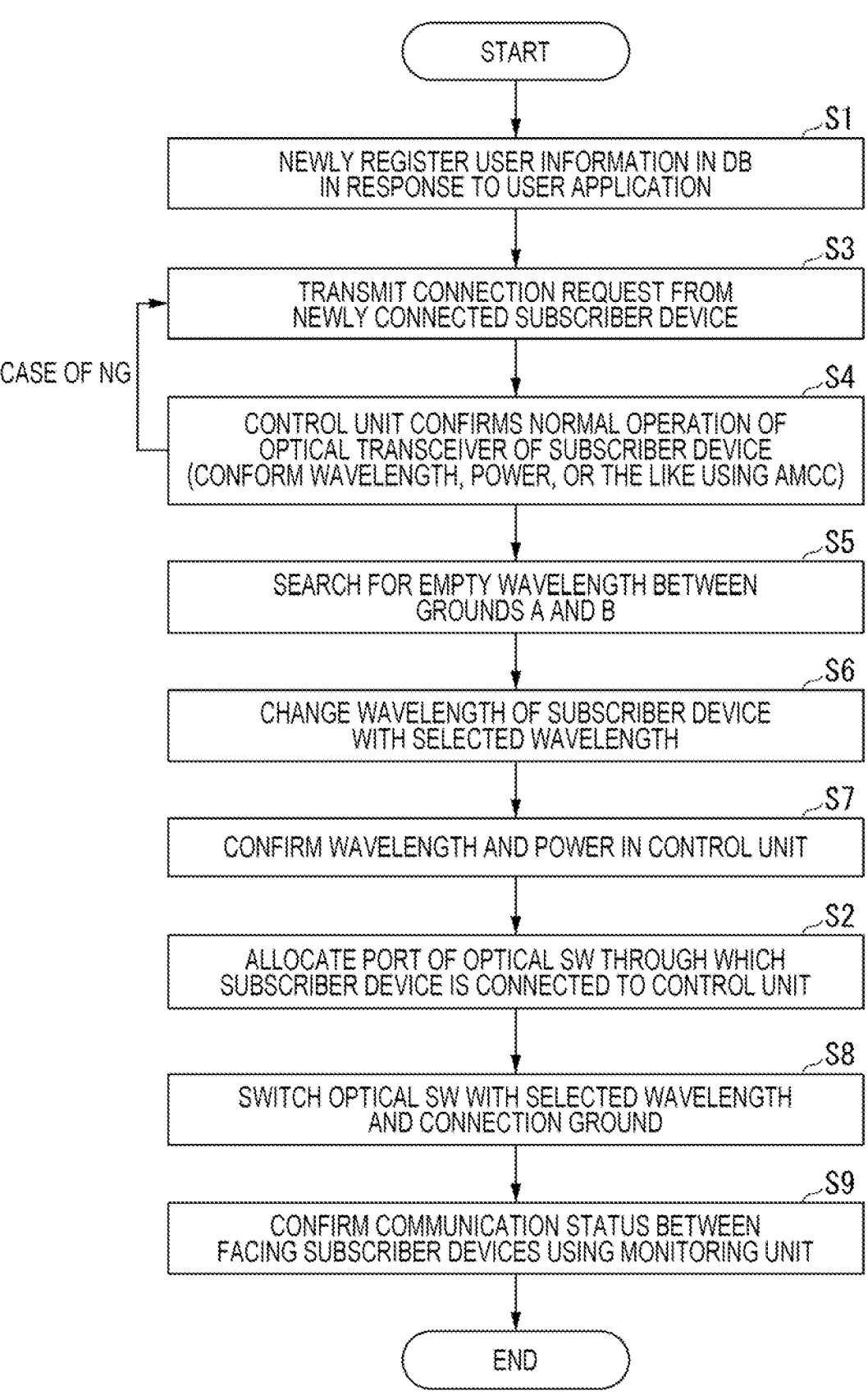
FIG. 71 is a flowchart illustrating an initial setting process of the optical access system according to the first modification of the subscriber device and the control unit.

FIG. 71 is a flowchart illustrating an initial setting process of the optical access system according to the first modification of the subscriber device 40 and the control unit 302. Reference numerals illustrated in FIG. 71 are similar to the reference numerals illustrated in FIG. 42. A port is connected between steps S1 and S3 illustrated in FIG. 71. In step S4, the present invention is not limited to the AMCC. Before the wavelength is set, it cannot be confirmed that the control signal of the connection request is normal in the connection request because of separate carriers. The control unit, the input monitoring unit, the output monitoring unit, the communication unit, or the subscriber device 40 autonomously confirms the flowing main signal. In step S7, the control unit, the input monitoring unit, the output monitoring unit, the communication unit, or the subscriber device 40 autonomously performs the confirming.

As described above, according to the first modification of the subscriber device 40 and the control unit 301, the optical SW 210 outputs the optical signal input from any one of the plurality of transmission lines 501 to the other 501 transmission line among the plurality of transmission lines 501. The monitoring unit 260 relays the optical signal between the subscriber device 40 and the control unit 301 along the transmission line 501 on the side where the optical signal transmitted from the subscriber device 40 is input to the optical SW 210. The monitoring unit 260 relays the optical signal between the subscriber device 40 and the optical SW 210 along the transmission line 501 on the side where the optical signal is input to the optical SW 210. The wavelength control unit 310 allocates a wavelength to the optical signal of the subscriber device 40 via the monitoring unit 260. After the wavelength is allocated to the optical signal of the subscriber device 40, the optical SW control unit 320 controls the optical SW 210 such that the optical signal input to the optical SW 210 via the transmission line 501 on the input side is output to the other transmission line 501. The optical GW 200 may include a first optical SW 210 and a second optical SW 210 cascade-connected to the first optical SW 210. Before the wavelength is allocated to the optical signal of the subscriber device 40, the optical SW control unit 320 may control the optical SW 210 such that the optical signal input to the optical SW 210 via the transmission line 501 on the input side is not output to another transmission line 501.

Accordingly, according to the first modification of the subscriber device 40 and the control unit 301, it is possible not only to transmit the optical signal in accordance with the destination but also to reduce the number of times the optical switch performs the switching in the setting of the wavelength of the optical signal transmitted from the subscriber device.

Hereinafter, a second modification will be described.

Each configuration described above with reference to FIGS. 1 to 69 may be modified as follows. In this case, for example, the blocking unit is provided at a subsequent stage of the power splitter 61 in the monitoring unit illustrated in FIGS. 33, 67, and 69, at a subsequent stage of the WDM device 63d in the monitoring unit illustrated in FIGS. 34(A) and 68(A), at a subsequent stage of the WDM device 63e-1 in the monitoring unit illustrated in FIGS. 34(B) and 68(B), at a subsequent stage of the modulator 64 in the monitoring unit illustrated in FIG. 35, or at a subsequent stage of the WDM device 63g-2 in the monitoring unit illustrated in FIG. 36.

The process of steps S1 to S8 in the flowchart illustrated in FIG. 42 may be performed in another manner. Hereinafter, another aspect (a modification) of the process of steps S1 to S8 will be described.

Figure 72:
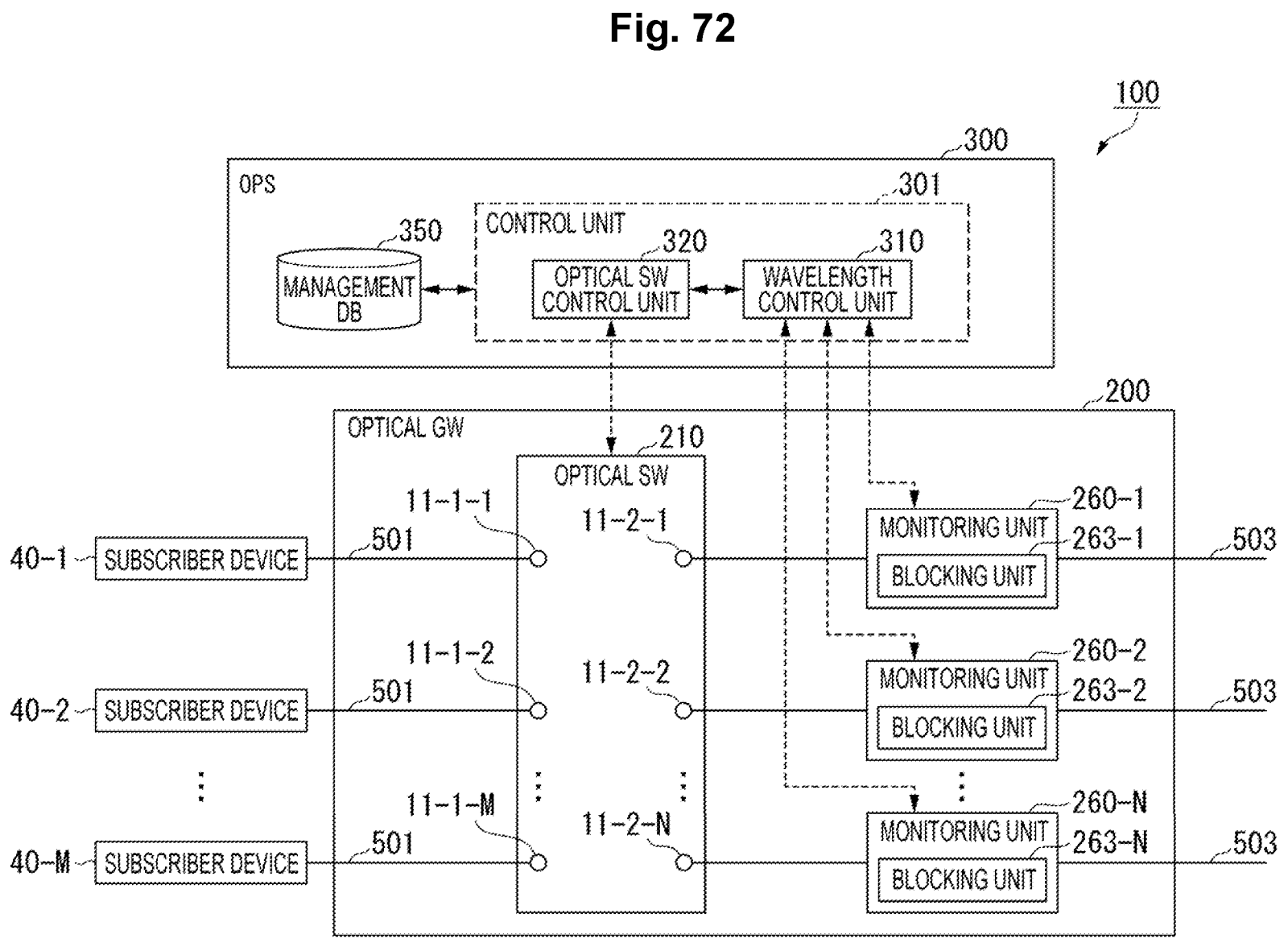

FIG. 72 is a diagram illustrating a configuration example of the subscriber device 40 and the control unit 301 according to the second modification. In the second modification, not only an optical signal can be transmitted in accordance with a destination, but also the number of times the optical switch performs switching in setting of a wavelength of the optical signal transmitted from the subscriber device can be reduced in some cases.

In the optical access system 100 (an optical communication device), the optical GW 200 includes a monitoring unit 260 for each output path in the transmission line 503 on the output side of the optical SW 210. That is, the monitoring unit 260 is connected to the port 11 on the output side of the optical SW 210. Accordingly, the wavelength control unit 310 is connected to the subscriber device 40 via the monitoring unit 260. In accordance with the configuration of the monitoring unit 260, the monitoring unit 260 and the output path do not necessarily have a one-to-one correspondence. For example, when the target subscriber device 40 can be selected as in the initial connection of the PON, or when a path to be connected can be selected by the optical SW 210 or the like, a plurality of output paths and one monitoring unit 260 may correspond to each other. In this case, the monitoring unit 260 may monitor the optical signal of the output path in accordance with the setting of the switching of the output path. When the switching of the output path is not set, the monitoring unit 260 may collectively monitor the optical signals of the plurality of output paths.

As illustrated in FIG. 72, the control unit 301 is connected to the subscriber device 40 via the monitoring unit 260. Specifically, when wavelengths are allocated, an output of a wavelength allocation target device such as the subscriber device 40 is connected to another port in the optical SW 210 in accordance with a setting by the control unit 301. However, the output is only monitored by the monitoring unit 260 installed on the output side, and the transmission along the transmission line 503 is blocked by the blocking unit 263. The blocking is released after the allocation.

The optical GW 200 may include a monitoring unit 60 instead of the monitoring unit 260. The optical GW 200 may include a power splitter 502 (a monitoring unit) instead of the monitoring unit 260.

The monitoring unit 260 transmits the optical signal transmitted and received by the subscriber device 40 to the wavelength control unit 310. The wavelength control unit 310 monitors a wavelength or the like of the optical signal of the subscriber device 40 based on the optical signal transmitted from the monitoring unit 260.

The monitoring unit 260 includes the blocking unit 263. The blocking unit 263 can block transmission of the optical signal in the transmission line 503. The blocking unit 263 blocks the transmission of the optical signal before the path setting process and the wavelength allocation process (wavelength setting) are performed under the control of the wavelength control unit 310. The blocking unit 263 releases the blocking of the transmission of the optical signal after the path setting process and the wavelength allocation process are performed.

For example, an optical switch can be used as the blocking unit 263. Alternatively, for example, a semiconductor optical amplifier (SOA) can be used as the blocking unit 263. In this case, an amplification factor in the semiconductor optical amplifier is set to a value (for example, −10 [dB]) equal to or less than about an extinction ratio of a modulator in a case where outputs of a single path and the subscriber device 40 are combined, a value (for example, −25 [dB] in a case of 32) lower by several outputs in a case where a plurality of outputs are combined, and −35 [dB] or the like in a case where there is a difference of 10 [dB] due to a perspective difference, and thus the transmission of the optical signal is interrupted.

As a position at which the blocking unit 263 is arranged, a position at a subsequent stage of multiplexing or demultiplexing of optical signals is appropriate, for example, in the case of the setting and changing in both upper and lower directions. On the other hand, as a position at which the blocking unit 263 is arranged, a position at a subsequent stage of multiplexing or demultiplexing of optical signals is appropriate, for example, in the case of the separate setting and changing in the upper and lower directions. When a combination of a plurality of outputs is blocked, the number of blocking units 263 is reduced. On the other hand, when the dividing of the output is blocked, the setting can be individually performed and the degree of freedom is improved.

The blocking unit 263 may be a functional unit or a device provided outside of the monitoring unit 260. When the extinction ratio of the modulator is high enough not to affect other optical signals, the modulator may also be configured to serve as the blocking unit 263.

Hereinafter, blocking of transmission of an optical signal may be simply referred to as "blocking." Hereinafter, releasing of the blocking of the transmission of the optical signal may be simply referred to as "blocking releasing."

In the first modification of the subscriber device 40 and the control unit 301, the blocking, the path setting process, the wavelength allocation process (the wavelength setting), and the blocking releasing are performed in this order. In such an order, even if the path setting process is performed, an optical signal before wavelength setting is not transmitted to the outside of the optical GW 200 via the transmission line 503.

When the optical signal is blocked by the blocking unit, the optical SW control unit 320 can basically communicate with the subscriber device 40 if the blocking unit blocks the optical signal. As an exception, the blocking unit may not be able to selectively interrupt the output of the subscriber device 40. For example, when the subscriber device 40 shares a plurality of wavelengths or the like (wavelengths, times, polarized waves orthogonal to each other, modes orthogonal to each other, codes orthogonal to each other, frequencies, core wires (cores), or a combination thereof) by the blocking unit and the supply partner of the subscriber device 40 is in operation, when the wavelengths output in the initial setting are uncertain and there is a possibility of the wavelengths or the like (the wavelengths, the times, the polarized waves orthogonal to each other, the modes orthogonal to each other, the codes orthogonal to each other, the frequencies, the core wires (the cores), or a combination thereof) of the other subscriber devices 40 overlapping, when the outputs at the time of changing of the wavelengths or the like overlap beyond an allowable time for the other wavelengths or the like in operation, or when there is an abnormal case and what is output is unclear. In such cases, after connection is established without influence (for example, after reconnection to a port in no operation,), the optical SW control unit 320 exchanges data with the subscriber device 40.

As an exception, when there is no influence despite non-blocking, the blocking may not be performed. Alternatively, the monitoring unit 260 of the output port may be configured to performing setting so that the connection to an output port that is not affected is made despite non-blocking.

In the path setting process, the optical switch control unit 320 controls the path in the optical SW 210 such that the subscriber device 40 which is a wavelength allocation target is connected to the port 11 (another port) other than the port 11 connected to the monitoring unit 260 of the subscriber device 40 which is a wavelength allocation target. For example, the optical switch control unit 320 controls the optical SW 210 such that the optical signal input from the transmission line 501 of the subscriber device 40 which is a wavelength allocation target is output to the port 11 (another port) specified in accordance with the transmission destination. Here, the transmission destination is specified in accordance with a subscriber, the subscriber device 40, the port 11 of the optical SW 210, the wavelength of the optical signal, a combination of the subscriber device 40 and the wavelength of the optical signal, a combination of the port 11 and the wavelength of the optical signal, or the like.

In the wavelength allocation process, the wavelength control unit 310 performs the wavelength allocation process on the subscriber device 40 which is a wavelength allocation target. For example, the wavelength control unit 310 performs an allocation process for a new wavelength that is the same as or different from the wavelength used when the abnormality is detected on the subscriber device 40 which is a wavelength allocation target.

Figure 73:
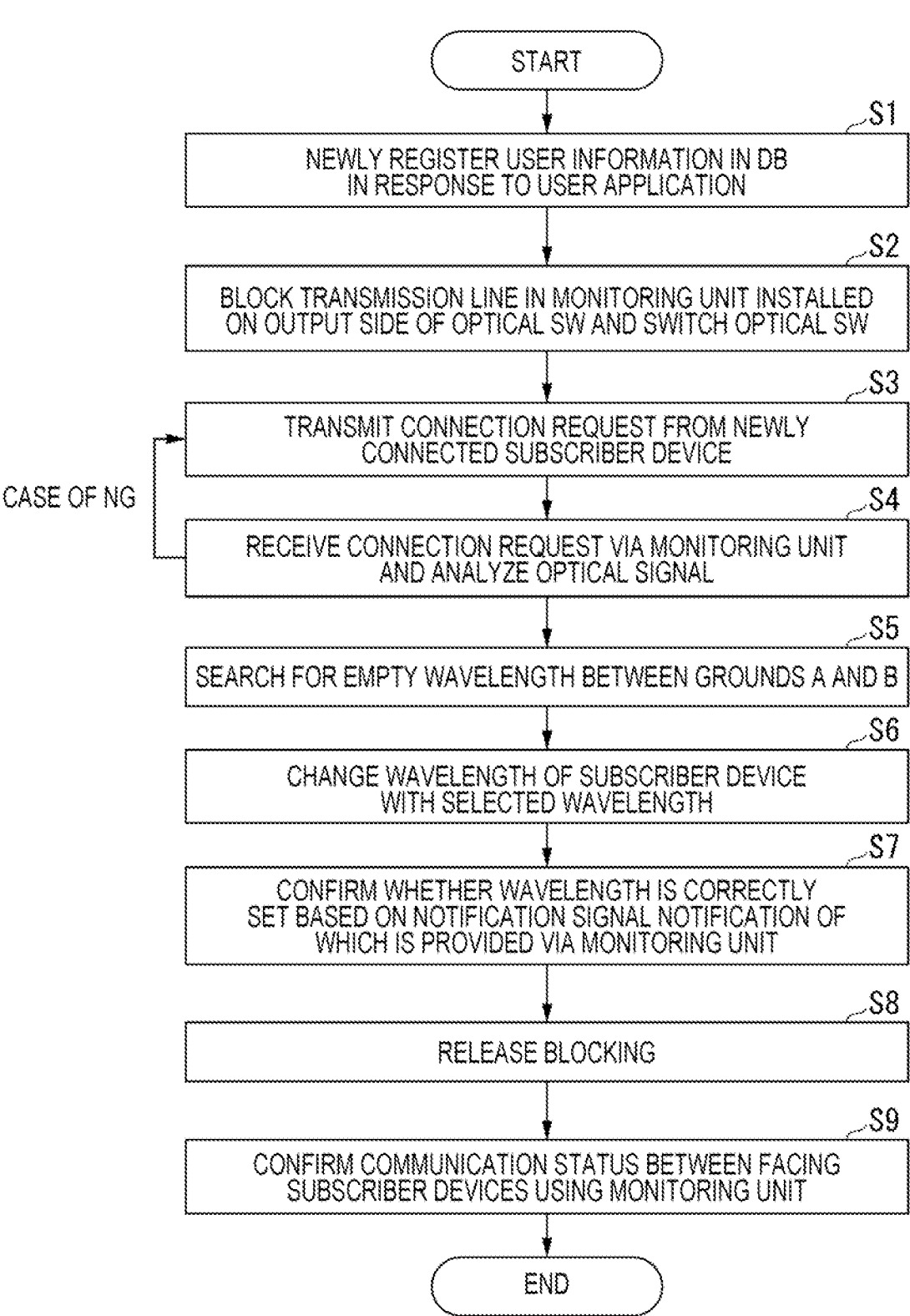
FIG. 73 is a flowchart illustrating an initial setting process of the optical access system according to the configuration example.

FIG. 73 is a flowchart illustrating an initial setting process of an optical access system according to a second modification. Note that a difference from the initial setting process illustrated in the flowchart of FIG. 42 will be mainly described.

In step S2, the control unit 301 controls the monitoring unit 260 installed on the output side of the optical SW 210 such that the blocking unit 263 blocks transmission along the transmission line 503 so that the optical signal of the subscriber device 40 is not transmitted via the transmission line 503. The optical SW control unit 320 performs a path setting process in the optical SW 210.

In step S3, the wavelength control unit 310 receives a connection request from the subscriber device 40 which is a wavelength allocation target. The subscriber device 40 which is a wavelength allocation target performs the initialization process before connection to the optical SW 210. The subscriber device 40 which is a wavelength allocation target may perform the initialization process immediately after connection to the optical SW 210. When a wavelength or the like is set in the initialization process or when at least a part of the initialization process such as allocation is performed after reception of a downlink signal or an allocation request permission of the downlink signal, at least a part of the initialization process is performed after connection. The subscriber device 40 which is a wavelength allocation target transmits a connection request (a register request) using an optical signal.

In step S4, the wavelength control unit 310 receives a connection request via the monitoring unit 260 from the subscriber device 40 which is a wavelength allocation target. "Via the monitoring unit 260" means that, for example, the monitoring unit 260 transmits an optical signal branched by the branch combiner/splitter to the wavelength control unit 310. For example, state of an electrical signal (the monitoring unit 260 includes a reception unit, the reception unit converts the optical signal into an electrical signal, and the reception unit transmits the electrical signal to the connecting unit) may be achieved. The wavelength control unit 310 analyzes the received optical signal and determines an initially set wavelength. The wavelength control unit 310 may analyze the received optical signal and confirm whether there is a problem in optical power.

In step S6, the wavelength control unit 310 (a control unit) transmits a wavelength instruction indicating information regarding the determined (selected) wavelength to the subscriber device 40 which is a wavelength allocation target. The branch combiner/splitter of the monitoring unit 260 may combine the optical signal of the wavelength control unit 310. The monitoring unit 260 may include a transmission unit, the transmission unit may convert an electrical signal into an optical signal, and the multiplexer/demultiplexer may combine the optical signals. When the wavelength instruction is transmitted using the optical signal, the wavelength instruction is transmitted to the subscriber device 40 using the optical signal of the wavelength addressed to the subscriber device 40. The wavelength instruction is transmitted to the subscriber device 40 which is a wavelength allocation target via the monitoring unit 260. The monitoring unit 260 outputs the optical signal input from the wavelength control unit 310 to the subscriber device 40. The optical signal indicating the wavelength instruction may be branched in the middle of the transmission line 501. When a transmission wavelength is set in the wavelength instruction, the subscriber device 40 which is a wavelength allocation target sets the transmission wavelength of the optical signal of the optical transceiver in response to the wavelength instruction.

In step S7, when the notification signal is transmitted using the optical signal, the subscriber device transmits, to the wavelength control unit 310 via the monitoring unit 260, a notification signal for notifying that the wavelength is set using the optical signal with the wavelength instructed in the wavelength instruction. Based on the notification signal, the wavelength control unit 310 confirms whether the instructed wavelength is correctly set. Based on the notification signal, the wavelength control unit 310 may confirm whether the output power of the optical signal is sufficient.

In step S8, when the instructed wavelength is correctly set, the wavelength control unit 310 controls the blocking unit 263 such that the blocking is released. Accordingly, communication between the subscriber device 40 that is the wavelength allocation target and the subscriber device 40 as the communication destination is started.

As described above, in the second modification of the subscriber device 40 and the control unit 301, the optical SW 210 outputs the optical signal input from any one of the plurality of transmission lines 501 to any one of the plurality of transmission lines 501 among the plurality of transmission lines 503. The monitoring unit 260 relays an optical signal between the optical SW 210 and the subscriber device 40 of a communication destination in the transmission line 503 on the side where the optical signal transmitted from the subscriber device 40 is output from the optical SW 210. The wavelength control unit 310 controls the blocking unit 263 such that transmission of the optical signal output from the monitoring unit 260 is blocked. After the blocking is performed by the blocking unit 263, the optical SW control unit 320 performs a path setting process on the optical signal in the optical SW 210. Next, the wavelength control unit 310 allocates a wavelength to the optical signal of the subscriber device based on the monitoring result of the monitoring unit 260. Next, the wavelength control unit 310 controls the blocking unit 263 such that the blocking of the transmission of the optical signal output from the monitoring unit 260 is released. In this way, the control unit 301 causes the blocking unit 263 to perform the blocking before the allocation of the wavelength and prevents the optical signal input from the transmission line 501 to the optical SW 210 from being output to the other transmission lines 503. After the blocking is performed, the control unit 301 performs the path setting process and the wavelength allocation process (the wavelength setting) in this order. After the wavelength is allocated, the control unit 301 causes the blocking unit 263 to perform releasing of the blocking so that the optical signal input from the transmission line 501 to the optical SW 210 is output to the other transmission line 503. The optical GW 200 may include the first optical SW 210 and the second optical SW 210 cascade-connected to the first optical SW 210.

Accordingly, in the second modification of the subscriber device 40 and the control unit 301, it is possible not only to transmit the optical signal in accordance with the destination but also to reduce the number of times the optical switch performs switching in the wavelength setting of the optical signal transmitted from the subscriber device.

The monitoring unit 60 illustrated in FIGS. 33 to 36 may be configured in another aspect (a modification). Hereinafter, another mode (modification) of the monitoring unit 60 will be described.

Figure 74:
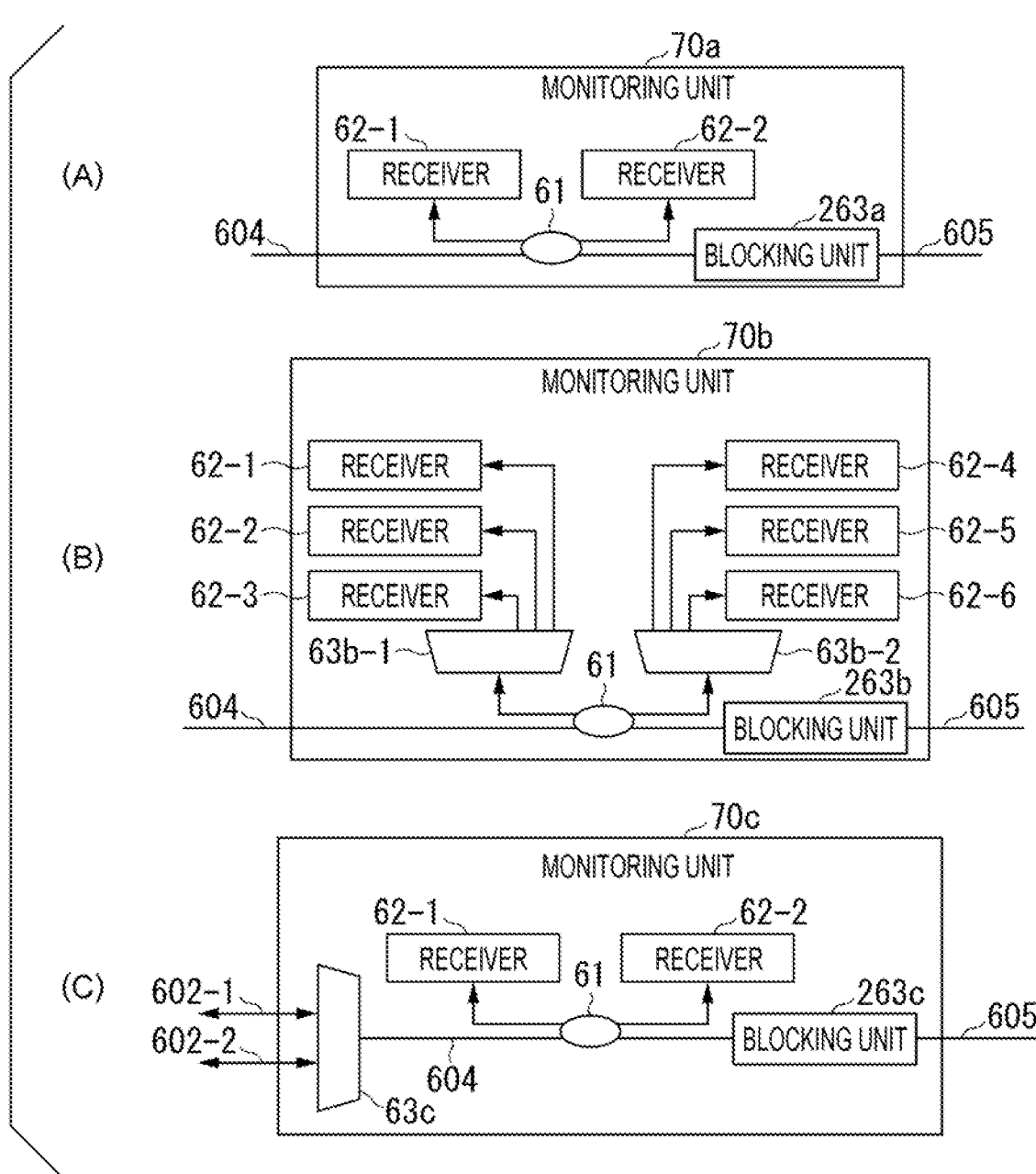
FIG. 74 is a diagram illustrating another aspect of the monitoring unit.
Figure 75:
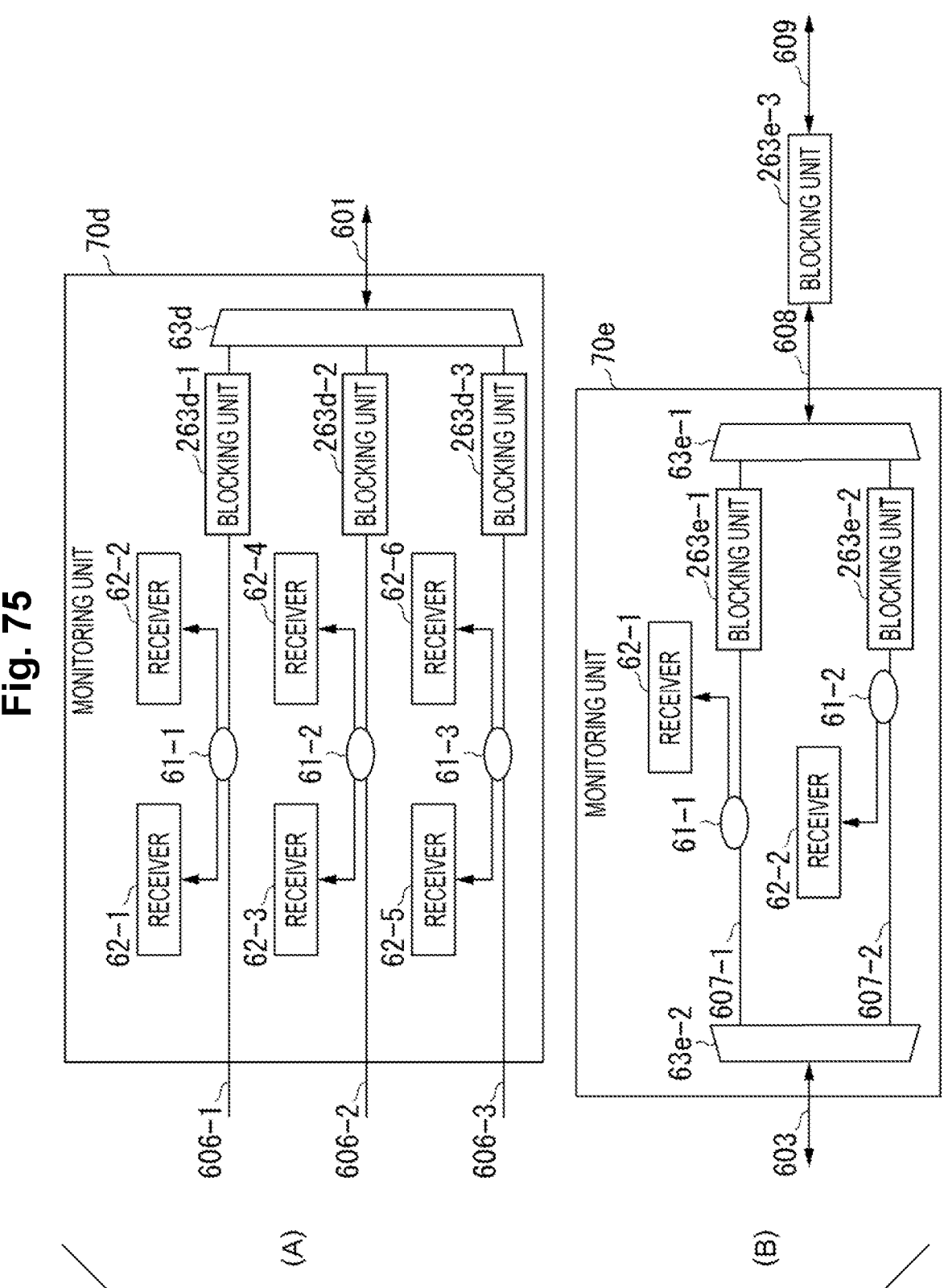
FIG. 75 is a diagram illustrating another aspect of the monitoring unit.

FIGS. 74 to 76 are configuration diagrams of another mode (a modification) of the monitoring unit 60. Although the monitoring unit 60 will be described as an example in FIGS. 74 to 76, the monitoring unit 260 may be used instead of the monitoring unit 60, and the configuration of the monitoring unit 260 may be the configuration illustrated in FIGS. 74 to 76.

A monitoring unit 70a illustrated in FIG. 74(A) is another aspect of the monitoring unit 60. The monitoring unit 70a illustrated in FIG. 74(A) includes a power splitter 61, a plurality of receivers 62-1 to 62-2, and a blocking unit 263a. The monitoring unit 70a illustrated in FIG. 74(A) is different from the monitoring unit 60a illustrated in FIG. 33(A) in that a blocking unit 263a is further included. The blocking unit 263a performs the same process as the blocking unit 263 illustrated in FIG. 72.

For example, the blocking unit 263a blocks the transmission of the optical signal before the path setting process and the wavelength allocation process (wavelength setting) are performed under the control of the wavelength control unit 310. For example, the blocking unit 263a releases the blocking of the transmission of the optical signal after the path setting process and the wavelength allocation process are performed under the control of the wavelength control unit 310. In the example illustrated in FIG. 73, the blocking unit 263a performs the foregoing process on the optical signal input via the transmission line 604 or the transmission line 605.

A monitoring unit 70b illustrated in FIG. 74(B) is another aspect of the monitoring unit 65. The monitoring unit 70b illustrated in FIG. 74(B) includes a power splitter 61, a plurality of receivers 62-1 to 62-6, a plurality of WDM devices 63b-1 to 63b-2, and a blocking unit 263b. The monitoring unit 70b illustrated in FIG. 74(B) is different from the monitoring unit 60b illustrated in FIG. 33(B) in that the blocking unit 263b is further included. The blocking unit 263b performs the same process as the blocking unit 263a.

A monitoring unit 70c illustrated in FIG. 74(C) includes a power splitter 61, a plurality of receivers 62-1 to 62-2, a plurality of WDM devices 63c, and a blocking unit 263c. The monitoring unit 70c illustrated in FIG. 74(C) is different from the monitoring unit 60c illustrated in FIG. 33(C) in that the blocking unit 263c is further included. The blocking unit 263c performs the same process as the blocking unit 263a. For example, the blocking unit 263c blocks transmission of the optical signal multiplexed by the WDM device 63c or releases the blocking of the transmission of the optical signal. For example, the blocking unit 263c blocks the transmission of the optical signal input via the transmission line 605 or releases the blocking of the transmission of the optical signal.

The monitoring unit 70d illustrated in FIG. 75(A) includes a plurality of power splitters 61-1 to 61-3, a plurality of receivers 62-1 to 62-6, a WDM device 63d, and a plurality of blocking units 263d-1 to 263d-3. The monitoring unit 70d illustrated in FIG. 75(A) is different from the monitoring unit 60d illustrated in FIG. 34(A) in that blocking units 263d-1 to 263d-3 are further provided. The transmission line 606-1 is provided with the power splitter 61-1 and the blocking unit 263d-1, the transmission line 602-2 is provided with the power splitter 61-2 and the blocking unit 263d-2, and the transmission line 602-3 is provided with the power splitter 61-3 and the blocking unit 263d-3.

The blocking units 263d-1 to 263d-3 perform the same process as the blocking unit 263a. For example, the blocking units 263d-1 to 263d-3 block the transmission of the optical signals demultiplexed by the WDM device 63d or release the blocking of the transmission of the optical signals. For example, the blocking unit 263d blocks the transmission of the optical signal input via the transmission line 606 or releases the blocking of the transmission of the optical signal.

A monitoring unit 70e illustrated in FIG. 75(B) includes a plurality of power splitters 61-1 to 61-2, a plurality of receivers 62-1 to 62-2, a plurality of WDM devices 63e-1 to 63e-2, and a plurality of blocking units 263e-1 to 263e-3. The monitoring unit 70e illustrated in FIG. 75(B) is different from the monitoring unit 60e illustrated in FIG. 34(B) in that the blocking units 263e-1 to 263e-3 are further included. Transmission lines 607-1 and 607-2 are provided between the WDM device 63e-1 and the WDM device 63e-2. The transmission line 607-1 is provided with the power splitter 61-1 and the blocking unit 263e-1, and the transmission line 607-2 is provided with the power splitter 61-2 and the blocking unit 263e-2. The transmission line 608 connected to the WDM device 63e-1 is provided with a blocking unit 263-3.

The blocking units 263e-1 to 263e-3 perform the same process as the blocking unit 263a. For example, the blocking units 263e-1 to 263e-2 block the transmission of the optical signal demultiplexed by the WDM device 63e-1 or the WDM device 63e-2 or release the blocking of the transmission of the optical signal. The blocking unit 263e-3 blocks the transmission of the optical signal multiplexed by the WDM device 63e-1 or releases the blocking of the transmission of the optical signal. Alternatively, the blocking unit 263e-3 blocks the transmission of the optical signal input via the transmission line 609 or releases the blocking of the transmission of the optical signal. In the monitoring unit 70e illustrated in FIG. 75(B), when the blocking is not set simultaneously in the uplink direction and the downlink direction, the optical signal is blocked at a position where demultiplexing is not performed. When the blocking is set simultaneously in the uplink direction and the downlink direction, the optical signal is blocked at a position where demultiplexing is performed.

A monitoring unit 70f illustrated in FIG. 76(A) includes a power splitter 61, a plurality of receivers 62-1 to 62-2, a modulator 64, and a blocking unit 263f. The monitoring unit 70f illustrated in FIG. 76(A) is different from the monitoring unit 60f illustrated in FIG. 35 (A) in that the blocking unit 263f is further included. The transmission line 604 is provided with the power splitter 61, the blocking unit 263f, and the modulator 64.

The blocking unit 263f performs the same process as the blocking unit 263a. For example, the blocking unit 263f blocks the transmission of the optical signal input via the transmission line 604 or releases the blocking of the transmission of the optical signal. The blocking unit 263f blocks the transmission of the optical signal modulated by the modulator 64 or releases the blocking of the transmission of the optical signal.

A monitoring unit 70g illustrated in FIG. 76(B) includes a plurality of power splitters 61-1 to 61-2, a plurality of receivers 62-1 to 62-2, a plurality of WDM devices 63g-1 to 63g-2, a plurality of modulators 64g-1 to 64g-2, and a plurality of blocking units 263g-1 to 263g-2. The monitoring unit 70g illustrated in FIG. 76(B) is different from the monitoring unit 60g illustrated in FIG. 36 in that the blocking units 263g-1 to 263g-2 are further included. The transmission lines 607-1 and 607-2 are provided between the WDM device 63g-1 and the WDM device 63g-2. The transmission line 607-1 is provided with the modulator 64g-1, the blocking unit 263g-1, and the power splitter 61-1, and the transmission line 607-2 is provided with the modulator 64g-2, the blocking unit 263g-2, and the power splitter 61-2.

The blocking units 263g-1 to 263g-2 perform the same process as the blocking unit 263a. For example, the blocking unit 263g-1 blocks the transmission of the optical signal demultiplexed by the WDM device 63g-2 or releases the blocking of the transmission of the optical signal. The blocking unit 263g-1 blocks the transmission of the optical signal modulated by the modulator 64g-1 or releases the blocking of the transmission of the optical signal. For example, the blocking unit 263g-2 blocks the transmission of the optical signal demultiplexed by the WDM device 63g-1 or releases the blocking of the transmission of the optical signal. The blocking unit 263g-2 blocks the transmission of the optical signal modulated by the modulator 64g-2 or releases the blocking of the transmission of the optical signal. In the monitoring unit illustrated in FIG. 76(B), when the blocking is not set simultaneously in the uplink direction and the downlink direction, the optical signal is blocked at a portion in which demultiplexing is not performed. When the blocking is set simultaneously in the uplink direction and the downlink direction, the optical signal is blocked at a portion in which demultiplexing is performed.

Figure 77:
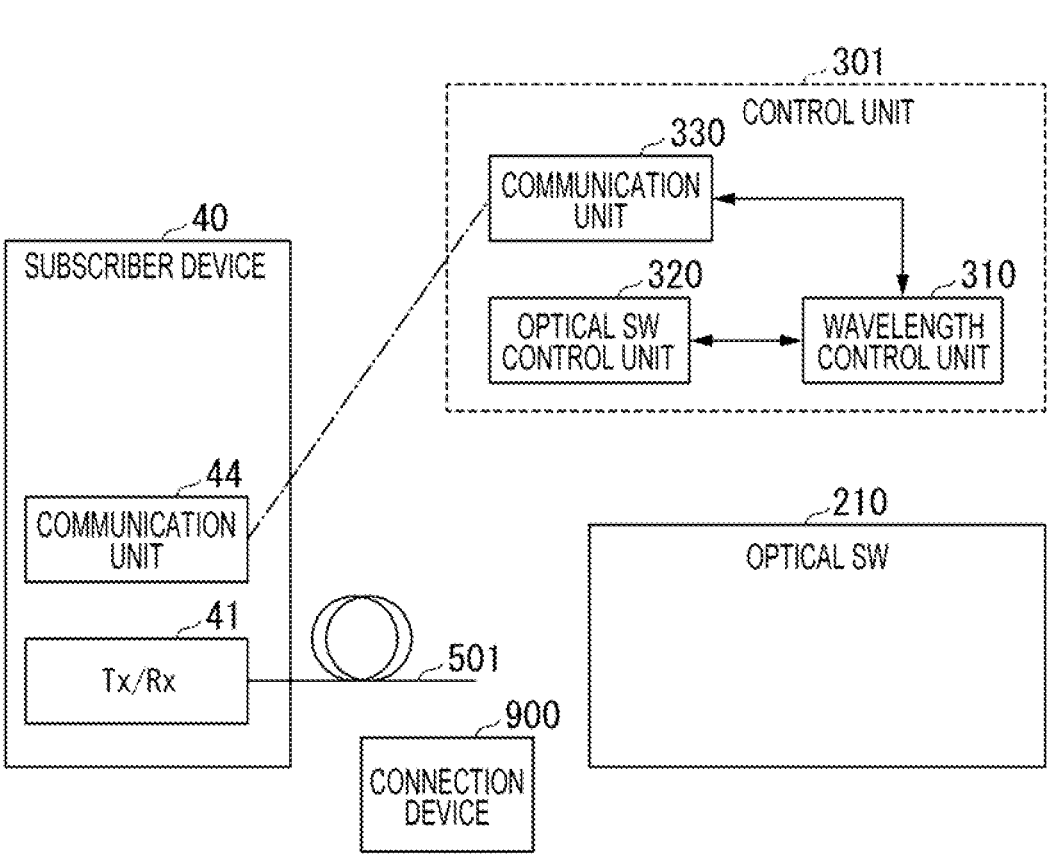
FIG. 77 is a diagram illustrating a configuration example in a third modification of the subscriber device and the control unit.
Figure 78:
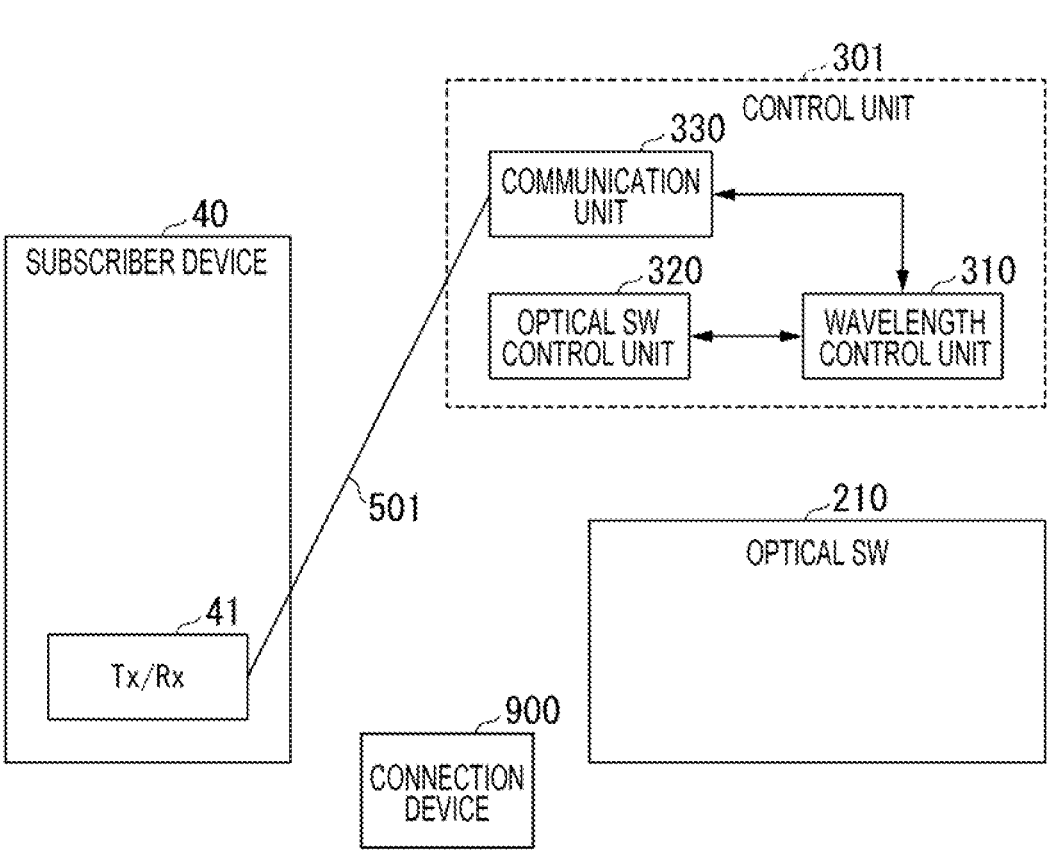
FIG. 78 is a diagram illustrating a configuration example in a fourth modification of the subscriber device and the control unit.
Figure 79:
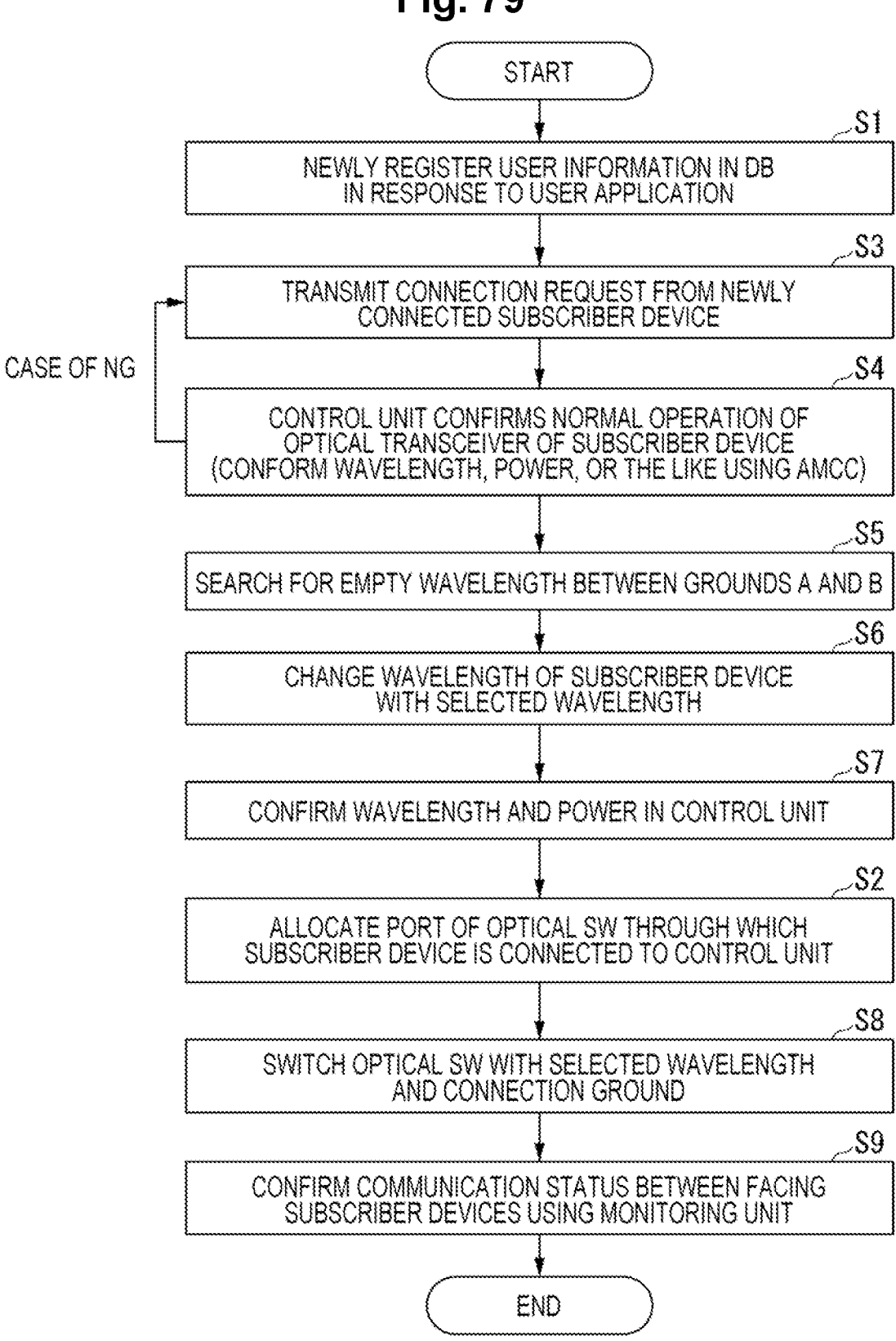
FIG. 79 is a diagram illustrating a modification of the flowchart.
Figure 84:
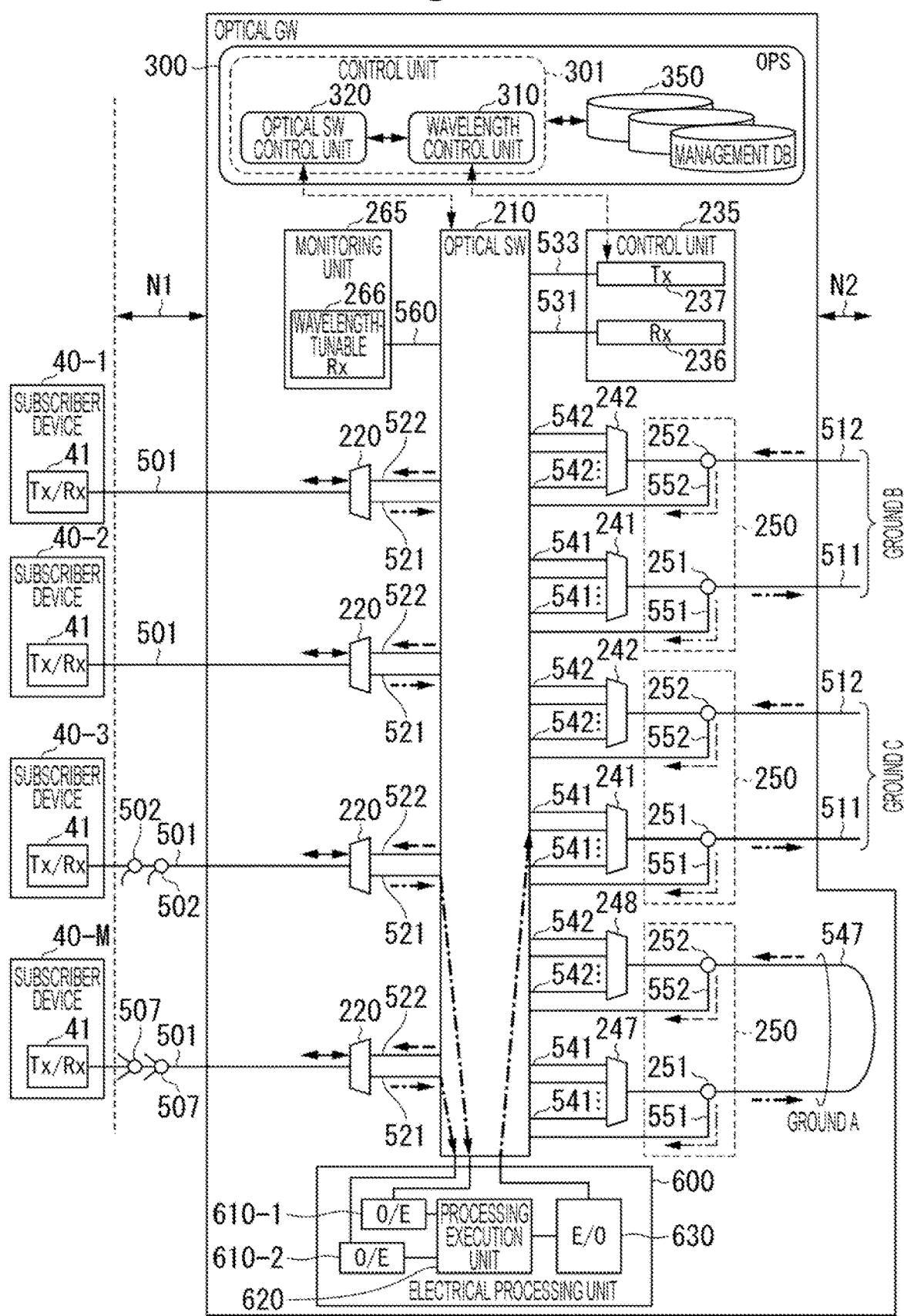
FIG. 84 is a diagram illustrating a modification of the optical access system.

The process in the flowchart illustrated in FIG. 42 may be performed in other aspects. Hereinafter, a flow of process corresponding to a modification of the flowchart of FIG. 42 and a configuration example for realizing such a flow of the process will be described. FIGS. 77 and 78 are diagrams illustrating configuration examples of third and fourth modifications of the subscriber device 40 and the control unit 301, respectively. FIG. 79 illustrates a modification of the flowchart of FIG. 42. In description of the flowchart illustrated in FIG. 42, the subscriber device 40-1 which is a setting target has already been connected to the optical SW 210. However, the subscriber device 40-1 to be set may not be connected (connected) to the optical SW 210 at the time when the processing of steps S1 to S7 is performed. In this case, the subscriber device and the control unit 301 have a function for communicating with each other.

FIG. 77 is a diagram illustrating a configuration example in the third modification of the subscriber device 40 and the control unit 301. The subscriber device 40 (for example, the subscriber device 40-1) includes a communication unit 44. The control unit 301 includes a communication unit 330.

The communication unit 44 is a communication device used when communicating with the control unit 301 without passing through the optical GW 201 is performed. The communication unit 44 may be configured in any way as long as the communication unit 44 can communicate with the control unit 301. For example, the communication unit 44 is configured using a communication device such as a network interface. The communication unit 44 may be configured using a device that performs wireless communication or may be configured using a device that performs wired communication. The wired communication may be communication performed using an electrical signal.

The communication unit 330 is a communication device used when communication with the subscriber device 40 without passing through the optical SW 210 is performed. The communication unit 330 may be configured in any way as long as the communication unit 330 can communicate with the subscriber device 40. For example, the communication unit 330 is configured using a communication device such as a network interface. The communication unit 330 may be configured using a device that performs wireless communication or may be configured using a device that performs wired communication. The wired communication may be communication performed using an electrical signal.

Next, a flow of a process will be described with reference to FIG. 79. Correspondence between processes illustrated in rectangles in FIG. 79 and step numbers given to the rectangles is the same as the correspondence between the rectangles and the step number illustrated in FIG. 42. The processing order is different between FIGS. 42 and 79.

In the modification, the process of step S3 is performed after the process of step S1. In step S3, the subscriber device 40-1 transmits a connection request (a register request) to the control unit 301 via the communication unit 44. The process of step S4 may be performed using the subscriber device 40 itself or a dedicated port. The process of step S4 may not be performed.

In step S5, the wavelength control unit 310 of the control unit 301 registers information regarding the subscriber device 40-1 (a request of the connection source) and the like in the management DB 350 based on the connection request received via the communication unit 330. The wavelength control unit 310 selects a wavelength to be used by the subscriber device 40-1 from among free wavelengths.

In step S6, the wavelength control unit 310 transmits the wavelength instruction in which the information regarding the selected wavelength is set to the subscriber device 40-1 via the communication unit 330. The subscriber device 40-1 receives the wavelength instruction via the communication unit 44. The subscriber device 40-1 sets the wavelength of the optical transceiver 41 according to the received wavelength instruction. When the reception wavelength is set in the wavelength instruction, the subscriber device 40-1 sets the optical transceiver 41 (the wavelength tunable filter 452) to receive the wavelength signal with the reception wavelength. Then, in step S7, the control unit 230 confirms whether the specified wavelength is correctly set, whether the output power is sufficient, and the like based on the received notification signal. This confirmation process is not necessarily performed. When the confirmation process is performed, for example, the confirmation process is performed using a dedicated port.

Thereafter, the process of step S2 is performed, and the subscriber device 40 and the optical SW 210 are connected using a port of the optical SW 210 allocated in step S2. This connection may be performed by a human hand or may be performed by the connection device 900. The connection device 900 includes, for example, a connector holding portion that holds a connector located at an end of an optical cable and an actuator that moves the connector holding portion to connect the connector to a port for connection to the optical SW 210. For example, the wavelength control unit 310 of the control unit 301 may transmit a connection instruction to the connection device 900 at a predetermined timing (for example, a timing after a time required until the end of the setting in accordance with the wavelength instruction in the subscriber device 40 has elapsed) after transmission of the wavelength instruction. The transmission process in this case may be performed via the communication unit 330, for example. When the connection instruction is received, the connection device 900 links (connects) the optical cable forming the transmission line 501 of the subscriber device 40 to the optical SW 210. The information indicating the port to which the optical cable is connected may be set in the connection device 900 in advance, for example, or may be included in the connection instruction transmitted from the control unit 301.

When the subscriber device 40-1 and the optical SW 210 are connected, the processing after step S8 is performed. That is, control (a routing process) of the path for the optical SW 210 is performed.

FIG. 78 is a diagram illustrating a configuration example in a fourth modification of the subscriber device and the control unit 301. The control unit 301 includes a communication unit 330.

The communication unit 330 is a communication device used when communication with the subscriber device 40 without passing through the optical SW 210 is performed. The communication unit 330 may be configured in any way as long as communication with the subscriber device 40 can be made using an optical transmission line. For example, the communication unit 330 is configured using a communication device such as an optical network interface. The optical transceiver 41 of the subscriber device 40 (for example, the subscriber device 40-1) is first connected to the communication unit 330 of the control unit 301 via the optical transmission line 501.

Next, a flow of a process will be described with reference to FIG. 79. In the modification, the process of step S3 is performed after the process of step S1. In step S3, the subscriber device 40-1 transmits a connection request (a register request) to the control unit 301 via the optical transceiver 41. The process of step S4 may be performed using the subscriber device itself or a dedicated port. The process of step S4 may be performed or may not be performed.

In step S5, the wavelength control unit 310 of the control unit 301 registers information regarding the subscriber device 40-1 (a request of the connection source) and the like in the management DB 350 based on the connection request received via the communication unit 330. The wavelength control unit 310 selects a wavelength to be used by the subscriber device 40-1 from among free wavelengths.

In step S6, the wavelength control unit 310 transmits the wavelength instruction in which the information regarding the selected wavelength is set to the subscriber device 40-1 via the communication unit 330. The subscriber device 40-1 receives the wavelength instruction via the optical transceiver 41. The subscriber device 40-1 sets an oscillation wavelength of the optical transceiver 41 in response to the received wavelength instruction. When the reception wavelength is set in the wavelength instruction, the subscriber device 40-1 sets the optical transceiver 41 (the wavelength tunable filter 452) to receive the wavelength signal with the reception wavelength. Then, in step S7, the control unit 230 confirms whether the specified wavelength is correctly set, whether the output power is sufficient, and the like based on the received notification signal. This confirmation process is not necessarily performed. When the confirmation process is performed, for example, the confirmation process is performed using a dedicated port.

Thereafter, the process of step S2 is performed, and the subscriber device 40 and the optical SW 210 are connected using a port of the optical SW 210 allocated in step S2. This connection may be performed by a human hand or may be performed by the connection device 900. For example, the wavelength control unit 310 of the control unit 301 may transmit a connection instruction to the connection device 900 at a predetermined timing (for example, a timing after a time required until the end of the setting in accordance with the wavelength instruction in the subscriber device 40 has elapsed) after transmission of the wavelength instruction. The transmission process in this case may be performed via the communication unit 330, for example. When the connection instruction is received, the connection device 900 links (connects) the optical cable forming the transmission line 501 of the subscriber device 40 to the optical SW 210. The information indicating the port to which the optical cable is connected may be set in the connection device 900 in advance, for example, or may be included in the connection instruction transmitted from the control unit 301.

When the subscriber device 40-1 and the optical SW 210 are connected, the processing after step S8 is performed. That is, control (a routing process) of the path for the optical SW 210 is performed.

As described above, in the modification of the subscriber device 40 and the control unit 301, in a state where the subscriber device 40 which is a setting target is not linked (connected) to the optical SW 210, the wavelength is allocated using the communication path without being involved in the optical SW 210. Accordingly, in the modification of the subscriber device 40 and the control unit 301, it is possible to improve the degree of freedom of work and a process related to wavelength allocation to the subscriber device 40.

As described above, in the third and fourth modifications of the subscriber device 40 and the control unit 301, in a state where the subscriber device 40 which is a setting target is not linked (connected) to the optical SW 210, the wavelength is allocated using the communication path without being involved in the optical SW 210. Accordingly, in the third and fourth modifications of the subscriber device 40 and the control unit 301, it is possible to increase the degree of freedom of work and a process related to wavelength allocation to the subscriber device 40. The first to fourth modifications of the subscriber device 40 and the control unit 301 may be combined.

Next, a configuration in a case where a CPE is further included in the optical access system will be described.

FIG. 80 is a diagram illustrating a first configuration example of an optical access system including a CPE.

The optical access system illustrated in FIG. 80 includes a subscriber unit 40, an optical GW 200, a control unit 301, and a CPE 800. The optical GW 200 may be any one of the optical GWs of the above-described embodiments.

The subscriber device 40 makes a requests for allocating a wavelength by communicating with the control unit 301 in response to a request from the CPE 800.

Here, the request from the CPE 800 may be an explicit request from the CPE 800 to the subscriber device or may be a detection of connection by the subscriber device 40.

When the CPE 800 makes a request to the subscriber device 40, the subscriber device 40 that has received the request requests the control unit 301 to set a wavelength or the like. In this case, the subscriber device 40 serves as a proxy for the request of the CPE 800, and the subscriber device 40 sets the CPE 800. Further, the subscriber device 40 controls a setting of the subscriber device 40 itself in accordance with the setting. The same applies to a case where the control unit 301 is requested from the subscriber device 40 via the monitoring unit. However, as compared with the case where the subscriber device 40 makes a request regardless of the request of the CPE 800, both the setting of the subscriber device 40 itself and the setting of the CPE 800 are included. The settings of both the devices can be used. For example, wavelengths to be used may be the same. When a light source of the subscriber device 40 is not included and a signal obtained by modulating an optical signal transmitted or received by the CPE 800 by an AMCC or the like is used to exchange a control signal of the subscriber device 40, the wavelength to be used for the subscriber 40 is not necessary. When a wavelength or the like different from that of the CPE 800 is used, the wavelength to be used may be set individually so that collision with the wavelength or the like used by the CPE 800 does not occur.

The request from the subscriber device 40 to the control unit 301 may be made by an optical transceiver included in the subscriber device 40, or may be made by AMCC modulation on an optical signal from the CPE 800, writing of a management signal in a non-modulated portion, or the like, similarly to a case where the monitoring unit adds a control signal to a signal from the subscriber device 40. Here, in consideration of an influence of the CPE 800 on the signal, it is preferable to use other wavelengths, time regions, or orthogonal states that do not interfere with each other without modulation of or the like the signal of the CPE 800.

The setting control of the subscriber device 40 itself is transmission and reception of setting of a wavelength or the like appropriate for a filter or a monitoring unit in an uplink or downlink direction to be described below, and unique information or information regarding a state or the setting of the subscriber device itself.

When the CPE 800 makes a request to the control unit 301 including a case where the monitoring unit is involved, the monitoring unit or the control unit 301 that has received the request sets the request in the CPE 800. In this case, the setting related to the subscriber device 40 may be performed separately from the CPE 800, the optical signal from the CPE 800 may be modulated and transmitted, the optical signal to the CPE 800 may be snooped and received, or the setting information from the CPE 800 to the subscriber device 40 may be received. When the setting information is received or transmitted from the CPE 800, encryption or the like is preferable in order to prevent alternation by the CPE 800.

The subscriber device 40 inputs a wavelength instruction including information regarding the wavelength allocated by the control unit 301 via the optical GW 200 and transmits the input wavelength instruction to the CPE 800. When the subscriber device 40 includes a tunable wavelength filter, the subscriber device 40 sets a wavelength included in the acquired wavelength instruction as a wavelength to be transmitted in the tunable wavelength filter. Although the wavelength filter is used here to describe the wavelength as an example, the subscriber device 40 sets filters such as a polarized wave splitter for a polarized wave, a decoder for a code, a mode selector for a mode, and a core selector for a core to be transmitted in accordance with the setting. The tunable wavelength filter is an example of a filter.

The control unit 301 includes a wavelength control unit 310 and an optical SW control unit 320. When a connection request is obtained from the subscriber device the wavelength control unit 310 transmits, to the subscriber device 40, a wavelength instruction in which information such as a wavelength selected in response to the connection request (a wavelength, a time, a polarized wave, a mode, a code, a frequency, a core, a core wire, or a combination thereof, and the same applies below) is set via the optical GW 200.

The subscriber device 40 includes an optical transceiver 460 and a wavelength setting unit 470. Although the configuration in which the subscriber device 40 includes the transceiver 460 is illustrated as illustrated in FIG. 80, the transceiver 460 illustrated in FIG. 80 may not be a normal optical transceiver that converts an electrical signal into an optical signal and outputs the optical signal, and converts an input optical signal into an electrical signal. That is, the optical transmitter and the optical receiver may not be included and the wavelength-tunable filter 461 may be included. This is because the subscriber device 40 in the present configuration transmits the optical signal transmitted from the CPE 800 through the optical GW 200 and transmits the optical signal output from the optical GW 200 through the CPE 800. Therefore, the subscriber device 40 in the present configuration does not include an optical transmitter and an optical receiver that once terminate an optical signal. When the optical signal flowing on the path is branched to acquire the optical signal, the transceiver 460 of the subscriber device 40 may include an optical transmitter and an optical receiver.

The wavelength-tunable filter 461 transmits light with a wavelength set by the wavelength setting unit 470 in the optical signal (an uplink optical signal) transmitted from the CPE 800. The optical signal transmitted through the wavelength-tunable filter 461 is output to the optical GW 200. The wavelength-tunable filter 461 is a kind of an uplink filter.

The subscriber device 40 transmits the optical signal input from the optical GW 200 to the CPE 800.

The wavelength setting unit 470 acquires a wavelength instruction transmitted from the control unit 301 and sets the wavelength to be transmitted through the tunable filter 461 based on the acquired wavelength instruction. For example, the wavelength setting unit 470 may acquire the wavelength instruction from the downlink path. The wavelength setting unit 470 may set a wavelength to be transmitted through the wavelength-tunable filter 461 based on the wavelength instruction transmitted through another line such as a telephone line.

Next, a specific configuration of the CPE 800 will be described.

The CPE 800 includes a wavelength control unit 811 and a wavelength-tunable light source 812. The wavelength control unit 811 requests the subscriber device 40 to allocate a wavelength, and sets the wavelength included in the wavelength instruction transmitted through the wavelength subscriber device 40 in the wavelength-tunable light source 812. The wavelength-tunable light source 812 transmits an optical signal with a wavelength set by the wavelength control unit 811 to the subscriber device 40.

The CPE 800 is a user device connected to the subscriber device 40 and provided at a user's home. For example, the CPE 800 is a user device that has a video distribution function when a video is delivered. The CPE 800 performs communication using the wavelength included in the wavelength instruction transmitted through the subscriber device 40. In the present example, the wavelength or the like used by the CPE 800 will be described in a configuration in which the wavelength instruction of the control unit 301 is received by the subscriber device 40 and the wavelength instruction acquired by the subscriber device 40 is acquired. However, the wavelength instruction may be received from the subscriber device 40, the control unit 301 may directly give an instruction to the CPE 800 by transmitting an optical signal to the CPE 800, may receive an instruction via another line such as a telephone line, or may receive an instruction directly from a monitoring unit (the monitoring unit 60, the monitoring unit 260, or the like) included in the optical GW 200 or via the subscriber device 40.

The CPE 800 is controlled with an optical signal emitted from the subscriber device 40, the control unit 301, and the monitoring unit (a subscriber side, other than subscriber side) and a signal (such as a wireless phone) other than the optical signal emitted from the subscriber device 40 and the control unit 301. Here, the monitoring unit (the subscriber side) is a monitoring unit disposed to be closer to the subscriber device 40 than the optical SW included in the optical GW 200 and connected to the subscriber device 40 without passing through the optical SW, and the monitoring unit (other than the subscriber side) is a monitoring unit connected to the subscriber device 40 via the optical SW. Among them, an optical signal emitted by the subscriber device 40, an optical signal other than the optical signal, an optical signal other than an optical signal emitted by the control unit 301, or an optical signal emitted from the monitoring unit (the subscriber side) is input to the CPE 800 directly or via the subscriber device 40 without passing through the optical GW 200. On the other hand, an optical signal generated from the control unit 301 or the monitoring unit (other than the subscriber side) is input to the CPE 800 directly via the optical GW 200 or to the CPE 800 via the subscriber device 40. In the first configuration example illustrated in FIG. 80, a configuration in which the CPE 800 is controlled by the optical signal emitted by the control unit 301 will be described.

Next, a flow of the first configuration example illustrated in FIG. 80 will be described.

In the process of steps S3 to S6 illustrated in FIG. 42, the subscriber device 40 acquires a wavelength instruction including wavelength information via the optical GW 200 in response to a request from the CPE 800.

Here, when the control signal to the subscriber device 40 is transmitted from the optical GW to a destination along with the main signal output from the CPE 800, the wavelength instruction to both is set such that the same path can be conducted. When the control signal is not transmitted together, the wavelength instruction is set in accordance with each path.

The control signal may be divided and multiplexed with the main signal by a wavelength, a time, a polarized wave, a mode, a code, a frequency, a core, a core wire, or a combination thereof. The control signal may receive an envelope-modulated AMCC signal by branching the main signal, perform envelope modulation on the main signal or light from a light source provided in the subscriber device and transmit the AMCC signal.

The wavelength indication obtained via the optical GW 200 is input to the CPE 800 via the subscriber device 40. At this time, the wavelength setting unit 470 of the subscriber device 40 acquires the wavelength instruction from the downlink path and sets the wavelength to be transmitted through the wavelength-tunable filter 461 in accordance with the acquired wavelength instruction.

The wavelength control unit 811 of the CPE 800 acquires the wavelength instruction via the subscriber device 40. The wavelength control unit 811 sets the wavelength of the wavelength-tunable light source 812 in accordance with the acquired wavelength instruction. The wavelength-tunable light source 812 transmits an optical signal with a wavelength set by the wavelength control unit 811 via the subscriber device 40.

An uplink optical signal input to the subscriber device 40 transmits only the optical signal with the wavelength set in the wavelength-tunable filter 461. The optical signal transmitted through the wavelength-tunable filter 461 is output to the optical GW 200.

In the foregoing description, the control signal is terminated in the control unit 301 or between the control unit 301 and the subscriber device 40 and between the subscriber device 40 and the CPE 800. The control signal is terminated in the control unit 301 or between the monitoring unit and the subscriber device 40 or in the control unit 301 or between the monitoring unit and the CPE 800, and the subscriber device 40 terminates the control signal addressed to itself, but the control signal to the CPE 800 may be transmitted and not terminated (a first example). In this case, the following is achieved.

In the processing of step S3 to S6 illustrated in FIG. 42, the subscriber device 40 serves as the subscriber device 40 and the CPE 800 acquires a wavelength instruction including information such as a wavelength instead of the subscriber device 40. The wavelength indication for the CPE 800 is transmitted through the subscriber device 40 to be input to the CPE 800. At this time, the wavelength setting unit 470 of the subscriber device 40 may acquire the wavelength instruction from the downlink path in order to ascertain the wavelength instruction for the CPE 800.

Further, the control signal is terminated in the control unit 301 or between the monitoring unit and the CPE 800. The subscriber device 40 may snoop not the control signal addressed to itself but the control signal addressed to the CPE 800 and may use the control signal for setting a transmission/blocking or a monitoring target (a second example). In that case, the following is achieved.

In the process of step S3 to S6 illustrated in FIG. 42, not the subscriber device 40 but only the CPE 800 acquires a wavelength instruction including information such as a wavelength instead of the subscriber device 40. The wavelength indication for the CPE 800 is transmitted through the subscriber device 40 to be input to the CPE 800. At this time, the wavelength setting unit 470 of the subscriber device 40 may acquire the wavelength instruction from the downlink path in order to ascertain the wavelength instruction for the CPE 800.

In the foregoing configuration, the subscriber device 40 can transmit only the optical signal with an appropriate wavelength which has been allocated in advance and may output the optical signal to the optical GW 200 by using the wavelength-tunable filter 461. In this way, the main signal transmitted from the CPE 800 is not terminated in the subscriber device 40 as compared with the related art. In the rear two examples (the first example and the second example) among the three examples described above, the control signal may also be modulated by the AMCC or the like with the control signal related to the subscriber device 40, but the control signal for the CPE 800 is not terminated. Further, since only an optical signal with the appropriate wavelength is output to the optical GW 200, it is easy to reach the destination without being blocked or attenuated by an optical demultiplexer or the like on the way. Thus, it is difficult to disturb other optical signals by using an inappropriate wavelength or the like. Therefore, the optical signal transmitted from the CPE 800 can be relayed to the destination as it is.

FIG. 81 is a diagram illustrating a second configuration example of the optical access system including the CPE.

The optical access system illustrated in FIG. 81 includes a subscriber device 40a, an optical GW 200, a control unit 301, and a CPE 800. A configuration other than the subscriber device 40a are similar to that of the optical access system illustrated in FIG. 80.

The second configuration example is different from the first configuration example in that the subscriber device 40a newly includes a wavelength monitoring unit 480 that monitors a wavelength of an optical signal transmitted by the CPE 800 instead of the wavelength-tunable filter 461. A filter that transmits only an uplink optical signal with an appropriate wavelength or the like may also be included. Differences will be described below.

The subscriber device 40a includes an optical transceiver 460a, a wavelength setting unit 470a, and a wavelength monitoring unit 480. Although the configuration in which the subscriber device 40a includes the transceiver 460a is illustrated as illustrated in FIG. 81, the transceiver 460a illustrated in FIG. 81 may not be a normal optical transceiver that converts an electrical signal into an optical signal and outputs the optical signal, and converts an input optical signal into an electrical signal. That is, the optical transmitter and the optical receiver may not be included. This is the same reason as the subscriber device 40 shown in FIG. 80. The optical transceiver 460a is different from the optical transceiver 460 in that the wavelength-tunable filter 461 is not included. When the optical signal flowing on the path is branched to acquire the optical signal, the transceiver 460a of the subscriber device 40a may include an optical transmitter and an optical receiver.

The wavelength setting unit 470a terminates or snoops and acquires a wavelength instruction transmitted from the control unit 301 to the subscriber device 40 or the CPE 800 and sets a wavelength to be monitored in the wavelength monitoring unit 480 based on the acquired wavelength instruction. For example, the wavelength setting unit 470a may acquire the wavelength instruction from a downlink path such as the CPE 800. The wavelength setting unit 470a may set the wavelength to be monitored in the wavelength monitoring unit 480 based on a wavelength instruction transmitted via another line such as a telephone line.

The wavelength monitor 480 monitors the wavelength of the optical signal transmitted by the CPE 800. The wavelength monitoring unit 480 acquires the optical signal flowing on an uplink path by branching or partially absorbing the optical signal on the path, and monitors whether the wavelength of the acquired optical signal is the set wavelength.

When the wavelength of the optical signal transmitted by the CPE 800 is different from the wavelength set as the monitoring target, the wavelength monitor 480 determines that the wavelength of the optical signal transmitted by the CPE 800 is not an appropriate wavelength. In this case, the wavelength monitor unit 480 notifies the CPE 800 of information regarding an appropriate wavelength (an uplink wavelength included in the wavelength instruction). The notification may be a value of the wavelength or an identifier representing the wavelength or may be a direction to be corrected or a deviated direction on the wavelength axis. On the other hand, when the wavelength of the optical signal transmitted by the CPE 800 is the same as the wavelength set as the monitoring target, the wavelength monitor 480 determines that the wavelength of the optical signal transmitted by the CPE 800 is an appropriate wavelength. In this case, the wavelength monitor 480 may particularly perform nothing.

The subscriber device 40 may notify of proper or improper monitoring information using a control signal or the like with the control unit 301 or the monitoring unit. In accordance with the notification, the control unit 301 may notify the CPE 800 to give an instruction for an initial setting such as correction and restart. The notification to the control unit 301 is appropriate when the subscriber device 40 does not terminate the control signal from the control unit 301 or the monitoring unit to the CPE 800, and the control unit 301 or the monitoring unit directly controls the CPE 800.

The monitoring of the wavelength may be performed directly, or may be performed based on the intensity of transmission or blocking of the filter or a ratio thereof. For example, the intensity of transmission or non-transmission may be monitored through a filter that transmits an optical signal with the appropriate wavelength or the like, and may be indirectly monitored by decreasing or increasing the intensity. In this case, the monitoring unit also serves as a filter.

In the optical access system in the second configuration example configured as described above, the wavelength monitoring unit 480 instructs the CPE 800 when the optical signal transmitted from the CPE 800 is different from the wavelength or the like allocated from the control unit 301, and transmits the optical signal through the optical switch 200 when the optical signal transmitted from the CPE 800 is the same as the wavelength or the like allocated from the control unit 301. In this way, the main signal transmitted from the CPE 800 is not terminated in the subscriber device 40a as compared with the related art. In the rear two examples (the first example and the second example) among the three examples described above, the control signal may also be modulated by the AMCC or the like with the control signal related to the subscriber device 40, but the control signal for the CPE 800 is not terminated. Further, since only an optical signal with an appropriate wavelength is output to the optical GW 200, it is easy to reach the destination without being filtered by an optical demultiplexer or the like on the way, and it is difficult to disturb other optical signals by using an inappropriate wavelength or the like. Therefore, it is possible to relay the optical signal transmitted from the CPE 800 to the destination.

When a notification is obtained from the wavelength monitoring unit 480 of the subscriber device 40a, the wavelength control unit 811 sets the wavelength included in the obtained notification as the wavelength of the wavelength-tunable light source 812. When the CPE 800 directly communicates with the control unit 301, the CPE 800 may directly inquire of the control unit 301 about the appropriate wavelength or may inquire in such a manner that the initial connection process is performed.

Figure 82:
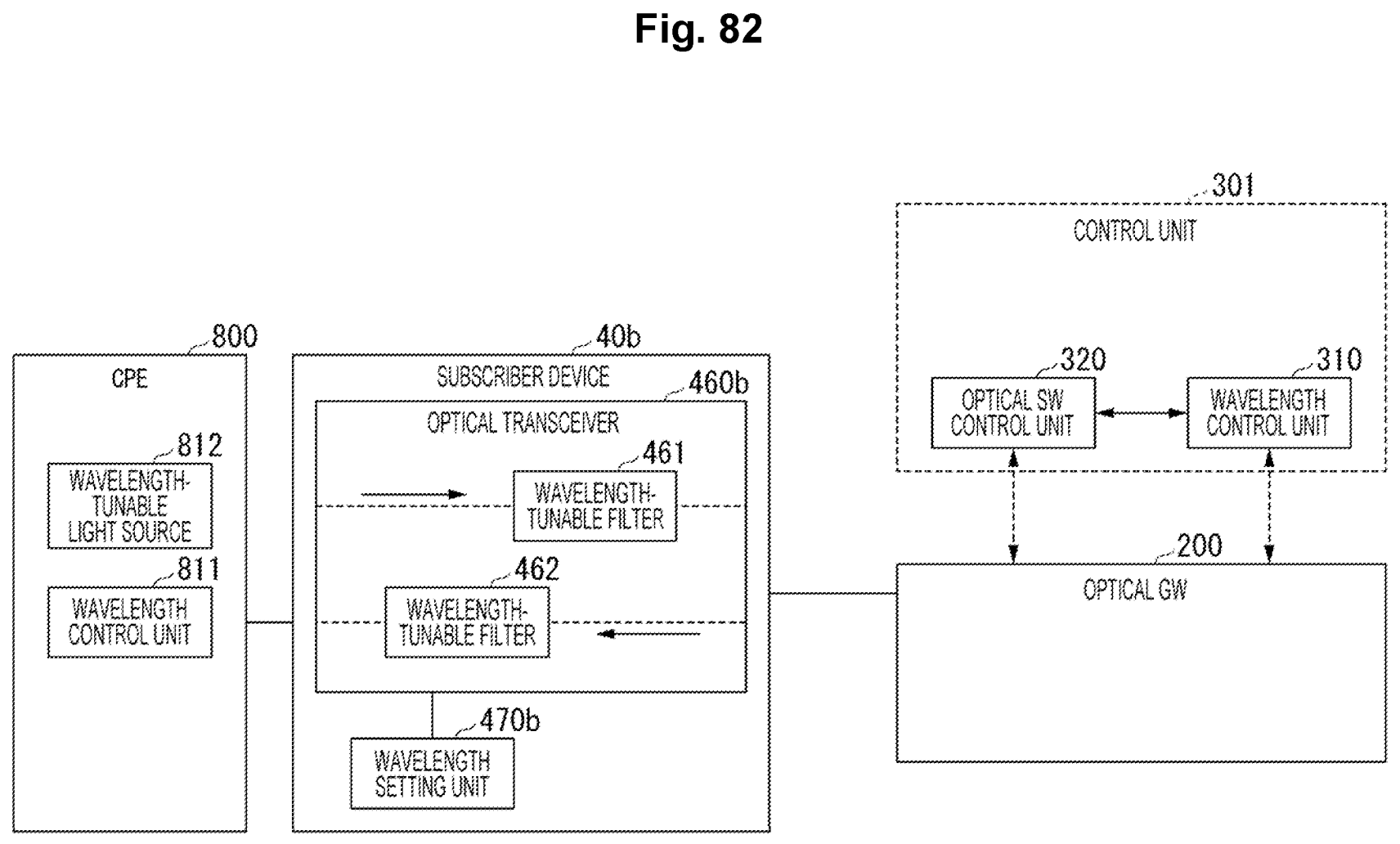

FIG. 82 is a diagram illustrating a third configuration example of the optical access system including the CPE.

The optical access system illustrated in FIG. 82 includes a subscriber device 40b, an optical GW 200, a control unit 301, and a CPE 800. A configuration other than the subscriber device 40b are similar to that of the optical access system illustrated in FIG. 80.

The third configuration example is different from the first configuration example in that the subscriber device 40b newly includes a downlink wavelength-tunable filter. Hereinafter, differences will be described.

The subscriber device 40b includes an optical transceiver 460b and a wavelength setting unit 470b. The optical transceiver 460b includes a wavelength-tunable filter 461 and a wavelength-tunable filter 462. Although the configuration in which the subscriber device 40b includes the transceiver 460b is illustrated as illustrated in FIG. 82, the transceiver 460b illustrated in FIG. 82 may not be a normal optical transceiver that converts an electrical signal into an optical signal and outputs the optical signal, and converts an input optical signal into an electrical signal. That is, the optical transmitter and the optical receiver may not be included. This is the same reason as the subscriber device 40 shown in FIG. 80. The optical transceiver 460b is different from the optical transceiver 460 in that a wavelength-tunable filter 462 is further included. When an optical signal flowing on the path is branched to acquire the optical signal, the transceiver 460b of the subscriber device 40b may include an optical transmitter and an optical receiver.

The wavelength-tunable filter 462 transmits the light with the wavelength set by the wavelength setting unit 470b in the optical signal (a downlink optical signal) output from the optical GW 200. The optical signal transmitted by the tunable filter 462 is output to the CPE 800. The wavelength-tunable filter 462 is a kind of a downlink filter. By including the wavelength-tunable filter 462 as a downlink filter, it is possible to prevent an optical signal with an uncontracted wavelength or the like from being input to the CPE 800. That is, the subscriber device 40 can block an inappropriate downlink optical signal for the CPE 800.

In the optical access system in the third configuration example configured as described above, since the subscriber device 40b includes a filter for an uplink signal (the wavelength-tunable filter 461), the optical signal can be transmitted toward the optical GW 200 only when the wavelength of the optical signal input to the optical GW 200 is appropriate. Further, since the subscriber device 40b includes a filter for a downlink signal (the wavelength-tunable filter 462), the optical signal can be transmitted to the CPE 800 only when the wavelength of the optical signal input from the optical GW 200 to the CPE 800 is appropriate.

In the optical access system illustrated in FIG. 82, the subscriber device 40b may include a wavelength monitoring unit. In this case, the wavelength monitoring unit monitors the wavelength of the optical signal output from the optical GW 200 in addition to the wavelength of the optical signal transmitted by the CPE 800. The uplink wavelength and the downlink wavelength to be monitored by the wavelength monitoring unit are set by the wavelength setting unit 470b. The wavelength monitoring unit branches and acquires the optical signal flowing on the uplink path and monitors whether the wavelength of the acquired optical signal is the set wavelength. The wavelength monitoring unit branches and acquires the optical signal flowing on the downlink path and monitors whether the wavelength of the acquired optical signal is the set wavelength. When the wavelength of the optical signal output from the optical GW 200 is different from the set wavelength, the wavelength monitoring unit may notify of or inquire about the wavelength of the control unit 301, or may regard the downlink optical signal as being correct and instruct the CPE 800 to receive the downlink optical signal in accordance with the downlink wavelength.

When the subscriber device 40b includes the wavelength monitoring unit, the subscriber device 40b may not include the wavelength-tunable filter 41. That is, the subscriber device 40b may be configured to monitor, filter, and block only the downlink optical signal.

Figure 83:
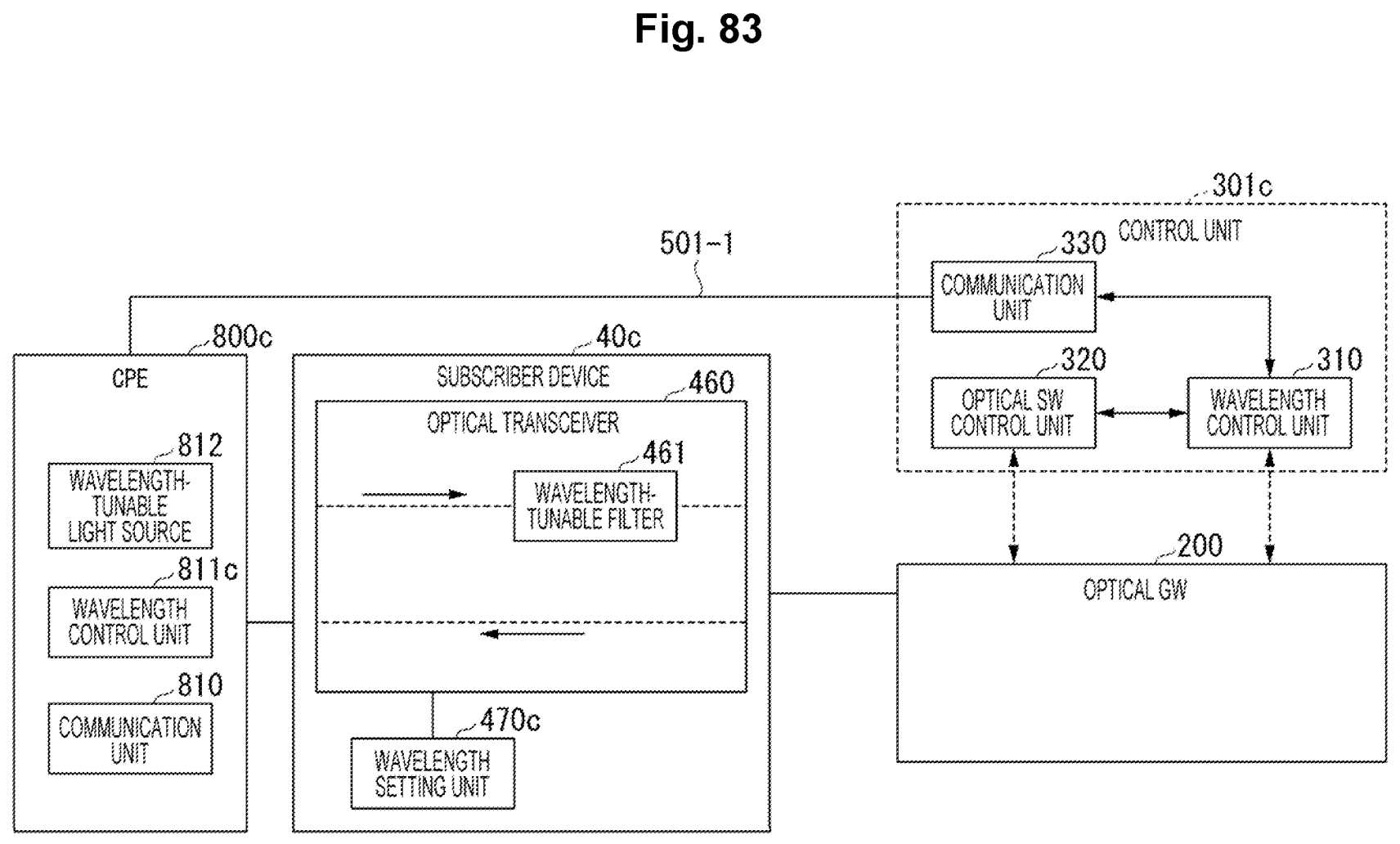

FIGS. 80 to 82 illustrate the configurations in which the CPE 800 communicates with the control unit 301 via the subscriber device 40. In the configurations illustrated in FIGS. 80 to 82, the CPE 800 may be configured to directly communicate with the control unit 301. FIG. 83 is a diagram illustrating a fourth configuration example of the optical access system including the CPE.

The optical access system illustrated in FIG. 83 includes a subscriber device 40c, an optical GW 200, a control unit 301c, and a CPE 800c.

The control unit 301c includes a wavelength control unit 310, an optical SW control unit 320, and a communication unit 330. The communication unit 330 is a communication device used when communicating with the CPE 800 without passing through the optical GW 200. The communication unit 330 communicates with the CPE 800c via the transmission line 501-1.

The communication unit 330 transmits a wavelength instruction in which information such as a wavelength selected in response to the connection request is set to the CPE 800. For example, when the connection request is obtained from the CPE 800, the communication unit 330 transmits the wavelength instruction in which information such as a wavelength selected in response to the connection request is set to the CPE 800. The communication unit 330 may transmit the wavelength instruction in which information such as a wavelength selected in response to the connection request is set to both the subscriber device 40 and the CPE 800 when the connection request is obtained from the subscriber device 40.

The subscriber device 40c includes an optical transceiver 460 and a wavelength setting unit 470c. The optical transceiver 460 is the same as that of the first configuration example illustrated in FIG. 80.

The wavelength setting unit 470c sets a wavelength to be transmitted through the wavelength-tunable filter 461 based on the wavelength instruction transmitted from the control unit 301c. The wavelength setting unit 470c may set the wavelength to be transmitted through the wavelength-tunable filter 461 based on a wavelength instruction transmitted through another line such as a telephone line.

The CPE 800c is connected to the communication unit 330 of the control unit 301c via an optical transmission line 501-1.

The CPE 800c includes a communication unit 810, a wavelength control unit 811c, and a wavelength-tunable light source 812. The communication unit 810 communicates with the control unit 301. For example, the communication unit 810 receives a wavelength instruction from the control unit 301. The wavelength control unit 811c sets the wavelength included in the wavelength instruction received by the communication unit 810 to the wavelength-tunable light source 812. The wavelength-tunable light source 812 transmits an optical signal with a wavelength set by the wavelength control unit 811c to the subscriber device 40c.

Next, a flow of the fourth configuration example illustrated in FIG. 83 will be described.

(Case of the CPE 800c Communicating Directly with the Control Unit 301c)

In the process of step S3 to S6 illustrated in FIG. 42, the subscriber device 40c acquires a wavelength instruction including the information regarding the wavelength used in the subscriber device 40c via the optical GW 200. The wavelength setting unit 470 of the subscriber device 40 sets a wavelength to be transmitted through the tunable filter 461 in the optical transceiver 460 in accordance with the acquired wavelength instruction.

Like the subscriber device 40c, the CPE 800c acquires the wavelength instruction including the information regarding the wavelength used in the CPE 800c via the transmission line 501-1 in the process of step S3 to S6 illustrated in FIG. 42. At this time, the CPE 800c notifies the control unit 301c of the identification information of the connected subscriber device 40c. As a result, the control unit 301c can specify the subscriber device 800c to which the CPE 40c is connected. Then, the control unit 301c notifies the CPE 800c of a wavelength instruction including information of the same wavelength as the wavelength allocated to the specified subscriber device via the transmission line 501-1. As a result, the CPE 800c can acquire a wavelength indication including information regarding the same wavelength as the wavelength allocated to the subscriber device 40c. As described above, substantially, the CPE 800c acquires the wavelength instruction directly from the wavelength control unit 310 in the control unit 301c.

The wavelength control unit 811c of the CPE 800c sets the wavelength of the wavelength-tunable light source 812 in accordance with the acquired wavelength instruction. The wavelength-tunable light source 812 transmits an optical signal with a wavelength set by the wavelength control unit 811c to the subscriber device 40c.

In the optical access system illustrated in FIGS. 80 to 83, an optical transmitter is provided when an optical signal that is a main signal (a control signal in some cases) of the CPE 800 and an optical signal that is a control signal of the subscriber device 40 are multiplexed with light.

The subscriber devices 40, 40a, 40b, and 40c may perform demultiplexing with the main signal and the control signal obtained by performing division multiplexing with a time, a polarized wave, a wavelength, a mode, a frequency, a code, a core, a core wire, or a combination thereof, and communicate with the optical GW 200 or the CPE 800.

The subscriber devices 40, 40a, 40b, and 40c may receive an envelope modulated AMCC signal by branching the signal or the like, perform envelope modulation on the main signal or light of a light source included in the subscriber device 40, and transmit the AMCC signal.

In this configuration, without affecting the main signal, for example, the control signal has a configuration in which division multiplexing is performed by a time, a wavelength, a core, a core wire, or a combination thereof, or division multiplexing is performed by orthogonal polarized waves, modes, or a combination thereof. When at least a wavelength or the like is appropriate, there is an effect that quantum optical communication with the CPE 800 can be accommodated in a case where modulation, amplification, a change in attenuation, and the like including modulation and the like because of a non-linear optical effect in the network including the subscriber device 40 with respect to the main signal from/to the CPE 800 are small enough not to cause collapse of a quantum state used in quantum optical communication, strong observation, or eavesdropping.

In this configuration, when the subscriber device 40 does not include a light source, or an inexpensive light source for a shorter distance to the extent that the control signal from the subscriber device 40 reaches the optical SW is used, there is an effect that a unit price of the subscriber device 40 can be reduced.

Although the wavelength changing process performed by the subscriber device 40 making a request for a change in a wavelength has been described above, the same applies to the wavelength changing process performed by the control unit 20 based on monitoring information or the like.

The control signal is exchanged between the control unit 20 and the subscriber device 40. For example, the subscriber device 40 transmits the connection request to the control unit 20 and the control unit 20 transmits the control signal to the subscriber device 40. For example, the control unit 20 allocates a wavelength used for communication by the subscriber device 40.

The control signal may be monitored by the monitoring unit 60 and may be exchanged between the monitoring unit 60 and the subscriber device 40 and between the monitoring unit 60 and the control unit 20.

The wavelength control unit 310 and the optical SW control unit 320 may be implemented using one information processing device, or may be implemented using a plurality of information processing devices communicably connected via a network.

As illustrated in FIG. 80, the optical GW may be configured as a device (the optical communication device according to the present invention) including any one or all of the OPS 300 or the control unit 20, the optical SW, the monitoring unit, the electrical processing unit, the folded transmission line, the branch combiner/splitter (the power splitter), and the multiplexer/demultiplexer (the WDM device or WDM filter).

In each of the foregoing embodiments, the allocation of the wavelength to the subscriber device 40 has been described as an example. However, a wavelength, a time, polarized waves orthogonal to each other, modes orthogonal to each other, codes orthogonal to each other, a frequency, a core, a core wire, a wavelength that is a combination thereof, or the like may be allocated. For example, the same applies to a multiplexer/demultiplexer when allocation is set for a time, a polarized wave, a mode, a code, a core, or core wire if the multiplexer/demultiplexer is replaced with a combination of a branch combiner/splitter and a delay line, a polarization mode coupler, a mode coupler, a demodulator, a branch combiner/splitter between cores, a branch combiner/splitter between core wires, or the like.

The control units 20, 230, and 235, the monitoring units 260, 265, and 267, the wavelength control unit 310, and the optical SW control unit 320 described above may include a CPU, a memory, an auxiliary storage device, and the like connected by a bus, and may implement some or all of the above-described functions by executing a program. Some or all of the functions of the control units 20, 230, and 235, the monitoring units 260, 265, and 267, the wavelength control unit 310, and the optical SW control unit 320 may be realized using hardware such as ASIC, PLD, or FPGA. The program for the control units 20, 230, and 235, the monitoring units 260, 265, and 267, the wavelength control unit 310, and the optical SW control unit 320 may be recorded in a computer-readable recording medium. The computer-readable recording medium is, for example, a portable medium such as a magneto-optical disk, a ROM, or a CD-ROM, or a storage device such as a hard disk incorporated in a computer system. The program may be transmitted via an electrical communication line.

Although the embodiments of the present invention have been described in detail with reference to the drawings, specific configurations are not limited to the embodiments, and includes design and the like within a range without departing from the gist of the present invention.

INDUSTRIAL APPLICABILITY

The present invention can be applied to an optical access system technology using an optical switch.

REFERENCE SIGNS LIST

1 Optical communication system
10, 10a, 10b, 10c, 10d, 10e, 10f, 10g, 34, 95a-1, 95a-2, 95b-2, 96a-1, 96a-2, 96b-1, 96b-2, 210, 211, 212a, 212b, 212c, 1001, 1002, 1003, 1004, 1005, 1006, 1007, 1008, 1009a, 1009b, 1010-1 to 1010-4 Optical switch
11-1, 11-1-1 to 11-1-P, 11-2, 11-2-1 to 11-2-Q Port
20 Control unit
21, 41, 411, 412 Optical transceiver
22, 42, 237 Optical transmitter
23, 43, 232, 236, 262 Optical receiver
25 Wavelength management control unit
26, 320 Optical SW control unit
30 Optical communication network
31 WDM access ring network
32-1 to 32-r Add/Drop node
33 Demultiplexing unit
35 Multiplexing unit
40, 40-1 to 40-M, 40a-1 to 40a-3, 40b-1 to 40b-3, 40c-1 to 40c-3, 40a-1-1, 40a-1-2, 40-p-1 to 40-p-Np, 40-p-N, 40-p to 40-(p+N) Subscriber device
44 Communication unit
46-1, 46-3 User
46-2 Mobile base station
50-1, 50-2, 50-1-p to 50-1-(p+N), 50-1-p1 to 50-1-pN, 50-1-p-1 to 50-p-Np, 50-2-1 to 50-2-q, 50-2-(N-1), 50-2-N, 50-2-q-1 to 50-2-q-N, 50-2-(1+N), 53, 54a, 54b, 54c, 54d, 92, 93-1 to 93-N, 501, 503, 504, 511, 512, 521, 522, 531, 533, 534, 540, 541, 542, 543-1, 543-2, 544, 545, 546, 547, 548, 549, 551, 551a, 552, 552b, 555, 560, 561, 562, 563, 570, 571, 572, 573, 574, 575, 581, 582, 583, 584, 585, 586, 587, 588, 589 Transmission line
51, 73 Folded transmission line
55, 55-1, 55-2, 55-p, 55-(p+1), 56, 57a, 57b, 61, 66, 69, 71, 72, 251, 251a, 251b, 252, 252b, 254, 258, 259, 270, 271, 272, 273, 502, 507 Power splitter
58, 59 Distribution unit
60a to 60h, 70a to 70g, 65 Monitoring unit
67, 68, 80, 80a, 80b, 80c, 81, 89, 97 WDM device
82a-1 to 82a-n, 82b-1 to 82b-m, 241, 247, 458 Multiplexer

83a-1 to 83a-n, 83b-1 to 83b-m, 242, 248, 457 Demultiplexer
85, 610 O/E converter
86, 620 Processing execution unit
87, 630 E/O converter
88 Storage unit
90, 91 Multiplex communication transmission line
100, 101, 102, 103, 104, 105, 106, 107, 108, 109, 110, 111, 112, 113, 114, 115, 116, 117 Optical access system
200, 201, 202, 203, 204, 205, 206, 207, 208, 209, 2010, 2011, 2012, 2013, 2014, 2015, 2016 Optical gateway
220, 238, 243, 244, 245, 249, 256, 257 Wavelength multiplexer/demultiplexer
230, 235 Control unit
231, 261 Wavelength demultiplexing unit
233, 269 Wavelength-tunable transmitter
250, 250a, 250b, 253, 255 Branching unit
260, 265 Monitoring unit
263, 263a to 263g Blocking part
266 Wavelength-tunable optical receiver
267 Monitoring unit
268 Wavelength-tunable receiver
300 Operation system
301 Control unit
310 Wavelength control unit
330 Communication unit
350 Management database
420 Write region
421 Control signal
422 Control signal
452 Tunable wavelength receiver
453, 461, 462 Wavelength-tunable filter
459, 459a to 459e WDM filter
470, 470a, 470b, 470c Wavelength setting unit
480 Wavelength monitoring unit
84, 600 Electrical processing unit
800, 800c CPE
810 Communication unit
811, 811c Wavelength control unit
812 Wavelength-tunable light source
861 Processor
862 Accelerator
900 Connection device

The invention claimed is:

1. A subscriber device in an optical communication system, the optical communication system including the subscriber device, a user device connected to the subscriber device, an optical switch that relays optical signals between devices, a control unit that allocates information regarding at least a wavelength, a time, a polarized wave, a mode, a code, a frequency, a core, a core wire, or a combination thereof to the user device; and an optical switch control unit that controls the optical switch such that an optical signal of the optical signals transmitted to the subscriber device from the user device is output to another port connected to a transmission line corresponding to a transfer destination on a path to a destination device, the subscriber device comprising:

a filter configured to transmit, in the optical signal transmitted from the user device, the optical signal satisfying a condition set in accordance with the information allocated by the control unit;

wherein the filter filters and blocks the optical signal transmitted from the user device when the optical signal is different from information allocated from the control unit, and a downlink filter configured to transmit, in an optical signal output from the optical switch, the optical signal satisfying the condition set in accordance with the information allocated by the control unit, wherein the downlink filter filters and blocks the optical signal when the optical signal output from the optical switch is different from the information allocated by the control unit.

2. An optical communication system comprising:
the subscriber device according to claim 1;
the user device;
the optical switch;
the control unit; and
the optical switch control unit.

3. The optical communication system according to claim 2, wherein the user device sets the information directly provided in notification by the control unit or the information provided in notification by the subscriber device as a light source and transmits the optical signal to the subscriber device.

4. A subscriber device in an optical communication system, the optical communication system including the subscriber device, a user device connected to the subscriber device, an optical switch that relays an optical signals between devices, a control unit that allocates information regarding at least a wavelength, a time, a polarized wave, a mode, a code, a frequency, a core, a core wire, or a combination thereof to the user device; and an optical switch control unit that controls the optical switch such that an optical signal of the optical signals transmitted to the subscriber device from the user device is output to another port connected to a transmission line corresponding to a transfer destination on a path to a destination device, the subscriber device comprising:

a monitoring unit configured to monitor an optical signal transmitted from the user device;

wherein the monitoring unit gives an instruction to the user device when the optical signal transmitted from the user device is different from the information allocated by the control unit, and transmits an optical signal through the optical switch when the optical signal transmitted from the user device is identical to the information allocated from the control unit; and a downlink monitoring unit configured to monitor an optical signal output from the optical switch, wherein when the optical signal output from the optical switch is different from information allocated by the control unit, the downlink monitoring unit notifies the control unit or inquiries about the information, or instructs the user device to receive the optical signal in accordance with downlink information.

5. A subscriber device in an optical communication system, the optical communication system including the subscriber device, a user device connected to the subscriber device, an optical switch that relays optical signals between devices, a control unit that allocates information regarding at least a wavelength, a time, a polarized wave, a mode, a code, a frequency, a core, a core wire, or a combination thereof to the user device; and an optical switch control unit that controls the optical switch such that an optical signal of the optical signals transmitted to the subscriber device from the user device is output to another port connected to a transmission line corresponding to a transfer destination on a path to a destination device, the subscriber device comprising:

a filter configured to transmit, in the optical signal transmitted from the user device, the optical signal satisfying a condition set in accordance with the information allocated by the control unit;

wherein the filter filters and blocks the optical signal transmitted from the user device when the optical signal is different from information allocated from the control unit, a downlink monitoring unit configured to monitor an optical signal output from the optical switch, wherein when the optical signal output from the optical switch is different from information allocated by the control unit, the downlink monitoring unit notifies the control unit or inquiries about the information, or instructs the user device to receive the optical signal in accordance with downlink information.

* * * * *